(12) United States Patent
Hosseini

(10) Patent No.: US 10,447,093 B2
(45) Date of Patent: Oct. 15, 2019

(54) NEAR-FIELD ANTENNA FOR WIRELESS POWER TRANSMISSION WITH FOUR COPLANAR ANTENNA ELEMENTS THAT EACH FOLLOWS A RESPECTIVE MEANDERING PATTERN

(71) Applicant: Energous Corporation, San Jose, CA (US)

(72) Inventor: Alister Hosseini, Phoenix, AZ (US)

(73) Assignee: Energous Corporation, San Jose, CA (US)

( * ) Notice: Subject to any disclaimer, the term of this patent is extended or adjusted under 35 U.S.C. 154(b) by 0 days.

(21) Appl. No.: 16/024,636

(22) Filed: Jun. 29, 2018

(65) Prior Publication Data

US 2018/0331581 A1 Nov. 15, 2018

Related U.S. Application Data

(63) Continuation-in-part of application No. PCT/US2017/065886, filed on Dec. 12, 2017, which
(Continued)

(51) Int. Cl.
*H02J 7/00* (2006.01)
*H02J 50/20* (2016.01)
(Continued)

(52) U.S. Cl.
CPC ............... *H02J 50/20* (2016.02); *H02J 7/025* (2013.01); *H02J 50/23* (2016.02); *H02J 50/40* (2016.02);
(Continued)

(58) Field of Classification Search
CPC .................................. H02J 50/20; H02J 7/025
(Continued)

(56) References Cited

U.S. PATENT DOCUMENTS

| 787,412 A | 4/1905 | Tesla |
| 3,167,775 A | 1/1965 | Guertler |

(Continued)

FOREIGN PATENT DOCUMENTS

| CN | 102292896 A | 12/2011 |
| CN | 102860037 A | 1/2013 |

(Continued)

OTHER PUBLICATIONS

Energous Corp., ISRWO, PCT/US2017/065886, Apr. 6, 2018, 13 pgs.
(Continued)

*Primary Examiner* — Suchin Parihar
(74) *Attorney, Agent, or Firm* — Morgan, Lewis & Bockius LLP

(57) ABSTRACT

A near-field antenna is provided, which includes: a reflector and four distinct antenna elements, offset from the reflector, each of the four distinct antenna elements following respective meandering patterns. Two antenna elements of the four antenna elements form a first dipole antenna along a first axis, and another two antenna elements of the four antenna elements form a second dipole antenna along a second axis perpendicular to the first axis. The near-field antenna further includes: (i) a power amplifier configured to feed electromagnetic signals to one of the dipole antennas, (ii) an impedance-adjusting component configured to adjust an impedance of one of the dipole antennas, and (iii) switch circuitry coupled to the power amplifier, the impedance-adjusting component, and the dipole antennas. The switch circuitry is configured to switchably couple the first dipole antenna to the power amplifier and the second dipole antenna to the impedance-adjusting component, and vice versa.

20 Claims, 56 Drawing Sheets
(9 of 56 Drawing Sheet(s) Filed in Color)

Related U.S. Application Data is a continuation of application No. 15/833,790, filed on Dec. 6, 2017, now Pat. No. 10,079,515, which is a continuation-in-part of application No. 15/424,552, filed on Feb. 3, 2017, said application No. 16/024,636 is a continuation-in-part of application No. 15/269,729, filed on Sep. 19, 2016, which is a continuation of application No. 15/046,348, filed on Feb. 17, 2016, now Pat. No. 10,027,158.

(60) Provisional application No. 62/433,227, filed on Dec. 12, 2016, provisional application No. 62/541,581, filed on Aug. 4, 2017, provisional application No. 62/374,578, filed on Aug. 12, 2016, provisional application No. 62/387,205, filed on Dec. 24, 2015.

(51) Int. Cl.
*H02J 7/02* (2016.01)
*H02J 50/40* (2016.01)
*H02J 50/23* (2016.01)
*H04B 5/00* (2006.01)
*H04W 4/80* (2018.01)

(52) U.S. Cl.
CPC ............. *H04B 5/0037* (2013.01); *H04W 4/80* (2018.02); *Y02B 40/90* (2013.01)

(58) Field of Classification Search
USPC ........................................................ 320/108
See application file for complete search history.

(56) References Cited

U.S. PATENT DOCUMENTS

| | | | |
|---|---|---|---|
| 3,434,678 A | 3/1969 | Brown et al. | |
| 3,696,384 A | 10/1972 | Lester | |
| 3,754,269 A | 8/1973 | Clavin | |
| 4,101,895 A | 7/1978 | Jones, Jr. | |
| 4,360,741 A | 11/1982 | Fitzsimmons et al. | |
| 4,944,036 A | 7/1990 | Hyatt | |
| 4,995,010 A | 2/1991 | Knight | |
| 5,200,759 A | 4/1993 | McGinnis | |
| 5,211,471 A | 5/1993 | Rohrs | |
| 5,548,292 A | 8/1996 | Hirshfield et al. | |
| 5,556,749 A | 9/1996 | Mitsuhashi et al. | |
| 5,568,088 A | 10/1996 | Dent et al. | |
| 5,646,633 A | 7/1997 | Dahlberg | |
| 5,697,063 A | 12/1997 | Kishigami et al. | |
| 5,712,642 A | 1/1998 | Hulderman | |
| 5,936,527 A | 8/1999 | Isaacman et al. | |
| 5,982,139 A | 11/1999 | Parise | |
| 6,046,708 A | 4/2000 | MacDonald, Jr. et al. | |
| 6,127,799 A | 10/2000 | Krishnan | |
| 6,127,942 A | 10/2000 | Welle | |
| 6,163,296 A | 12/2000 | Lier et al. | |
| 6,271,799 B1 | 8/2001 | Rief | |
| 6,289,237 B1 | 9/2001 | Mickle et al. | |
| 6,329,908 B1 | 12/2001 | Frecska | |
| 6,421,235 B2 | 7/2002 | Ditzik | |
| 6,437,685 B2 | 8/2002 | Hanaki | |
| 6,456,253 B1 | 9/2002 | Rummeli et al. | |
| 6,476,795 B1 | 11/2002 | Derocher et al. | |
| 6,501,414 B2 | 12/2002 | Amdt et al. | |
| 6,583,723 B2 | 6/2003 | Watanabe et al. | |
| 6,597,897 B2 | 7/2003 | Tang | |
| 6,615,074 B2 | 9/2003 | Mickle et al. | |
| 6,650,376 B1 | 11/2003 | Obitsu | |
| 6,664,920 B1 | 12/2003 | Mott et al. | |
| 6,798,716 B1 | 9/2004 | Charych | |
| 6,803,744 B1 | 10/2004 | Sabo | |
| 6,853,197 B1 | 2/2005 | McFarland | |
| 6,856,291 B2 | 2/2005 | Mickle et al. | |
| 6,911,945 B2 | 6/2005 | Korva | |
| 6,960,968 B2 | 11/2005 | Odendaal et al. | |
| 6,967,462 B1 * | 11/2005 | Landis | H02J 17/00 320/101 |
| 7,003,350 B2 | 2/2006 | Denker et al. | |
| 7,027,311 B2 | 4/2006 | Vanderelli et al. | |
| 7,068,234 B2 | 6/2006 | Sievenpiper | |
| 7,068,991 B2 | 6/2006 | Parise | |
| 7,079,079 B2 | 7/2006 | Jo et al. | |
| 7,183,748 B1 | 2/2007 | Unno et al. | |
| 7,191,013 B1 | 3/2007 | Miranda et al. | |
| 7,193,644 B2 | 3/2007 | Carter | |
| 7,196,663 B2 | 3/2007 | Bolzer et al. | |
| 7,205,749 B2 | 4/2007 | Hagen et al. | |
| 7,215,296 B2 | 5/2007 | Abramov et al. | |
| 7,222,356 B1 | 5/2007 | Yonezawa et al. | |
| 7,274,334 B2 | 9/2007 | o'Riordan et al. | |
| 7,274,336 B2 | 9/2007 | Carson | |
| 7,351,975 B2 | 4/2008 | Brady et al. | |
| 7,359,730 B2 | 4/2008 | Dennis et al. | |
| 7,372,408 B2 | 5/2008 | Gaucher | |
| 7,392,068 B2 | 6/2008 | Dayan | |
| 7,403,803 B2 | 7/2008 | Mickle et al. | |
| 7,443,057 B2 | 10/2008 | Nunally | |
| 7,451,839 B2 | 11/2008 | Perlman | |
| 7,463,201 B2 | 12/2008 | Chiang et al. | |
| 7,471,247 B2 | 12/2008 | Saily | |
| 7,535,195 B1 | 5/2009 | Horovitz et al. | |
| 7,614,556 B2 | 11/2009 | Overhultz et al. | |
| 7,639,994 B2 | 12/2009 | Greene et al. | |
| 7,643,312 B2 | 1/2010 | Vanderelli et al. | |
| 7,652,577 B1 | 1/2010 | Madhow et al. | |
| 7,679,576 B2 | 3/2010 | Riedel et al. | |
| 7,702,771 B2 | 4/2010 | Ewing et al. | |
| 7,786,419 B2 | 8/2010 | Hyde et al. | |
| 7,830,312 B2 | 11/2010 | Choudhury et al. | |
| 7,844,306 B2 | 11/2010 | Shearer et al. | |
| 7,898,105 B2 | 3/2011 | Greene et al. | |
| 7,904,117 B2 | 3/2011 | Doan et al. | |
| 7,911,386 B1 | 3/2011 | Ito et al. | |
| 7,925,308 B2 | 4/2011 | Greene et al. | |
| 8,055,003 B2 | 11/2011 | Mittleman et al. | |
| 8,070,595 B2 | 12/2011 | Alderucci et al. | |
| 8,072,380 B2 | 12/2011 | Crouch | |
| 8,092,301 B2 | 1/2012 | Alderucci et al. | |
| 8,099,140 B2 | 1/2012 | Arai | |
| 8,159,090 B2 | 4/2012 | Greene et al. | |
| 8,228,194 B2 | 7/2012 | Mickle | |
| 8,234,509 B2 | 7/2012 | Gioscia et al. | |
| 8,264,291 B2 | 9/2012 | Morita | |
| 8,276,325 B2 | 10/2012 | Clifton et al. | |
| 8,284,101 B2 | 10/2012 | Fusco | |
| 8,310,201 B1 | 11/2012 | Wright | |
| 8,380,255 B2 | 2/2013 | Shearer et al. | |
| 8,384,600 B2 | 2/2013 | Huang et al. | |
| 8,411,963 B2 | 4/2013 | Luff | |
| 8,432,062 B2 | 4/2013 | Greene et al. | |
| 8,432,071 B2 | 4/2013 | Huang et al. | |
| 8,451,189 B1 | 5/2013 | Fluhler | |
| 8,452,235 B2 | 5/2013 | Kirby et al. | |
| 8,457,656 B2 * | 6/2013 | Perkins | G01S 5/0257 340/686.6 |
| 8,461,817 B2 | 6/2013 | Martin et al. | |
| 8,552,597 B2 | 10/2013 | Song et al. | |
| 8,560,026 B2 | 10/2013 | Chanterac | |
| 8,604,746 B2 | 12/2013 | Lee | |
| 8,621,245 B2 | 12/2013 | Shearer et al. | |
| 8,626,249 B2 | 1/2014 | Kuusilinna et al. | |
| 8,629,576 B2 | 1/2014 | Levine | |
| 8,653,966 B2 | 2/2014 | Rao et al. | |
| 8,674,551 B2 | 3/2014 | Low et al. | |
| 8,686,905 B2 | 4/2014 | Shtrom | |
| 8,712,355 B2 | 4/2014 | Black et al. | |
| 8,712,485 B2 | 4/2014 | Tam | |
| 8,718,773 B2 | 5/2014 | Wills et al. | |
| 8,729,737 B2 | 5/2014 | Schatz et al. | |
| 8,736,228 B1 | 5/2014 | Freed et al. | |
| 8,760,113 B2 | 6/2014 | Keating et al. | |
| 8,770,482 B2 | 7/2014 | Ackermann et al. | |
| 8,772,960 B2 | 7/2014 | Yoshida | |
| 8,832,646 B1 | 9/2014 | Wendling | |

(56) References Cited

U.S. PATENT DOCUMENTS

| | | |
|---|---|---|
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,083,595 B2 | 7/2015 | Rakib et al. |
| 9,088,216 B2 | 7/2015 | Garrity et al. |
| 9,124,125 B2 * | 9/2015 | Leabman ............... H02J 7/025 |
| 9,142,998 B2 | 9/2015 | Yu et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,401,977 B1 | 7/2016 | Gaw |
| 9,409,490 B2 | 8/2016 | Kawashima |
| 9,419,335 B2 | 8/2016 | Pintos |
| 9,444,283 B2 | 9/2016 | Son et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,723,635 B2 | 8/2017 | Nambord et al. |
| 9,793,764 B2 | 10/2017 | Perry |
| 9,853,361 B2 | 12/2017 | Chen et al. |
| 9,867,032 B2 | 1/2018 | Verma |
| 10,014,728 B1 | 7/2018 | Leabman |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,068,703 B1 | 9/2018 | Contopanagos |
| 10,075,008 B1 | 9/2018 | Bell et al. |
| 10,090,699 B1 | 10/2018 | Leabman |
| 10,090,886 B1 | 10/2018 | Bell et al. |
| 10,122,219 B1 | 11/2018 | Hosseini et al. |
| 10,124,754 B1 | 11/2018 | Leabman |
| 10,128,686 B1 | 11/2018 | Leabman et al. |
| 10,134,260 B1 | 11/2018 | Bell et al. |
| 10,135,112 B1 | 11/2018 | Hosseini |
| 10,135,294 B1 | 11/2018 | Leabman |
| 10,141,771 B1 | 11/2018 | Hosseini et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,259 B1 | 12/2018 | Leabman |
| 10,164,478 B2 | 12/2018 | Leabman |
| 10,170,917 B1 | 1/2019 | Bell et al. |
| 10,186,892 B2 | 1/2019 | Hosseini et al. |
| 10,193,396 B1 | 1/2019 | Bell et al. |
| 10,263,432 B1 | 4/2019 | Leabman et al. |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0133592 A1 | 9/2002 | Matsuda et al. |
| 2002/0171594 A1 | 11/2002 | Fang |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brien et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |

(56) References Cited

U.S. PATENT DOCUMENTS

| | | |
|---|---|---|
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalkar et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |

(56) References Cited

U.S. PATENT DOCUMENTS

| | | |
|---|---|---|
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschrnidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |

(56) References Cited

U.S. PATENT DOCUMENTS

| | | |
|---|---|---|
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0313835 A1 | 12/2012 | Gebretnsae |
| 2012/0326660 A1* | 12/2012 | Lu .................. H02J 17/00 320/108 |
| 2013/0002550 A1 | 1/2013 | Zalewski |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yun et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1* | 2/2014 | Lee .................. H04B 5/0037 320/137 |
| 2014/0057618 A1 | 2/2014 | Zirwas et al. |
| 2014/0062395 A1 | 3/2014 | Kwon et al. |
| 2014/0082435 A1 | 3/2014 | Kitagawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0103869 A1 | 4/2014 | Radovic |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |

(56) References Cited

U.S. PATENT DOCUMENTS

| | | |
|---|---|---|
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sankar |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273892 A1 | 9/2014 | Nourbakhsh |
| 2014/0281655 A1 | 9/2014 | Angle et al. |
| 2014/0292090 A1* | 10/2014 | Cordeiro ............ H02J 17/00 307/104 |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabamn |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270741 A1 | 9/2015 | Leabman et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |

(56) References Cited

U.S. PATENT DOCUMENTS

| | | |
|---|---|---|
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020647 A1 | 1/2016 | Leabman et al. |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0202343 A1 | 7/2016 | Okutsu |
| 2016/0204622 A1 | 7/2016 | Leabman |
| 2016/0204642 A1 | 7/2016 | Oh |
| 2016/0238365 A1 | 8/2016 | Wixey et al. |
| 2016/0240908 A1 | 8/2016 | Strong |
| 2016/0294225 A1 | 10/2016 | Blum et al. |
| 2016/0299210 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2016/0380464 A1 | 12/2016 | Chin et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones |
| 2017/0047784 A1 | 2/2017 | Jung et al. |
| 2017/0077733 A1 | 3/2017 | Jeong et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085112 A1 | 3/2017 | Leabman et al. |
| 2017/0085120 A1 | 3/2017 | Leabman et al. |
| 2017/0085127 A1 | 3/2017 | Leabman |
| 2017/0085437 A1 | 3/2017 | Condeixa et al. |
| 2017/0092115 A1 | 3/2017 | Sloo et al. |
| 2017/0104263 A1 | 4/2017 | Hosseini |
| 2017/0110887 A1 | 4/2017 | Bell et al. |
| 2017/0110888 A1 | 4/2017 | Leabman |
| 2017/0110889 A1 | 4/2017 | Bell |
| 2017/0110914 A1 | 4/2017 | Bell |
| 2017/0134686 A9 | 5/2017 | Leabman |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0179771 A1 | 6/2017 | Leabman |
| 2017/0187198 A1 | 6/2017 | Leabman |
| 2017/0187222 A1 | 6/2017 | Hosseini |
| 2017/0187223 A1 | 6/2017 | Hosseini |
| 2017/0187224 A1 | 6/2017 | Hosseini |
| 2017/0187228 A1 | 6/2017 | Hosseini |
| 2017/0187247 A1 | 6/2017 | Leabman |
| 2017/0187248 A1 | 6/2017 | Leabman |
| 2017/0187422 A1 | 6/2017 | Hosseini |
| 2017/0338695 A1 | 11/2017 | Port |
| 2018/0040929 A1 | 2/2018 | Chappelle |
| 2018/0048178 A1 | 2/2018 | Leabman |
| 2018/0123400 A1 | 5/2018 | Leabman |
| 2018/0131238 A1 | 5/2018 | Leabman |
| 2018/0159355 A1 | 6/2018 | Leabman |
| 2018/0166924 A1 | 6/2018 | Hosseini |
| 2018/0166925 A1 | 6/2018 | Hosseini |
| 2018/0198199 A1 | 7/2018 | Hosseini |
| 2018/0226840 A1 | 8/2018 | Leabman |
| 2018/0241255 A1 | 8/2018 | Leabman |
| 2018/0248409 A1 | 8/2018 | Johnston |
| 2018/0262014 A1 | 9/2018 | Bell |
| 2018/0262040 A1 | 9/2018 | Contopanagos |
| 2018/0262060 A1 | 9/2018 | Johnston |
| 2018/0269570 A1 | 9/2018 | Hosseini |
| 2018/0287431 A1 | 10/2018 | Liu et al. |
| 2018/0331429 A1 | 11/2018 | Kornaros |
| 2018/0331581 A1 | 11/2018 | Hosseini |
| 2018/0337534 A1 | 11/2018 | Bell et al. |
| 2018/0375340 A1 | 12/2018 | Bell et al. |
| 2018/0375368 A1 | 12/2018 | Leabman |
| 2018/0376235 A1 | 12/2018 | Leabman |

FOREIGN PATENT DOCUMENTS

| | | |
|---|---|---|
| CN | 203826555 U | 9/2014 |
| CN | 104090265 A | 10/2014 |
| CN | 103380561 B | 9/2017 |
| DE | 200216655 U1 | 2/2002 |
| EP | 1028482 A2 | 8/2000 |

(56) References Cited

FOREIGN PATENT DOCUMENTS

| | | |
|---|---|---|
| EP | 1081506 A1 | 3/2001 |
| EP | 2397973 A1 | 6/2010 |
| EP | 2346136 A1 | 7/2011 |
| EP | 2545635 A2 | 1/2013 |
| GB | 2404497 A | 2/2005 |
| JP | 2002319816 a | 10/2002 |
| JP | 2006157586 A | 6/2006 |
| JP | 2007043432 A | 2/2007 |
| JP | 2008167017 A | 7/2008 |
| JP | 2015128349 A | 7/2015 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| WO | WO 9952173 | 10/1999 |
| WO | WO 200111716 A1 | 2/2001 |
| WO | WO 2003091943 A1 | 11/2003 |
| WO | WO 2004077550 A1 | 9/2004 |
| WO | WO 2006122783 | 11/2006 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |

OTHER PUBLICATIONS

Order Granting Reexamination Request Control No. 90013793 Aug. 31, 2016, 23 pgs.
Ossia Inc. vs Energous Corp., PGR2016-00023-Institution Decision, Nov. 29, 2016, 29 pgs.
Ossia Inc. vs Energous Corp., PGR2016-00024-Institution Decision, Nov. 29, 2016, 50 pgs.
Ossia Inc. vs Energous Corp., PGR2016-00024-Judgement-Adverse, Jan. 20, 2017, 3 pgs.
ReExam Ordered Control No. 90013793 Feb. 2, 2017, 8 pgs.
Ossia Inc. vs Energous Corp., Declaration of Stephen B. Heppe in Support of Petition for Post-Grant Review of U.S. Pat. No. 9,124,125, PGR2016-00024, May 31, 2016, 122 pgs.
Ossia Inc. vs Energous Corp., Petition for Post-Grant Review of U.S. Pat. No. 9,124,125, May 31, 2016, 92 pgs.
Ossia Inc. vs Energous Corp., Patent Owner Preliminary Response, Sep. 8, 2016, 95 pgs.
Ossia Inc. vs Energous Corp., Petition for Post Grant Review of U.S. Pat. No. 9,124,125, May 31, 2016, 86 pgs.
Ossia Inc. vs Energous Corp., Declaration of Stephen B. Heppe in Support of Petition for Post-Grant Review of U.S. Pat. No. 9,124,125, PGR2016-00023, May 31, 2016, 144 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334, Oct. 3, 2013.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.
Li et al. High-Efficiency Switching-Mode Charger System Design Considerations with Dynamic Power Path Management, Mar./Apr. 2012 Issue, 8 pgs.
Energous Corp. ISRWO, PCT/US2014/037170, dated Sep. 15, 2014, 11 pgs.
Energous Corp., IPRP, PCT/US2014/037170, dated Nov 10, 2015, 8 pgs.
Energous Corp., ISRWO, PCT/US2014/041534, dated Oct. 13, 2013, 10 pgs.
Energous Corp., IPRP, PCT/US2014/041534, dated Dec. 29, 2015, 7 pgs.
Energous Corp., ISRWO, PCT/US2014/046956, dated Nov. 12, 2014, 10 pgs.
Energous Corp., IPRP, PCT/US2014/046956, dated Jan. 19, 2016, 7 pgs.
Energous Corp., ISRWO, PCT/US2014/037072, dted Sep. 12, 2014, 8 pgs.
Energous Corp., IPRP, PCT/US2014/037072, dated Nov. 10, 2015, 6 pgs.
Energous Corp., ISRWO, PCT/US2014/068568, dated Mar. 20, 2015, 10 pgs.
Energous Corp., IPRP, PCT/US2014/068568, dated Jun. 14, 2016, 8 pgs.
Energous Corp., ISRWO, PCT/US2014/055195, dated Dec 22, 2014, 11 pgs.
Energous Corp., IPRP, PCT/US2014/055195, dated Mar. 22, 2016, 9 pgs.
Energous Corp., ISRWO, PCT/US2015/067291, dated Mar. 4, 2016, 10 pgs.
Energous Corp., IPRP, PCT/US2015/067291, dated Jul. 4, 2017, 4 pgs.
Energous Corp., ISRWO, PCT/US2015/067242, dated Mar. 16, 2016, 9 pgs.
Energous Corp., IPRP, PCT/US2015/067242, dated Jun. 27, 2017, 7 pgs.
Energous Corp., ISRWO, PCT/US2015/067243, dated Mar. 10, 2016, 11 pgs.

(56) References Cited

OTHER PUBLICATIONS

Energous Corp., IPRP, PCT/US2015/067243, dated Jun. 27, 2017, 7 pgs.
Energous Corp., ISRWO, PCT/US2014/037109, dated Apr. 8, 2016, 12 pgs.
Energous Corp., IPRP, PCT/US2014/037109, dated Apr. 12, 2016, 9 pgs.
Energous Corp., ISRWO, PCT/US2015/067275, dated 3, 2016, 8 pgs.
Energous Corp., IPRP, PCT/US2015/067275, dated Jul. 4, 2017, 7 pgs.
Energous Corp., ISRWO, PCT/US2015/067245, dated Mar. 17, 2016, 8 pgs.
Energous Corp., IPRP, PCT/US2015/067245, dated Jun. 27, 2017, 7 pgs.
Energous Corp., ISRWO, PCT/US2014/041546, dated Oct. 16, 2014, 12 pgs.
Energous Corp., IPRP, PCT/US2014/041546, dated Dec. 29, 2019, 9 pgs.
Energous Corp., ISRWO, PCT/US2015/67250, dated Mar. 30, 2016, 11 pgs.
Energous Corp., IPRP, PCT/US2015/67250, dated Mar. 30, 2016, 10 pgs.
Energous Corp., ISRWO, PCT/US2015/067325, dated Mar. 10, 2016, 9 pgs.
Energous Corp., IPRP, PCT/US2015/067325, dated Jul. 4, 2017, 8 pgs.
Energous Corp., ISRWO, PCT/US2014/040697, dated Oct. 1, 2014, 12 pgs.
Energous Corp., IPRP, PCT/US2014/040697, dated Dec. 8, 2015, 9 pgs.
Energous Corp., ISRWO, PCT/US2014/040705, dated Sep. 23, 2014, 8 pgs.
Energous Corp., IPRP, PCT/US2014/040705, dated Dec. 8, 2015, 6 pgs.
Energous Corp., ISRWO, PCT/US2015/067249, dated Mar. 29, 2016, 8 pgs.
Energous Corp., IPRP, PCT/US2015/067249, dated Jun. 27, 2017, 7 pgs.
Energous Corp., ISRWO, PCT/US2015/067246, dated May 11, 2016, 18 pgs.
Energous Corp., IPRP, PCT/US2015/067246, dated Jun. 27, 2019, 9 pgs.
Energous Corp., ISRWO, PCT/US2014/059317, dated Feb. 24, 2015, 13 pgs.
Energous Corp., IPRP, PCT/US2014/059317, dated Apr. 12, 2016, 10 pgs.
Energous Corp., ISRWO, PCT/US2014/049669, dated Nov. 13, 2014, 10 pgs.
Energous Corp., IPRP, PCT/US2014/049669, dated Feb. 9, 2016, 8 pgs.
Energous Corp., ISRWO, PCT/US2014/041323, dated Oct. 1, 2014, 10 pgs.
Energous Corp., IPRP, PCT/US2014/041323, dated Dec. 22, 2015, 8 pgs.
Energous Corp., ISRWO, PCT/US2014/048002, dated Nov. 13, 2014, 11 pgs.
Energous Corp., IPRP, PCT/US2014/048002, dated Feb. 12, 2015 8 pgs.
Energous Corp., ISRWO, PCT/US2014/062682, dated Feb. 12, 2015, 10 pgs.
Energous Corp., IPRP, PCT/US2014/062682, dated May 3, 2016, 8 pgs.
Energous Corp., ISRWO, PCT/US2014/049666, dated Nov. 10, 2014, 7 pgs.
Energous Corp., IPRP, PCT/US2014/049666, dated Feb. 9, 2016, 5 pgs.
Energous Corp., ISRWO, PCT/US2014/046961, dated Nov. 24, 2014, 16 pgs.
Energous Corp., IPRP, PCT/US2014/046961, dated Jan. 19, 2016, 8 pgs.
Energous Corp., ISRWO, PCT/US2015/067279, dated Mar. 11, 2015, 13 pgs.
Energous Corp., IPRP, PCT/US2015/067279, dated Jul. 4, 2017, 7 pgs.
Energous Corp., ISRWO, PCT/US2014/041342, dated Jan. 27, 2015, 10 pgs.
Energous Corp., IPRP, PCT/US2014/041342, dated Dec. 15, 2015, 8 pgs.
Energous Corp., ISRWO, PCT/US2014/046941, dated Nov. 6, 2014, 11 pgs.
Energous Corp., IPRP, PCT/US2014/046941, dated Jan. 19, 2016, 9 pgs.
Energous Corp., ISRWO, PCT/US2014/062661, dated Jan. 27, 2015, 12 pgs.
Energous Corp., IPRP, PCT/US2014/062661, dated May 3, 2016, 10 pgs.
Energous Corp., ISRWO, PCT/US2014/059871, dated Jan. 23, 2015, 12 pgs.
Energous Corp., IPRP, PCT/US2014/059871, dated Apr. 12, 2016, 9 pgs.
Energous Corp., ISRWO, PCT/US2014/045102, dated Oct. 28, 2014, 14 pgs.
Energous Corp., IPRP, PCT/US2014/045102, dated Jan. 12, 2016, 11 pgs.
Energous Corp., ISRWO, PCT/US2014/059340, dated Jan. 15, 2015, 13 pgs.
Energous Corp., IPRP, PCT/US2014/059340, dated Apr. 12, 2016, 11 pgs.
Energous Corp., ISRWO, PCT/US2015/067282, dated Jul. 5, 2016, 7 pgs.
Energous Corp., IPRP, PCT/US2015/067282, dated Jul. 4, 2016, 6 pgs.
Energous Corp., ISRWO, PCT/US2014/041558, dated Oct. 10, 2014, 8 pgs.
Energous Corp., IPRP, PCT/US2014/041558, dated Dec. 29, 2015, 6 pgs.
Energous Corp., ISRWO, PCT/US2014/045119, dated Oct. 13, 2014, 11 pgs.
Energous Corp., IPRP, PCT/US2014/045119, dated Jan. 12, 2016, 9 pgs.
Energous Corp., ISRWO PCT/US2014/045237, dated Oct. 13, 2014, 16 pgs.
Energous Corp., IPRP, PCT/US2014/045237, dated Jan. 12, 2019, 12 pgs.
Energous Corp., ISRWO, PCT/US2014/054897, dated Feb. 17, 2015, 10 pgs.
Energous Corp., IPRP, PCT/US2014/054897, dated Mar. 15, 2016, 8 pgs.
Energous Corp., ISRWO, PCT/US2015/067334, dated Mar. 3, 2016, 6 pgs.
Energous Corp., IPRP, PCT/US2015/067334, dated Jul. 4, 2017, 5 pgs.
Energous Corp., ISRWO, PCT/US2014/047963, dated Nov. 7, 2014, 13 pgs.
Energous Corp., IPRP, PCT/US2014/047963, dated Jan. 26, 2016, 10 pgs.
Energous Corp., ISRWO, PCT/US2014/054891, dated Dec. 18, 2014, 12 pgs.
Energous Corp., IPRP, PCT/US2014/054891, dated Mar. 15, 2016, 10 pgs.
Energous Corp., ISRWO, PCT/US2014/054953, dated Dec. 4, 2014, 7 pgs.
Energous Corp., IPRP, PCT/US2014/054953, dated Mar. 22, 2016, 5 pgs.
Energous Corp., ISRWO, PCT/US2015/067294, dated Mar. 29, 2016, 7 pgs.
Energous Corp., IPRP, PCT/US2015/067294, dated Jul. 4, 2017, 6 pgs.
Energous Corp., ISRWO, PCT/US2014/062672 dated Jan. 26, 2015, 11 pgs.

(56) References Cited

OTHER PUBLICATIONS

Energous Corp., IPRP, PCT/US2014/062672 dated May 10, 2016, 8 pgs.
Energous Corp., ISRWO, PCT/US2014/044810 dated Oct. 21, 2014, 12 pgs.
Energous Corp., IPRP, PCT/US2014/044810, dated Jan. 5, 2016, 10 pgs.
Energous Corp., ISRWO, PCT/US2015/067271, dated Mar. 11, 2016, 6 pgs.
Energous Corp., IPRP, PCT/US2015/067271, dated Jul. 4, 2015, 5 pgs.
Energous Corp., ISRWO, PCT/US2014/040648, dated Oct. 10, 2014, 11 pgs.
Energous Corp., IPRP, PCT/US2014/040648, dated Dec. 8, 2015, 8 pgs.
Energous Corp., ISRWO, PCT/US2014/049673, dated Nov. 8, 2014, 10 pgs.
Energous Corp., IPRP, PCT/US2014/049673, dated Feb. 9, 2016, 6 pgs.
Energous Corp., ISRWO, PCT/US2014/068282, dated Mar. 19, 2015, 13 pgs.
Energous Corp., IPRP, PCT/US2014/068282, dated Jun. 7, 2016, 10 pgs.
Energous Corp., ISRWO, PCT/US2014/068586, dated Mar. 20, 2015, 11 pgs.
Energous Corp., IPRP, PCT/US2014/068586, dated Jun. 14, 2016, 8 pgs.
Energous Corp., ISRWO, PCT/US2016/068504, dated Mar. 30, 2017, 8 pgs.
Energous Corp., ISRWO, PCT/US2016/068495, dated Mar. 30, 2017, 9 pgs.
Energous Corp., ISRWO, PCT/US2015/067287, dated Feb. 2, 2016, 8 pgs.
Energous Corp., IPRP, PCT/US2015/067287, dated Jul. 4, 2017, 6 pgs.
Energous Corp., ISRWO, PCT/US2016/068551, dated Mar. 17, 2017, 8 pgs.
Energous Corp., ISRWO, PCT/US2016/068498, dated May 17, 2017, 8 pgs.
Energous Corp., ISRWO, PCT/US2016/068993, dated Mar. 13, 2017, 12 pgs.
Energous Corp., ISRWO, PCT/US2016/068565, dated Mar. 8, 2017, 11 pgs.
Energous Corp., ISRWO, PCT/US2016/068987, dated May 8, 2017, 10 pgs.
Energous Corp., ISRWO, PCT/US2016/069316, dated Mar. 16, 2017, 15 pgs.
Energous Corp., ISRWO, PCT/US2018/012806, dated Mar. 23, 2018, 9 pgs.
Energous Corp., ISRWO, PCT/US2017/046800, dated Sep. 11, 2017, 13 pgs.
Energous Corp., ISRWO, PCT/US2017/065886, dated Apr. 6, 2018, 13 pgs.
Energous Corp., ISRWO, PCT/US2018/064289, dated Mar. 28, 2019, 14 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.8, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2019, 5 pgs.
European Search Report, EP Patent Application No. 14868901.1, dated Jul. 7, 2017, 5 pgs.
European Search Report EP15876036, dated May 3, 2018, 8 pgs.
Supplemental European Search Report. EP15874273.4, dated May 11, 2018, 7 pgs.
Supplemental European Search Report. EP15876033.0, dated Jun. 13, 2018, 10 pgs.

\* cited by examiner

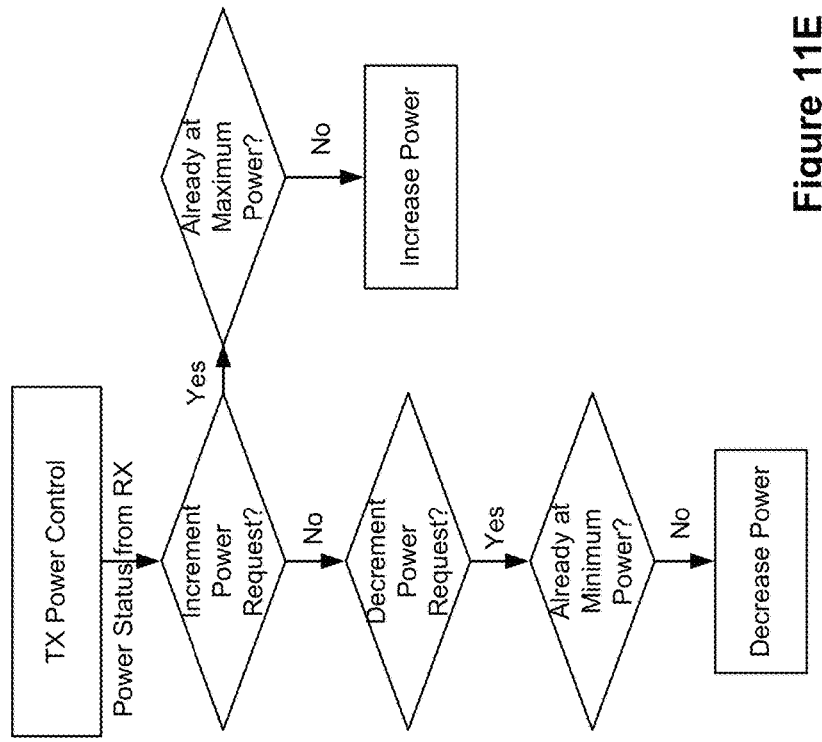
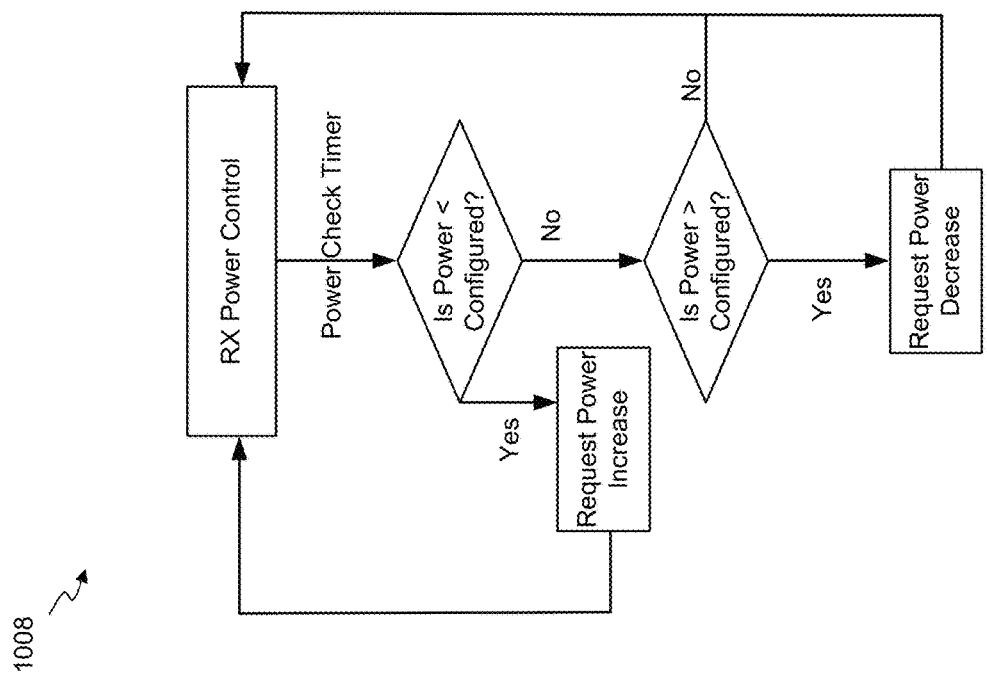
Figure 11E

Method 1300

Provide a charging pad comprising one or more RF antennas, wherein each RF antenna comprises: a meandered conductive line pattern; an input terminal; and a plurality of adaptive load terminals at a plurality of positions of the meandered conductive line
1302

Transmit RF Signal(s)
1304

Monitor Energy Transmitted from RF antennas to RF receivers
1306

Adjust Frequency and/or Impedance of the RF antennas to Optimize Energy Transfer
1308

Figure 13

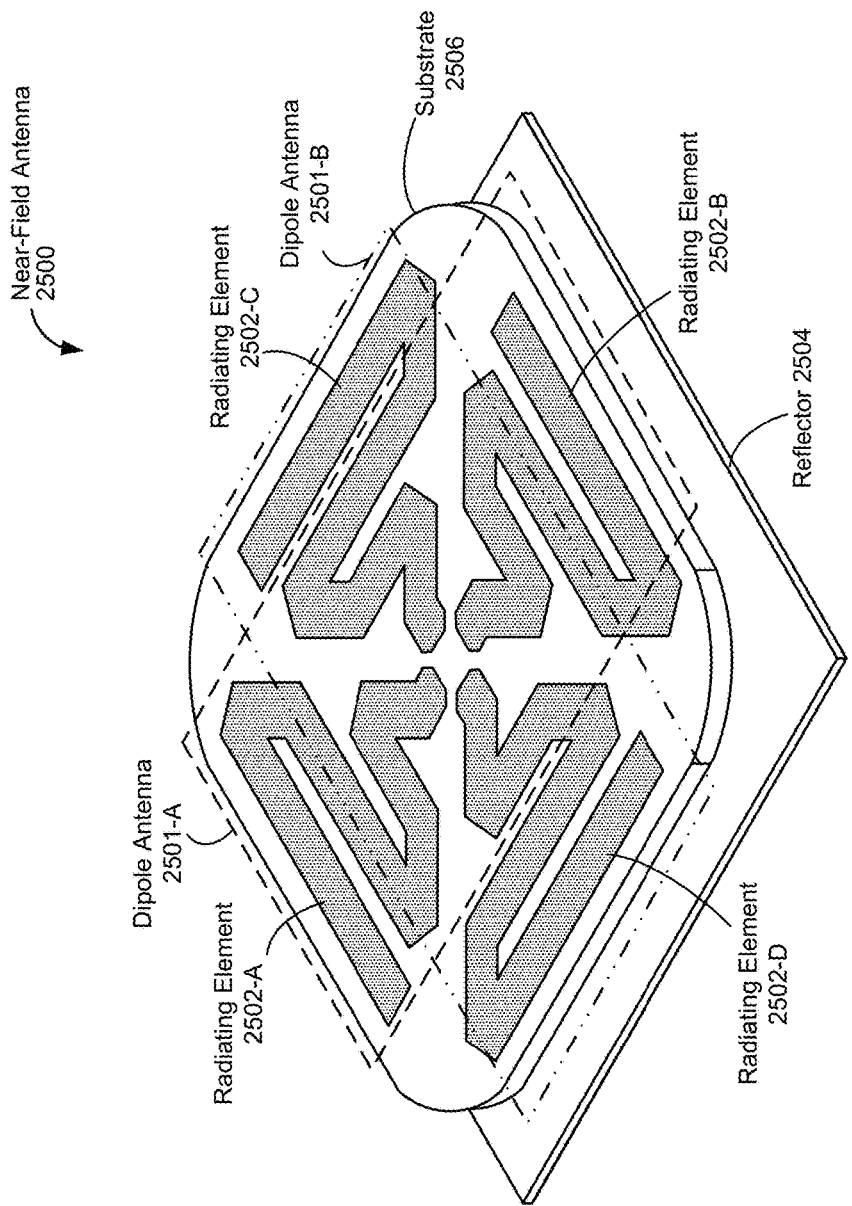
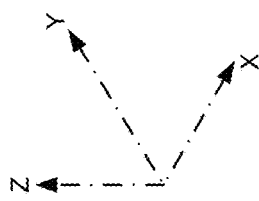
Figure 25A

3000

Providing a wireless power transmitter comprising: (i) a reflector, (ii) four distinct coplanar antenna elements, offset from the reflector, each following respective meandering patterns, (iii) switch circuitry coupled to at least two of the four coplanar antenna elements, (iv) a power amplifier coupled to the switch circuitry, and (v) an impedance-adjusting component coupled to the switch circuitry. Two antenna elements of the four coplanar antenna elements form a first dipole antenna aligned with a first axis; and (ii) another two antenna elements of the four coplanar antenna elements form a second dipole antenna aligned with a second axis perpendicular to the first axis ⎯3002

Instruct the switch circuitry to couple: (i) the first dipole antenna to the power amplifier, and (ii) the second dipole antenna to the impedance-adjusting component ⎯3004

Instruct the power amplifier to feed electromagnetic signals to the first dipole antenna via the switch circuitry ⎯3006

The electromagnetic signals, when fed to the first dipole antenna, cause the first dipole antenna to radiate electromagnetic signals

Figure 30

NEAR-FIELD ANTENNA FOR WIRELESS POWER TRANSMISSION WITH FOUR COPLANAR ANTENNA ELEMENTS THAT EACH FOLLOWS A RESPECTIVE MEANDERING PATTERN

RELATED APPLICATIONS

This application is a continuation-in-part of PCT Patent Application No. PCT/US17/65886, filed Dec. 12, 2017, which is a continuation of U.S. Non-Provisional patent application Ser. No. 15/833,790, filed Dec. 6, 2017, which is a continuation-in-part of U.S. Non-Provisional patent application Ser. No. 15/424,552, filed Feb. 3, 2017, which claims priority to U.S. Provisional Application Ser. No. 62/433,227, filed Dec. 12, 2016. PCT Patent Application No. PCT/US17/65886 also claims priority to U.S. Provisional Application Ser. No. 62/541,581, filed Aug. 4, 2017. Each of these applications is hereby incorporated by reference in its respective entirety.

This application is also a continuation-in-part of U.S. Non-Provisional patent application Ser. No. 15/269,729, filed Sep. 19, 2016, which (i) claims priority to U.S. Provisional Application Ser. No. 62/374,578, filed Aug. 12, 2016, and (ii) is also a continuation-in-part of U.S. Non-Provisional patent application Ser. No. 15/046,348, filed Feb. 17, 2016, which claims priority to U.S. Provisional Application Ser. No. 62/387,205, filed Dec. 24, 2015. Each of these applications is hereby incorporated by reference in its respective entirety.

TECHNICAL FIELD

The embodiments herein generally relate to near-field wireless power transmission systems (e.g., antennas, software, and devices used in such systems) and, more specifically, to a near-field antenna for wireless power transmission with four coplanar antenna elements that each follows a respective meandering pattern.

BACKGROUND

Conventional charging pads utilize inductive coils to generate a magnetic field that is used to charge a device. Users typically must place the device at a specific position on the charging pad and are unable to move the device to different positions on the pad, without interrupting or terminating the charging of the device. This results in a frustrating experience for many users as they may be unable to locate the device at the exact right position on the pad in which to start charging their device. Often, users may think that their device has been properly positioned, but may then dishearteningly find hours later that very little (or no) energy has been transferred.

Conventional charging pads also utilize components that are distributed across multiple different integrated circuits. Such a configuration results in processing delays that cause these charging pads to operate slower (e.g., wireless charging and adjustments made during wireless charging takes longer) than is desired by users of such pads.

SUMMARY

Accordingly, there is a need for wireless charging systems (e.g., RF charging pads) that address the problems identified above. To this end, an RF charging pad is described herein that includes components that are efficiently arranged on a single integrated circuit, and that single integrated circuit manages antennas of the RF charging pad by selectively or sequentially activating antenna zones (e.g., one or more antennas or unit cell antennas of the RF charging pad that are grouped together, also referred to herein as an antenna group) to locate an efficient antenna zone to use for transmission of wireless power to a receiver device that is located on a surface of the RF charging pad. Such systems and methods of use thereof help to eliminate user dissatisfaction with conventional charging pads. For example, by monitoring transferred energy while selectively activating the antenna zones, such systems and methods of use thereof help to eliminate wasted RF power transmissions by ensuring that energy transfer is maximized at any point in time and at any position at which a device may be placed on an RF charging pad, thus eliminating wasteful transmissions that may not be efficiently received.

In the description that follows, references are made to an RF charging pad that includes various antenna zones. For the purposes of this description, antenna zones include one or more transmitting antennas of the RF charging pad, and each antenna zone may be individually addressable by a controlling integrated circuit (e.g., RF power transmitter integrated circuit 160, FIGS. 1A-1B) to allow for selective activation of each antenna zone in order to determine which antenna zone is able to most efficiently transfer wireless power to a receiver. The RF charging pad is also inter-changeably referred to herein as a near-field charging pad, or, more simply, as a charging pad.

(A1) In some embodiments, a method is performed at a near-field charging pad that includes a wireless communication component (e.g., communication component 204, FIG. 1A), a plurality of antenna zones that each respectively include at least one antenna element (e.g., example antenna zones are shown in FIG. 1B), and one or more processors (e.g., CPU 202, FIGS. 1B and 2A). The method includes detecting, via the wireless communication component, that a wireless power receiver is within a threshold distance of the near-field charging pad and in response to detecting that the wireless power receiver is within the threshold distance of the near-field charging pad, determining whether the wireless power receiver has been placed on the near-field charging pad. The method further includes, in accordance with determining that the wireless power receiver has been placed on the near-field charging pad, selectively transmitting, by respective antenna elements included in the plurality of antenna zones, respective test power transmission signals with a first set of transmission characteristics until a determination is made that a particular power-delivery parameter associated with transmission of a respective test power transmission signal by at least one particular antenna zone of the plurality of antenna zones satisfies power-delivery criteria. Upon determining, by the one or more processors, that the particular power-delivery parameter satisfies the power-delivery criteria, the method further includes transmitting a plurality of additional power transmission signals to the wireless power receiver using the at least one particular antenna zone, wherein each additional power transmission signal of the plurality is transmitted with a second set of transmission characteristics, distinct from the first set.

(A2) In some embodiments of the method of A1, determining whether the wireless power receiver has been placed on the surface of the near-field charging pad includes: (i) transmitting the test power transmission signals using each of the plurality of antenna zones, (ii) monitoring an amount of reflected power at the near-field charging pad while transmitting the test power transmission signals, and (iii)

determining that the wireless power receiver has been placed on the near-field charging pad when the amount of reflected power satisfies a device detection threshold.

(A3) In some embodiments of the method of A2, the amount of reflected power is measured at each antenna zone of the plurality of antenna zones.

(A4) In some embodiments of the method of any of A2-A3, the device detection threshold is established during a calibration process for the near-field charging pad.

(A5) In some embodiments of the method of A4, the device detection threshold is specific to a type of device that is coupled with the wireless power receiver, and the device detection threshold is selected by the one or more processors after detecting the wireless power receiver in proximity to the near-field charging pad (e.g., the wireless power receiver sends a packet of information to the near-field charging pad, and that packet of information includes information that identifies the type of device that is coupled with the wireless power receiver).

(A6) In some embodiments of the method of any of A1-A5, selectively transmitting the respective test power transmission signals is performed using each antenna zone of the plurality of antenna zones. In addition, the method further comprises, before the determination is made that the power-delivery parameter associated with transmission of the respective test power transmission signal by the at least one particular antenna zone of the plurality of antenna zones satisfies the power-delivery criteria: (i) updating a respective power-delivery parameter associated with transmission of a respective test power transmission signal by each respective antenna zone based on the transmission by each antenna zone, and (ii) selecting two or more antenna zones, including the at least one particular antenna zone, based on their associated respective power-delivery parameters, to transmit wireless power to the wireless power receiver.

(A7) In some embodiments of the method of A6, the method further comprises using each of the two or more antenna zones to transmit additional test power transmission signals having the first set of transmission characteristics. Moreover, the determination that the particular power-delivery parameter satisfies the power-delivery criteria includes determining that the particular power-delivery parameter indicates that the particular antenna zone is more efficiently transmitting wireless power to the wireless power receiver as compared to other antenna zones of the two or more antenna zones.

(A8) In some embodiments of the method of any of A6-A7, the determination that the particular power-delivery parameter satisfies the power-delivery criteria also includes determining that the particular power-delivery parameter indicates that a first threshold amount of power is transferred to the wireless power receiver by the at least one particular antenna zone, and the at least one particular antenna zone is the only antenna zone of the two or more antenna zones having a respective power-delivery parameter that indicates that the first threshold amount of power is transferred to the wireless power receiver.

(A9) In some embodiments of the method of any of A6-A8, the determination that the particular power-delivery parameter satisfies the power-delivery criteria also includes determining that (i) no antenna zone is transferring a first threshold amount of power to the wireless power receiver and (ii) an additional power-delivery parameter associated with an additional antenna zone of the two or more antenna zones satisfies the power-delivery criteria. In addition, the particular power-delivery parameter indicates that a first amount of power transferred to the wireless power receiver by the particular antenna zone is above a second threshold amount of power and below the first threshold amount of power, and the additional power-delivery parameter indicates that a second amount of power transferred to the wireless power receiver by the additional antenna zone is above the second threshold amount of power and below the first threshold amount of power.

(A10) In some embodiments of the method of A9, both of the particular antenna group and the additional antenna group are used to simultaneously transmit the additional plurality of power transmission signals to provide power to the wireless power receiver.

(A11) In some embodiments of the method of any of A1-A10, information used to determine the power-delivery parameter is provided to the near-field charging pad by the wireless power receiver via the wireless communication component of the near-field charging pad.

(A12) In some embodiments of the method of any of A1-A11, the second set of transmission characteristics is determined by adjusting at least one characteristic in the first set of transmission characteristics to increase an amount of power that is transferred by the particular antenna group to the wireless power receiver.

(A13) In some embodiments of the method of A12, the at least one adjusted characteristic is a frequency or impedance value.

(A14) In some embodiments of the method of any of A1-A13, while transmitting the additional plurality of power transmission signals, adjusting at least one characteristic in the second set of transmission characteristics based on information, received from the wireless power receiver, that is used to determine a level of power that is wirelessly delivered to the wireless power receiver by the near-field charging pad.

(A15) In some embodiments of the method of any of A1-A14, the one or more processors are components of a single integrated circuit that is used to control operation of the near-field charging pad. For example, any of the methods described herein are managed by the single integrated circuit, such as an instance of the radio frequency (RF) power transmitter integrated circuit 160 shown in FIG. 1B.

(A16) In some embodiments of the method of any of A1-A15, each respective power-delivery metric corresponds to an amount of power received by the wireless power receiver based on transmission of a respective test power transmission signal by a respective antenna group of the plurality of antenna groups.

(A17) In some embodiments of the method of any of A1-A16, the method further includes, before transmitting the test power transmission signals, determining that the wireless power receiver is authorized to receive wirelessly delivered power from the near-field charging pad.

(A18) In another aspect, a near-field charging pad is provided. In some embodiments, the near-field charging pad includes a wireless communication component, a plurality of antenna zones that each respectively include at least one antenna element, one or more processors, and memory storing one or more programs, which when executed by the one or more processors cause the near-field charging pad to perform the method described in any one of A1-A17.

(A19) In yet another aspect, a near-field charging pad is provided and the near-field charging includes means for performing the method described in any one of A1-A17.

(A20) In still another aspect, a non-transitory computer-readable storage medium is provided. The non-transitory computer-readable storage medium stores executable instructions that, when executed by a near-field charging pad (that includes a wireless communication component, a plurality of antenna zones that each respectively include at least one antenna element) with one or more processors/cores, cause the near-field charging pad to perform the method described in any one of A1-A17.

As described above, there is also a need for an integrated circuit that includes components for managing transmission of wireless power that are all integrated on a single integrated circuit. Such a integrated circuit and methods of use thereof help to eliminate user dissatisfaction with conventional charging pads. By including all components on a single chip (as discussed in more detail below in reference to FIGS. 1A and 1B), such integrated circuits are able to manage operations at the integrated circuits more efficiently and quickly (and with lower latency), thereby helping to improve user satisfaction with the charging pads that are managed by these integrated circuits.

(B1) In some embodiments, an integrated circuit includes: (i) a processing unit that is configured to control operation of the integrated circuit, (ii) a power converter, operatively coupled to the processing unit, that is configured to convert an input current into radio frequency energy, (iii) a waveform generator, operatively coupled to the processing unit, that is configured to generate a plurality of power transmission signals using the radio frequency energy, (iv) a first interface that couples the integrated circuit with a plurality of power amplifiers that are external to the integrated circuit, and (v) a second interface, distinct from the first interface, that couples the integrated circuit with a wireless communication component. The processing unit is also configured to: (i) receive, via the second interface, an indication that a wireless power receiver is within transmission range of a near-field charging pad controlled by the integrated circuit, and (ii) in response to receiving the indication provide, via the first interface, at least some of the plurality of power transmission signals to at least one of the plurality of power amplifiers.

(B2) In some embodiments of the integrated circuit of B 1, the processing unit includes a CPU, ROM, RAM, and encryption (e.g., CPU subsystem 170, FIG. 1B).

(B3) In some embodiments of the integrated circuit of any of B1-B2, the input current is direct current. Alternatively, in some embodiments, the input current is alternating current. In these embodiments, the power converter is a radio frequency DC-DC converter or a radio frequency AC-AC converter, respectively.

(B4) In some embodiments of the integrated circuit of any of B1-B3, the wireless communication component is a Bluetooth or Wi-Fi radio that is configured to receive communication signals from a device that is placed on a surface of the near-field charging pad.

To help address the problems described above and to thereby provide charging pads that satisfy user needs, the antenna zones described above may include adaptive antenna elements (e.g., antenna zones 290 of the RF charging pad 100, FIG. 1B, may each respectively include one or more of the antennas 120 described below in reference to FIGS. 3A-6E and 8) that are able to adjust energy transmission characteristics (e.g., impedance and frequency for a conductive line of a respective antenna element) so that the charging pad is capable of charging a device that is placed at any position on the pad.

In accordance with some embodiments, the antenna zones of the radio frequency (RF) charging pads described herein may include: one or more antenna elements that are in communication with the one or more processors for transmitting RF signals to the RF receiver of the electronic device. In some embodiments, each respective antenna element includes: (i) a conductive line forming a meandered line pattern; (ii) a first terminal at a first end of the conductive line for receiving current that flows through the conductive line at a frequency controlled by the one or more processors; and (iii) a second terminal, distinct from the first terminal, at a second end of the conductive line, the second terminal coupled with a component that is controlled by the at least one processor and allows for modifying an impedance value at the second terminal. In some embodiments, the at least one processor is configured to adaptively adjust the frequency and/or the impedance value to optimize the amount of energy that is transferred from the one or more antenna elements to the RF receiver of the electronic device.

There is a need for wireless charging systems (e.g., RF charging pads) that include adaptive antenna elements that are able to adjust energy transmission characteristics (e.g., impedance and frequency for a conductive line of a respective antenna element) so that the charging pad is capable of charging a device that is placed at any position on the pad. In some embodiments, these charging pads include one or more processors that monitor energy transferred from the transmitting antenna elements (also referred to herein as RF antenna elements or antenna elements) and to a receiver of an electronic device to be charged, and the one or more processors optimize the energy transmission characteristics to maximize energy transfer at any position on the charging pad. Some embodiments may also include a feedback loop to report received power at the receiver to the one or more processors.

(C1) In accordance with some embodiments, a radio frequency (RF) charging pad is provided. The RF charging pad includes: at least one processor for monitoring an amount of energy that is transferred from the RF charging pad to an RF receiver of an electronic device. The RF charging pad also includes: one or more antenna elements that are in communication with the one or more processors for transmitting RF signals to the RF receiver of the electronic device. In some embodiments, each respective antenna element includes: (i) a conductive line forming a meandered line pattern; (ii) a first terminal at a first end of the conductive line for receiving current that flows through the conductive line at a frequency controlled by the one or more processors; and (iii) a second terminal, distinct from the first terminal, at a second end of the conductive line, the second terminal coupled with a component that is controlled by the at least one processor and allows for modifying an impedance value at the second terminal. In some embodiments, the at least one processor is configured to adaptively adjust the frequency and/or the impedance value to optimize the amount of energy that is transferred from the one or more antenna elements to the RF receiver of the electronic device.

(C2) In accordance with some embodiments, a method is also provided that is used to charge an electronic device through radio frequency (RF) power transmission. The method includes: providing a transmitter comprising at least one RF antenna. The method also includes: transmitting, via at the least one RF antenna, one or more RF signals and monitoring an amount of energy that is transferred via the one or more RF signals from the at least one RF antenna to an RF receiver. The method additionally includes: adaptively adjusting a characteristic of the transmitter to optimize the amount of energy that is transferred from the at least one RF antenna to the RF receiver. In some embodiments, the characteristic is selected from a group consisting of (i) a frequency of the one or more RF signals, (ii) an impedance of the transmitter, and (iii) a combination of (i) and (ii). In some embodiments, the at least one RF antenna is a part of an array of RF antennas.

(C3) In accordance with some embodiments, a radio frequency (RF) charging pad is provided. The RF charging pad includes: one or more processors for monitoring an amount of energy that is transferred from the RF charging pad to an RF receiver of an electronic device. The RF charging pad also includes: one or more transmitting antenna elements that are configured to communicate with the one or more processors for transmitting RF signals to the RF receiver of the electronic device. In some embodiments, each respective antenna element includes: (i) a conductive line forming a meandered line pattern; (ii) an input terminal at a first end of the conductive line for receiving current that flows through the conductive line at a frequency controlled by the one or more processors; and (iii) a plurality of adaptive load terminals, distinct from the input terminal and distinct from each other, at a plurality of positions of the conductive line, each respective adaptive load terminal of the plurality of adaptive load terminals coupled with a respective component that is configured to be controlled by the one or more processors and is configured to allow modifying a respective impedance value at the respective adaptive load terminal. In some embodiments, the one or more processors are configured to adaptively adjust at least one of the frequency and a respective impedance value at one or more of the plurality of adaptive load terminals to optimize the amount of energy that is transferred from the one or more transmitting antenna elements to the RF receiver of the electronic device.

(C4) In accordance with some embodiments, a method is also provided that is used to charge an electronic device through radio frequency (RF) power transmission. The method includes: providing a charging pad that includes a transmitter comprising one or more RF antennas. In some embodiments, each RF antenna includes: (i) a conductive line forming a meandered line pattern; (ii) an input terminal at a first end of the conductive line for receiving current that flows through the conductive line at a frequency controlled by one or more processors; and (iii) a plurality of adaptive load terminals, distinct from the input terminal and distinct from each other, at a plurality of positions of the conductive line, each respective adaptive load terminal of the plurality of adaptive load terminals coupled with a respective component that is controlled by the one or more processors and allows for modifying a respective impedance value at the respective adaptive load terminal. The method also includes: transmitting, via the one or more RF antennas, one or more RF signals, and monitoring an amount of energy that is transferred via the one or more RF signals from the one or more RF antennas to an RF receiver. The method additionally includes: adaptively adjusting a characteristic of the transmitter using the one or more processors of the transmitter to optimize the amount of energy that is transferred from the one or more RF antennas to the RF receiver. In some embodiments, the characteristic is selected from a group consisting of (i) a frequency of the one or more RF signals, (ii) an impedance of the transmitter, and (iii) a combination of (i) and (ii). In some embodiments, the impedance of the transmitter is adaptively adjusted at a respective one or more of the plurality of adaptive load terminals of the one or more RF antennas using the one or more processors of the transmitter.

(C5) In accordance with some embodiments, a non-transitory computer-readable storage medium is provided. The non-transitory computer-readable storage medium includes executable instructions that, when executed by one or more processors that are coupled with a radio frequency (RF) charging pad that includes one or more transmitting antenna elements, cause the one or more processors to: monitor an amount of energy that is transferred from the RF charging pad to an RF receiver of an electronic device; and communication with the one or more transmitting antenna elements for transmitting RF signals to the RF receiver of the electronic device. In some embodiments, each respective transmitting antenna element includes: a conductive line forming a meandered line pattern; an input terminal at a first end of the conductive line for receiving current that flows through the conductive line at a frequency controlled by the one or more processors; and a plurality of adaptive load terminals, distinct from the input terminal and distinct from each other, at a plurality of positions of the conductive line, each respective adaptive load terminal of the plurality of adaptive load terminals coupled with a respective component that is configured to be controlled by the one or more processors and is configured to allow modifying a respective impedance value at each respective adaptive load terminal. And the one or more processors further adaptively adjust at least one of the frequency and a respective impedance value at one or more of the plurality of adaptive load terminals to optimize the amount of energy that is transferred from the one or more transmitting antenna elements to the RF receiver of the electronic device.

(C6) In some embodiments of any of C1-C5, the frequency is in a first frequency band, and at least one of the one or more transmitting antenna elements is configured to operate at a second frequency band based on adaptive adjustments, by the one or more processors, to respective impedance values at one or more of the plurality of adaptive load terminals of the at least one transmitting antenna element.

(C7) In some embodiments of any of C1-C6, the RF charging pad includes an input circuit that is coupled with the one or more processors and is configured to provide the current to the input terminal at the first end of the conductive line, wherein the one or more processors are configured to adaptively adjust the frequency by instructing the input circuit to generate the current with a new frequency that is distinct from the frequency.

(C8) In some embodiments of any of C1-C7, the one or more processors are configured to adaptively adjust the frequency by instructing the feeding element to generate the current with a plurality of different frequencies that are determined using predetermined increments.

(C9) In some embodiments of any of C1-C8, a respective conductive line for at least one of the one or more transmitting antenna elements has a respective meandered line pattern that allows the at least one transmitting antenna element to efficiently transmit RF signals having the frequency and/or the new frequency, at least two adjacent segments of the respective conductive line having the respective meandered line pattern have different geometric dimensions relative to each other, and the respective conductive line has a length that remains the same when the at least one transmitting antenna element is configured to transmit RF signals having the frequency and/or the new frequency.

(C10) In some embodiments of any of C1-C9, at least one transmitting antenna element of the one or more transmitting antenna elements has a first segment and a second segment, the first segment including the input terminal, and the at least one transmitting antenna element is configured to: operate at the frequency while the first segment is not coupled with the second segment, and operate at the new frequency while the first segment is coupled with the second segment; and the one or more processors are configured to couple the first segment with the second segment in conjunction with instructing the feeding element to generate the current with the new frequency that is distinct from the frequency.

(C11) In some embodiments of any of C1-C10, the one or more processors are configured to: adaptively adjust the frequency and/or a respective impedance value associated with a first transmitting antenna element of the one or more transmitting antenna elements to cause the first transmitting antenna element to operate in a first frequency band, and adaptively adjust the frequency and/or the respective impedance value associated with a second transmitting antenna element of the one or more transmitting antenna elements to cause the second transmitting antenna element to operate in a second frequency band, wherein the first frequency band is distinct from the second frequency band.

(C12) In some embodiments of any of C1-C11, the electronic device is placed in contact with or close to a top surface of the RF charging pad.

(C13) In some embodiments of any of C1-C12, the respective component is a mechanical relay coupled with the respective adaptive load terminal for switching the respective adaptive load terminal between open and short states, and the impedance value is adaptively adjusted at the respective adaptive load terminal of the respective transmitting antenna element by opening or closing the mechanical relay to switch between an open or short circuit, respectively.

(C14) In some embodiments of any of C1-C13, the respective component is an application-specific integrated circuit (ASIC), and the respective impedance value is adaptively adjusted by the ASIC to within a range of values.

(C15) In some embodiments of any of C1-C14, the one or more processors are configured to: adaptively adjust the frequency and/or the respective impedance value by adaptively adjusting the frequency and a respective impedance value at one or more of the plurality of adaptive load terminals to determine a relative maximum amount of energy that is transferred to the RF receiver of the electronic device, and once the maximum amount of energy is determined, cause each of the one or more transmitting antenna elements to respectively transmit the RF signals at a respective frequency and using a respective impedance value that resulted in the maximum amount of energy transferred to the RF receiver.

(C16) In some embodiments of any of C1-C15, the one or more processors monitor the amount of energy that is transferred to the RF receiver based at least in part on information received from the electronic device, the information identifying energy received at the RF receiver from the RF signals.

(C17) In some embodiments of any of C1-C16, the information received from the electronic device identifying received energy is sent using a wireless communication protocol.

(C18) In some embodiments of any of C1-C17, the wireless communication protocol is bluetooth low energy (BLE).

(C19) In some embodiments of any of C1-C18, the one or more processors monitor the amount of energy transferred based at least in part on an amount of energy that is detected at the respective adaptive load terminal.

Thus, wireless charging systems configured in accordance with the principles described herein are able to charge an electronic device that is placed at any position on the RF charging pad and avoid wasting energy by ensuring that energy transfer is constantly optimized.

In addition, wireless charging systems configured in accordance with the principles described herein are able to charge different electronic devices that are tuned at different frequencies or frequency bands on the same charging transmitter. In some embodiments, a transmitter with a single antenna element can operate at multiple frequencies or frequency bands at the same time or at different times. In some embodiments, a transmitter with multiple antenna elements can operate at multiple frequencies or frequency bands at the same time. That enables more flexibility in the types and sizes of antennas that are included in receiving devices.

In another aspect, dynamically-adjustable transmitting antennas are provided. In the design of charging pads that allow receiving devices to be placed at any position on the pad, radio-frequency-based solutions offer much promise. Because receiving antennas used in radio-frequency-based solutions may have different polarizations, transmitting antennas must also be designed that are able to transmit at different polarizations, to ensure an efficient transfer of power from the transmitting to the receiving antennas. As such, there is a need for transmitting antennas that may be dynamically adjusted to transmit energy using different polarizations and embodiments discussed herein address this need (see, e.g., descriptions and figures associated with near-field antenna 2500).

(D1) In accordance with some embodiments, a near-field antenna is provided. The near-field antenna (e.g., near-field antenna 2500, FIG. 25A) includes: a reflector and four distinct coplanar antenna elements, offset from the reflector, where each of the four distinct antenna elements follows respective meandering patterns. Further, two antenna elements of the four coplanar antenna elements form a first dipole antenna along a first axis, and another two antenna elements of the four coplanar antenna elements form a second dipole antenna along a second axis perpendicular to the first axis. The near-field antenna further includes: (i) a power amplifier configured to feed electromagnetic signals to at least one of the first and second dipole antennas, (ii) an impedance-adjusting component configured to adjust an impedance of at least one of the first and second dipole antennas, and (iii) switch circuitry coupled to the power amplifier, the impedance-adjusting component, and the first and second dipole antennas. The switch circuitry is configured to: (A) switchably couple the first dipole antenna to the power amplifier and the second dipole antenna to the impedance-adjusting component, or (B) switchably couple the second dipole antenna to the power amplifier and the first dipole antenna to the impedance-adjusting component.

(D2) In accordance with some embodiments, a method is also provided that is used to charge an electronic device through radio frequency (RF) power transmission using a near-field antenna. The method includes providing the near-field antenna of D1. For example, the near-field antenna includes (i) a reflector, (ii) four distinct coplanar antenna elements, offset from the reflector, each of the four distinct antenna elements following respective meandering patterns, where: (A) two antenna elements of the four coplanar antenna elements form a first dipole antenna aligned with a first axis, and (B) another two antenna elements of the four coplanar antenna elements form a second dipole antenna aligned with a second axis perpendicular to the first axis, (iii) switch circuitry coupled to at least two of the four coplanar antenna elements, (iv) a power amplifier coupled to the switch circuitry, and (v) an impedance-adjusting component coupled to the switch circuitry. The method further includes instructing the switch circuitry to couple: (i) the first dipole antenna to the power amplifier, and (ii) the second dipole antenna to the impedance-adjusting component. The method further includes instructing the power amplifier to feed electromagnetic signals to the first dipole antenna via the switch circuitry. In doing so, the electromagnetic signals, when fed to the first dipole antenna, cause the first dipole antenna to radiate electromagnetic signals to be received by a wireless-power-receiving device located within a threshold distance from the near-field antenna. In addition, an impedance of the second dipole antenna is adjusted by the impedance-adjusting component so that the impedance of the second dipole antenna differs from an impedance of the first dipole antenna.

(D3) In accordance with some embodiments, a non-transitory computer-readable storage medium is provided. The non-transitory computer-readable storage medium includes executable instructions that, when executed by one or more processors that are coupled with the near-field antenna of D1, cause the near-field antenna of D1 to: (A) instruct the switch circuitry to couple: (i) the first dipole antenna to the power amplifier, and (ii) the second dipole antenna to the impedance-adjusting component, and (B) instruct the power amplifier to feed electromagnetic signals to the first dipole antenna via the switch circuitry. In doing so, the electromagnetic signals, when fed to the first dipole antenna, cause the first dipole antenna to radiate electromagnetic signals to be received by a wireless-power-receiving device located within a threshold distance from the near-field antenna. In addition, an impedance of the second dipole antenna is adjusted by the impedance-adjusting component so that the impedance of the second dipole antenna differs from an impedance of the first dipole antenna.

(D4) In some embodiments of any of D1-D3, in a first mode of operation for the near-field antenna, the switch circuitry couples (i) the first dipole antenna to the power amplifier and (ii) the second dipole antenna to the impedance-adjusting component. Further, in a second mode of operation for the near-field antenna, the switch circuitry couples (i) the second dipole antenna to the power amplifier and (ii) the first dipole antenna to the impedance-adjusting component.

(D5) In some embodiments of D4, in the first mode of operation for the near-field antenna, the first dipole antenna is to receive electromagnetic waves from the power amplifier and radiate the received electromagnetic waves having a first polarization, and in the second mode of operation for the near-field antenna, the second dipole antenna is to receive electromagnetic waves from the power amplifier and radiate the received electromagnetic waves having a second polarization different from the first polarization.

(D6) In some embodiments of any of D1-D5, a wireless-power-receiving device, located within a threshold distance from the near-field antenna, is configured to harvest the radiated electromagnetic waves and use the harvested electromagnetic waves to power or charge an electronic device coupled with the wireless-power-receiving device.

(D7) In some embodiments of any of D1-D6, the near-field antenna further includes a controller configured to control operation of the switch circuitry and the power amplifier.

(D8) In some embodiments of any of D1-D7, the controller is configured to control operation of the switch circuitry and the power amplifier based on one or more of: (i) a location of a wireless-power-receiving device, (ii) a polarization of a power-receiving-antenna of the wireless-power-receiving device, and (iii) a spatial orientation of the wireless-power-receiving device.

(D9) In some embodiments of any of D1-D8, the near-field antenna further includes a first feed and a second feed. The first feed is connected to a first of the two antenna elements of the first dipole antenna and the switch circuitry, and the first feed is configured to supply electromagnetic signals to the first antenna element of the first dipole antenna that originate from the power amplifier when the power amplifier is switchably coupled to the first dipole antenna by the switch circuitry (e.g., the near-field antenna is in the first mode of operation). The second feed is connected to a first of the other two antenna elements of the second dipole antenna and the switch circuitry, and the second feed is configured to supply electromagnetic signals to the first antenna element of the second dipole antenna that originate from the power amplifier when the power amplifier is switchably coupled to the second dipole antenna by the switch circuitry (e.g., the near-field antenna is in the second mode of operation).

(D10) In some embodiments of any of D1-D9, a first antenna element of the four distinct coplanar antenna elements is a first pole of the first dipole antenna and a second antenna element of the four distinct coplanar antenna elements is a second pole of the first dipole antenna. In addition, a third antenna element of the four distinct coplanar antenna elements is a first pole of the second dipole antenna and a fourth antenna element of the four distinct coplanar antenna elements is a second pole of the second dipole antenna.

(D11) In some embodiments of any of D1-D10, the two antenna elements that form the first dipole antenna each include two segments that are perpendicular to the first axis and the other two antenna elements that form the second dipole antenna each include two segments that are parallel to the first axis. Put another way, the two antenna elements that form the first dipole antenna each include two segments that are parallel to the second axis and the other two antenna elements that form the second dipole antenna each include two segments that are perpendicular to the second axis.

(D11.1) In some embodiments of any of D1-D11, each of the four distinct antenna elements includes: (i) a respective first plurality of segments, and (ii) a respective second plurality of segments interspersed between each of the first plurality of segments.

(D12) In some embodiments of any of D1-D11.1, first lengths of segments in the first plurality of segments increase from a first end portion of the antenna element to a second end portion of the antenna element and seconds lengths of segments in the second plurality of segments increase from the first end portion of the antenna element to the second end portion of the antenna element.

(D13) In some embodiments of D12, the first lengths of the segments in the first plurality of segments are different from the second lengths of the segments in the second plurality of segments.

(D14) In some embodiments of any of D12 and D13, the first lengths of the segments in the first plurality of segments are different from the second lengths of the segments in the second plurality of segments.

(D15) In some embodiments of D14, the first lengths of the segments in the first plurality of segments toward the second end portion of the antenna element are greater than the second lengths of the segments in the second plurality of segments toward the second end portion of the antenna element.

(D16) In some embodiments of any of D1-D15, the reflector is a solid metal sheet of copper or a copper alloy.

(D17) In some embodiments of any of D1-D16, the reflector is configured to reflect at least a portion of the electromagnetic signals radiated by the first or second dipole antennas.

(D18) In some embodiments of any of D1-D17, the four distinct coplanar antenna elements are formed on or within a substrate.

(D19) In some embodiments of D18, the substrate comprises a metamaterial of a predetermined magnetic permeability or electrical permittivity.

(D20) In some embodiments of any of D1-D19, the respective meandering patterns are all the same.

(D21) In some embodiments of D20, the two antenna elements that form the first dipole antenna are aligned along the first axis such that the respective meandering patterns followed by each of the two antenna elements are mirror images of one another.

(D22) In some embodiments of any of D20-D21, the other two antenna elements that form the second dipole antenna are aligned along the second axis such that the respective meandering patterns followed by each of the other two antenna elements are mirror images of one another.

(D23) In some embodiments of any of D1-D22, a first end portion of the respective meandering pattern followed by each of the four distinct antenna elements borders a same central portion of the near-field antenna, and a second end portion of the respective meandering pattern followed by each of the four distinct antenna elements borders a distinct edge of the near-field antenna. Furthermore, a longest dimension of the respective meandering pattern followed by each of the four distinct antenna elements is closer to the distinct edge of the near-field antenna than to the same central portion of the near-field antenna.

(D24) In some embodiments of D23, a shortest dimension of the respective meandering pattern followed by each of the four distinct antenna elements is closer to the same central portion of the near-field antenna than the distinct edge of the near-field antenna.

(E1) In accordance with some embodiments, a near-field antenna is provided. The near-field antenna (e.g., near-field antenna 2500, FIG. 25A) includes four distinct coplanar antenna elements, where each antenna element occupies a distinct quadrant of the near-field antenna (e.g., one of the quadrants 2570-A to 2570-D). Further, a width of each of the four distinct antenna elements increases, in a meandering fashion, from a central portion of the near-field antenna to a respective edge of the near-field antenna. In other words, a longest dimension of each of the four distinct antenna elements is near (i.e., adjacent/borders) the respective edge of the near-field antenna, and conversely, a shortest dimension of each of the four distinct antenna elements is near (i.e., adjacent/borders) the central portion of the near-field antenna.

(E2) In some embodiments of E1, two antenna elements of the four coplanar antenna elements form a first dipole antenna along a first axis, and another two antenna elements of the four coplanar antenna elements form a second dipole antenna along a second axis perpendicular to the first axis.

(E3) In some embodiments of E2, the two antenna elements that form the first dipole antenna are aligned along the first axis such that the respective meandering patterns followed by each of the two antenna elements are mirror images of one another.

(E4) In some embodiments of E3, the other two antenna elements that form the second dipole antenna are aligned along the second axis such that the respective meandering patterns followed by each of the other two antenna elements are mirror images of one another.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not intended to circumscribe or limit the inventive subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 11A-11E are flow diagrams showing various aspects of selectively activating one or more antenna zones in a near-field charging pad, in accordance with some embodiments.

FIG. 13 is a flow chart of a method of charging an electronic device through radio frequency (RF) power transmission by using at least one RF antenna with a plurality of adaptive loads, in accordance with some embodiments.

FIG. 25A shows an isometric view of a near-field antenna in accordance with some embodiments.

FIG. 30 is a flow diagram showing a method of wireless power transmission in accordance with some embodiments.

Figure 1A:
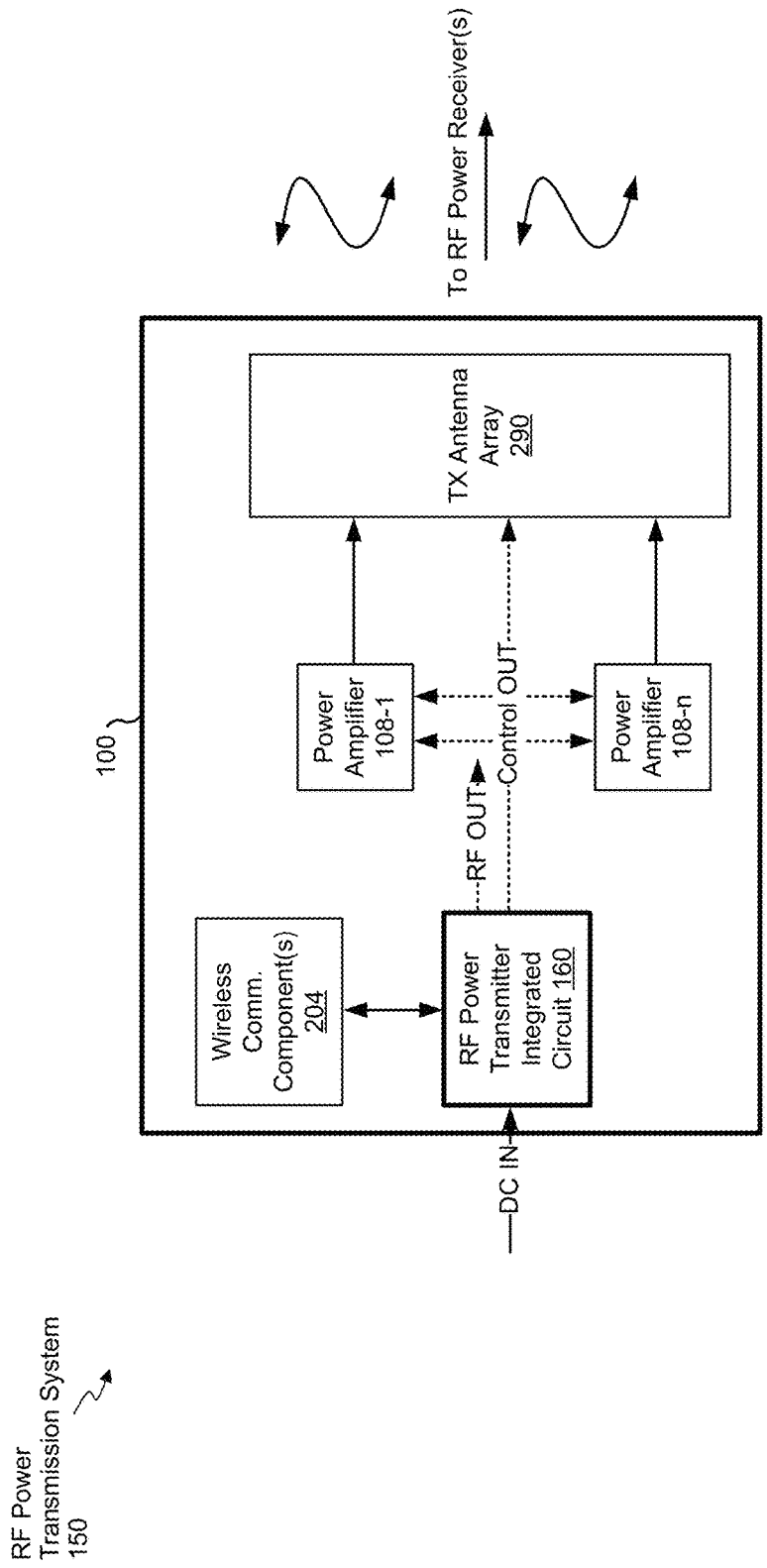
FIG. 1A is a block diagram of an RF wireless power transmission system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1A is a block diagram of an RF wireless power transmission system in accordance with some embodiments. In some embodiments, the RF wireless power transmission system 150 includes a RF charging pad 100 (also referred to herein as a near-field (NF) charging pad 100 or RF charging pad 100). In some embodiments, the RF charging pad 100 includes an RF power transmitter integrated circuit 160 (described in more detail below). In some embodiments, the RF charging pad 100 includes one or more communications components 204 (e.g., wireless communication components, such as WI-FI or BLUETOOTH radios), discussed in more detail below with reference to FIG. 2A. In some embodiments, the RF charging pad 100 also connects to one or more power amplifier units 108-1, . . . 108-n to control operation of the one or more power amplifier units when they drive an external TX antenna array 210. In some embodiments, RF power is controlled and modulated at the RF charging pad 100 via switch circuitry as to enable the RF wireless power transmission system to send RF power to one or more wireless receiving devices via the TX antenna array 210. Example power amplifier units are discussed in further detail below with reference to FIG. 3A.

In some embodiments, the communication component(s) 204 enable communication between the RF charging pad 100 and one or more communication networks. In some embodiments, the communication component(s) 204 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Figure 1B:
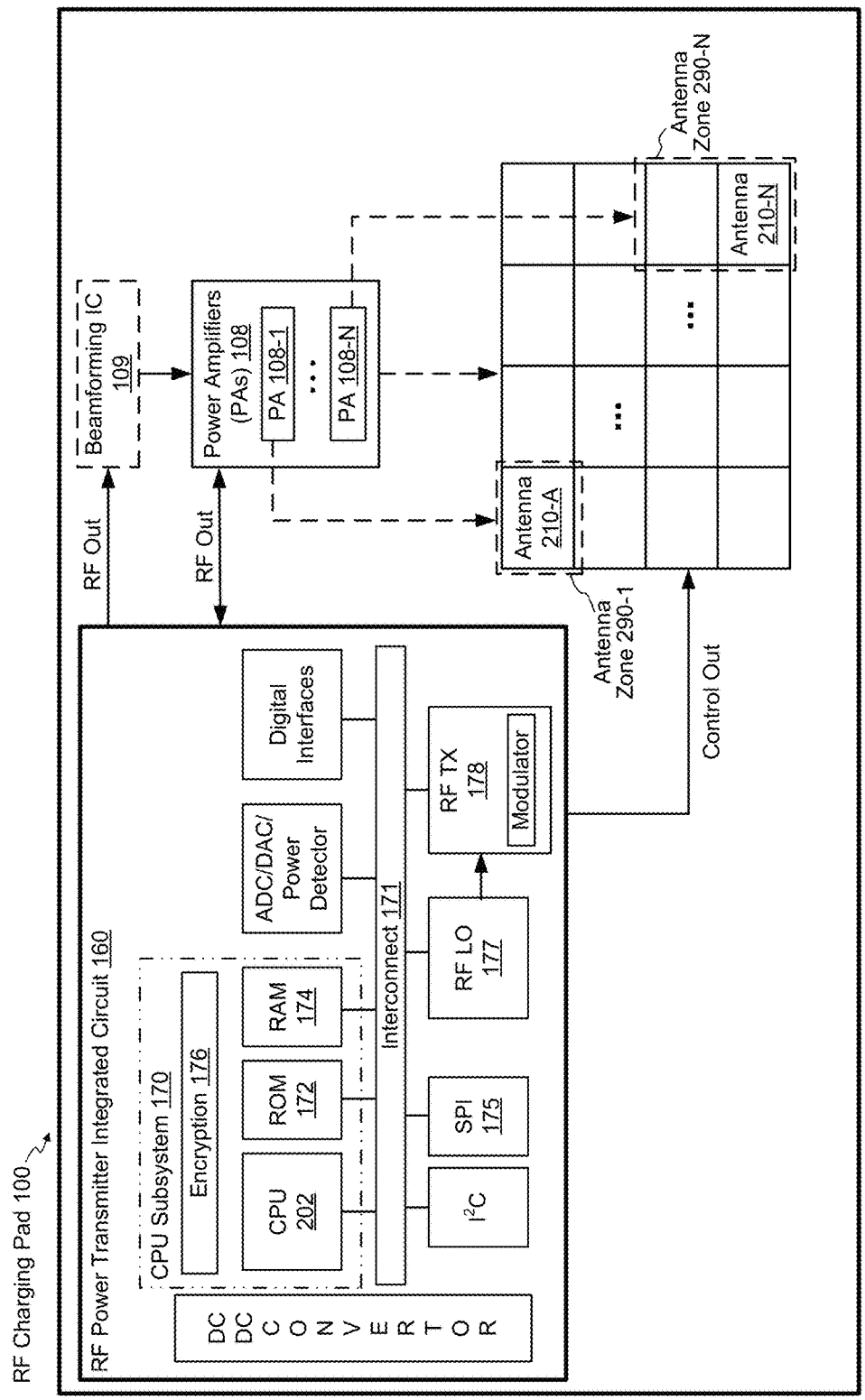
FIG. 1B is a block diagram showing components of an example RF charging pad that includes an RF power transmitter integrated circuit and antenna zones, in accordance with some embodiments.

FIG. 1B is a block diagram of the RF power transmitter integrated circuit 160 (the "integrated circuit") in accordance with some embodiments. In some embodiments, the integrated circuit 160 includes a CPU subsystem 170, an external device control interface, an RF subsection for DC to RF power conversion, and analog and digital control interfaces interconnected via an interconnection component, such as a bus or interconnection fabric block 171. In some embodiments, the CPU subsystem 170 includes a microprocessor unit (CPU) 202 with related Read-Only-Memory (ROM) 172 for device program booting via a digital control interface, e.g. an I²C port, to an external FLASH containing the CPU executable code to be loaded into the CPU Subsystem Random Access Memory (RAM) 174 (e.g., memory 206, FIG. 2A) or executed directly from FLASH. In some embodiments, the CPU subsystem 170 also includes an encryption module or block 176 to authenticate and secure communication exchanges with external devices, such as wireless power receivers that attempt to receive wirelessly delivered power from the RF charging pad 100.

In some embodiments, executable instructions running on the CPU (such as those shown in the memory 206 in FIG. 2A and described below) are used to manage operation of the RF charging pad 100 and to control external devices through a control interface, e.g., SPI control interface 175, and the other analog and digital interfaces included in the RF power transmitter integrated circuit 160. In some embodiments, the CPU subsystem also manages operation of the RF subsection of the RF power transmitter integrated circuit 160, which includes an RF local oscillator (LO) 177 and an RF transmitter (TX) 178. In some embodiments, the RF LO 177 is adjusted based on instructions from the CPU subsystem 170 and is thereby set to different desired frequencies of operation, while the RF TX converts, amplifies, modulates the RF output as desired to generate a viable RF power level.

In some embodiments, the RF power transmitter integrated circuit 160 provides the viable RF power level (e.g., via the RF TX 178) to an optional beamforming integrated circuit (IC) 109, which then provides phase-shifted signals to one or more power amplifiers 108. In some embodiments, the beamforming IC 109 is used to ensure that power transmission signals sent using two or more antennas 210 (e.g., each antenna 210 may be associated with a different antenna zones 290 or may each belong to a single antenna zone 290) to a particular wireless power receiver are transmitted with appropriate characteristics (e.g., phases) to ensure that power transmitted to the particular wireless power receiver is maximized (e.g., the power transmission signals arrive in phase at the particular wireless power receiver). In some embodiments, the beamforming IC 109 forms part of the RF power transmitter IC 160.

In some embodiments, the RF power transmitter integrated circuit 160 provides the viable RF power level (e.g., via the RF TX 178) directly to the one or more power amplifiers 108 and does not use the beamforming IC 109 (or bypasses the beamforming IC if phase-shifting is not required, such as when only a single antenna 210 is used to transmit power transmission signals to a wireless power receiver).

In some embodiments, the one or more power amplifiers 108 then provide RF signals to the antenna zones 290 for transmission to wireless power receivers that are authorized to receive wirelessly delivered power from the RF charging pad 100. In some embodiments, each antenna zone 290 is coupled with a respective PA 108 (e.g., antenna zone 290-1 is coupled with PA 108-1 and antenna zone 290-N is coupled with PA 108-N). In some embodiments, multiple antenna zones are each coupled with a same set of PAs 108 (e.g., all PAs 108 are coupled with each antenna zone 290). Various arrangements and couplings of PAs 108 to antenna zones 290 allow the RF charging pad 100 to sequentially or selectively activate different antenna zones in order to determine the most efficient antenna zone 290 to use for transmitting wireless power to a wireless power receiver (as explained in more detail below in reference to FIGS. 9A-9B, 10, and 11A-11E). In some embodiments, the one or more power amplifiers 108 are also in communication with the CPU subsystem 170 to allow the CPU 202 to measure output power provided by the PAs 108 to the antenna zones of the RF charging pad 100.

FIG. 1B also shows that, in some embodiments, the antenna zones 290 of the RF charging pad 100 may include one or more antennas 210A-N. In some embodiments, each antenna zones of the plurality of antenna zones includes one or more antennas 210 (e.g., antenna zone 290-1 includes one antenna 210-A and antenna zones 290-N includes multiple antennas 210). In some embodiments, a number of antennas included in each of the antenna zones is dynamically defined based on various parameters, such as a location of a wireless power receiver on the RF charging pad 100. In some embodiments, the antenna zones may include one or more of the meandering line antennas described in more detail below. In some embodiments, each antenna zone 290 may include antennas of different types (e.g., a meandering line antenna and a loop antenna), while in other embodiments each antenna zone 290 may include a single antenna of a same type (e.g., all antenna zones 290 include one meandering line antenna), while in still other embodiments, the antennas zones may include some antenna zones that include a single antenna of a same type and some antenna zones that include antennas of different types. Antenna zones are also described in further detail below.

In some embodiments, the RF charging pad 100 may also include a temperature monitoring circuit that is in communication with the CPU subsystem 170 to ensure that the RF charging pad 100 remains within an acceptable temperature range. For example, if a determination is made that the RF charging pad 100 has reached a threshold temperature, then operation of the RF charging pad 100 may be temporarily suspended until the RF charging pad 100 falls below the threshold temperature.

By including the components shown for RF power transmitter circuit 160 (FIG. 1B) on a single chip, such integrated circuits are able to manage operations at the integrated circuits more efficiently and quickly (and with lower latency), thereby helping to improve user satisfaction with the charging pads that are managed by these integrated circuits. For example, the RF power transmitter circuit 160 is cheaper to construct, has a smaller physical footprint, and is simpler to install. Furthermore, and as explained in more detail below in reference to FIG. 2A, the RF power transmitter circuit 160 may also include a secure element module 234 (e.g., included in the encryption block 176 shown in FIG. 1B) that is used in conjunction with a secure element module 282 (FIG. 2B) or a receiver 104 to ensure that only authorized receivers are able to receive wirelessly delivered power from the RF charging pad 100 (FIG. 1B).

Figure 1C:
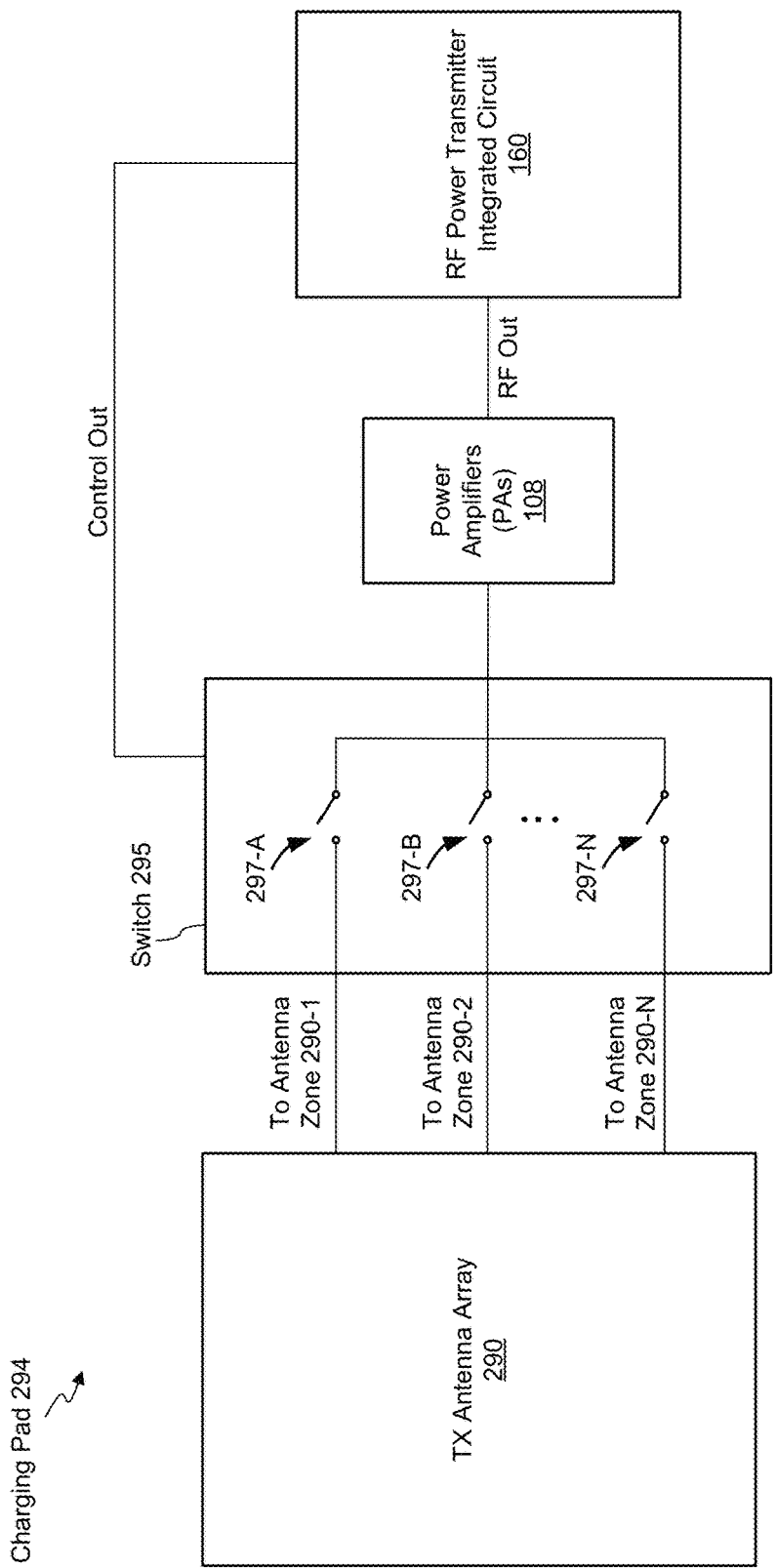
FIG. 1C is a block diagram showing components of an example RF charging pad that includes an RF power transmitter integrated circuit coupled to a switch, in accordance with some embodiments.

FIG. 1C is a block diagram of a charging pad 294 in accordance with some embodiments. The charging pad 294 is an example of the charging pad 100 (FIG. 1A), however, one or more components included in the charging pad 100 are not included in the charging pad 294 for ease of discussion and illustration.

The charging pad 294 includes an RF power transmitter integrated circuit 160, one or more power amplifiers 108, and a transmitter antenna array 290 having multiple antenna zones. Each of these components is described in detail above with reference to FIGS. 1A and 1B. Additionally, the charging pad 294 includes a switch 295, positioned between the power amplifiers 108 and the antenna array 290, having a plurality of switches 297-A, 297-B, . . . 297-N. The switch 295 is configured to switchably connect one or more power amplifiers 108 with one or more antenna zones of the antenna array 290 in response to control signals provided by the RF power transmitter integrated circuit 160.

To accomplish the above, each switch 297 is coupled with (e.g., provides a signal pathway to) a different antenna zone of the antenna array 290. For example, switch 297-A may be coupled with a first antenna zone 290-1 (FIG. 1B) of the antenna array 290, switch 297-B may be coupled with a second antenna zone 290-2 of the antenna array 290, and so on. Each of the plurality of switches 297-A, 297-B, . . . 297-N, once closed, creates a unique pathway between a respective power amplifier 108 (or multiple power amplifiers 108) and a respective antenna zone of the antenna array 290. Each unique pathway through the switch 295 is used to selectively provide RF signals to specific antenna zones of the antenna array 290. It is noted that two or more of the plurality of switches 297-A, 297-B, . . . 297-N may be closed at the same time, thereby creating multiple unique pathways to the antenna array 290 that may be used simultaneously.

In some embodiments, the RF power transmitter integrated circuit 160 is coupled to the switch 295 and is configured to control operation of the plurality of switches 297-A, 297-B, . . . 297-N (illustrated as a "control out" signal in FIGS. 1A and 1C). For example, the RF power transmitter integrated circuit 160 may close a first switch 297-A while keeping the other switches open. In another example, the RF power transmitter integrated circuit 160 may close a first switch 297-A and a second switch 297-B, and keep the other switches open (various other combinations and configuration are possible). Moreover, the RF power transmitter integrated circuit 160 is coupled to the one or more power amplifiers 108 and is configured to generate a suitable RF signal (e.g., the "RF Out" signal) and provide the RF signal to the one or more power amplifiers 108. The one or more power amplifiers 108, in turn, are configured to provide the RF signal to one or more antenna zones of the antenna array 290 via the switch 295, depending on which switches 297 in the switch 295 are closed by the RF power transmitter integrated circuit 160.

To further illustrate, as described in some embodiments below, the charging pad is configured to transmit test power transmission signals and/or regular power transmission signals using different antenna zones, e.g., depending on a location of a receiver on the charging pad. Accordingly, when a particular antenna zone is selected for transmitting test signals or regular power signals, a control signal is sent to the switch 295 from the RF power transmitter integrated circuit 160 to cause at least one switch 297 to close. In doing so, an RF signal from at least one power amplifier 108 can be provided to the particular antenna zone using a unique pathway created by the now-closed at least one switch 297.

In some embodiments, the switch 295 may be part of (e.g., internal to) the antenna array 290. Alternatively, in some embodiments, the switch 295 is separate from the antenna array 290 (e.g., the switch 295 may be a distinct component, or may be part of another component, such as the power amplifier(s) 108). It is noted that any switch design capable of accomplishing the above may be used, and the design of the switch 295 illustrated in FIG. 1C is merely one example.

Figure 2A:
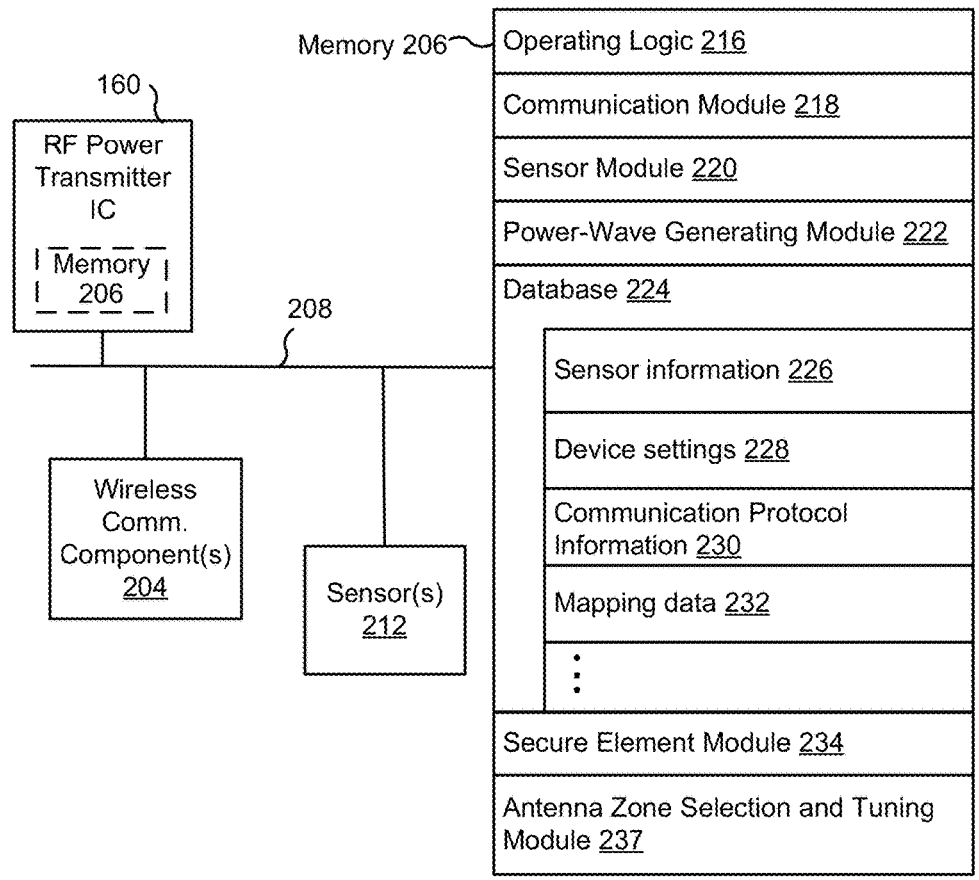
FIG. 2A is a block diagram illustrating an example RF charging pad, in accordance with some embodiments.

FIG. 2A is a block diagram illustrating certain components of an RF charging pad 100 in accordance with some embodiments. In some embodiments, the RF charging pad 100 includes an RF power transmitter IC 160 (and the components included therein, such as those described above in reference to FIGS. 1A-1B), memory 206 (which may be included as part of the RF power transmitter IC 160, such as nonvolatile memory 206 that is part of the CPU subsystem 170), and one or more communication buses 208 for interconnecting these components (sometimes called a chipset). In some embodiments, the RF charging pad 100 includes one or more sensor(s) 212 (discussed below). In some embodiments, the RF charging pad 100 includes one or more output devices such as one or more indicator lights, a sound card, a speaker, a small display for displaying textual information and error codes, etc. In some embodiments, the RF charging pad 100 includes a location detection device, such as a GPS (global positioning satellite) or other geo-location receiver, for determining the location of the RF charging pad 100.

In some embodiments, the one or more sensor(s) 212 include one or more thermal radiation sensors, ambient temperature sensors, humidity sensors, IR sensors, occupancy sensors (e.g., RFID sensors), ambient light sensors, motion detectors, accelerometers, and/or gyroscopes.

The memory 206 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 206, or alternatively the non-volatile memory within memory 206, includes a non-transitory computer-readable storage medium. In some embodiments, the memory 206, or the non-transitory computer-readable storage medium of the memory 206, stores the following programs, modules, and data structures, or a subset or superset thereof:

- Operating logic 216 including procedures for handling various basic system services and for performing hardware dependent tasks;
- Communication module 218 for coupling to and/or communicating with remote devices (e.g., remote sensors, transmitters, receivers, servers, mapping memories, etc.) in conjunction with wireless communication component(s) 204;
- Sensor module 220 for obtaining and processing sensor data (e.g., in conjunction with sensor(s) 212) to, for example, determine the presence, velocity, and/or positioning of object in the vicinity of the RF charging pad 100;
- Power-wave generating module 222 for generating and transmitting power transmission signals (e.g., in conjunction with antenna zones 290 and the antennas 210 respectively included therein), including but not limited to, forming pocket(s) of energy at given locations. Power-wave generating module 222 may also be used to modify transmission characteristics used to transmit power transmission signals by individual antenna zones; and
- Database 224, including but not limited to:
    - Sensor information 226 for storing and managing data received, detected, and/or transmitted by one or more sensors (e.g., sensors 212 and/or one or more remote sensors);
    - Device settings 228 for storing operational settings for the RF charging pad 100 and/or one or more remote devices;
    - Communication protocol information 230 for storing and managing protocol information for one or more protocols (e.g., custom or standard wireless protocols, such as ZigBee, Z-Wave, etc., and/or custom or standard wired protocols, such as Ethernet); and Mapping data 232 for storing and managing mapping data (e.g., mapping one or more transmission fields);

a secure element module 234 for determining whether a wireless power receiver is authorized to receive wirelessly delivered power from the RF charging pad 100; and an antenna zone selecting and tuning module 237 for coordinating a process of transmitting test power transmission signals with various antenna zones to determine which antenna zone or zones should be used to wirelessly deliver power to various wireless power receivers (as is explained in more detail below in reference to FIGS. 9A-9B, 100, and 11A-11E).

Each of the above-identified elements (e.g., modules stored in memory 206 of the RF charging pad 100) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 206, optionally, stores a subset of the modules and data structures identified above.

Figure 2B:
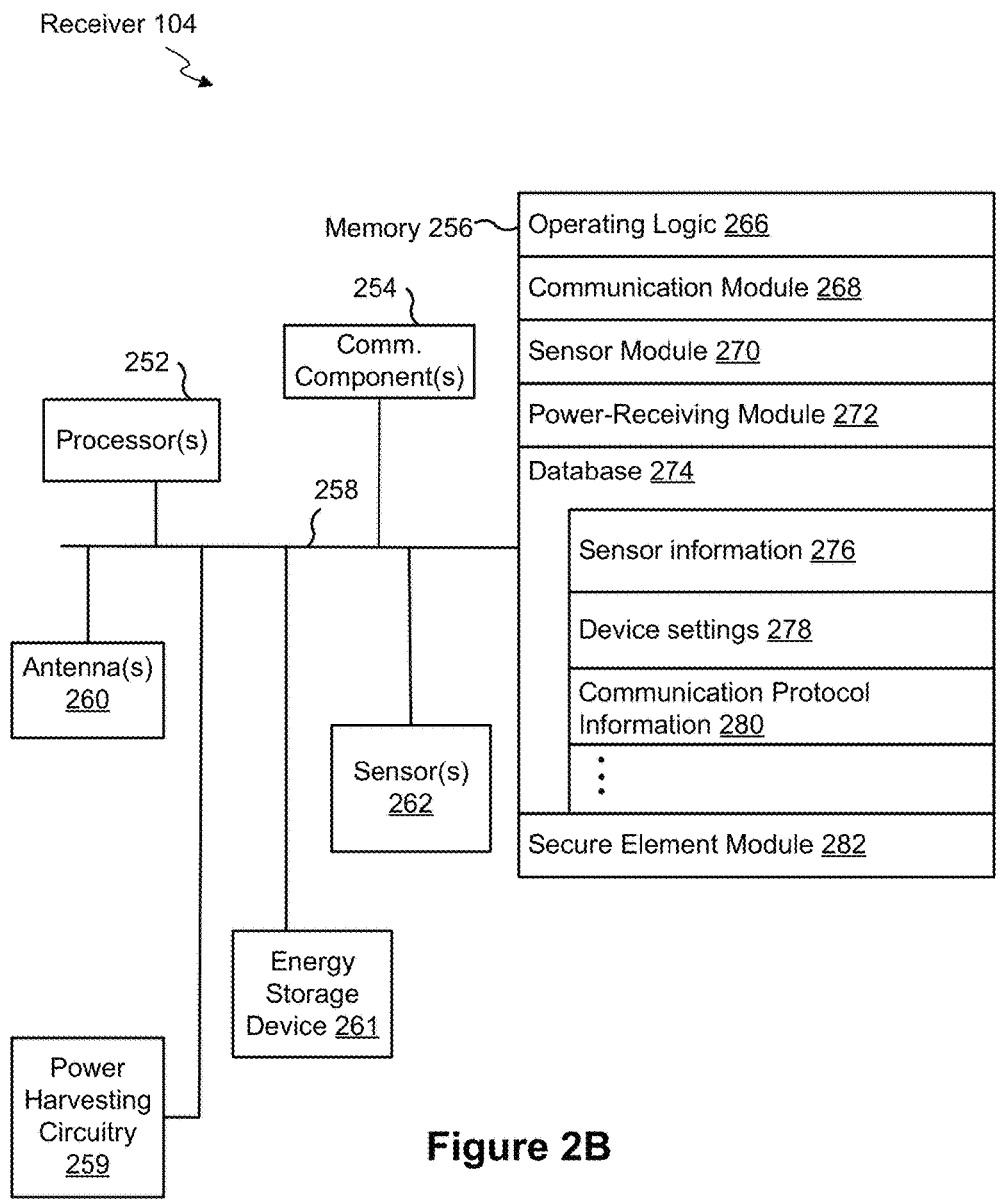
FIG. 2B is a block diagram illustrating an example receiver device, in accordance with some embodiments.

FIG. 2B is a block diagram illustrating a representative receiver device 104 (also sometimes called a receiver, power receiver, or wireless power receiver) in accordance with some embodiments. In some embodiments, the receiver device 104 includes one or more processing units (e.g., CPUs, ASICs, FPGAs, microprocessors, and the like) 252, one or more communication components 254, memory 256, antenna(s) 260, power harvesting circuitry 259, and one or more communication buses 258 for interconnecting these components (sometimes called a chipset). In some embodiments, the receiver device 104 includes one or more sensor(s) 262 such as the one or sensors 212 described above with reference to FIG. 2A. In some embodiments, the receiver device 104 includes an energy storage device 261 for storing energy harvested via the power harvesting circuitry 259. In various embodiments, the energy storage device 261 includes one or more batteries, one or more capacitors, one or more inductors, and the like.

In some embodiments, the power harvesting circuitry 259 includes one or more rectifying circuits and/or one or more power converters. In some embodiments, the power harvesting circuitry 259 includes one or more components (e.g., a power converter) configured to convert energy from power waves and/or energy pockets to electrical energy (e.g., electricity). In some embodiments, the power harvesting circuitry 259 is further configured to supply power to a coupled electronic device, such as a laptop or phone. In some embodiments, supplying power to a coupled electronic device include translating electrical energy from an AC form to a DC form (e.g., usable by the electronic device).

In some embodiments, the antenna(s) 260 include one or more of the meandering line antennas that are described in further detail below.

In some embodiments, the receiver device 104 includes one or more output devices such as one or more indicator lights, a sound card, a speaker, a small display for displaying textual information and error codes, etc. In some embodiments, the receiver device 104 includes a location detection device, such as a GPS (global positioning satellite) or other geo-location receiver, for determining the location of the receiver device 103.

In various embodiments, the one or more sensor(s) 262 include one or more thermal radiation sensors, ambient temperature sensors, humidity sensors, IR sensors, occupancy sensors (e.g., RFID sensors), ambient light sensors, motion detectors, accelerometers, and/or gyroscopes.

The communication component(s) 254 enable communication between the receiver 104 and one or more communication networks. In some embodiments, the communication component(s) 254 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

The communication component(s) 254 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 256 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 256, or alternatively the non-volatile memory within memory 256, includes a non-transitory computer-readable storage medium. In some embodiments, the memory 256, or the non-transitory computer-readable storage medium of the memory 256, stores the following programs, modules, and data structures, or a subset or superset thereof:

Operating logic 266 including procedures for handling various basic system services and for performing hardware dependent tasks;

Communication module 268 for coupling to and/or communicating with remote devices (e.g., remote sensors, transmitters, receivers, servers, mapping memories, etc.) in conjunction with communication component(s) 254;

Sensor module 270 for obtaining and processing sensor data (e.g., in conjunction with sensor(s) 262) to, for example, determine the presence, velocity, and/or positioning of the receiver 103, a RF charging pad 100, or an object in the vicinity of the receiver 103;

Wireless power-receiving module 272 for receiving (e.g., in conjunction with antenna(s) 260 and/or power harvesting circuitry 259) energy from power waves and/or energy pockets; optionally converting (e.g., in conjunction with power harvesting circuitry 259) the energy (e.g., to direct current); transferring the energy to a coupled electronic device; and optionally storing the energy (e.g., in conjunction with energy storage device 261); and Database 274, including but not limited to:
Sensor information 276 for storing and managing data received, detected, and/or transmitted by one or more sensors (e.g., sensors 262 and/or one or more remote sensors);

Device settings 278 for storing operational settings for the receiver 103, a coupled electronic device, and/or one or more remote devices; and Communication protocol information 280 for storing and managing protocol information for one or more protocols (e.g., custom or standard wireless protocols, such as ZigBee, Z-Wave, etc., and/or custom or standard wired protocols, such as Ethernet); and a secure element module 282 for providing identification information to the RF charging pad 100 (e.g., the RF charging pad 100 uses the identification information to determine if the wireless power receiver 104 is authorized to receive wirelessly delivered power).

Each of the above-identified elements (e.g., modules stored in memory 256 of the receiver 104) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 256, optionally, stores a subset of the modules and data structures identified above. Furthermore, the memory 256, optionally, stores additional modules and data structures not described above, such as an identifying module for identifying a device type of a connected device (e.g., a device type for an electronic device that is coupled with the receiver 104).

Turning now to FIGS. 3A through 8, embodiments of the RF charging pad 100 are shown that include a component for modifying impedance values (e.g., a load pick) at various antennas of the RF charging pad 100, and descriptions of antennas that include a conductive line forming a meandering line pattern are also provided in reference to these figures.

Figure 3A:
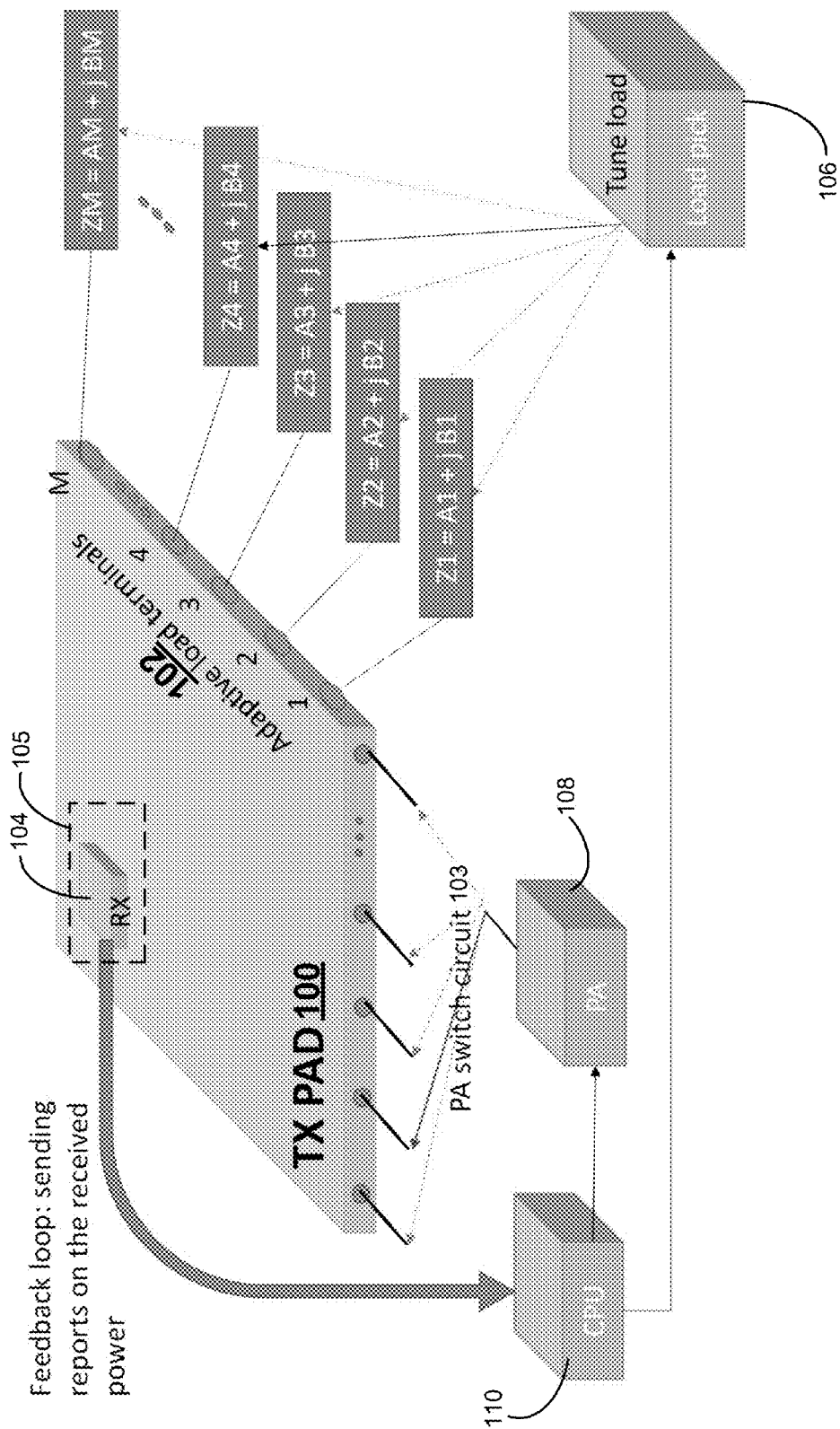
FIG. 3A is a high-level block diagram of an RF charging pad, in accordance with some embodiments.

As shown in FIG. 3A, some embodiments include an RF charging pad 100 that includes a load pick 106 to allow for modifying impedance values at various antennas of the RF charging pad 100. In some embodiments, the RF charging pad 100 includes one or more antenna elements that are each powered/fed by a respective power amplifier switch circuit 103 at a first end and a respective adaptive load terminal 102 at a second end (additional details and descriptions of the one or more antenna elements are provided below in reference to FIGS. 3B-3C).

In some embodiments, the RF charging pad 100 also includes (or is in communication with) a central processing unit 110 (also referred to here as processor 110). In some embodiments, the processor 110 is a component of a single integrated circuit that is responsible for managing operations of the RF charging pad 100, such as the CPU 202 illustrated in FIG. 1B and included as a component of the RF power transmitter integrated circuit 160. In some embodiments, the processor 110 is configured to control RF signal frequencies and to control impedance values at each of the adaptive load terminals 102 (e.g., by communicating with the load pick or adaptive load 106, which may be an application-specific integrated circuit (ASIC), or a variable resister, to generate various impedance values). In some embodiments, the load pick 106 is an electromechanical switch that is placed in either an open or shorted state.

In some embodiments, an electronic device (e.g., a device that includes a receiver 104 as an internally or externally connected component, such as a remote that is placed on top of a charging pad 100 that may be integrated within a housing of a streaming media device or a projector) and uses energy transferred from one or more RF antenna elements of the charging pad 100 to the receiver 104 to charge a battery and/or to directly power the electronic device.

In some embodiments, the RF charging pad 100 is configured with more than one input terminal for receiving power (from power amplifier (PA) 108, FIG. 3A) and more than one output or adaptive load terminal 102. In some embodiments, the adaptive load terminals 102 at a particular zone of the RF charging pad 100 (e.g., a zone that includes antenna elements located underneath a position at which an electronic device (with an internally or externally connected RF receiver 104) to be charged is placed on the charging pad) are optimized in order to maximize power received by the receiver 104. For example, the CPU 110 upon receiving an indication that an electronic device with an internally or externally connected RF receiver 104 has been placed on the pad 100 in a particular zone 105 (the zone 105 includes a set of antenna elements) may adapt the set of antenna elements to maximize power transferred to the RF receiver 104. Adapting the set of antenna elements may include the CPU 110 commanding load pick 106 to try various impedance values for adaptive load terminals 102 that are associated with the set of antenna elements. For example, the impedance value for a particular conductive line at an antenna element is given by the complex value of $Z=A+jB$ (where A is the real part of the impedance value and B is the imaginary part, e.g., $0+j0$, $1000+j0$, $0+50j$, or $25+j75$, etc.), and the load pick adjusts the impedance value to maximize the amount of energy transferred from the set of antenna elements to the RF receiver 104. In some embodiments, adapting the set of antenna elements also or alternatively includes the CPU 110 causing the set of antenna elements to transmit RF signals at various frequencies until a frequency is found at which a maximum amount of energy is transferred to the RF receiver 104. In some embodiments, adjusting the impedance value and/or the frequencies at which the set of antenna elements transmits causes changes to the amount of energy transferred to the RF receiver 104. In this way, the amount of energy transferred to the RF receiver 104 is maximized (e.g., to transfer at least 75% of the energy transmitted by antenna elements of the pad 100 to the receiver 104, and in some embodiments, adjusting the impedance value and/frequencies may allow up to 98% of the energy transmitted to be received by the receiver 104) may be received at any particular point on the pad 100 at which the RF receiver 104 might be placed.

In some embodiments, the input circuit that includes the power amplifier 108 can additionally include a device that can change frequencies of the input signal, or a device that can operate at multiple frequencies at the same time, such as an oscillator or a frequency modulator.

In some embodiments, the CPU 110 determines that a maximum amount of energy is being transferred to the RF receiver 104 when the amount of energy transferred to the RF receiver 104 crosses a predetermined threshold (e.g., 75% or more of transmitted energy is received, such as up to 98%) or by testing transmissions with a number of impedance and/or frequency values and then selecting the combination of impedance and frequency that results in maximum energy being transferred to the RF receiver 104 (as described in reference to the adaptation scheme below).

In some embodiments, an adaptation scheme is employed to adaptively adjust the impedance values and/or frequencies of the RF signal(s) emitted from the RF antenna(s) 120 of the charging pad 100, in order to determine which combinations of frequency and impedance result in maximum energy transfer to the RF receiver 104. For example, the processor 110 that is connected to the charging pad 100 tries different frequencies (i.e., in the allowed operating frequency range or ranges) at a given location of the RF charging pad 100 (e.g., a zone or area of the RF charging pad 100 that includes one or more RF antenna elements for transmitting RF signals, such as zone 105 of FIG. 3A) to attempt to adaptively optimize for better performance. For example, a simple optimization either opens/disconnects or closes/shorts each load terminal to ground (in embodiments in which a relay is used to switch between these states), and may also cause RF antennas within the zone to transmit at various frequencies. In some embodiments, for each combination of relay state (open or shorted) and frequency, the energy transferred to the receiver 104 is monitored and compared to energy transferred when using other combinations. The combination that results in maximum energy transfer to the receiver 104 is selected and used to continue to transmitting the one or more RF signals to the receiver 104. In some embodiments, the adaptation scheme described above is performed as a part of the methods described below in reference to FIGS. 9A-9B, 10, and 11A-11E to help maximize an amount of energy transferred by the RF charging pad 100 to the receiver 104.

As another example, if five frequencies in the ISM band are utilized by the pad 100 for transmitting radio frequency waves and the load pick 106 is an electromechanical relay for switching between open and shorted states, then employing the adaptation scheme would involve trying 10 combinations of frequencies and impedance values for each antenna element 120 or for a zone of antenna elements 120 and selecting the combination that results in best performance (i.e., results in most power received at receiver 104, or most power transferred from the pad 100 to the RF receiver 104).

The industrial, scientific, and medical radio bands (ISM bands) refers to a group of radio bands or parts of the radio spectrum that are internationally reserved for the use of radio frequency (RF) energy intended for scientific, medical and industrial requirements rather than for communications. In some embodiments, all ISM bands (e.g., 40 MHz, 900 MHz, 2.4 GHz, 5.8 GHz, 24 GHz, 60 GHz, 122 GHz, and 245 GHz) may be employed as part of the adaptation scheme. As one specific example, if the charging pad 100 is operating in the 5.8 GHz band, then employing the adaptation scheme would include transmitting RF signals and then adjusting the frequency at predetermined increments (e.g., 50 MHz increments, so frequencies of 5.75 GHz, 5.755 GHz, 5.76 GHz, and so on). In some embodiments, the predetermined increments may be 5, 10 15, 20, 50 MHz increments, or any other suitable increment.

In some embodiments, the antenna elements 120 of the pad 100 may be configured to operate in two distinct frequency bands, e.g., a first frequency band with a center frequency of 915 MHz and a second frequency band with a center frequency of 5.8 GHz. In these embodiments, employing the adaptation scheme may include transmitting RF signals and then adjusting the frequency at first predetermined increments until a first threshold value is reached for the first frequency band and then adjusting the frequency at second predetermined increments (which may or may not be the same as the first predetermined increments) until a second threshold value is reached for the second frequency band. For example, the antenna elements 120 may be configured to transmit at 902 MHz, 915 MHz, 928 MHZ (in the first frequency band) and then at 5.795 GHz, 5.8 GHz, and 5.805 GHz (in the second frequency band). Additional details regarding antenna elements that are capable of operating at multiple frequencies are provided below in reference to FIGS. 14A-14D and 15.

Figure 3B:
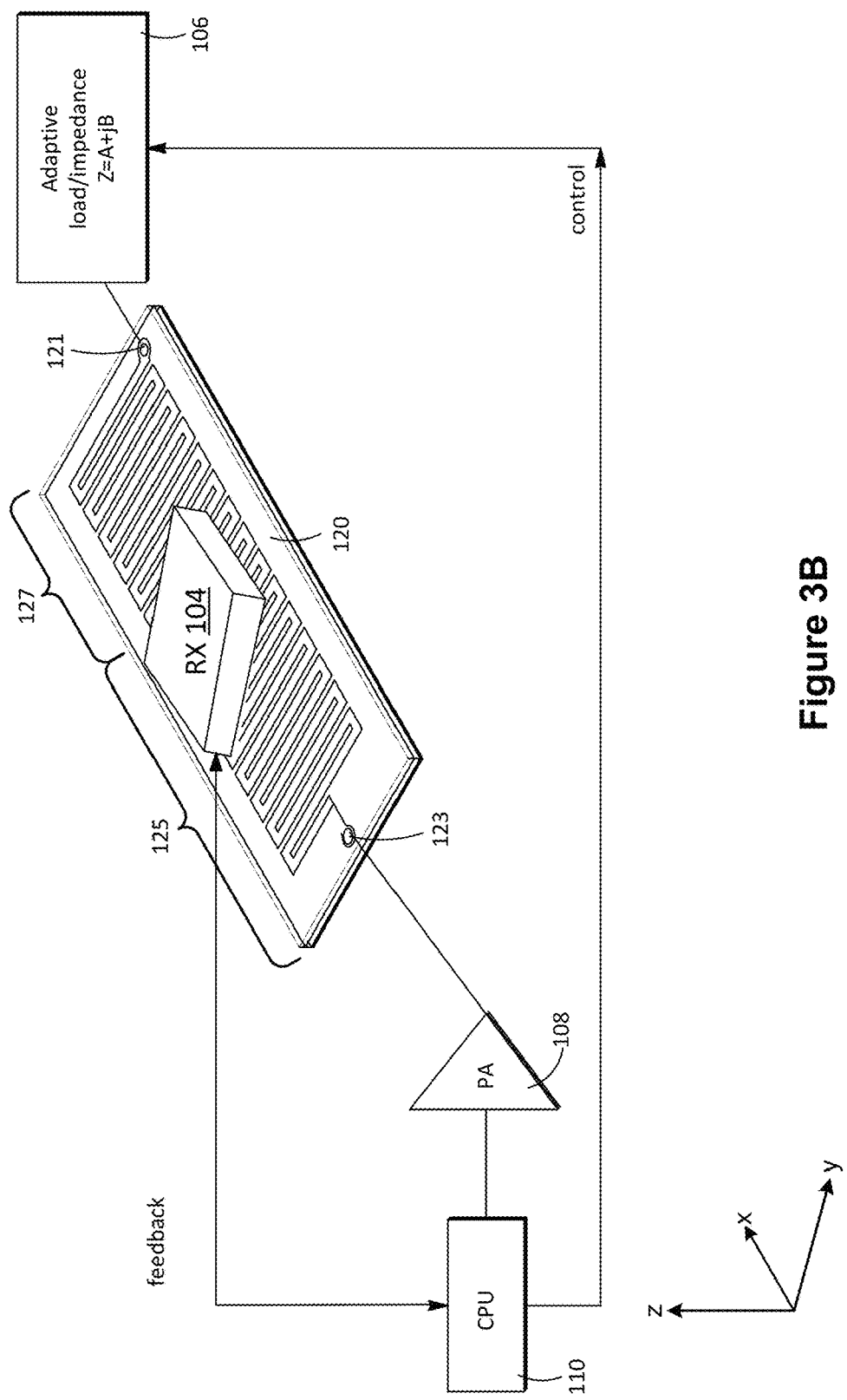
FIGS. 3B-3C are high-level block diagrams showing a portion of an RF charging pad, in accordance with some embodiments.
Figure 3C:
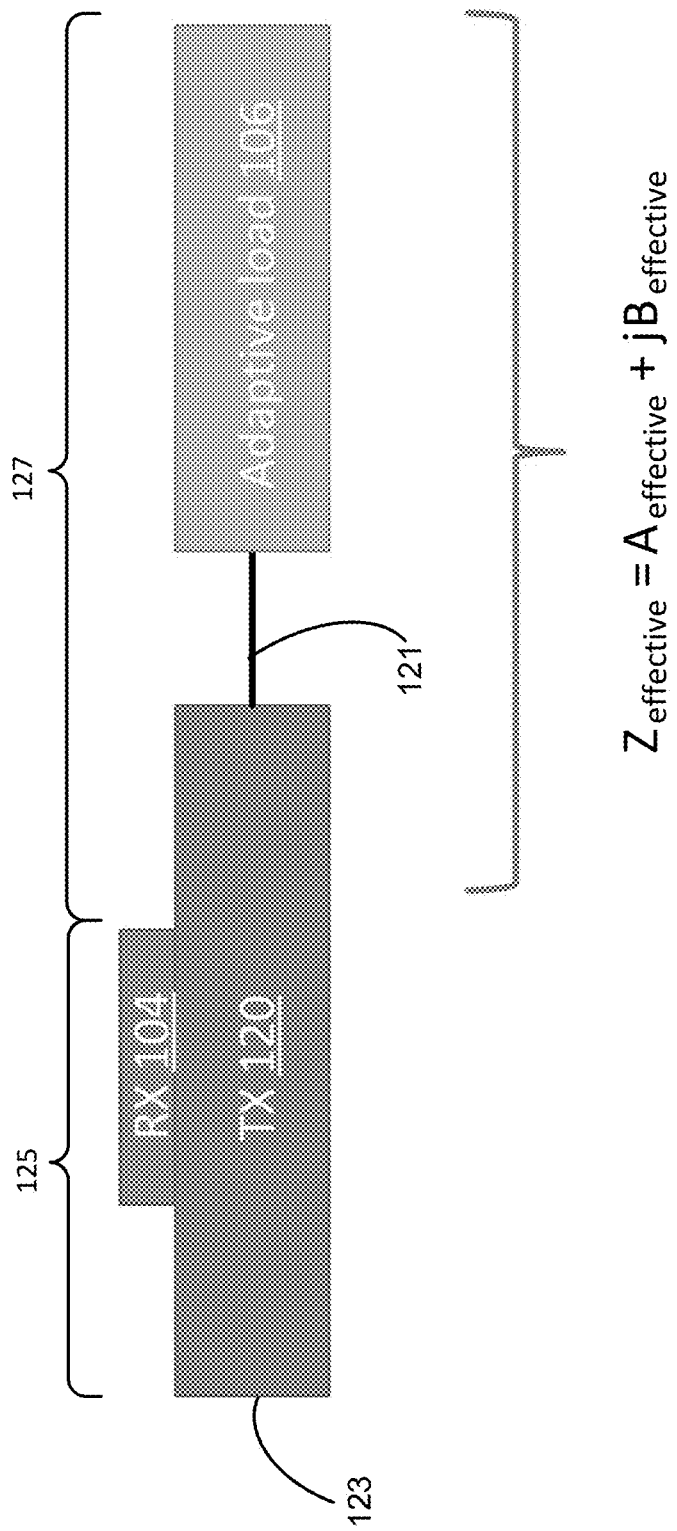

Turning now to FIGS. 3B-3C, high-level block diagrams showing a portion of an RF charging pad are illustrated, in accordance with some embodiments.

FIG. 3B shows a schematic of a single TX antenna 120 (which may be a part of an antenna zone that includes one or an array of such antennas 120, all forming the charging pad 100 that is shown in FIG. 3A). In some embodiments, the TX antenna 120 is also referred to as a TX antenna element 120. In some circumstances, an RF receiving unit/antenna (RX) (or a device that includes the receiving unit 104 as an internally or externally connected component) is placed on top of a portion of the pad 100 that includes the TX antenna 120 (which includes a conductive line that forms a meandered line arrangement, as shown in FIG. 3B).

In some embodiments, the receiver 104 has no direct contact to a metallic conductive line of the single TX antenna 120 and is just coupled (i.e. in near-field zone) to the TX antenna 120.

In some embodiments, the TX antenna 120 has two or more terminals (or ports) that are labeled as 121 (which may be a respective one of the terminals 102 of FIG. 3A) and 123 (which may be connected to a respective one of the PA switch circuits 103 of FIG. 3A) in FIG. 3B. In some embodiments, the source of power (from the power amplifier or PA) is connected to terminal 123 and an adaptive load (e.g., an electromechanical switch or ASIC) is connected to terminal 121. In some embodiments, the adaptive load is formed generally as a complex impedance which may have both real and imaginary parts (i.e., a complex adaptive load can be formed using active devices (e.g., integrated circuits or chips made of transistors) or passive devices formed by inductors/capacitors and resistors). In some embodiments, the complex impedance is given by the formula $Z=A+jB$ (e.g., 0+j0, 100+j0, 0+50j, and etc.), as discussed above.

In some embodiments, the receiver 104 may also be considered as a third terminal. To eliminate wasted energy, the receiver 104 should be configured to absorb a maximum amount (e.g., 75% or more, such as 98%) of the induced power that travels from terminal 123 and towards terminal 121. In some embodiments, processor 110 is connected to the receiver 104 through a feedback loop (e.g., by exchanging messages using a short-range communication protocol, such by BLUETOOTH low energy (BLE) to exchange messages). In some alternative embodiments, the feedback loop from the receiver back to the CPU at the transmitter may utilize a same frequency band as the power transmission signals transmitted by the pad 100, rather than using a separate communication protocol and/or a different frequency band.

In some embodiments, the feedback loop and messages exchanged may be used to indicate an amount of energy received or alternatively or additionally may indicate an increase or decrease in the amount of energy received as compared to previous measurements. In some embodiments, the processor 110 monitors the amount of energy received by the receiver 104 at certain points in time and controls/optimizes the adaptive load to maximize the power transferred from terminal 123 to terminal 121. In some embodiments, monitoring the amount of energy transferred includes one or both of (i) receiving information from the receiver 104 (or a component of an electronic device in which the receiver 104 is located) that indicates an amount of energy received by the receiver 104 at a certain point in time and (ii) monitoring an amount of energy that remains in the conductive line at terminal 121 (instead of having been absorbed by the receiver 104). In some embodiments, both of these monitoring techniques are utilized while, in other embodiments, one or the other of these monitoring techniques is utilized.

In some embodiments, the receiver 104 (i.e., an electronic device that includes the receiver 104 as an internally or externally connected component) may be placed anywhere on top of the charging pad 100 (i.e., partially or fully covering the conductive line that forms a meandered pattern on a respective antenna element 120) and the processor 110 will continue to monitor the amount of energy transferred and make needed adjustments (e.g., to impedance and/or frequency) to maximize the energy transferred to the receiver 104.

To help illustrate operation of the charging pad 100 and the antenna elements 120 included therein, the transmitting antenna element 120 shown in FIG. 3B is divided into two sections: 1) section 125 starts at the terminal 123 of the antenna element 120 and extends to an edge of the receiver 104; and 2) section 127 is formed by the rest of the transmitting antenna element 120 and the terminal 121. The blocks are described in more detail below with respect to FIG. 3C. It should be understood that sections 125 and 127 are functional representations used for illustrative purposes, and they are not intended to designate a specific implementation that partitions an antenna element into separate sections.

Turning now to FIG. 3C, a block diagram of the TX antenna 120 is shown. In some embodiments, an effective impedance value ($Z_{effective}$), starting from a point that divides sections 125 and 127 and ending at the TX antenna 120's connection to the adaptive load 106 (e.g., terminal 121) will change based on location of the receiver 104 on the TX antenna 120 and based on a selected load provided by adaptive load 106 at the terminal 121. In some embodiments, the selected load is optimized by the adaptive load 106 (in conjunction with the processor 110, FIG. 3A) to tune $Z_{effective}$ in such a way that the energy transferred between terminal 123 and the receiver 104 reaches a maximum (e.g., 75% or more of energy transmitted by antenna elements of the pad 100 is received by the RF receiver 104, such as 98%), while energy transfer may also stay at a minimum from terminal 123 to terminal 121 (e.g., less than 25% of energy transmitted by antenna elements of the pad 100 is not received by the RF receiver 104 and ends up reaching terminal 121 or ends up being reflected back, including as little as 2%).

In embodiments in which an electromechanical switch (e.g., a mechanical relay) is used to switch between open and shorted states, moving the switch from the open to the shorted state (e.g., shorted to a ground plane) for a particular antenna element 120 causes the impedance value, $Z_{effective}$, at a respective terminal 121 for that particular antenna element 120 to drop to a value close to 0 (alternatively, switching from the shorted to the open state causes the impedance value to jump close to a value close to infinity). In some embodiments, the frequency adaptation scheme discussed above in reference to FIG. 3A is employed to test various combinations of impedance values and RF signal frequencies, in order to maximize energy transferred to an RF receiver (e.g., receiver 104, FIGS. 3A-3C). In some embodiments, an integrated circuit (IC or chip) may be used instead of an electromechanical switch as the adaptive load 106. In such embodiments, the adaptive load 106 is configured to adjust the impedance value along a range of values, such as between 0 and infinity. In some embodiments, the IC may be formed by adaptive/reconfigurable RF active and/or passive elements (e.g., transistors and transmission lines) that are controlled by firmware of the IC (and/or firmware executing on the CPU 110 that controls operation of the IC). In some embodiments, the impedance produced by the IC, and controlled through firmware and based on information from the feedback loop (discussed above in reference to FIG. 3A), may be changed to cover any load values selected from a Smith Chart (or the IC may be designed to produce certain loads covering a portion of values form the Smith Chart). In some embodiments, this IC is distinct from the RF power transmitter integrated circuit 160 (FIG. 1B) that is used to manage overall operation of the pad 100, and this other IC is also in communication with the RF power transmitter integrated circuit 160 to allow the circuit 160 to control adjustments to impedance values. A Smith Chart may be sampled and stored in a memory (e.g., as a lookup table) that is accessible by the processor 110, and the processor 110 may perform lookups using the stored Smith Chart to determine various impedance values to test. For example, the integrated circuit may be configured to select a predetermined number of complex values (e.g., 5j to 10j, 100+0j, or 0+50j, etc.) for the impedance value to test in combination with various RF transmission frequencies, in order to locate a combination of values that optimizes energy transferred to the receiver 104 (examples of maximized energy transfer are discussed above).

In some other embodiments, a transmitter or charging pad with more than one antenna elements 120 of FIG. 1B with one adaptive load 106 may be configured to operate in two or more distinct frequency bands respectively at the same time. For example, a first antenna element operates at a first frequency or frequency band, a second antenna element operates at a second frequency or frequency band, and a third antenna element operates at a third frequency or frequency band, and a fourth antenna element operates at a fourth frequency or frequency band, and the four frequency bands are distinct from each other. A transmitter with two or more antenna elements 120 therefore can be used as a multi-band transmitter.

Figure 3D:
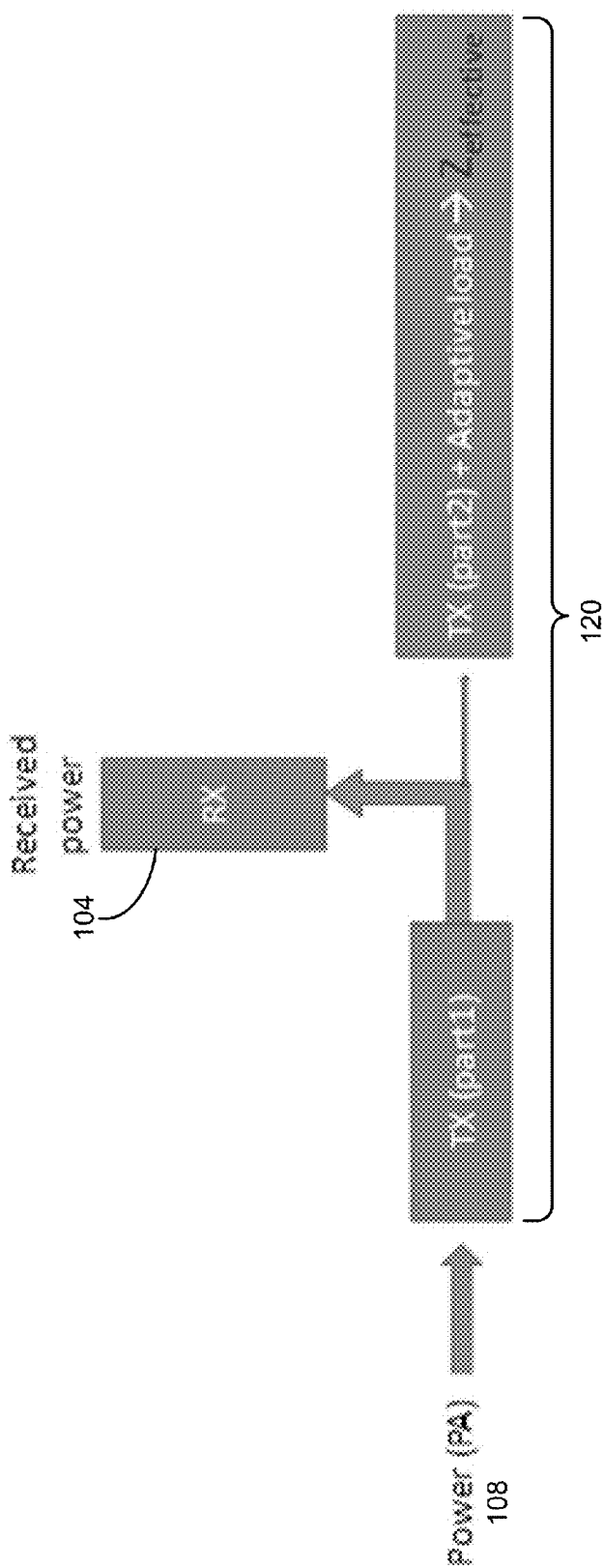
FIG. 3D is a block diagram of a simplified circuit that illustrates energy flow within sections of an antenna element that is transmitting an RF signal, in accordance with some embodiments.

FIG. 3D is a block diagram of a simplified circuit that illustrates energy flow within sections of an antenna element that is transmitting an RF signal, in accordance with some embodiments. The references to part1 and part2 in FIG. 3D refer to sections illustrated in FIGS. 3B and 3C, in particular, part1 corresponds to section 125 and part2 corresponds to section 127.

As shown in FIG. 3D, the effective impedance ($Z_{effective}$) for a transmitting antenna element 120 is formed by the portion of the conductive line that is after the receiver 104 (which, in some embodiments, forms a meandered line pattern as discussed in more detail below) and the adaptive load (labelled to as section 127 in FIGS. 3B and 3C). In some embodiments, by optimizing, the load $Z_{effective}$ will be tuned so the energy transferred from PA to the receiver 104 is maximized; and, the energy remaining in the conductive line by the time it reaches the adaptive load is minimized (as discussed above).

Figure 4:
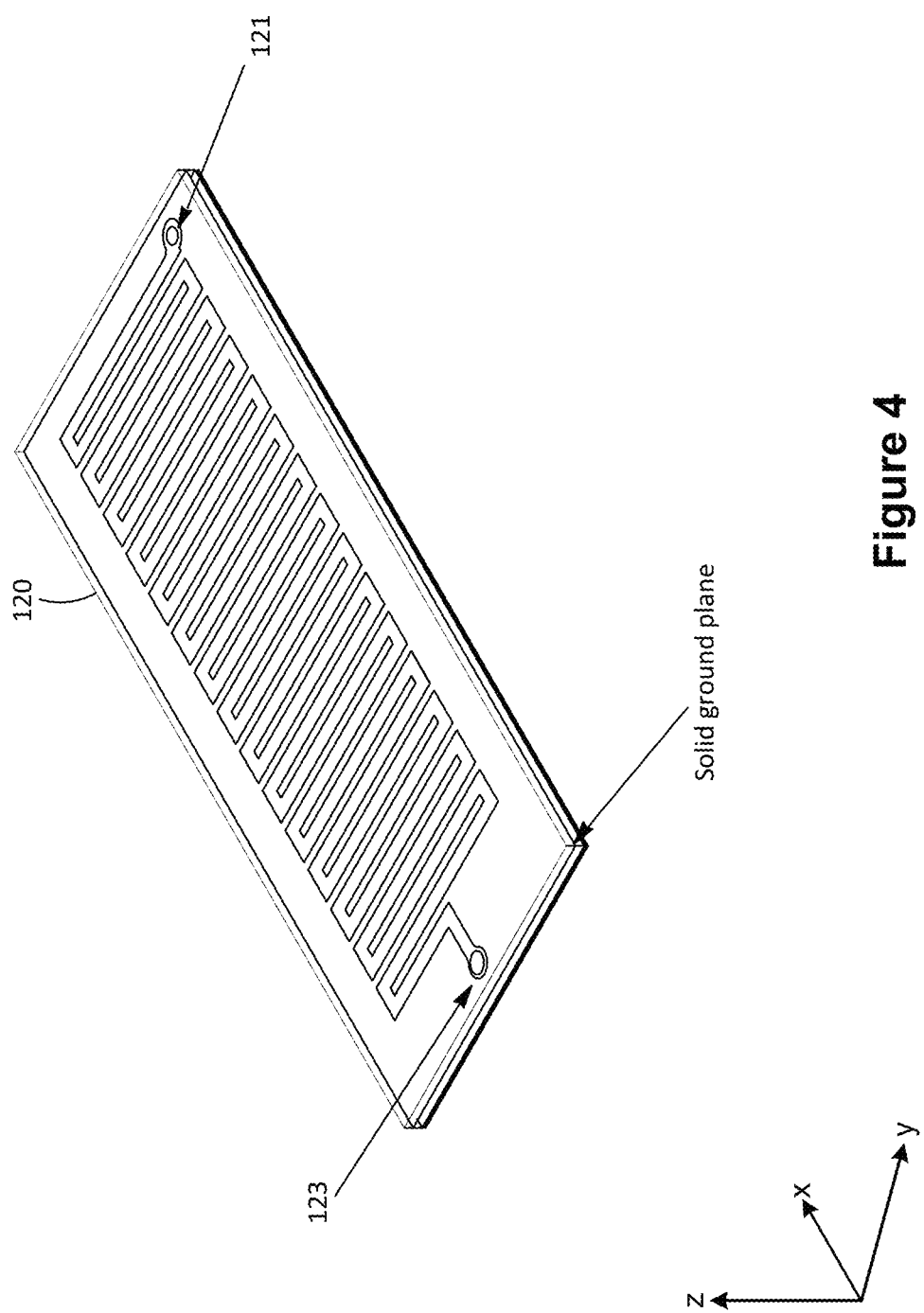
FIG. 4 is a schematic of a transmitting antenna element with two terminals, in accordance with some embodiments.

FIG. 4 is a schematic of an antenna element with two terminals, in accordance with some embodiments. As shown in FIG. 4, an input or first terminal of the antenna element 120 (also described as terminal 123 in reference to FIGS. 3B-3D above) is connected with a power amplifier 108 and an output or second terminal (also described as terminal 121 in reference to FIGS. 3B-3D above) is connected with a load pick 106 that allows for configuring an adaptive load. Stated another way, in some embodiments, the antenna element 120 is fed by the power amplifier 108 from the first terminal and the antenna element 120 is also terminated at a second terminal at an adaptive load (for example, the mechanical relay that switches between shorted and open states).

In some embodiments, the charging pad 100 (FIG. 3A) is made of single-layer or multi-layer copper antenna elements 120 with conductive lines that form a meandered line pattern. In some embodiments, each of these layers has a solid ground plane as one of its layers (e.g., a bottom layer). One example of a solid ground plane is shown and labelled for the transmitting antenna element shown in FIG. 4.

In some embodiments, the RF charging pad 100 (and individual antenna elements 120 included therein) is embedded in a consumer electronic device, such as a projector, a laptop, or a digital media player (such as a networked streaming media player, e.g. a ROKU device, that is connected to a television for viewing streaming television shows and other content). For example, by embedding the RF charging pad 100 in a consumer electronic device, a user is able to simply place a peripheral device, such as a remote for a projector or a streaming media player (e.g., the remote for the projector or streaming media player includes a respective receiver 104, such as the example structures for a receiver 104 shown in FIGS. 7A-7D), on top of the projector or the streaming media player and the charging pad 100 included therein will be able to transmit energy to a receiver 104 that is internally or externally connected to the remote, which energy is then harvested by the receiver 104 for charging of the remote.

In some embodiments, the RF charging pad 100 may be included in a USB dongle as a standalone charging device on which a device to be charged is placed. In some embodiments, the antenna elements 120 may be placed near a top surface, side surfaces, and/or a bottom surface of the USB dongle, so that a device to be charged may be placed at various positions that contact the USB dongle (e.g., a headphone that is being charged might sit on top of, underneath, or hang over the USB dongle and would still be able to receive RF transmissions from the embedded RF charging pad 100).

In some embodiments, the RF charging pad 100 is integrated into furniture, such as desks, chairs, countertops, etc., thus allowing users to easily charge their devices (e.g., devices that includes respective receivers 104 as internally or externally connected components) by simply placing them on top of a surface that includes an integrated RF charging pad 100.

Figure 5:
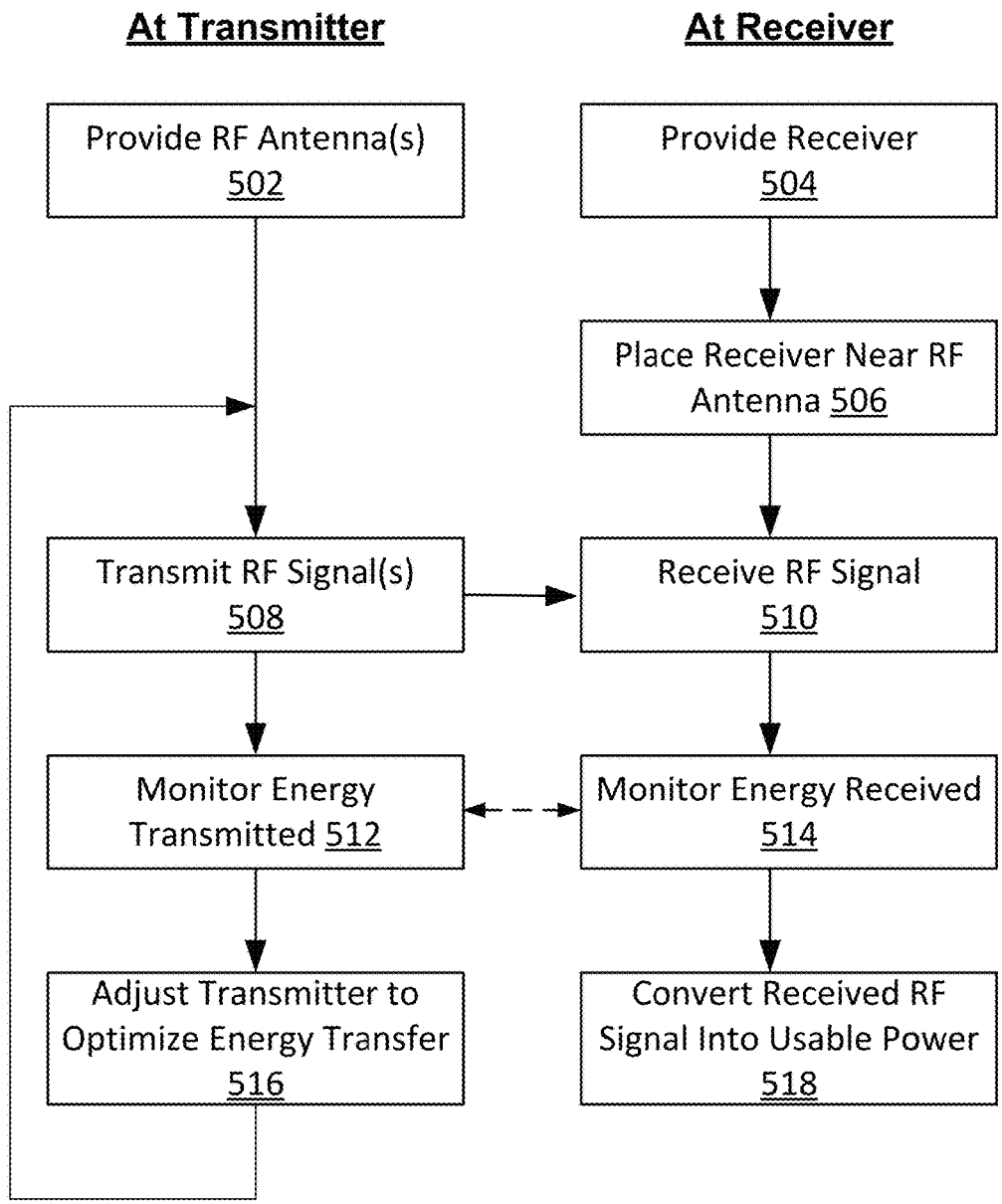
FIG. 5 is a flow chart of a method of charging an electronic device through radio frequency (RF) power transmission.

Turning now to FIG. 5, a flowchart of a method 500 of charging an electronic device through radio frequency (RF) power transmission is provided. Initially, a transmitter is provided 502 that includes at least one RF antenna (e.g., antenna element 120, FIGS. 3B-3D and 4) for transmitting one or more RF signals or waves, i.e., an antenna designed to and capable of transmitting RF electromagnetic waves. In some embodiments, an array of RF antenna elements 120 are arranged adjacent to one another in a single plane, in a stack, or in a combination of thereof, thus forming an RF charging pad 100. In some embodiments, the RF antenna elements 120 each include an antenna input terminal (e.g., the first terminal 123 discussed above in reference to FIG. 4) and an antenna output terminal (e.g., the second terminal 121 discussed above in reference to FIG. 4).

In some embodiments, a receiver (e.g., receiver 104, FIGS. 3A-3D) is also provided 504. The receiver also includes one or more RF antennas for receiving RF signals 310. In some embodiments, the receiver includes at least one rectenna that converts 318 the one or more RF signals into usable power to charge a device that includes the receiver 104 as an internally or externally connected component. In use, the receiver 104 is placed 506 within a near-field radio frequency distance to the at least one antenna. For example, the receiver may be placed on top of the at least one RF antenna or on top of a surface that is adjacent to the at least one RF antenna, such as a surface of a charging pad 100.

One or more RF signals are then transmitted 508 via at the least one RF antenna. The system is then monitored 512/514 to determine the amount of energy that is transferred via the one or more RF signals from the at least one antenna to a RF receiver (as is also discussed above). In some embodiments, this monitoring 512 occurs at the transmitter, while in other embodiments the monitoring 514 occurs at the receiver which sends data back to the transmitter via a back channel (e.g., over a wireless data connection using WIFI or BLUETOOTH). In some embodiments, the transmitter and the receiver exchange messages via the back channel, and these messages may indicate energy transmitted and/or received, in order to inform the adjustments made at step 516.

In some embodiments, a characteristic of the transmitter is adaptively adjusted at step 516 to attempt to optimize the amount of energy that is transferred from the at least one RF antenna to the receiver. In some embodiments, this characteristic is a frequency of the one or more RF signals and/or an impedance of the transmitter. In some embodiments, the impedance of the transmitter is the impedance of the adjustable load. Also in some embodiments, the at least one processor is also configured to control the impedance of the adaptive load. Additional details and examples regarding impedance and frequency adjustments are provided above.

In some embodiments, the transmitter includes a power input configured to be electrically coupled to a power source, and at least one processor (e.g., processor 110, FIGS. 3A-3B) configured to control at least one electrical signal sent to the antenna. In some embodiments, the at least one processor is also configured to control the frequency of the at least one signal sent to the antenna.

In some embodiments, the transmitter further comprises a power amplifier electrically coupled between the power input and the antenna input terminal (e.g., PA 108, FIGS. 3A, 3B, 3D, and 4). Some embodiments also include an adaptive load electrically coupled to the antenna output terminal (e.g., terminal 121, FIGS. 3A-3C and 4). In some embodiments, the at least one processor dynamically adjusts the impedance of the adaptive load based on the monitored amount of energy that is transferred from the at least one antenna to the RF receiver. In some embodiments, the at least one processor simultaneously controls the frequency of the at least one signal sent to the antenna.

In some embodiments, each RF antenna of the transmitter includes: a conductive line forming a meandered line pattern, a first terminal (e.g., terminal 123) at a first end of the conductive line for receiving current that flows through the conductive line at a frequency controlled by one or more processors, and a second terminal (e.g., terminal 121), distinct from the first terminal, at a second end of the conductive line, the second terminal coupled to a component (e.g., adaptive load 106) controlled by the one or more processors and that allows for modifying an impedance value of the conductive line. In some embodiments, the conductive line is disposed on or within a first antenna layer of a multi-layered substrate. Also in some embodiments, a second antenna is disposed on or within a second antenna layer of the multi-layered substrate. Finally, some embodiments also provide a ground plane disposed on or within a ground plane layer of the multi-layered substrate.

In some embodiments, the method described above in reference to FIG. 5 is performed in conjunction with the methods described below in reference to FIGS. 9A-9B, 10, and 11A-11E. For example, the operations of modifying/adjusting impedance values are performed after determining which antenna zones (the "determined antenna zones") to use for transmitting wireless power to a receiver, and then impedance values at the determined antenna zones are adjusted to ensure that a maximum amount of power is transferred wirelessly to the receiver by antennas within the determined antenna zones.

FIGS. 6A-6E are schematics showing various configurations for individual antenna elements within an RF charging pad, in accordance with some embodiments. As shown in FIGS. 6A-6E, an RF charging pad 100 (FIG. 3A) may include antenna elements 120 that are made using different structures.

Figure 6A:
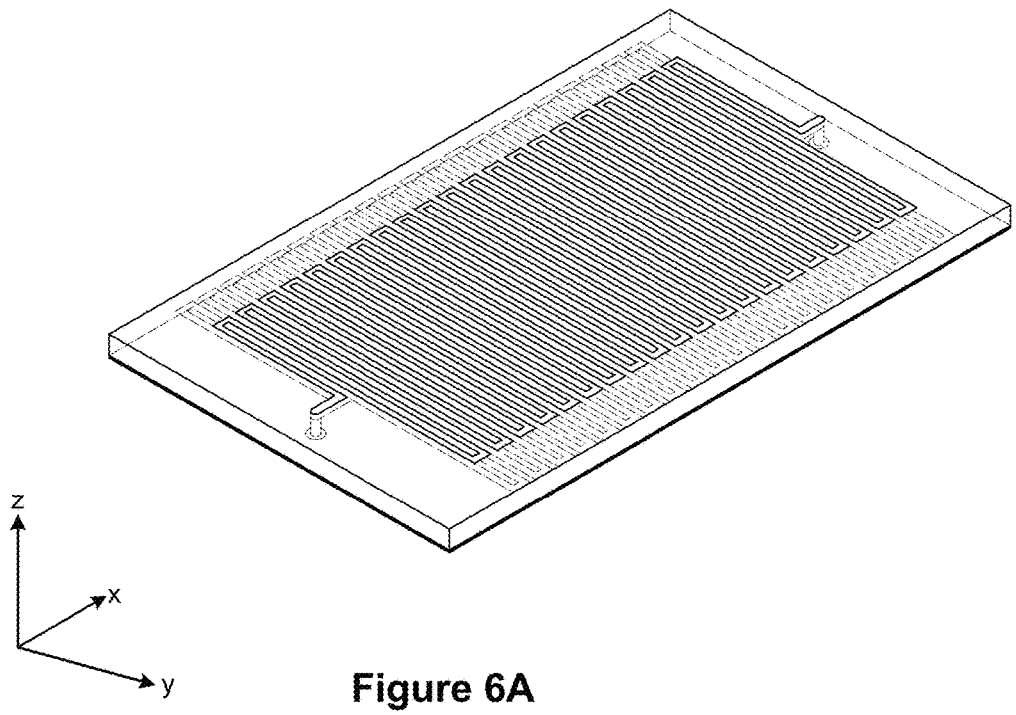
FIGS. 6A-6E are schematics showing various configurations for individual antenna elements within an RF charging pad, in accordance with some embodiments.
Figure 6B:
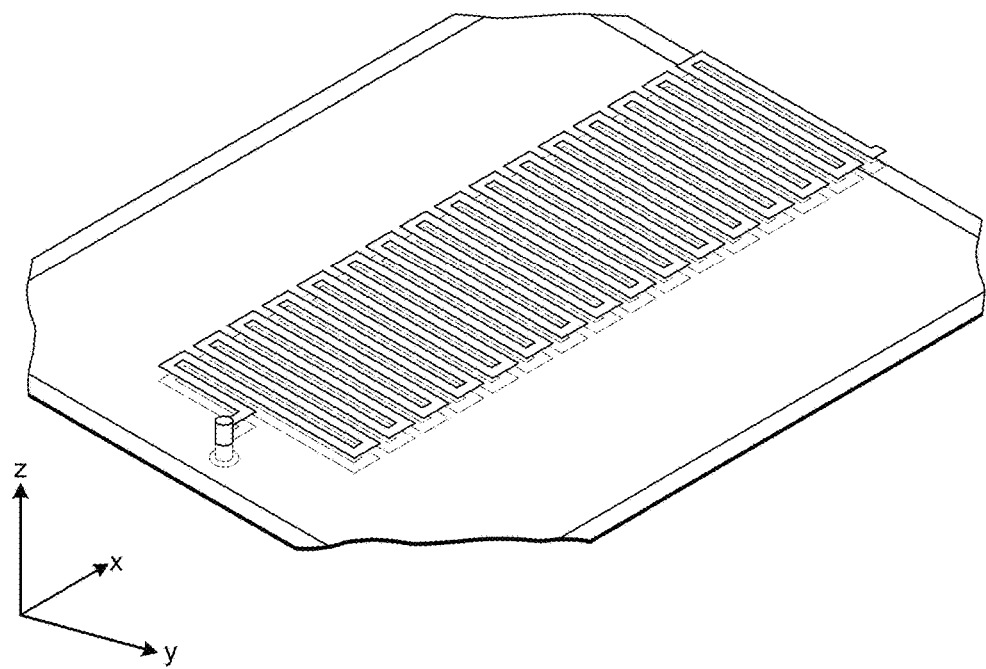

For example, FIGS. 6A-6B show examples of structures for an antenna element 120 that includes multiple layers that each include conductive lines formed into meandered line patterns. The conductive lines at each respective layer may have the same (FIG. 6B) or different (FIG. 6A) widths (or lengths, or trace gauges, or patterns, spaces between each trace, etc.) relative to other conductive lines within a multi-layer antenna element 120. In some embodiments, the meandered line patterns may be designed with variable lengths and/or widths at different locations of the pad 100 (or an individual antenna element 120), and the meandered line patterns may be printed on more than one substrate of an individual antenna element 120 or of the pad 100. These configurations of meandered line patterns allow for more degrees of freedom and, therefore, more complex antenna structures may be built that allow for wider operating bandwidths and/or coupling ranges of individual antenna elements 120 and the RF charging pad 100.

Figure 6C:
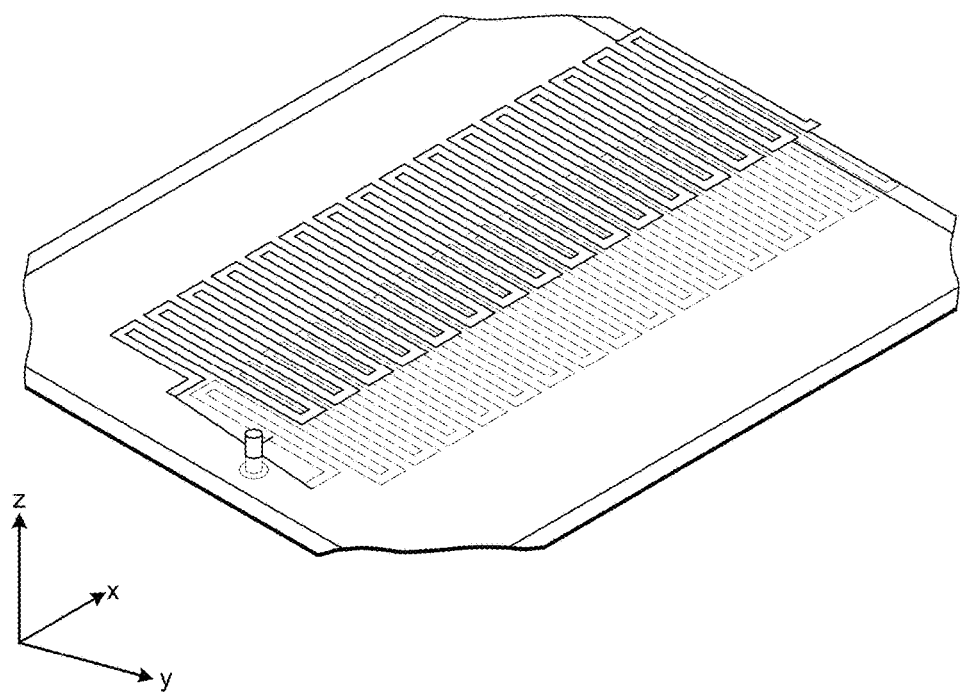
Figure 6D:
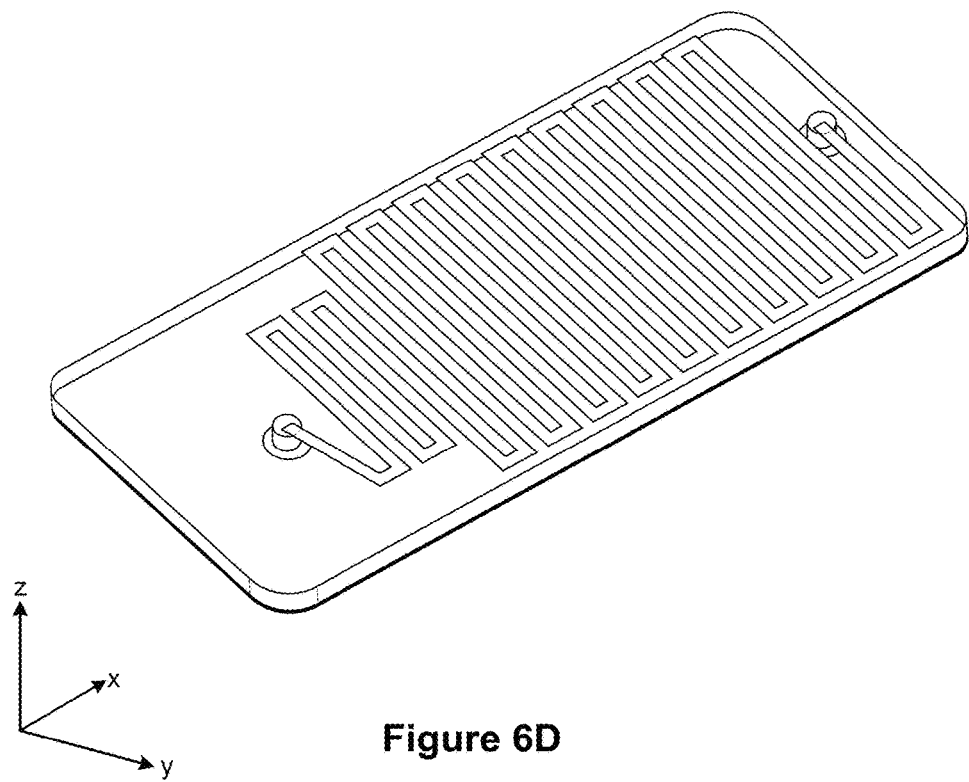
Figure 6E:
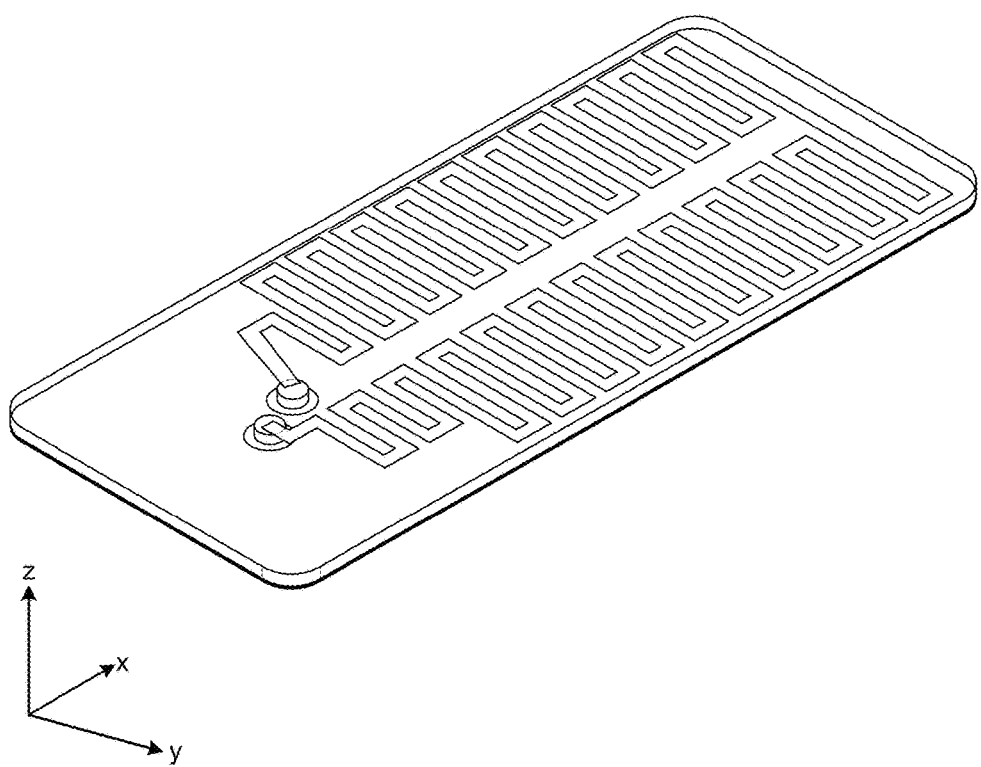

Additional example structures are provided in FIGS. 6C-6E: FIG. 6C shows an example of a structure for an antenna element 120 that includes multiple layers of conductive lines forming meandered line patterns that also have sliding coverage (in some embodiments, respective meandered line patterns may be placed in different substrates with just a portion of a first meandered line pattern of a respective substrate overlapping the a second meandered line pattern of a different substrate (i.e., sliding coverage), and this configuration helps to extend coverage throughout width of the antenna structure); FIG. 6D shows an example of a structure for an antenna element 120 that includes a conductive line having different lengths at each turn within the meandered line pattern (in some embodiments, using different lengths at each turn helps to extend coupling range of the antenna element 120 and/or helps add to the operating bandwidth of the RF charging pad 100); and FIG. 6E shows an example of a structure for an antenna element 120 that includes a conductive line that forms two adjacent meandered line patterns (in some embodiments, having a conductive line that forms two adjacent meandered line patterns helps to extend width of the antenna element 120). All of these examples are non-limiting and any number of combinations and multi-layered structures are possible using the example structures described above.

Figure 7A:
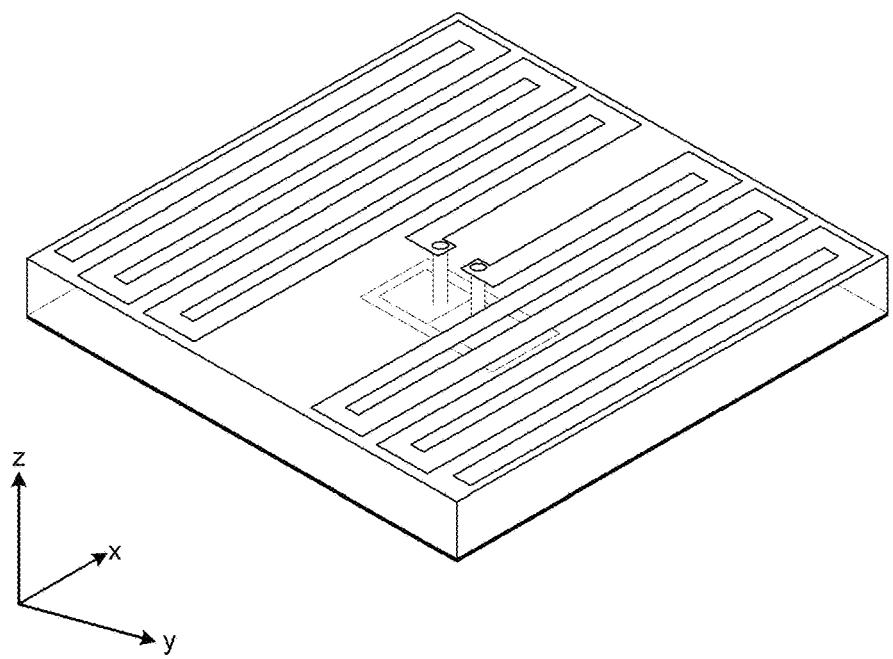
FIGS. 7A-7D are schematics of an antenna element for an RF receiver, in accordance with some embodiments.
Figure 7B:
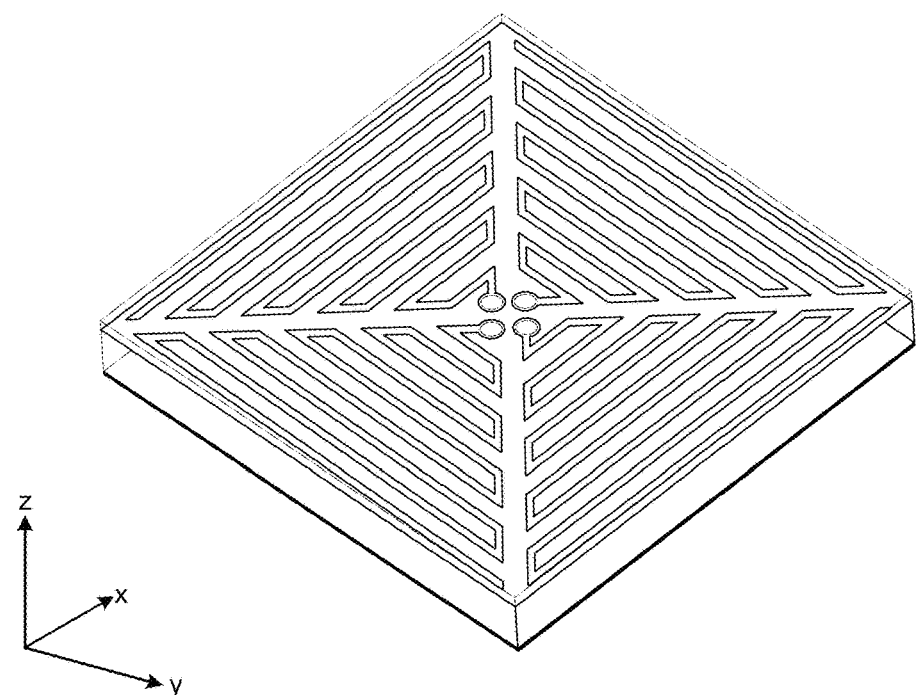
Figure 7C:
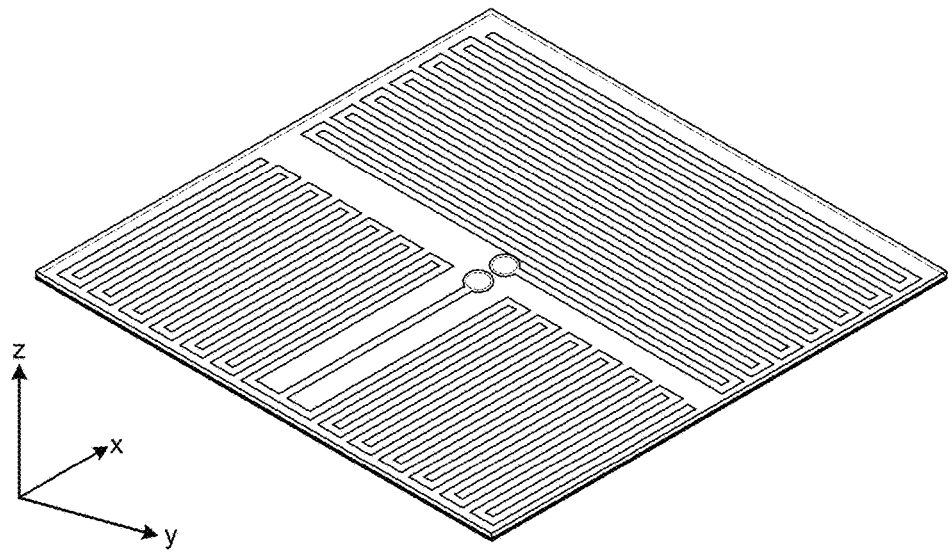
Figure 7D:
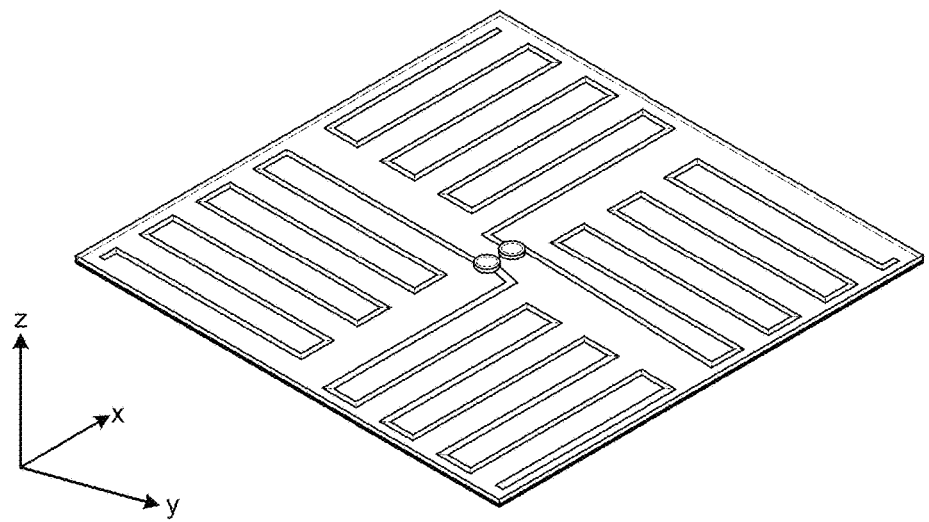

FIGS. 7A-7D are schematics of an antenna element for an RF receiver, in accordance with some embodiments. In particular FIGS. 7A-7D show examples of structures for RF receivers (e.g., receiver 104, FIGS. 3A-3D and 4), including: (i) a receiver with a conductive line that forms meandered line patterns (the conductive line may or may not be backed by solid ground plane or reflector), as shown in FIGS. 7A (single-polarity receiver) and 7B (dual-polarity receiver). FIGS. 7C-7D show additional examples of structures for an RF receiver with dual-polarity and a conductive line that forms a meandered line pattern. Each of the structures shown in FIGS. 7A-7D may be used to provide different coupling ranges, coupling orientations, and/or bandwidth for a respective RF receiver. As a non-limiting example, when the antenna element shown in FIG. 7A is used in a receiver, very small receivers may be designed/built that only couple to the pad 100 in one direction. As another non-limiting example, when the antenna elements shown in FIGS. 7B-7D are used in a receiver, the receiver is then able to couple to the pad 100 in any orientation.

Figure 8:
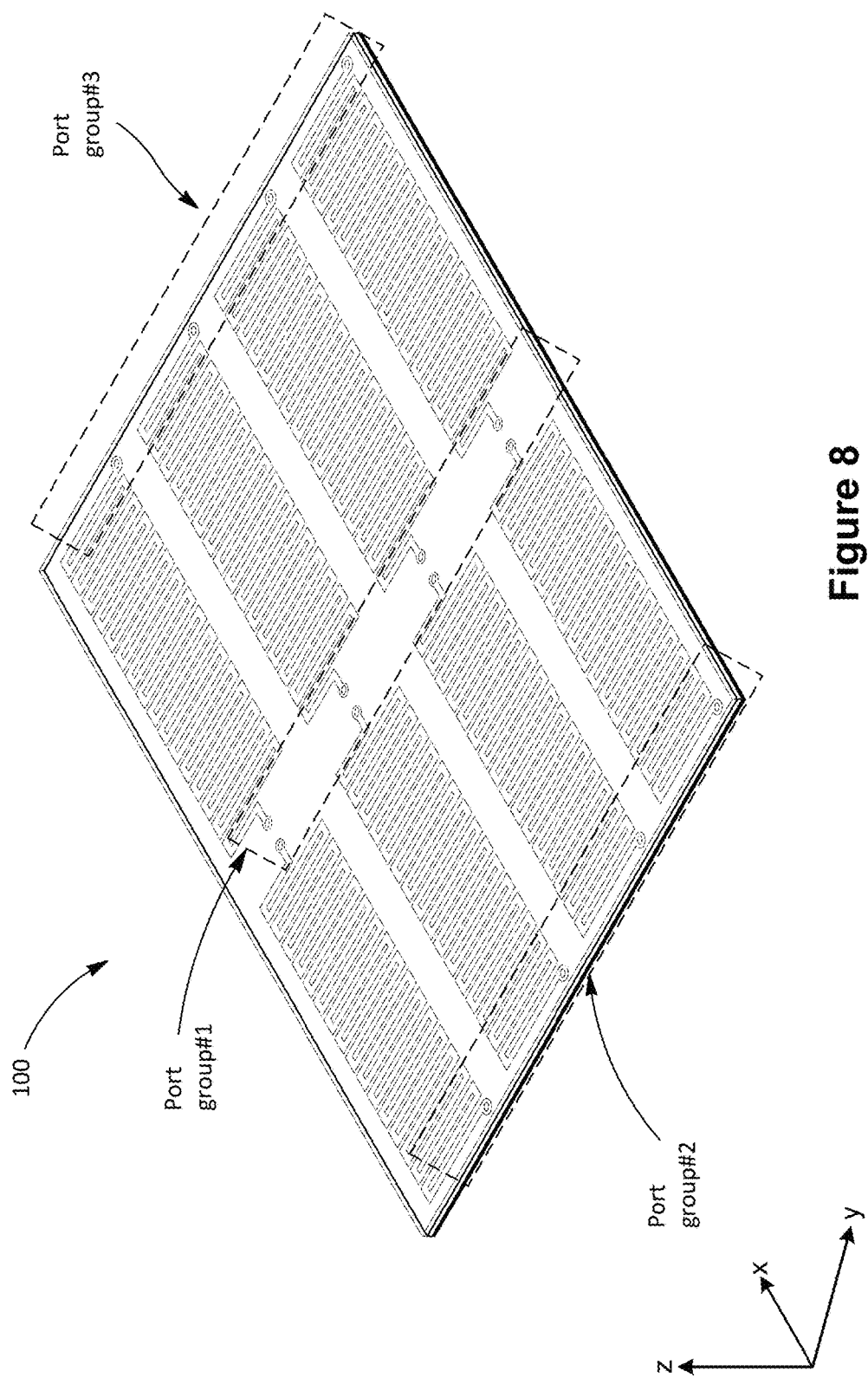
FIG. 8 is a schematic of an RF charging pad with a plurality of transmitting antenna elements (or unit cells), in accordance with some embodiments.

Other examples and descriptions of meandered line patterns for antenna elements are provided below. FIG. 8 is a schematic of an RF charging pad with a plurality of transmitting antenna elements (unit cells) that form a larger RF charging/transmitting pad, in accordance with some embodiments. In some embodiments, the RF charging pad 100 is formed as an array of adjacent antenna elements 120 (the distance between cells may be optimized for the best coverage). In some embodiments, when a receiver is placed in an area/gap that is between adjacent antenna elements 120, attempts to optimize energy transfer (e.g., in accordance with the adaptation scheme discussed above in reference to FIG. 3A) may not result in increased energy transfer above an acceptable threshold level (e.g., 75% or more). As such, in these circumstances, adjacent antenna elements may both be configured to transmit RF waves at full power at the same time to transfer additional energy to a receiver that is placed on a surface of the RF charging pad, and at a location that is between adjacent antenna elements 120.

As one possible configuration in accordance with some embodiments, port (or terminal) group #1 (FIG. 8) supplies power, port (or terminal) groups #2 and #3 provide adaptive loads (e.g., an electromechanical relay moving between short-circuit and open-circuit states). As another example of a suitable configuration, port (or terminal) groups #1, #2 and #3 may also be used to supply power via a power amplifier to the charging pad 100 (at the same time or with one group at a time being switched when necessary).

In some embodiments, each transmitting antenna element 120 of the RF charging pad 100 forms a separate antenna zone which is controlled by a feeding (PA) terminal and one or more terminals to support adaptive load(s), as explained in detail above. In some embodiments, feedback from the receiver helps determine the antenna zone on top of which the receiver is placed, and this determination activates that zone (e.g., using the switch 295, FIG. 1C). In circumstances in which the receiver is placed between two or more zones (e.g., at an area/gap that is between adjacent antenna elements 120), additional adjacent zones might be activated to ensure sufficient transfer of energy to the receiver. Additional details regarding determining zones to use for transmitting wireless power to the receiver are provided below in reference to FIGS. 9A-9B, 10, and 11A-11E.

Figure 9A:
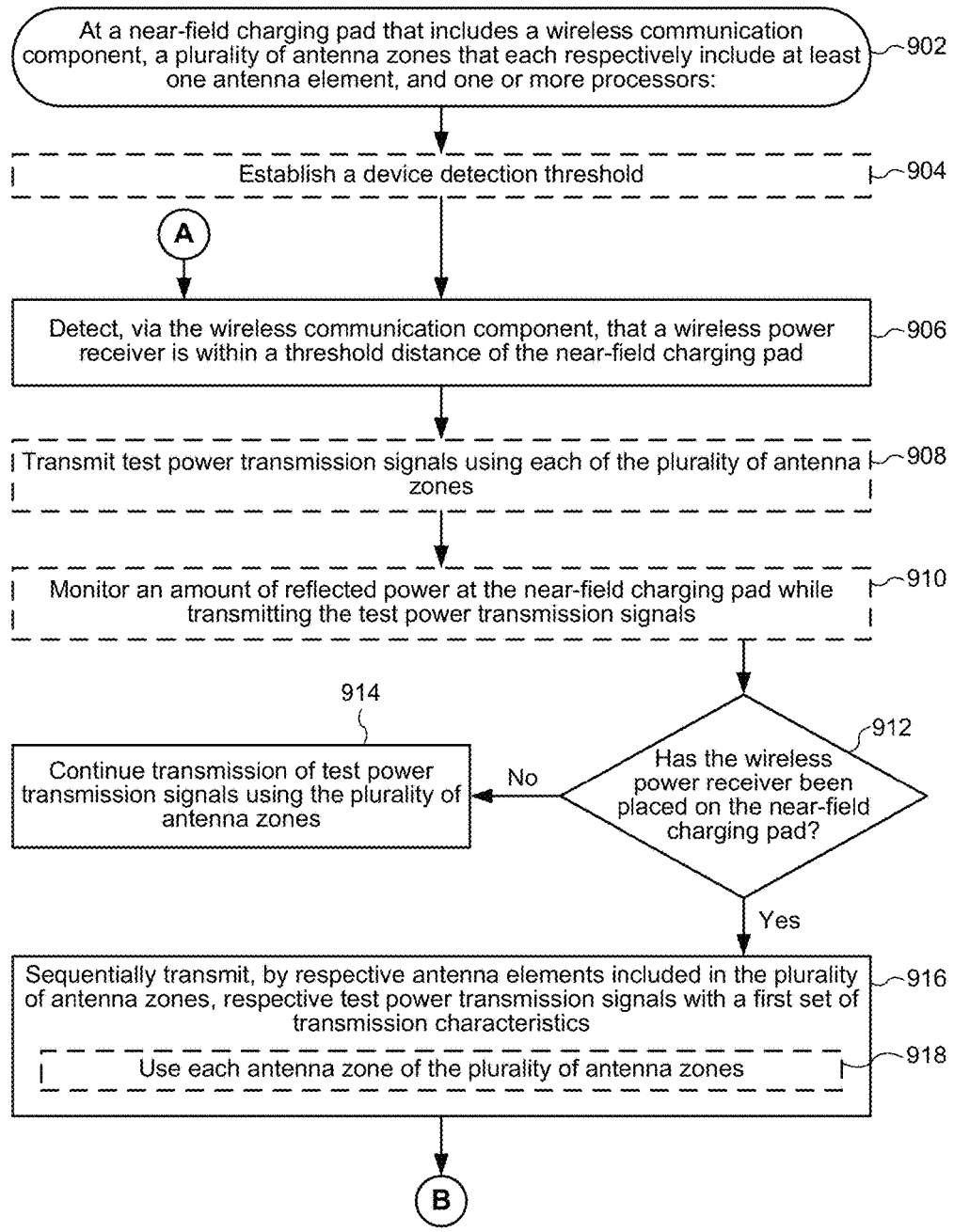
FIGS. 9A-9B are flow diagrams showing a method 900 of selectively activating one or more antenna zones in a near-field charging pad, in accordance with some embodiments.
Figure 9B:
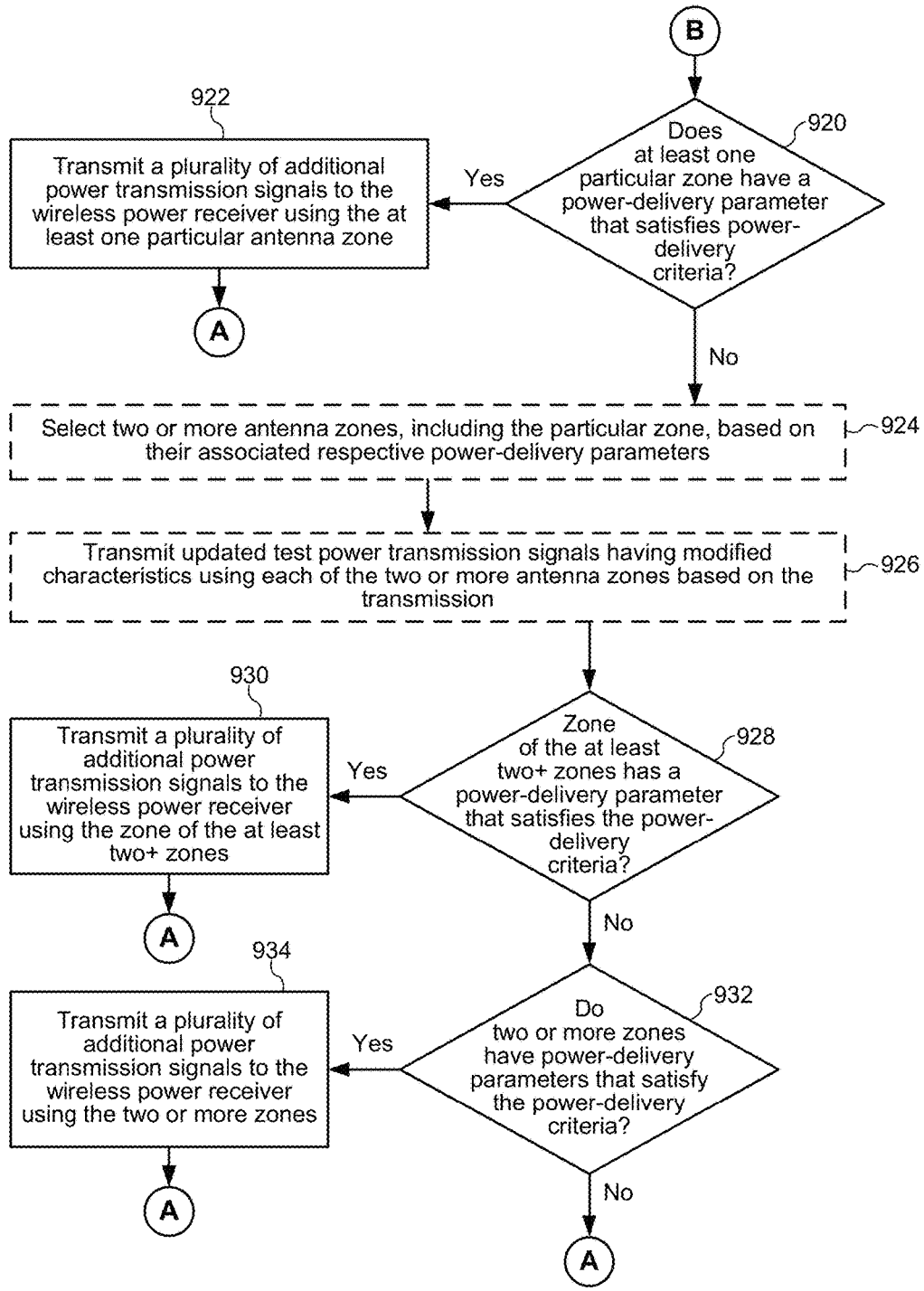

FIGS. 9A-9B are flow diagrams showing a method 900 of selectively activating one or more antenna zones (e.g., activating the antennas associated therewith) in a near-field charging pad, in accordance with some embodiments. Operations of the method 900 are performed by a near-field charging pad (e.g. RF charging pad 100, FIGS. 1B and 2A) or by one or more components thereof (e.g., those described above with reference to FIGS. 1A-1B and 2A). In some embodiments, the method 900 corresponds to instructions stored in a computer memory or computer-readable storage medium (e.g., memory 206 of the RF charging pad 100, FIG. 2A).

The near-field charging pad includes one or more processors (e.g., CPU 202, FIG. 1B), a wireless communication component (e.g., communication component(s) 204, FIGS. 1A and 2A), and a plurality of antenna zones (e.g., antenna zones 290-1 and 290-N, FIG. 1B) that each respectively include at least one antenna element (e.g., one of antennas 210, which may be one of the antennas 120 described in reference to FIGS. 3A-6E) (902). In some embodiments, the near-field charging pad includes distinct antennas (or unit cells including antennas, also referred to herein as antenna elements) that are each included in respective antenna zones. For example, as shown in FIG. 1B, an antenna zone 290-1 includes an antenna 210-A. In another example, as is also shown in FIG. 1B, an antenna zone 290-N includes multiple antennas. The antenna zones may also be referred to as antenna groups, such that the near-field charging pad includes a plurality of antenna zones or groups, and each respective zone/group includes at least one of the distinct antenna elements (e.g., at least one antenna 210). It should be noted that an antenna zone can include any number of antennas, and that the numbers of antennas associated with a particular antenna zone may be modified or adjusted (e.g., the CPU subsystem 170 of RF power transmitter integrated circuit 160 responsible for managing operations of the near-field charging pad 100 dynamically defines each antenna zone at various points in time, as is discussed in more detail below). In some embodiments, each antenna zone includes a same number of antennas.

In some embodiments, the one or more processors are a component of a single integrated circuit (e.g., RF power transmitter integrated circuit 160, FIG. 1B) that is used to control operation of the near-field charging pad. In some embodiments, the one or more processors and/or the wireless communication component of the near-field charging pad is/are external to the near-field charging pad, such as one or more processors of a device in which the near-field charging pad is embedded. In some embodiments, the wireless communication component is a radio transceiver (e.g., a BLUETOOTH radio, WI-FI radio, or the like for exchanging communication signals with wireless power receivers).

In some embodiments, the method includes establishing (904) one or more device detection thresholds during a calibration process for the near-field charging pad. In some instances, the calibration process is performed after manufacturing the near-field charging pad and includes placing devices of various types (e.g., smartphones, tablets, laptops, connected devices, etc.) on the near-field charging pad and then measuring a minimum amount of reflected power detected at an antenna zone while transmitting test power transmission signals to the devices of various types. In some instances, a first device-specific threshold is established at a value corresponding to 5% or less of the minimum amount of reflected power. In some embodiments, a second device-specific threshold is also established so that if no one antenna zone is able to satisfy the first threshold (e.g., because the wireless power receiver is located at a border between antenna zones), then the second, higher threshold may be used to locate more than one antenna zone to use for transmitting power to the wireless power receiver (as discussed in more detail below). In some embodiments, multiple first and second device-specific detection thresholds are established for each type of device of the various types, and these multiple first and second device-specific detection thresholds may be stored in a memory associated with the RF power transmitter integrated circuit 160 (e.g., memory 206, FIG. 2A).

The method 900 also includes detecting (906), via the wireless communication component, that a wireless power receiver is within a threshold distance of the near-field charging pad. In some instances, the detecting may occur after the near-field charging pad is turned on (e.g., powered up). In these instances, the near-field charging pad scans an area around the near-field charging pad (e.g., to scan for wireless power receivers that are located within the threshold distance, e.g., within 1-1.5 meters, away from the NF charging pad 100) to determine whether any wireless power receivers are within the threshold distance of the NF charging pad 100. The near-field charging pad may use the wireless communication component (e.g., communication component(s) 204, FIG. 2A, such as a Bluetooth radio) to conduct the scanning for signals broadcasted by wireless communication components associated with wireless power receivers (e.g., communication component 254, FIG. 2B). In some embodiments, the device detection threshold is selected (from among the multiple first and second device detection threshold discussed above) by the one or more processors after detecting the wireless power receiver within the threshold distance of the near-field charging pad. For example, a wireless communication component of the wireless power receiver is used to provide information to the near-field charging pad that identifies the type of device, such as a BLUETOOTH or BLUETOOTH low energy advertisement signal that includes this information. In some embodiments, to save energy and prolong life of the near-field charging pad and its components, no wireless power is transmitted (and the device detection and antenna selection algorithms discussion herein are not initiated) until a wireless power receiver is detected within the threshold distance of the near-field charging pad.

In some embodiments, the detecting 906 also includes performing an authorization handshake (e.g., using the secure element modules 234 and 282, FIGS. 2A and 2B) to ensure that the wireless power receiver is authorized to receive wirelessly delivered power from the near-field charging pad and the method only proceeds to operation 908 if it is determined that the wireless power receiver is so authorized. In this way, the near-field charging pad ensures that only authorized wireless power receivers are able to receive wirelessly delivered power and that no device is able to leech power that is transmitted by the near-field charging pad.

The method 900 further includes, in response to detecting that the wireless power receiver is within the threshold distance of the near-field charging pad, determining (912) whether the wireless power receiver has been placed on the near-field charging pad. In some embodiments, this is accomplished by transmitting (908) test power transmission signals using each of the plurality of antenna zones and monitoring (910) an amount of reflected power at the near-field charging pad while transmitting the test power transmission signals.

In some embodiments, if the amount of reflected power does not satisfy the device detection threshold (e.g., the amount of reflected power is greater than 20% of power transmitted with the test power transmission signals), then a determination is made that the wireless power receiver has not been placed on the surface of the near-field charging pad (912—No). In accordance with this determination, the near-field charging pad continues to transmit test power transmission signals using each of the plurality of antenna zones at step 914 (i.e., proceed to step 908). In some embodiments, the operations at 908 and 910 are performed until it is determined that the device detection threshold has been satisfied.

In some embodiments, the amount of reflected power is measured at each antenna zone of the plurality of antenna zones (e.g., each antenna zone may be associated with a respective ADC/DAC/Power Detector, such as the one shown in FIG. 1B) while, in other embodiments, the amount of reflected power may be measured using a single component of the RF power transmitter integrated circuit 160 (e.g., the ADC/DAC/Power Detector). When the amount of reflected power satisfies the device detection threshold (912—Yes), the wireless power receiver is determined to have been placed on the near-field charging pad. For example, the amount of reflected power may satisfy the device detection threshold when the amount of reflected power is 20% or less than amount of power transmitted with the test power transmission signals. Such a result indicates that a sufficient amount of the power transmitted with the test power transmission signals was absorbed/captured by the wireless power receiver.

In some embodiments, other types of sensors (e.g., sensors 212, FIG. 2A) are included in or in communication with the near-field charging pad to help determine when the wireless power receiver has been placed on the near-field charging pad. For example, in some embodiments, one or more optical sensors (e.g., when light is blocked from a part of the pad, then this may provide an indication that the wireless power receiver has been placed on the pad), one or more vibration sensors (e.g., when a vibration is detected at the pad, then this may provide an indication that the wireless power receiver has been placed on the pad), one or more strain gauges (e.g., when a strain level at a surface of the pad increases, this may provide an indication that the wireless power receiver has been placed on the surface), one or more thermal sensors (e.g., when a temperature at a surface of the pad increases, this may provide an indication that the wireless power receiver has been placed on the surface), and/or one or more weighing sensors (e.g., when an amount of weight measured on the surface of the pad increases, then this may provide an indication that the wireless power receiver has been placed on the surface) are utilized to help make this determination.

In some embodiments, before transmitting the test power transmission signals, the method includes determining that the wireless power receiver is authorized to receive wirelessly delivered power from the near-field charging pad. For example, as shown in FIGS. 2A-2B, the wireless power receiver 104 and the near-field charging pad 100 may include secure element modules 282 and 234, respectively, which are used to perform this authorization process, thereby ensuring that only authorized receivers are able to receive wirelessly delivered power from the near-field charging pad.

The method 900 further includes, in accordance with determining that the wireless power receiver has been placed on the near-field charging pad, selectively transmitting (916), by respective antenna elements included in the plurality of antenna zones, respective test power transmission signals with a first set of transmission characteristics. In some embodiments, the selectively or sequentially transmitting is performed using each antenna zone of the plurality of antenna zones (918). Selectively or sequentially transmitting refers to a process of selectively activating antenna zones one at a time to cause one or more antennas associated with individual antenna zones to transmit test power transmission signals (e.g., the RF power transmitter integrated circuit 160 provides one or more control signals to the switch 295 to selectively activate different antenna zones).

Referring now to FIG. 9B, the method 900 further includes determining (920) whether a particular power-delivery parameter associated with transmission of a respective test power transmission signal (during the sequential or selective transmission operation at 916 and/or 918) by at least one particular antenna zone of the plurality of antenna zones satisfies power-delivery criteria (e.g., whether the particular power-delivery parameter indicates that more than a threshold amount of power is transferred to the wireless power receiver by the at least one particular antenna zone). In some embodiments, each respective power-delivery parameter corresponds to an amount of power received by the wireless power receiver based on transmission of a respective test power transmission signal by a respective antenna group of the plurality of antenna groups.

Upon determining, by the one or more processors, that the particular power-delivery parameter satisfies the power-delivery criteria (920—Yes), the method further includes transmitting (922) a plurality of additional power transmission signals to the wireless power receiver using the at least one particular antenna zone, where each additional power transmission signal of the plurality is transmitted with a second set of transmission characteristics, distinct from the first set. In some embodiments, the second set of transmission characteristics is determined by adjusting at least one characteristic in the first set of transmission characteristics to increase an amount of power that is transferred by the particular antenna group to the wireless power receiver. Moreover, in some embodiments, the at least one adjusted characteristic is a frequency or impedance value (and the frequency and impedance value may be adjusted using the adaptation scheme discussed above).

The test power transmission signals discussed above are used to help determine which antenna zones to use for delivering wireless power to the wireless power receiver. In some embodiments, these test power transmission signals are not used by the wireless power receiver to provide power or charge to the wireless power receiver, or a device associated therewith. Instead, the plurality of additional power transmission signals is used to provide power or charge to the wireless power receiver. In this way, the near-field charging pad is able to preserve resources during a device detection stage (e.g., while transmitting the test power transmission signals) until a suitable antenna zone is located for transmitting the plurality of additional power transmission signals. As such, the method 900 is able to locate a position of the wireless power receiver using test signals (i.e., the test power transmission signals with the first set of transmission characteristics) and then transmit using antenna from an antenna zone that is best-suited to provide power transmission signals given the position of the wireless power receiver on the near-field charging pad. As discussed in more detail below with reference to FIG. 10, this process may include a coarse search for antenna zones (e.g., the coarse search may include the operations 908-918) and a finer search for antenna zones (e.g., the finer search may include operations 920-934).

In some embodiments, a power control process (FIG. 11E) is also used to help optimize a level of power delivered to the wireless power receiver using the selected antenna zones (e.g., power control may be performed after operations 922, 930, or 934 to tune transmission of wireless power using the antenna zones that were selected during the method 900). As a part of the power control process, the near-field charging pad may, while transmitting the additional plurality of power transmission signals, adjust at least one characteristic in the second set of transmission characteristics based on information, received from the wireless power receiver, which is used to determine a level of power that is wirelessly delivered to the wireless power receiver by the near-field charging pad.

Returning back to operation 920, in response to determining that none of the power-delivery parameters associated with transmission of the test power transmission signals during the sequential or selective transmission operation(s) at 916 (and optionally 918) satisfy the power-delivery criteria (920—No), the method 900 further includes selecting (924) two or more antenna zones (also referred to interchangeably herein as two+ antenna zones) based on their associated respective power-delivery parameters. This may arise when the wireless power receiver is not centered over any particular antenna zone (e.g., the receiver may be over more than one antenna zone). For example, the two or more antenna zones that transferred the highest amount of power to the wireless power receiver during the sequential or selective transmission operation at 916 (and optionally 918) based on their respective power-delivery parameters are selected at operation 924. In this way, in some embodiments, a finer search for the most efficient antenna zone is started by selecting the two or more antenna zones that most efficiently transmitted power to the wireless power receiver during the operations at 916/918 based on their respective association with power-delivery parameters that is higher than the power-delivery parameters for other antenna zones. In these embodiments, a respective power-delivery parameter may be monitored (in conjunction with operations 916/918) for each antenna zone and these power-delivery parameters are then compared to determine which of the plurality of antenna zones to select as the two or more antenna zones to use for transmission of wireless power.

After selecting the two or more antenna zones, the method further includes: (i) updating the test power transmission signals by modifying at least one characteristic of the test power transmission signals (e.g., frequency, impedance, amplitude, phase, gain, etc.), based on the previous transmissions (e.g., based on feedback received from the wireless power receiver regarding a level of power receive by the wireless power receiver or based on an amount of reflected power measured at each antenna group after the transmission), and (ii) transmitting (926) the updated test power transmission signals using each of the two or more antenna zones (e.g., the RF power transmitter integrated circuit 160 may provide one or more control signals to the switch 295 to activate the two or more antenna zones).

The method 900 further includes determining (928) whether a particular power-delivery parameter associated with transmission of an updated respective test power transmission signal by a zone of the two or more antenna zones satisfies power-delivery criteria. In response to determining that the particular power-delivery parameter associated with transmission of the updated respective test power transmission signal by the zone of the two or more antenna zones satisfies the power-delivery criteria (928—Yes), the method 900 further includes transmitting (930) a plurality of additional power transmission signals to the wireless power receiver using the zone of the two or more antenna zones, where each additional power transmission signal of the plurality is transmitted with a second set of transmission characteristics, distinct from the first set (e.g., the RF power transmitter integrated circuit 160 may provide a control signal to the switch 295). The plurality of additional power transmission signals is used to wirelessly deliver power to the wireless power receiver (or an electronic device coupled with the wireless power receiver).

In some embodiments, the determination that the particular power-delivery parameter satisfies the power-delivery criteria at operations 920 and 928 may include determining that respective power-delivery parameters (associated with the at least one particular zone and/or the zone of the two or more antenna zones) indicates that a first threshold amount of power is transferred to the wireless power receiver. If such a determination is made at operation 928, this indicates that the zone is the only antenna zone of the two or more antenna zones having a respective power-delivery parameter that indicates that the first threshold amount of power is transferred to the wireless power receiver by the zone in conjunction with operation 926.

In some embodiments, the first threshold amount of power corresponds to an amount of power received by the wireless power receiver (in some circumstances, the first threshold amount of power could alternatively correspond to an amount of reflected power detected at the near-field charging pad). As discussed above, in some embodiments, a calibration process is performed after manufacturing the near-field charging pad and includes placing devices of various types (e.g., smartphones, tablets, laptops, connected devices, etc., that are each coupled with wireless power receivers) on the near-field charging pad and then measuring a maximum amount of power received at the receiver (or device coupled thereto) after transmission of the test signal by an antenna group to the devices of various types. In some instances, the first threshold is established at a value corresponding to a percentage of the maximum amount of received power (e.g., approximately 85% or more of power transmitted by a particular antenna zone is received by the receiver).

As explained above, during embodiments of the calibration process, a second threshold is also established so that if no one antenna zone is able to satisfy the first threshold (e.g., because the wireless power receiver may be located at a border between antenna groups) then the second threshold may be utilized to locate more than one antenna zone to transmit wireless power to the wireless power receiver (as discussed below). This second threshold may be another percentage of the maximum amount of reflected power that is measured during the calibration process (e.g., 65%). In some embodiments, the first and second thresholds are determined as respective device-specific first and second thresholds for each of the devices undergoing the calibration process.

In some embodiments, the method 900 includes determining (928—No) that (i) no antenna zone of the two or more antenna zones is transferring the first threshold amount of power to the wireless power receiver and (ii) an additional power-delivery parameter associated with an additional antenna zone of the two or more antenna zones satisfies the power-delivery criteria. For example, a respective power-delivery parameter indicates that a first amount of power transferred to the wireless power receiver by the zone of the two or more zones is above a second threshold amount of power and below the first threshold amount of power, and the additional power-delivery parameter also indicates that a second amount of power transferred to the wireless power receiver by the additional antenna zone is above the second threshold amount of power and below the first threshold amount of power. In other words, if no antenna zone of the two or more antenna zones is able to transfer enough power to the wireless power receiver to satisfy the first threshold amount of power, then the method proceeds to determine whether two of the antenna groups transferred enough power to the wireless power receiver to satisfy a second, lower threshold amount of power. For example, the wireless power receiver may be located at a border between two antenna groups, so no one antenna group is able to satisfy the first threshold, but these two antenna groups may be able to each individually satisfy the second threshold amount of power.

Upon determining, by the one or more processors of the near-field charging pad, that the power-delivery parameters associated with transmission of the updated test power transmission signals by the two or more antennas zones satisfy the power-delivery criteria (932—Yes), the method further includes transmitting (934) a plurality of additional power transmission signals to the wireless power receiver using the two or more antenna zones. Such a situation may arise when the wireless power receiver is placed between two adjacent antenna zones. In some embodiments, the two or more antenna zones each simultaneously transmit the additional plurality of power transmission signals to provide power to the wireless power receiver.

As is also shown in FIG. 9B, if the two or more zones do not have power-delivery parameters that satisfy the power-delivery criteria (932—No), then the method 900 returns to operation 906 to start searching for the receiver (or a different receiver again), as no antenna zones were located that could efficiently transfer wireless power to the receiver. In some embodiments, the method 900 may alternatively return to operation 924 to begin transmitting test power transmission signals with different characteristics to determine if those characteristics are able to then allow the two or more antenna zones to deliver enough wireless power to the receiver to satisfy the power-delivery criteria. In some embodiments, the method 900 returns to operation 924 a predetermined number of times (e.g., 2) and, if the two or more zones still do not have power-delivery parameters that satisfy the power-delivery criteria, then the method at that point returns to operation 906 to begin searching for new receivers.

In some embodiments, after the method 900 successfully locates antenna zones to use for wirelessly delivering power to the receiver (e.g., at operations 922, 930, and 934) then the method 900 returns to operation 906 to being search for new receivers. The near-field charging pad, in some embodiments, is capable of simultaneously delivering wireless power to multiple receivers at any particular point in time and, therefore, iterating through the method 900 again allows the near-field charging pad to appropriately determine which antenna zones to use for transmission of wireless power to each of these multiple receivers.

In some embodiments, information used to determine respective power-delivery parameters for each of the antenna zones of the near-field charging pad is provided to the near-field charging pad by the wireless power receiver via the wireless communication component of the near-field charging pad (e.g., the receiver transmits information that is used to determine an amount of power received by the receiver from the test power transmission signals discussed above). In some embodiments, this information is sent via a connection between the wireless communication component of the near-field charging pad and the wireless power receiver, and the connection is established upon determining that the wireless power receiver has been placed on the near-field charging pad.

Additionally, in some embodiments, the near-field charging pad dynamically creates or defines antenna zones. For example, with reference to FIG. 1B, the near-field charging pad may define a first antenna zone 290-1 to include a single antenna 210-A and may define another antenna zone 290-N to include more than one antenna 210. In some embodiments, at various phases of the method 900 discussed above, antenna zones may be redefined. For example, in accordance with the determination that the two or more antenna zones do not have power-delivery parameters that satisfy the power-delivery criteria (932-No), the near-field charging pad may redefine the antenna zones to each include multiple antennas (instead of having each antenna zone include a single antenna). In this way, the method 900 is able to dynamically define antenna zones to help ensure that an appropriate antenna zone is located that may be used to transmit wireless power to a receiver that has been placed on the near-field charging pad.

Figure 10:
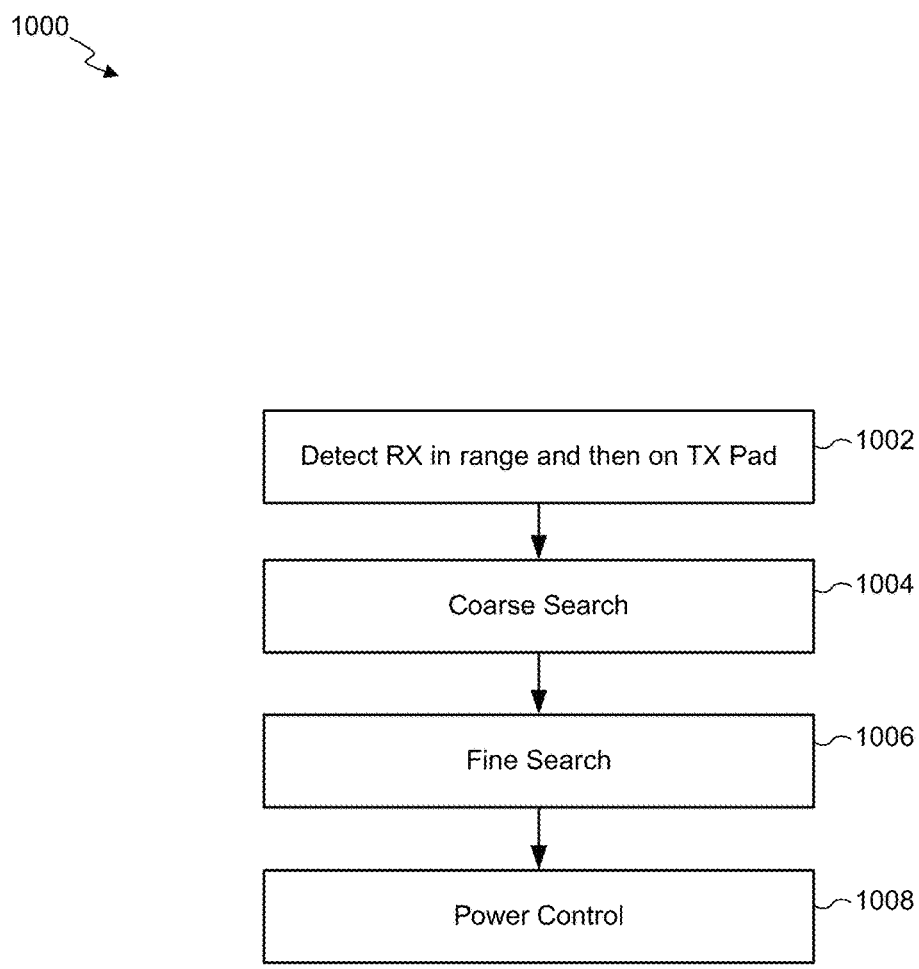
FIG. 10 is an overview showing a process of selectively activating one or more antenna zones in a near-field charging pad, in accordance with some embodiments.

FIG. 10 is an overview showing a process 1000 of selectively activating one or more antenna groups in a near-field charging pad, in accordance with some embodiments. Some of the operations in process 1000 correspond to or supplement the operations describe above in reference to method 900 of FIGS. 9A-9B. As shown in FIG. 10, the process 1000 begins with a near-field charging pad (e.g., RF charging pad 100, FIGS. 1A-1B and 2A) detecting (1002) a wireless power receiver (e.g., wireless power receiver 104, FIG. 12B) in range and subsequently on the near-field charging pad (operation 1002 corresponds to operations 906 to 912—Yes in FIG. 9A). The process 1000 further includes performing (1004) a coarse search, performing (1006) a fine search, and executing (1008) a power control routine. Each step in the process 1000 is described in further detail below with reference to FIGS. 11A-11E. It should be noted that the process 1000, in some embodiments, begins with the near-field charging pad detecting (1002) a wireless power receiver on the near-field charging pad and subsequently in range of the near-field charging pad.

Figure 11A:
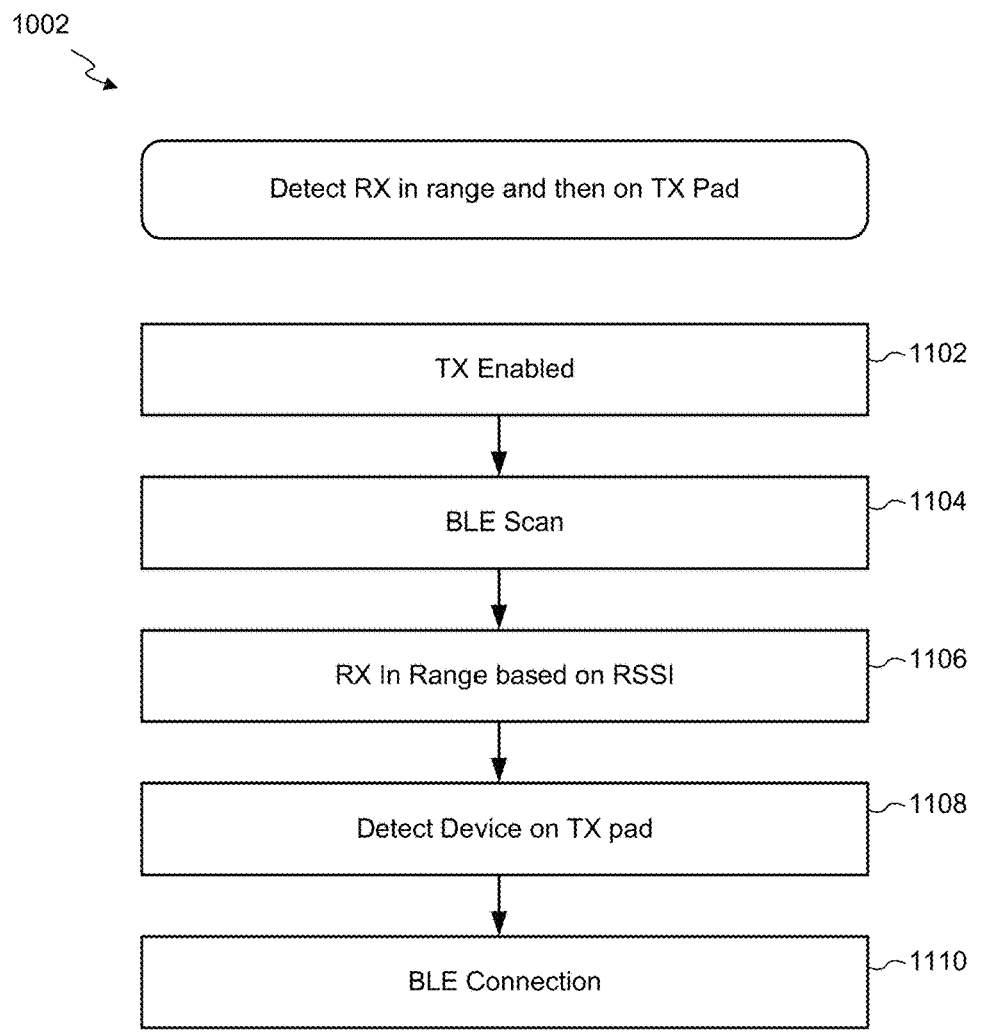

FIG. 11A is a flowchart detailing a process 1002 for detecting a wireless power receiver in range and subsequently on the near-field charging pad (or in some embodiments, on the near-field charging pad and subsequently in range of the near-field charging pad). The process 1002 includes enabling the near-field charging pad (1102), i.e., powering on the near-field charging pad. Thereafter, the near-field charging pad scans (1104) for wireless power receivers and detects (1106) a wireless power receiver in range based, at least in part, on a received signal strength indicator (RSSI). To obtain the RSSI, the near-field charging pad may use a wireless communication component (e.g., communication component(s) 204, FIG. 2A, such as a Bluetooth radio) to scan for signals broadcasted by wireless communication components associated with wireless power receivers (e.g., a Bluetooth advertisement signal). Detecting a wireless power receiver in range of the near-field charging pad is discussed in further detail above with reference to operation 906 of the method 900.

Next, the near-field charging pad detects (1108) a wireless power receiver on the near-field charging pad. In some embodiments, the near-field charging pad establishes that the wireless power receiver is on the near-field charging pad using the processes discussed above in reference to operations 908-914 until it is determined that the wireless power receiver has been placed on the near-field charging pad. In some embodiments, operation (1108) occurs before operation (1102).

Continuing, the near-field charging pad establishes (1110) a communication channel with the wireless power receiver in response to detecting the wireless power receiver on the near-field charging pad.

Figure 11B:
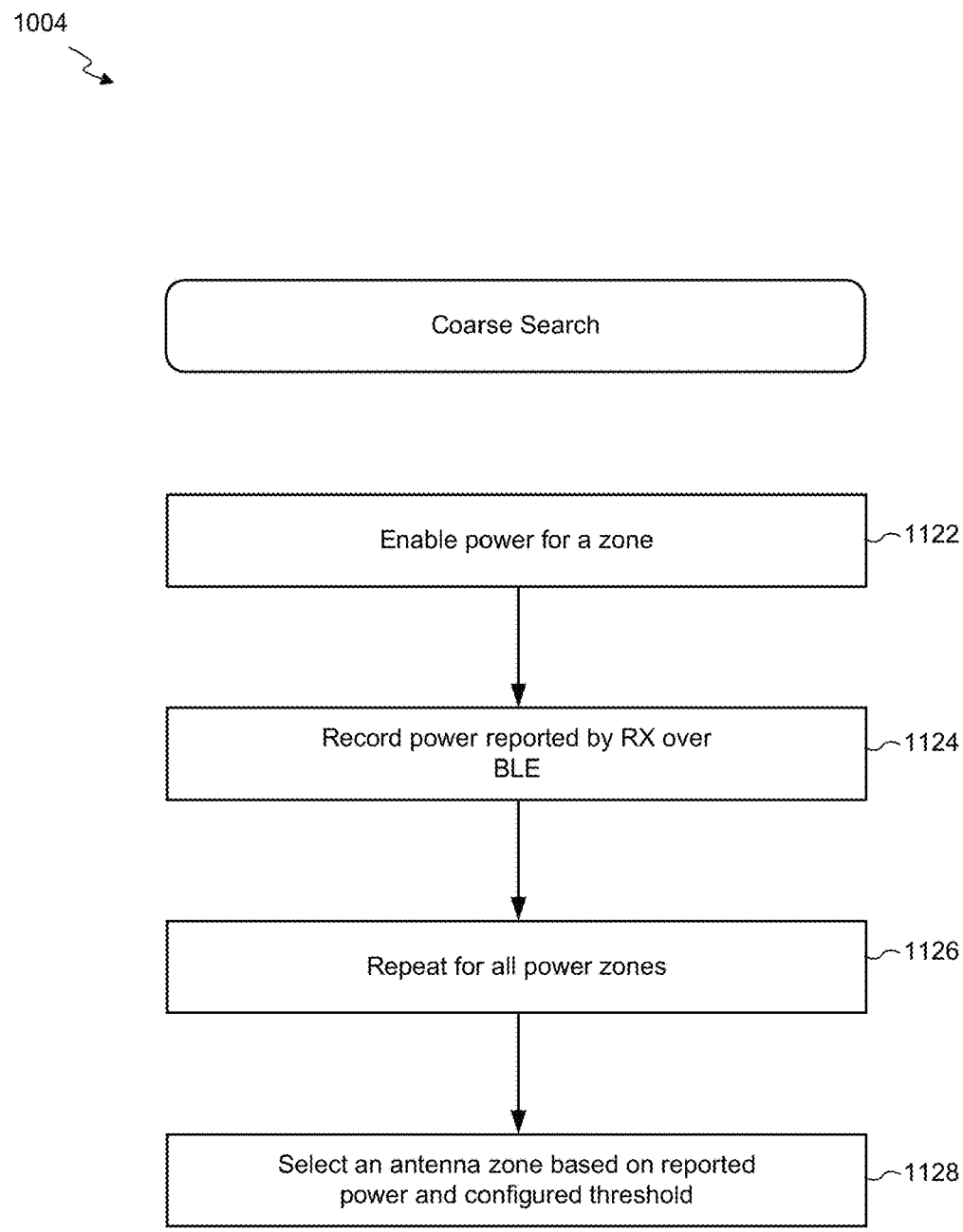

Turning now to FIG. 11B, the method proceeds to process 1004 in which the near-field charging pad performs a coarse search (1004). In performing the coarse search 1004, the near-field charging pad begins by enabling (1122) power for an antenna zone (e.g., antenna zone 290-1, FIG. 1B). In some embodiments, enabling power for the antenna zone includes transmitting, by an antenna element included in the antenna zone (e.g., after the RF power transmitter integrated circuit 160 provides one or more control signals to the switch 295 to activate the antenna zone), test power transmission signals with a first set of transmission characteristics (e.g., phase, gain, direction, amplitude, polarization, and/or frequency). Transmitting test power transmission signals is discussed in further detail above with reference to steps 916-918 of the method 900.

Continuing with the coarse search 1004, the near-field charging pad records (1124) an amount of power received by the wireless power receiver (the "reported power"). In some embodiments, the reported power is communicated to the near-field charging pad by the wireless power receiver via the communication channel that was established at operation 1110.

The near-field charging pad repeats (1126) steps (1122) and (1124) above for all antenna zones that have been defined for the near-field charging pad (e.g., RF power transmitter integrated circuit 160 provides one or more control signals to the switch 295 to selectively activate all the antenna zones). Thereafter, in some embodiments, the near-field charging pad selects (1128) a set of antenna zones based on the reported power (e.g., 2 or 3 zones, or some greater or lesser number, depending on the circumstances) and a configured threshold (e.g., power-delivery criteria). For ease of discussion, each antenna zone in the set includes a single antenna 210 (e.g., antenna zone 290-1, FIG. 1B). However, it should be understood that instead of selecting a set of antenna zones, the near-field charging pad could also select a single antenna zone that includes multiple antennas 210. For example, as shown in FIG. 1B, the antenna zone 290-N includes multiple antennas 210. In addition, each antenna zone in the set could also include multiple antennas, depending on the circumstances.

Figure 11C:
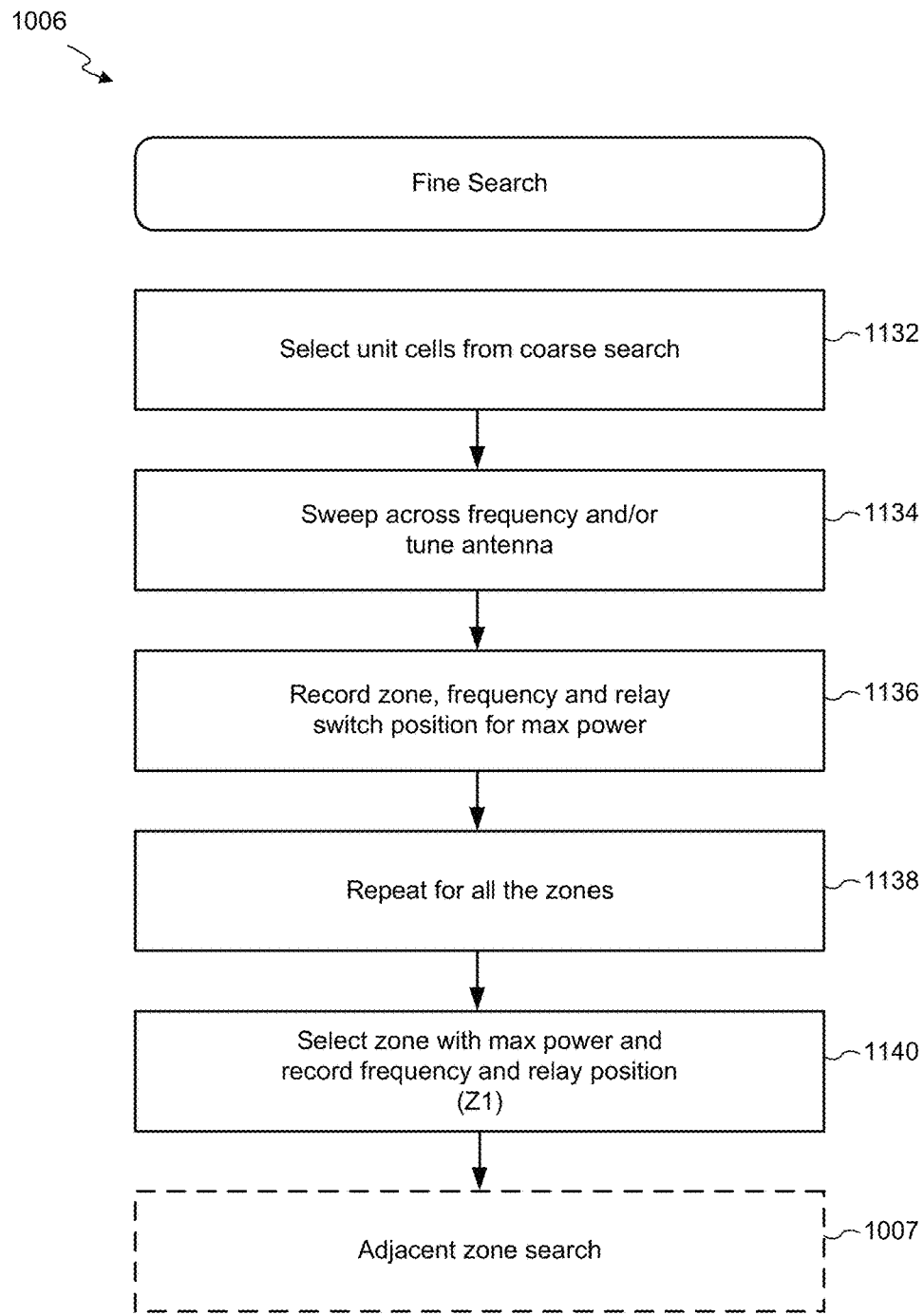

Turning now to FIG. 11C, after selecting the set of antenna zones based on the reported power, the near-field charging pad performs the fine search process (1006). In some embodiments, the fine search 1006 is used to determine which antenna zone(s) is/are best suited to wirelessly delivery power to the wireless power receiver, based on a location of the wireless power receiver on the near-field charging pad. In performing the fine search (1006), the near-field charging pad selects (1132) at least one antenna zone from the set of antenna zones selected using the coarse search, and for the at least one antenna zone, the near-field charging pad sweeps (1134) across available frequencies and/or impedances (i.e., tunes transmission of power transmission signals by the at least one antenna zone). Thereafter, the near-field charging pad records (1136) those characteristics that result in maximizing an amount of received power reported by the wireless power receiver. In some embodiments, operations 1134 and 1136 are repeated for each antenna zone in the set of antenna zones (1138) and the near-field charging pad selects (1140) an antenna zone (Z1) that delivers a maximum amount of power to the wireless power receiver. In addition, the near-field charging pad also records the frequency (and other transmission characteristics) and a relay position by antenna zone Z1 to achieve the delivery of the maximum amount of power to the wireless power receiver.

Figure 11D:
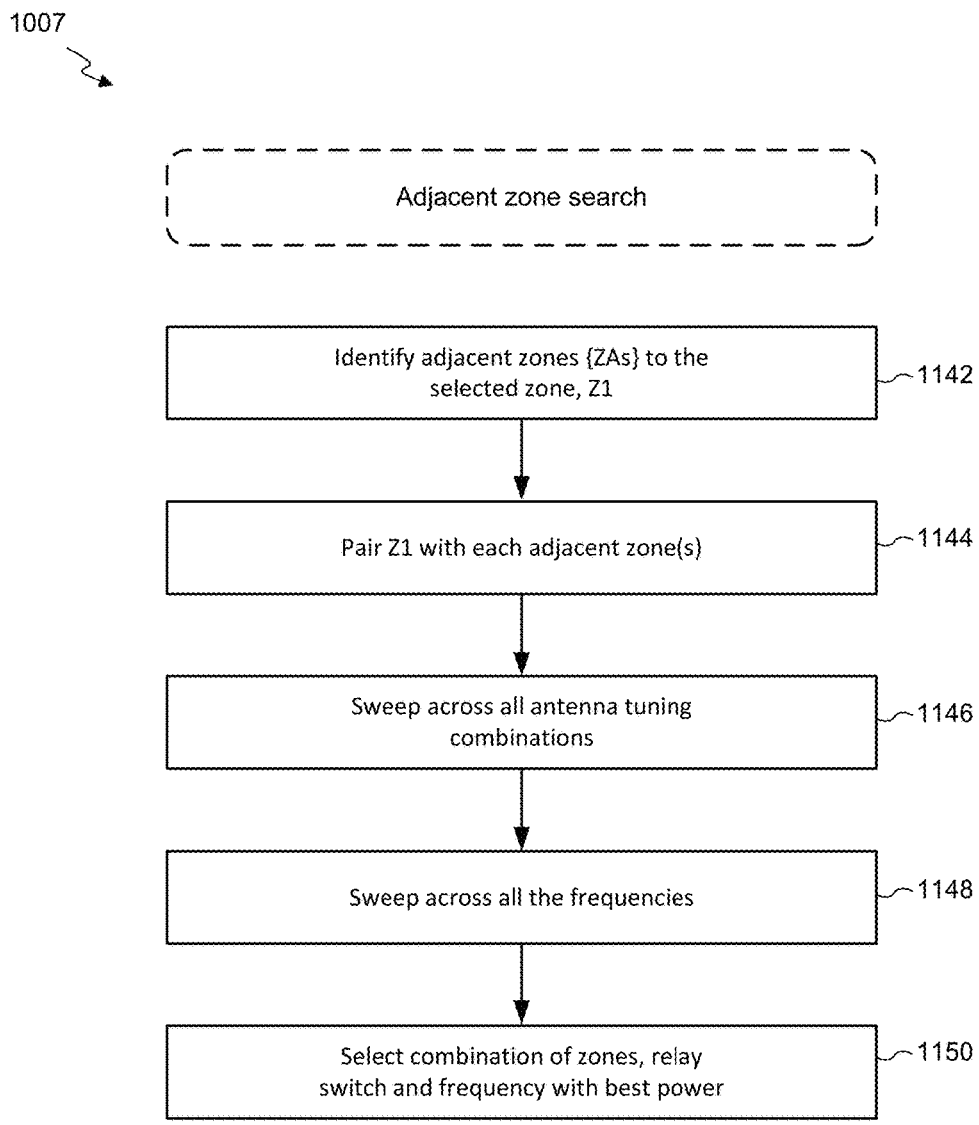

In some circumstances or situations, the amount of power delivered to the wireless power receiver by the antenna zone Z1 does not meet a threshold amount of power. In these circumstances or situations, the near-field charging pad performs an adjacent zone search (1007), which is illustrated in FIG. 11D. In some embodiments, the adjacent zone search 1007 is used to identify one or more adjacent zones to the selected antenna zone Z1 that may be activated (e.g., the RF power transmitter integrated circuit 160 provides one or more control signals to the switch 295) in order to increase an amount of power delivered to the wireless power receiver. For example, this may occur when the wireless power receiver is located at a border between adjacent antenna zones of the near-field charging pad (e.g., located at an intersection between two antenna zones, three antenna zones, or four antenna zones). In performing the adjacent zone search 1007, the near-field charging pad identifies (1142) adjacent antenna zones (ZAs) to the selected antenna zone Z1. In some embodiments, identifying adjacent zones (ZAs) includes identifying up to five adjacent zones.

Next, the near-field charging pad pairs (1144) the selected antenna zone Z1 with each identified adjacent zone and sweeps (1146) across all antenna tuning combinations and sweeps (1148) across all available frequencies (and perhaps other transmission characteristics). Thereafter, the near-field charging pad selects (1150) a combination of antenna zones from among the adjacent zones (ZAs). For example, the near-field charging pad may determine that the selected antenna zone Z1 deliver a higher amount of power to the wireless power receiver than either of these antenna zones is individually able to deliver to the wireless power receiver. In another example, the near-field charging pad may determine that the selected antenna zone Z1 and two (or three) other adjacent zones deliver a maximum amount of power to the wireless power receiver. When selecting the desired combination of antenna zones, the near-field charging pad records the transmission characteristics used to produce the maximum amount of power delivered to the wireless power receiver. Performing the fine search and the adjacent zone search are also discussed in more detail above with reference to steps 924-932 of the method 900.

After performing the fine search 1006 (and the adjacent zone search 1007 if needed), the near-field charging pad executes (1008) a power control routine, an example of which is illustrated in FIG. 11E. In some embodiments, the power control routine allows both the wireless power receiver and the near-field charging pad to continually monitor an amount of power being delivered to the wireless power receiver. In this way, adjustments to the wireless power transmission can be made based on feedback received from the wireless power receiver. For example, if the delivered power is below a configured threshold, then the wireless power receiver may request a power increase from the near-field charging pad. FIG. 11E illustrates various operations that may be used to allow the receiver to request an increase or a decrease in an amount of wireless power delivered to the receiver, and also illustrates a process executed by the near-field charging pad to determine when to increase or decrease the amount of wireless power delivered to the receiver in response to the receiver's requests for increases or decreases in the amount of wireless power delivered.

Figure 12:
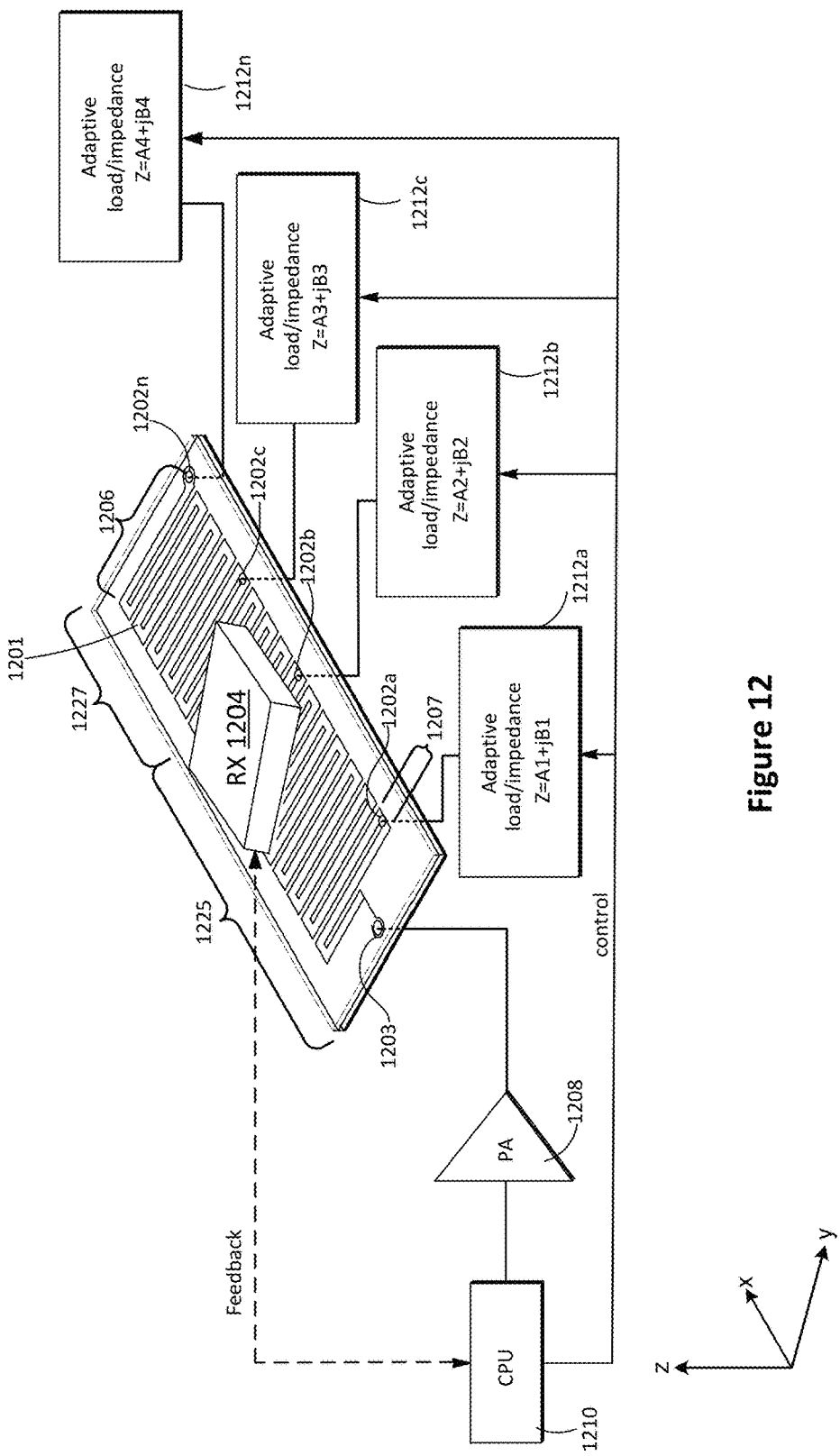
FIG. 12 is a schematic of a transmitting antenna element with a plurality of adaptive loads of an RF charging pad, in accordance with some embodiments.
Figure 14A:
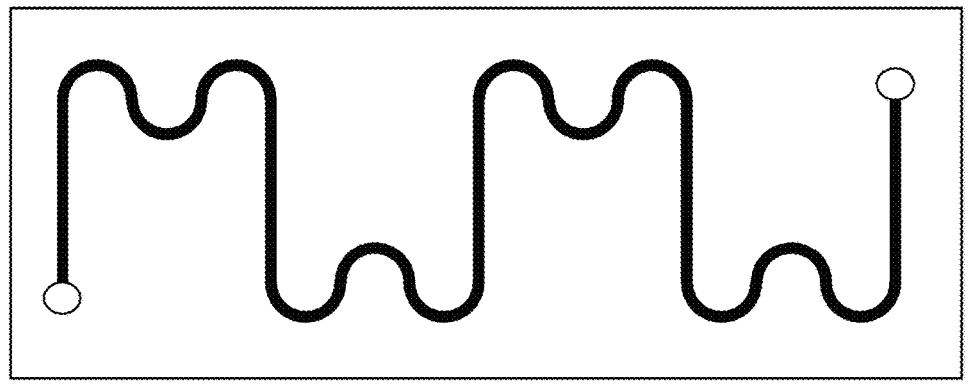
FIGS. 14A-14D are schematics showing various configurations for individual antenna elements that can operate at multiple frequencies or frequency bands within an RF charging pad, in accordance with some embodiments.
Figure 14B:
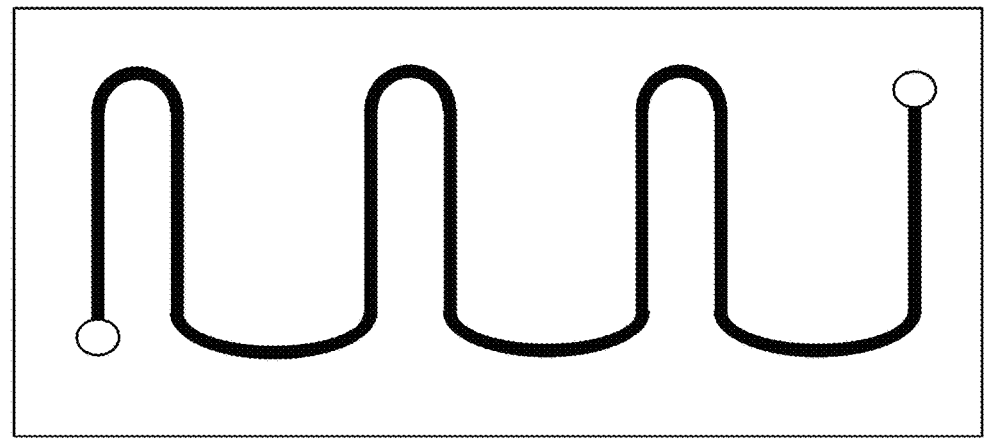
Figure 14C:
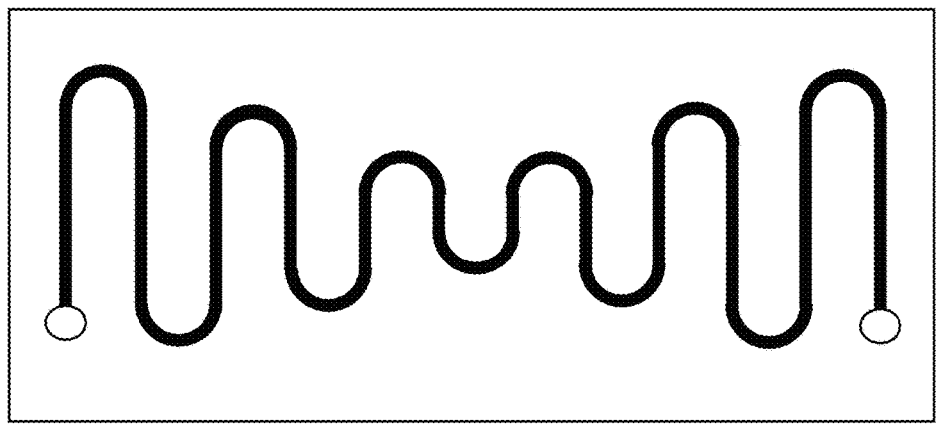
Figure 14D:
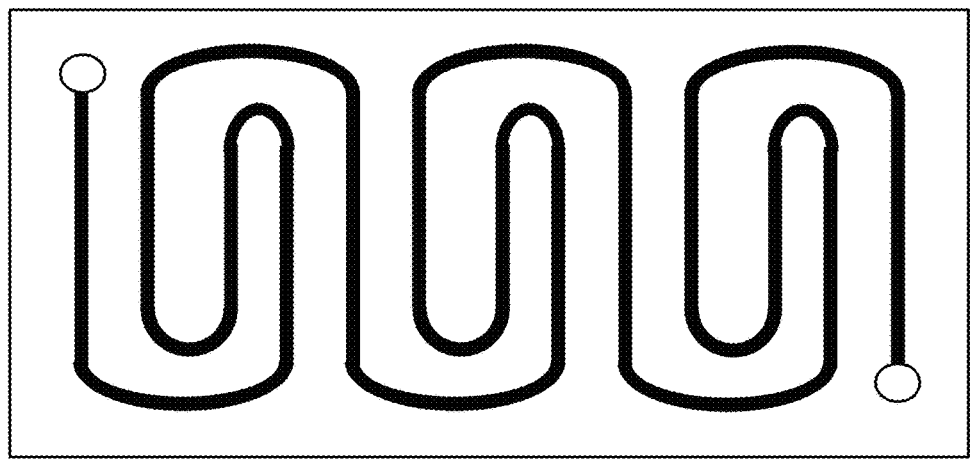

The antenna elements 120 described above (e.g., in reference to FIG. 1B) may also be configured to have multiple adaptive load terminals (e.g., multiple adaptive load terminals 121) that are coupled to at different positions along a respective antenna element 120. An example of an antenna element 120 with multiple adaptive load terminals is provided below in reference to FIG. 12. FIG. 12 is a schematic showing a transmitting antenna element (unit cell) with a plurality of adaptive loads (which may be a part of an array of such antennas, as described above in reference to FIGS. 3-8) of an RF charging pad, in accordance with some embodiments. In some embodiments, the RF charging pad 1200 includes one or more antenna elements 1201 (which may be any of the antenna elements as shown in FIGS. 3B, 4, 6A-6E, 7A-7D, and 8). Each antenna element 1201 is powered/fed by a respective power amplifier (PA) switch circuit 1208 (which may be a respective one of the PA switch circuits 103 of FIG. 3A) that may be connected to a respective power amplifier 1208 or a source of power at a first end of the antenna element 1201.

In some embodiments, the input circuit that includes the power amplifier 1208 may additionally include a device that can change frequencies of the input signal or a device that can operate at multiple frequencies at the same time, such as an oscillator or a frequency modulator.

In some embodiments, each antenna element 1201 of the RF charging pad 1200 includes a plurality of respective adaptive load terminals 1202, for example, 1202a, 1202b, 1202c, . . . 1202n, at a plurality of positions within a respective antenna element 1201. In some embodiments, the antenna element 1201 includes a conductive line forming a meandered line pattern (as discussed above in reference to FIGS. 3, 4, and 6-8). In some embodiments, each adaptive load terminals of the plurality of adaptive load terminals 1202 for the antenna element 1201 is located at different positions on the conductive meandered line of the antenna element 1201 as shown in FIG. 12.

In some embodiments, a meandered line antenna element 1201 includes a conductive line with multiple turns in one plane. In some embodiments, the multiple turns may be square turns as shown for the antenna element 1201 in FIG. 12. In some embodiments, the multiple turns may be round-edged turns. The conductive line may also have segments of varying widths, for example, a segment 1206 having a first width, and short-length segment 1207 that has a second width that is less than the first width. In some embodiments, at least one of the adaptive load terminals 1202a is positioned at one of the short-length segments (e.g., short-length segment 1207) and another adaptive load terminal is positioned anywhere at one of the segments 1206 having the first width. In some embodiments, at least one of the adaptive load terminals 1202 is positioned or connected anywhere on a width segment, for example, at the middle of a width segment of the meandered line antenna element 1201. In some embodiments, the last adaptive load terminal 1202n is positioned at a second end of the conductive line (opposite to a first end at the input terminal 1203 of the antenna element 1201 described above in reference to FIGS. 3, 4, and 6-8). In some embodiments, in certain design and optimization, an adaptive load terminal is not necessarily positioned at a second end of the meandered line antenna element 1201 but can be positioned at any location of the antenna element 1201.

In some embodiments, the RF charging pad 1200 also includes (or is in communication with) a central processing unit 1210 (also referred to here as processor 1210). In some embodiments, the processor 1210 is configured to control RF signal frequencies and to control impedance values at each of the adaptive load terminals 1202, e.g., by communicating with a plurality of the load picks or adaptive loads 1212, for example, 1212a, 1212b, 1212c, . . . 1212n, for each of the adaptive load terminals 1202 (as discussed above in reference to load pick or adaptive load 106 in FIGS. 3A and 3B).

In some embodiments, an electronic device (e.g., a device that includes a receiver 1204 as an internally or externally connected component, such as a remote that is placed on top of a charging pad 1200 that may be integrated within a housing of a streaming media device or a projector) and uses energy transferred from one or more RF antenna elements 1201 of the charging pad 1200 to the receiver 1204 to charge a battery and/or to directly power the electronic device.

In some embodiments, the adaptive load terminals 1202 at a particular zone or selected positions of the antenna element 1201 (e.g., a zone on the antenna element 1201 located underneath a position at which an electronic device (with an internally or externally connected RF receiver 1204) to be charged is placed on the charging pad) are optimized in order to maximize power received by the receiver 1204. For example, the CPU 1210 upon receiving an indication that an electronic device with an internally or externally connected RF receiver 1204 has been placed on the pad 1200 in a particular zone on the antenna element 1201 may adapt the plurality of adaptive loads 1212, for example, adaptive loads 1212a, 1212b, 1212c, . . . 1212n, that are respectively coupled to the adaptive terminals 1202, in order to maximize power transferred to the RF receiver 1204. Adapting the set of adaptive loads 1212 may include the CPU 1210 commanding one or more of the adaptive loads to try various impedance values for one or more of the adaptive load terminals 1202 that are coupled to different positions of the antenna element 1201. Additional details regarding adapting adaptive loads were provided above, and, for the sake of brevity, are not repeated here.

The effective impedance value ($Z_{effective}$) at a particular position/portion of the conductive line of the antenna element 1201 is affected by a number of variables and may be manipulated by adjusting configurations of the adaptive load terminals 1212 that are coupled to various positions on the antenna element 1201. In some embodiments, an effective impedance value ($Z_{effective}$), starting from a point that divides sections 1225 (which starts at the terminal 1203 of the antenna element 1201 and extends to an edge of the receiver 1204) and 1227 (which is formed by the rest of the transmitting antenna element 1201 and the terminal 1202n) and ending at the TX antenna 1201's connection to the adaptive load 1212n (e.g., terminal 1202n) will change based on location of the receiver 1204 on the TX antenna 1201 and based on a set of selected loads provided by adaptive loads 1212 at various positions within section 1227. In some embodiments, the selected loads are optimized by the adaptive loads 1212 (in conjunction with the processor 1210) to tune $Z_{effective}$ in such a way that the energy transferred between terminal 1203 and the receiver 1204 reaches a maximum (e.g., 75% or more of energy transmitted by antenna elements of the pad 1200 is received by the RF receiver 1204, such as 98%), while energy transfer may also stay at a minimum from terminal 1203 to terminal 1202n (e.g., less than 25% of energy transmitted by antenna elements of the pad 1200 is not received by the RF receiver 1204 and ends up reaching terminals positioned within section 1227 or ends up being reflected back, including as little as 2%).

In some embodiments, a selected several adaptive loads 1212 of the plurality of adaptive loads 1212 are used (by the processor 1210) on the antenna element 1201 to adjust the impedance and/or frequency of the antenna element 1201. In one example, with reference to FIG. 12, only adaptive load terminals 1202a and 1202c are connected at a particular point in time to adaptive loads 1212a and 1212c respectively, while adaptive load terminals 1202b and 1202n are disconnected at the particular point in time. In another example, with reference to FIG. 12, only adaptive load terminals 1202a and 1202n are connected at a particular point in time to adaptive loads 1212a and 1212n, respectively, while adaptive load terminals 1202b and 1202c are disconnected at the particular point in time. In some embodiments, all of the adaptive load terminals 1202 are connected at a particular point in time to their respective adaptive loads 1212. In some embodiments, none of the adaptive load terminals 1202 are connected at a particular point in time to their respective adaptive loads 1212. In some embodiments, the impedance value of each of the adaptive loads 1212 connected to a selected adaptive load terminal 1212 is adjusted individually to optimize the energy transfer.

In embodiments in which a meandered line antenna has been optimized for the multi-band operation, the multiple adaptive load configuration within a single antenna element also enables a broader frequency band adjustment compared with a single adaptive load configuration within a single antenna element as described in FIG. 3B above. The multiple adaptive load configuration within a single antenna element further enhances multiple frequency band operation on a single antenna element. For example, a single antenna element 1201 with multiple adaptive load terminals is capable of operating at a wider frequency band than a corresponding antenna element that is configured with one adaptive load terminal.

In some embodiments, adapting the set of adaptive loads 1212 also or alternatively includes the CPU 1210 causing the set of antenna elements to transmit RF signals at various frequencies until a frequency is found at which a maximum amount of energy is transferred to the RF receiver 1204. In some embodiments, for example, one of the antenna elements transmits RF signals at a first frequency, and another one of the antenna elements transmits RF signals at a second frequency that is different from the first frequency. In some embodiments, adjusting the impedance value and/or the frequencies at which the set of antenna elements transmits causes changes to the amount of energy transferred to the RF receiver 1204. In this way, the amount of energy transferred to the RF receiver 1204 that is maximized (e.g., to transfer at least 75% of the energy transmitted by antenna elements of the pad 1200 to the receiver 1204, and in some embodiments, adjusting the impedance value and/frequencies may allow up to 98% of the energy transmitted to be received by the receiver 1204) may be received at any particular point on the pad 1200 at which the RF receiver 1204 might be placed.

In some embodiments, the CPU 1210 determines that a maximum amount of energy is being transferred to the RF receiver 1204 when the amount of energy transferred to the RF receiver 1204 crosses a predetermined threshold (e.g., 75% or more of transmitted energy is received, such as up to 98%) or by testing transmissions with a number of impedance and/or frequency values and then selecting the combination of impedance and frequency that results in maximum energy being transferred to the RF receiver 1204 (also as described in reference to the adaptation scheme in FIGS. 3A-3D above). In some embodiments, processor 1210 is connected to the receiver 1204 through a feedback loop (e.g. by exchanging messages using a wireless communication protocol, such as BLUETOOTH low energy (BLE), WIFI, ZIGBEE, infrared beam, near-field transmission, etc, to exchange messages). In some embodiments, the adaptation scheme is employed to test various combinations of impedance values of the adaptive impedance loads 1212 and RF frequencies, in order to maximize energy transferred to an RF receiver 1204. In such embodiments, each of the adaptive load 1212 is configured to adjust the impedance value along a range of values, such as between 0 and infinity. In some embodiments, the adaptation scheme is employed when one or more RF receivers are placed on top of one of the antenna element 1201.

In some embodiments, an adaptation scheme is employed to adaptively adjust the impedance values and/or frequencies of the RF signal(s) emitted from the RF antenna(s) 1201 of the charging pad 1200, in order to determine which combinations of frequency and impedance result in maximum energy transfer to the RF receiver 1204. For example, the processor 1210 that is connected to the charging pad 1200 tries different frequencies (i.e., in the allowed operating frequency range or ranges) by using different selected sets of adaptive loads 1212 at different locations of the antenna element 1201, e.g. enabling or disabling certain adaptive loads 1212, to attempt to adaptively optimize for better performance. For example, a simple optimization either opens/disconnects or closes/shorts each load terminal to ground (in embodiments in which a relay is used to switch between these states), and may also cause RF antenna element 1201 to transmit at various frequencies. In some embodiments, for each combination of relay state (open or shorted) and frequency, the energy transferred to the receiver 1204 is monitored and compared to energy transferred when using other combinations. The combination that results in maximum energy transfer to the receiver 1204 is selected and used to continue to transmitting the one or more RF signals using one or more antenna elements 1201 to the receiver 1204.

In some embodiments, the single antenna element 1201 with multiple adaptive loads 1212 of the pad 1200 may be configured to operate in two or more distinct frequency bands (such as the ISM bands described above), e.g., a first frequency band with a center frequency of 915 MHz and a second frequency band with a center frequency of 5.8 GHz. In these embodiments, employing the adaptation scheme may include transmitting RF signals and then adjusting the frequency at first predetermined increments until a first threshold value is reached for the first frequency band and then adjusting the frequency at second predetermined increments (which may or may not be the same as the first predetermined increments) until a second threshold value is reached for the second frequency band. In some embodiments, a single antenna element can operate at multiple different frequencies within one or more frequency bands. For example, the single antenna element 1201 may be configured to transmit at 902 MHz, 915 MHz, 928 MHZ (in the first frequency band) and then at 5.795 GHz, 5.8 GHz, and 5.805 GHz (in the second frequency band). The single antenna element 1201 can operate at more than one frequency bands as a multi-band antenna. A transmitter with at least one antenna element 1201 can be used as a multi-band transmitter.

In some embodiments, multiple antenna elements 1201 each with multiple adaptive loads 1212 may be configured within a particular transmission pad to allow the particular transmission pad to operate in two or more distinct frequency bands respectively at the same time. For example, a first antenna element 1201 of the particular transmission pad operates at a first frequency or frequency band, a second antenna element 1201 of the particular transmission pad operates at a second frequency or frequency band, and a third antenna element 1201 of the particular transmission pad operates at a third frequency or frequency band, and a fourth antenna element 1201 of the particular transmission pad operates at a fourth frequency or frequency band, and the four frequency bands are distinct from each other. In this way, the particular transmission pad is configured to operate at multiple different frequency bands.

In some embodiments, the transmitter described herein can transmit wireless power in one frequency or frequency band, and transmit and exchange data with a receiver in another frequency or frequency band.

Different antenna elements operating at different frequencies can maximize energy transfer efficiency when a smaller device is charged with higher frequencies and a larger device is charged with lower frequencies on the same charging pad. For example, devices that require a higher amount of power, such as mobile phones, may also have more space to include larger antennas, thus making a lower frequency of 900 MHz a suitable frequency band. As a comparison, a smaller device, such as an earbud, may require a small amount of power and may also have less space available for longer antennas, thus making a higher frequency of 2.4 or 5.8 GHz a suitable frequency band. This configuration enables more flexibility in the types and sizes of antennas that are included in receiving devices.

Turning now to FIG. 13, in accordance with some embodiments, a flow chart of a method 1300 of charging an electronic device through radio frequency (RF) power transmission by using at least one RF antenna with a plurality of adaptive loads is provided. Initially, a charging pad including a transmitter is provided in step 1302 that includes at least one RF antenna (e.g., antenna element 1201, as described with respect to FIG. 12 above which further includes FIGS. 3-8) for transmitting one or more RF signals or waves, i.e., an antenna designed to and capable of transmitting RF electromagnetic waves. In some embodiments, an array of RF antenna elements 1201 are arranged adjacent to one another in a single plane, in a stack, or in a combination of thereof, thus forming an RF charging pad 1200 (as described in reference to FIGS. 6A-6E, 7A-7D and 8). In some embodiments, the RF antenna elements 1201 each include an antenna input terminal (e.g., the first terminal 1203 discussed above in reference to FIG. 12) and a plurality of antenna output terminals (e.g., the plurality of adaptive load terminals 1202 discussed above in reference to FIG. 12). In some embodiments, the antenna element 1201 includes a conductive line that forms a meandered line arrangement (as shown in FIGS. 3-4, and 6-12). The plurality of adaptive load terminals 1202 are positioned at different locations of the conductive line of the antenna element 1201.

In some embodiments, the transmitter further comprises a power amplifier electrically coupled between the power input and the antenna input terminal (e.g., PA 1208 in FIG. 12). Some embodiments also include respective adaptive loads 1212a, 1212b, 1212c, . . . 1212n electrically coupled to the plurality of antenna output terminals (e.g., adaptive load terminals 1202 in FIG. 12). In some embodiments, the transmitter includes a power input configured to be electrically coupled to a power source, and at least one processor (e.g., processor 1210 in FIG. 12, and processor 110 in FIGS. 3A-3B) configured to control at least one electrical signal sent to the antenna. In some embodiments, the at least one processor is also configured to control the frequency and/or amplitude of the at least one signal sent to the antenna.

In some embodiments, each RF antenna of the transmitter includes: a conductive line forming a meandered line pattern, a first terminal (e.g., terminal 1203) at a first end of the conductive line for receiving current that flows through the conductive line at a frequency controlled by one or more processors, and a plurality of adaptive load terminals (e.g., terminals 1202), distinct from the first terminal, at a plurality of positions of the conductive line, the plurality of adaptive load terminals coupled to a respective component (e.g., adaptive loads 1212 in FIG. 12) controlled by the one or more processors and that allows for modifying an impedance value of the conductive line. In some embodiments, the conductive line is disposed on or within a first antenna layer of a multi-layered substrate. Also in some embodiments, a second antenna is disposed on or within a second antenna layer of the multi-layered substrate. Finally, some embodiments also provide a ground plane disposed on or within a ground plane layer of the multi-layered substrate.

In some embodiments, a receiver (e.g., receiver 1204 in reference to FIG. 12) is also provided (also as described in reference to FIG. 3). The receiver also includes one or more RF antennas for receiving RF signals. In some embodiments, the receiver includes at least one rectenna that converts the one or more RF signals into usable power to charge a device that includes the receiver 1204 as an internally or externally connected component (see also steps 504, 506, 510, 514 and 518 in reference to FIG. 5). In use, the receiver 1204 is placed within a near-field radio frequency distance to the at least one antenna of the transmitter or the charging pad. For example, the receiver may be placed on top of the at least one RF antenna 1201 or on top of a surface that is adjacent to the at least one RF antenna 1201, such as a surface of a charging pad 1200.

In step 1304, one or more RF signals are then transmitted via at the least one RF antenna 1201.

The system is then monitored in step 1306 to determine the amount of energy that is transferred via the one or more RF signals from the at least one antenna 1201 to one or more RF receivers (as is also discussed above). In some embodiments, this monitoring 1306 occurs at the transmitter, while in other embodiments the monitoring 1306 occurs at the receiver which sends data back to the transmitter via a back channel (e.g., over a wireless data connection using WIFI or BLUETOOTH). In some embodiments, the transmitter and the receiver exchange messages via the back channel, and these messages may indicate energy transmitted and/or received, in order to inform the adjustments made at step 1308.

In some embodiments, in step 1308, a characteristic of the transmitter is adaptively adjusted to attempt to optimize the amount of energy that is transferred from the at least one RF antenna 1201 to the receiver. In some embodiments, this characteristic is a frequency of the one or more RF signals and/or an impedance of the transmitter. In some embodiments, the impedance of the transmitter is the impedance of the adjustable loads. Also in some embodiments, the at least one processor is also configured to control the impedance of the selected set of the plurality of adaptive loads 1212. Additional details and examples regarding impedance and frequency adjustments are provided above.

In some embodiments, the at least one processor (e.g. CPU 1210 in FIG. 12) dynamically adjusts the impedance of the adaptive load based on the monitored amount of energy that is transferred from the at least one antenna 1201 to the RF receiver. In some embodiments, the at least one processor simultaneously controls the frequency of the at least one signal sent to the antenna.

In some embodiments, the single antenna element 1201 with multiple adaptive loads 1212 of the pad 1200 may be dynamically adjusted by the one or more processors to operate in two or more distinct frequency bands (such as the ISM bands described above) at the same time or at different times, e.g., a first frequency band with a center frequency of 915 MHz and a second frequency band with a center frequency of 5.8 GHz. In these embodiments, employing the adaptation scheme may include transmitting RF signals and then adjusting the frequency at first predetermined increments until a first threshold value is reached for the first frequency band and then adjusting the frequency at second predetermined increments (which may or may not be the same as the first predetermined increments) until a second threshold value is reached for the second frequency band. For example, the single antenna element 1201 may be configured to transmit at 902 MHz, 915 MHz, 928 MHZ (in the first frequency band) and then at 5.795 GHz, 5.8 GHz, and 5.805 GHz (in the second frequency band). The single antenna element 1201 can operate at more than one frequency bands as a multi-band antenna. A transmitter with at least one antenna element 1201 can be used as a multi-band transmitter.

In some embodiments, a charging pad or transmitter may include one or more of the antenna element 1201 with a plurality of adaptive loads as described in FIG. 12 and one or more antenna element 120 with one adaptive load as described in FIG. 3A-3D.

FIGS. 14A-14D are schematics showing various configurations for individual antenna elements that can operate at multiple frequencies or frequency bands within an RF charging pad, in accordance with some embodiments. As shown in FIGS. 14A-14D, an RF charging pad 100 (FIGS. 3A-3B) or an RF charging pad 1200 (FIG. 12) may include antenna elements 120 (FIG. 3B) or 1201 (FIG. 12) that configured to have conductive line elements that have varying physical dimensions.

For example, FIGS. 14A-14D show examples of structures for an antenna element that each include a conductive line formed into different meandered line patterns at different portions of the element. The conductive lines at different portions or positions of the element may have different geometric dimensions (such as widths, or lengths, or trace gauges, or patterns, spaces between each trace, etc.) relative to other conductive lines within an antenna element. In some embodiments, the meandered line patterns may be designed with variable lengths and/or widths at different locations of the pad (or an individual antenna element). These configurations of meandered line patterns allow for more degrees of freedom and, therefore, more complex antenna structures may be built that allow for wider operating bandwidths and/or coupling ranges of individual antenna elements and the RF charging pad.

In some embodiments, the antennas elements 120 and 1201 described herein may have any of the shapes illustrated in FIGS. 14A-14D. In some embodiments, each of the antenna elements shown in FIGS. 14A-14D has an input terminal (123 in FIG. 1B or 1203 in FIG. 12) at one end of the conductive line and at least one adaptive load terminals (121 in FIG. 1B or 1202a-n in FIG. 12) with adaptive loads (106 in FIG. 1B or 1212a-n in FIG. 12) as described above at another end or a plurality of positions of the conductive line.

In some embodiments, each of the antenna elements shown in FIGS. 14A-14D can operate at two or more different frequencies or two or more different frequency bands. For example, a single antenna element can operate at a first frequency band with a center frequency of 915 MHz at a first point in time and a second frequency band with a center frequency of 5.8 GHz at a second point in time, depending on which frequency is provided at an input terminal of each of the antenna elements. Moreover, the shapes of the meandered line patterns shown in FIGS. 14A-14D are optimized to allow the antenna elements to operate efficiently at multiple different frequencies.

In some embodiments, each of the antenna elements shown in FIGS. 14A-14D can operate at two or more different frequencies or two or more different frequency bands at the same time when the input terminal is supplied with more than two distinct frequencies that can be superimposed. For example, a single antenna element can operate at a first frequency band with a center frequency of 915 MHz and a second frequency band with a center frequency of 5.8 GHz at the same time when both frequency bands with a first center frequency of 915 MHz and a second center frequency of 5.8 GHz are supplied at the input terminal of the conductive line. In yet another example, a single antenna element can operate at multiple different frequencies within one or more frequency bands.

In some embodiments, the operating frequencies of the antenna elements can be adaptively adjusted by one or more processors (110 in FIGS. 3A-3B or 1210 in FIG. 12) as described above according to the receiver antenna dimension, frequency, or the receiver loads and the adaptive loads on the charging pad.

In some embodiments, each of the antenna elements shown in FIGS. 14A-14D with different meandered patterns at different portions of the conductive line can operate more efficiently at multiple frequencies compared with the more symmetrical meandered line structures (For example, FIG. 3B, 4, 6A-6B, or 8). For example, energy transfer efficiency at different operating frequencies of the antenna elements shown in FIGS. 14A-14D with different meandered patterns at different portions of the conductive line can be improved by about at least 5%, and in some instance at least 60%, more than the more symmetrical meandered line structure elements. For example, the more symmetrical meandered line structure antenna element may be able to transfer no more than 60% of transmitted energy to a receiving device while operating at a new frequency other than a frequency for which the more symmetrical meandered line structure antenna element has been designed (e.g., if the more symmetrical meandered line structure antenna element is designed to operate at 900 MHz, if it then transmits a signal having a frequency of 5.8 GHz it may only be able to achieve an energy transfer efficiency of 60%). In contrast, the antenna element with different meandered patterns (e.g., those shown in FIGS. 14A-14D) may be able to achieve an energy transfer efficiency of 80% or more while operating at various frequencies. In this way, the designs for antenna elements shown in FIGS. 14A-14D ensure that a single antenna element is able to achieve a more efficient operation at various different frequencies.

Figure 15:
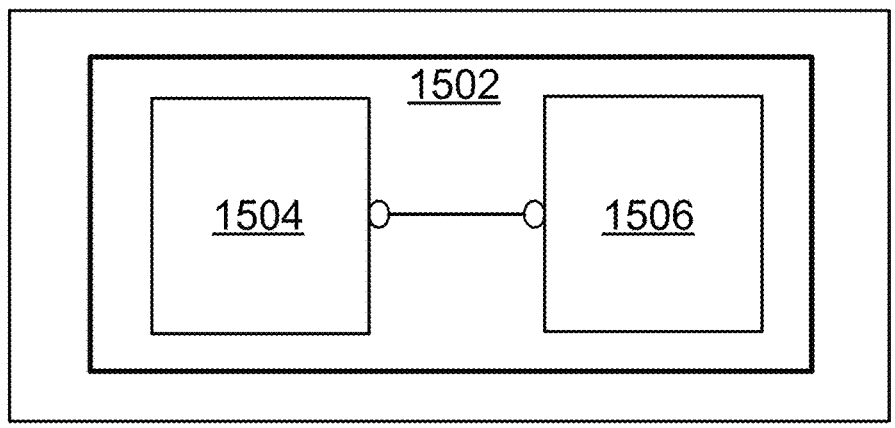
FIG. 15 is schematic showing an example configuration for an individual antenna element that can operate at multiple frequencies or frequency bands by adjusting the length of the antenna element, in accordance with some embodiments.

FIG. 15 is schematic showing an example configuration for an individual antenna element that can operate at multiple frequencies or frequency bands by adjusting the length of the antenna element, in accordance with some embodiments.

In some embodiments as shown in FIG. 15, at least one transmitting antenna element 1502 (as described in FIGS. 3-8 and 13-14) of the one or more transmitting antenna elements of an RF charging pad 1500 has a first conductive segment 1504 (a first portion of a meandered conductive line, such as any of those described above for antenna elements 120 and 1201) and a second conductive segment 1506 (a second portion of the meandered conductive line, such as any of those described above for antenna elements 120 and 1201). In some embodiments, the first conductive segment includes an input terminal (123 in FIG. 3B or 1203 in FIG. 12). In some embodiments, the at least one transmitting antenna element 1502 is configured to operate at a first frequency (e.g., 2.4 GHz) while the first conductive segment 1504 is not coupled with the second conductive segment 1506. In some embodiments, the at least one transmitting antenna element 1502 is configured to operate at a second frequency (e.g., 900 MHz) which is different from the first frequency while the first conductive segment is coupled with the second conductive segment.

In some embodiments, one or more processors (110 in FIGS. 3A-3B or 1210 in FIG. 12) are configured to cause coupling of the first segment with the second segment in conjunction with instructing a feeding element (as described as 108 in FIGS. 3A-3B and 1208 in FIG. 12) to generate current with a second frequency (e.g., 900 MHz) that is distinct from the first frequency (e.g., 2.4 GHz), thereby allowing the antenna element 1502 to more efficiently operate at the second frequency. The one or more processor may also be configured to cause de-coupling of the second conductive segment from the first conductive segment in conjunction with instructing the feeding element to generate current with the first frequency instead of the second frequency, thereby allowing the antenna element 1502 to more efficiently operate at the first frequency again. In some embodiments, the one or more processors are configured to determine whether to causing the coupling (or de-coupling) of these conductive segments based on information received from a receiver (e.g., RX 104 or 1204) that identifies a frequency at which the receiver is configured to operate (e.g., for larger devices with longer receiving antennas, this frequency may be 900 MHz, while for smaller devices with small receiving antennas, this frequency may be 2.4 GHz).

In some embodiments, the coupling described here in FIG. 15 can be implemented by directly connecting two different segments of a single antenna element 1502 while bypassing the conductive line located in-between the two connection points or the two different segments. In some embodiments, coupling can be implemented between more than two different segments of the antenna element 1502. The coupling of the different portions or segments of a single meandered line antenna element 1502 can effectively change the size or length of the conductive line of the antenna element 1502, and therefore enable the single antenna element 1502 to operate at different frequencies. The single antenna element 1502 may also operate at more than one frequency bands as a multi-band antenna.

Figure 16B:
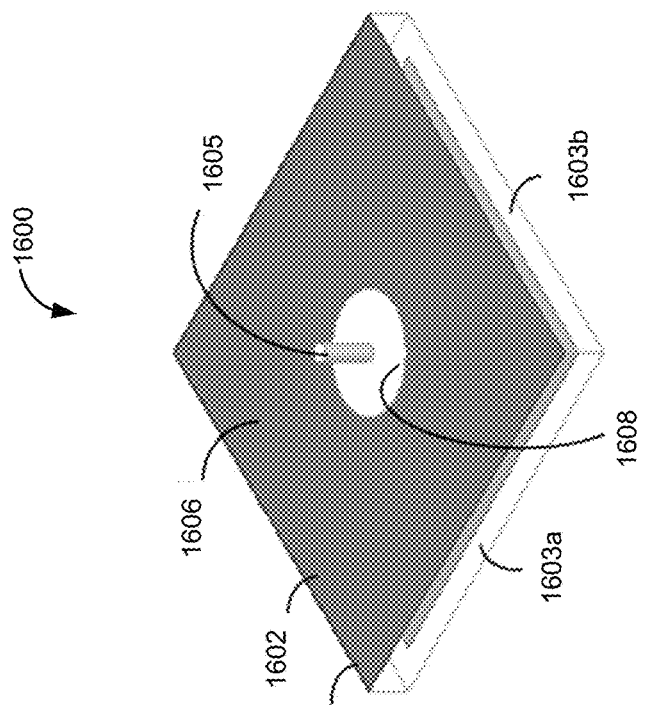
FIGS. 16A and 16B are schematic illustrations of an exemplary system, according to an embodiment.
Figure 16A:
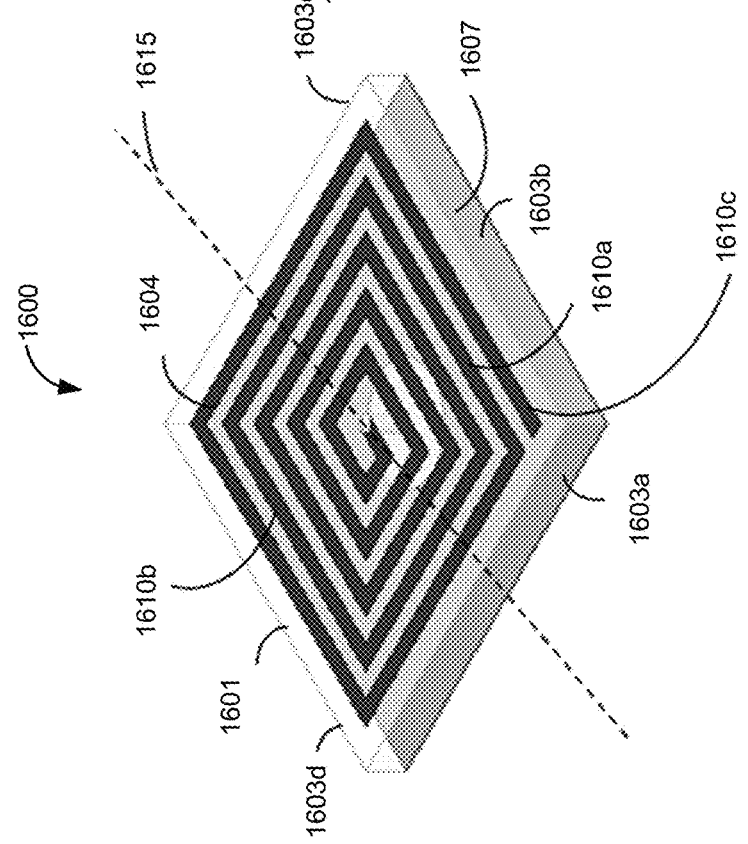

FIG. 16A shows a top perspective view of a schematic drawing of an exemplary near-field power transfer system 1600. FIG. 16B shows a bottom perspective view of a schematic drawing of an exemplary near-field power transfer system 1600. The power transfer system 1600 may comprise a top surface 1601, a bottom surface 1602, and sidewalls 1603. In some embodiments, a housing containing components of the power transfer system 1600 may be constructed of a material creating minimal obstructions for electromagnetic waves to pass through. In other embodiments, different portions of the housing may be constructed with materials having different electromagnetic properties such as permeability and permittivity. For example, the top surface 1601 may allow electromagnetic waves to pass through with minimal obstruction while the sidewalls 1603 may obstruct electromagnetic waves by attenuation, absorption, reflection, or other techniques known in the art.

The power transfer system 1600 may radiate RF energy and thus transfer power when the power transfer system 1600 is adjacent to a second power transfer system (not shown). As such, a power transfer system 1600 may be on a "transmit side," so as to function as a power transmitter, or the power transfer system 1600 may be on a "receive side," so as to function as a power receiver. In some embodiments, where the power transfer system 1600 is associated with a transmitter, the power transfer system 1600 (or subcomponents of the power transfer system 1600) may be integrated into the transmitter device, or may be externally wired to the transmitter. Likewise, in some embodiments, where the power transfer system 1600 is associated with a receiver, the power transfer system 1600 (or subcomponents of the power transfer system 1600) may be integrated into the receiver device, or may be externally wired to the receiver.

A substrate 1607 may be disposed within a space defined between the top surface 1601, sidewalls 1603, and the bottom surface 1602. In some embodiments, the power transfer system 1600 may not include a housing and the substrate 1607 may include the top surface 1601, sidewalls 1603, and the bottom surface 1602. The substrate 1607 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may generate radiation, and may act as thin reflectors.

An antenna 1604 may be constructed on or below the top surface 1601. When the power transfer system 1600 is associated with a power transmitter, the antenna 1604 may be used for transmitting electromagnetic waves. Alternatively, when the power transfer system 1600 is associated with a power receiver, the antenna 1604 may be used for receiving electromagnetic waves. In some embodiments, the power transfer system 1600 may operate as a transceiver and the antenna 1604 may both transmit and receive electromagnetic waves. The antenna 1604 may be constructed from materials such as metals, alloys, metamaterials and composites. For example, the antenna 1604 may be made of copper or copper alloys. The antenna 1604 may be constructed to have different shapes based on the power transfer requirements. In the exemplary system 1600 shown in FIG. 16A and FIG. 16B, the antenna 1604 is constructed in a shape of a spiral including antenna segments 1610 that are disposed close to each other. The currents flowing through the antenna segments 1610 may be in opposite directions. For example, if the current in the antenna segment 1610b is flowing from left to right of FIG. 16A, the current each of the antenna segments 1610a, 1610c may be flowing from right to left. The opposite flow of the current results in mutual cancellation of the electromagnetic radiation the far field of the power transfer system 1600. In other words, the far field electromagnetic radiation generated by one or more antenna segments 1610 left of an imaginary line 1615 is cancelled out by the far field electromagnetic radiation generated by one or more antenna segments 1610 right of the line 1615. Therefore, there may be no leakage of power in the far field of the power transfer system 1600. Such cancellation, however, may not occur in a near-field active zone of the power transfer system 1600, where the transfer of power may occur.

The power transfer system 1600 may include a ground plane 1606 at or above the bottom surface 1602. The ground plane 1606 may be formed by materials such as metal, alloys, and composites. In an embodiment, the ground plane 1606 may be formed by copper or a copper alloy. In some embodiments, the ground plane 1606 may be constructed of a solid sheet of material. In other embodiments, the ground plane 1606 may be constructed using material strips arranged in shapes such as loops, spirals, and meshes. A via 1605 carrying a power feed line (not shown) to the antenna may pass through the ground plane 1606. The power feed line may supply current to the antenna 1604. In some embodiments, the ground plane 1606 may be electrically connected to the antenna 1604. In some embodiments, the ground plane 1606 may not be electrically connected to the antenna 1604. For such implementations, an insulation area 1608 to insulate the via 1605 from the ground plane 1606 may be constructed between the via 1605 and the ground plane 1606. In some embodiments, the ground plane 1606 may act as a reflector of the electromagnetic waves generated by the antenna 1604. In other words, the ground plane may not allow electromagnetic transmission beyond the bottom surface of the power transfer system 1600 by cancelling and/or reflecting the transmission image formed beyond the bottom surface. Reflecting the electromagnetic waves by the ground plane may reinforce the electromagnetic waves transmitted by the antenna 1604 from or towards the top surface 1601. Therefore, there may be no leakage of electromagnetic power from the bottom surface 1602.

Therefore, as a result of the antenna 1604 and the ground plane 1606, the electromagnetic waves transmitted or received by the power transfer system 1600 accumulate in the near field of the system 1600. The leakage to the far field of the system 1600 is minimized.

Figure 17A:
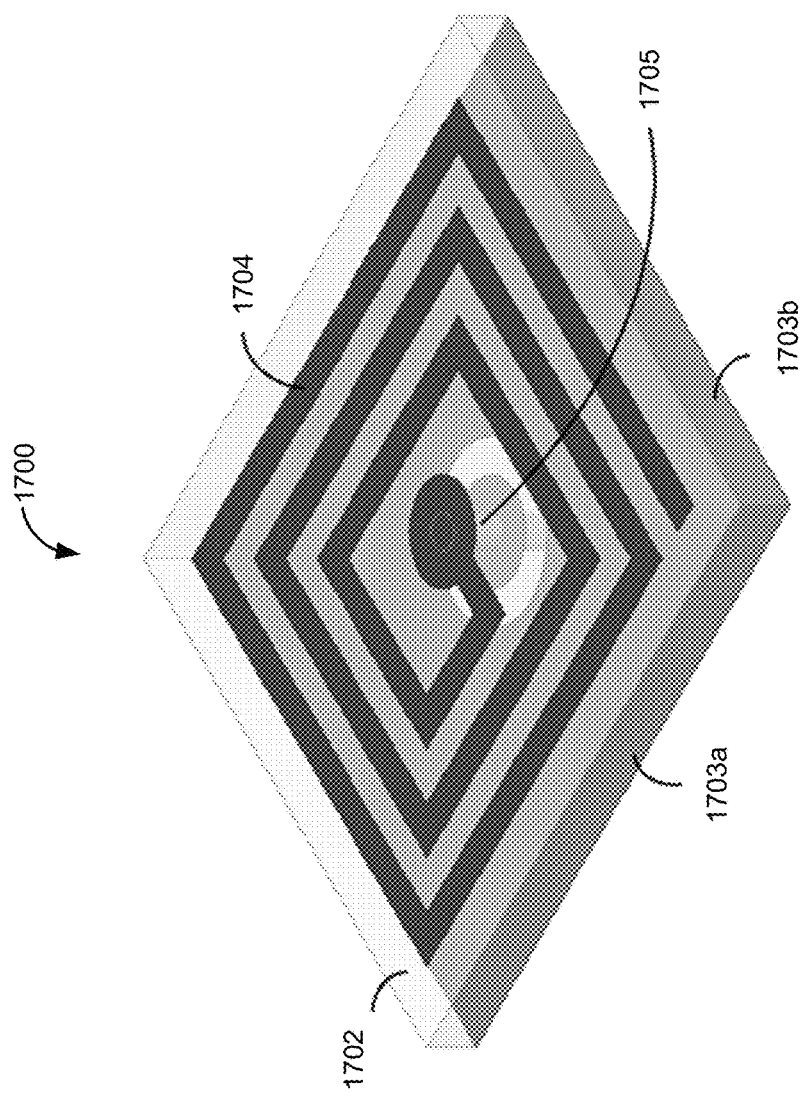
FIGS. 17A-17D are schematic illustrations of an exemplary system, according to an embodiment.

FIG. 17A schematically illustrates a top perspective view of an exemplary near-field power transfer system 1700, according to an embodiment of the disclosure. In some embodiments, the power transfer system 1700 may be a part of or associated with a power transmitter. In other embodiments, the power transfer system 1700 may be a part of or associated with a power receiver. The power transfer system 1700 may comprise a housing defined by a top surface 1701, a bottom surface (not shown), and sidewalls 1703. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 1701 may allow electromagnetic waves to pass through with minimal obstruction while the sidewalls 1703 may obstruct electromagnetic waves by attenuation, absorption, reflection, or other techniques known in the art.

A substrate 1707 may be disposed within a space defined between the top surface 1701, sidewalls 1703, and the bottom surface 1702. In some embodiments, the power transfer system 1700 may not include a housing and the substrate 1707 may include the top surface 1701, sidewalls 1703, and the bottom surface 1702. The substrate 1707 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may generate radiation, and may act as thin reflectors.

An antenna 1704 may be constructed on or below the top surface 1701. When the power transfer system 1700 is a part of or associated with a power transmitter, the antenna 1704 may be used for transmitting electromagnetic waves. Alternatively, when the power transfer system 1700 is a part of or associated with a power receiver, the antenna 1704 may be used for receiving electromagnetic waves. In some embodiments, the power transfer system 1700 may operate as a transceiver and the antenna 1704 may both transmit and receive electromagnetic waves. The antenna 1704 may be constructed from materials such as metals, alloys, metamaterials, and composites. For example, the antenna 1704 may be made of copper or copper alloys. The antenna 1704 may be constructed to have different shapes based on the power transfer requirements. In the exemplary system 1700 shown in FIG. 17A the antenna 1704 is constructed in a shape of a spiral including antenna segments which are disposed close to each other. A signal feed line (not shown) may be connected to the antenna 1704 through a via 1705.

Figure 17C:
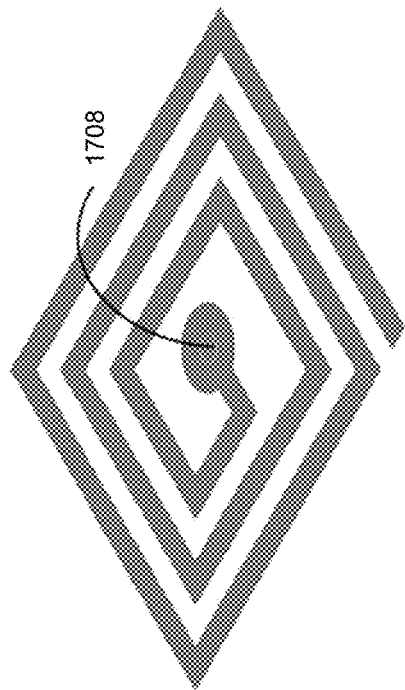
Figure 17D:
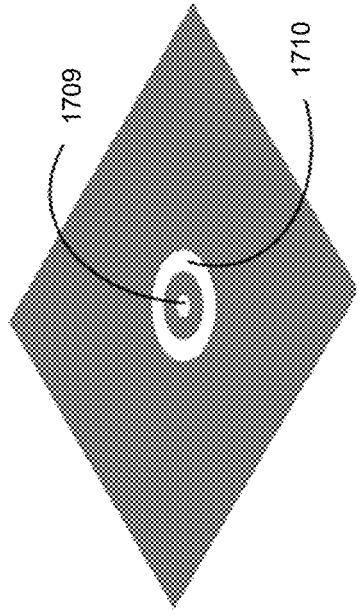
Figure 17B:
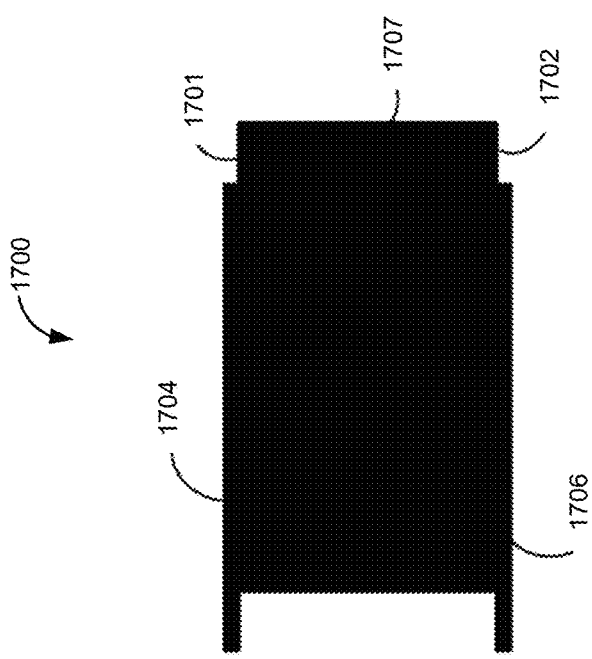

FIG. 17B schematically illustrates a side view of the exemplary power transmission system 1700. As shown, an upper metal layer may form the antenna 1704, and a lower metal layer may form the ground plane 1706. The substrate 1707 may be disposed in between the upper and lower metal layer. The substrate 1707 may include materials such as FR4, metamaterials, or any other materials known in the art. The metamaterials may be a broad class of synthetic materials that are engineered to yield desirable magnetic permeability and electrical permittivity. At least one of the magnetic permeability and electrical permittivity may have to be based upon power-transfer requirements, and/or compliance constraints for government regulations. The metamaterials disclosed herein may receive radiation or generate radiation, and may act as thin reflectors.

FIG. 17C schematically illustrates a top perspective view of antenna 1704. The antenna 1704 comprises a connection point 1709 for a feed line (not shown) coming through the via 1705. FIG. 17D schematically illustrates a side perspective view of the ground plane 1706. In an embodiment, the ground plane 1706 comprises a solid metal layer. In other embodiments, the ground plane 1706 may include structures such as stripes, meshes, and lattices and may not be completely solid. The ground plane 1706 may also comprise a socket 1709 for the via 1705 to pass through. Around the socket 1709, the ground plane 1706 may also include an insulating region 1710 to insulate the socket 1709 from the rest of the ground plane 1706. In some embodiments, the ground plane may have an electrical connection to a line coming through the via, and the insulating region 1710 may not be required.

Figure 18:
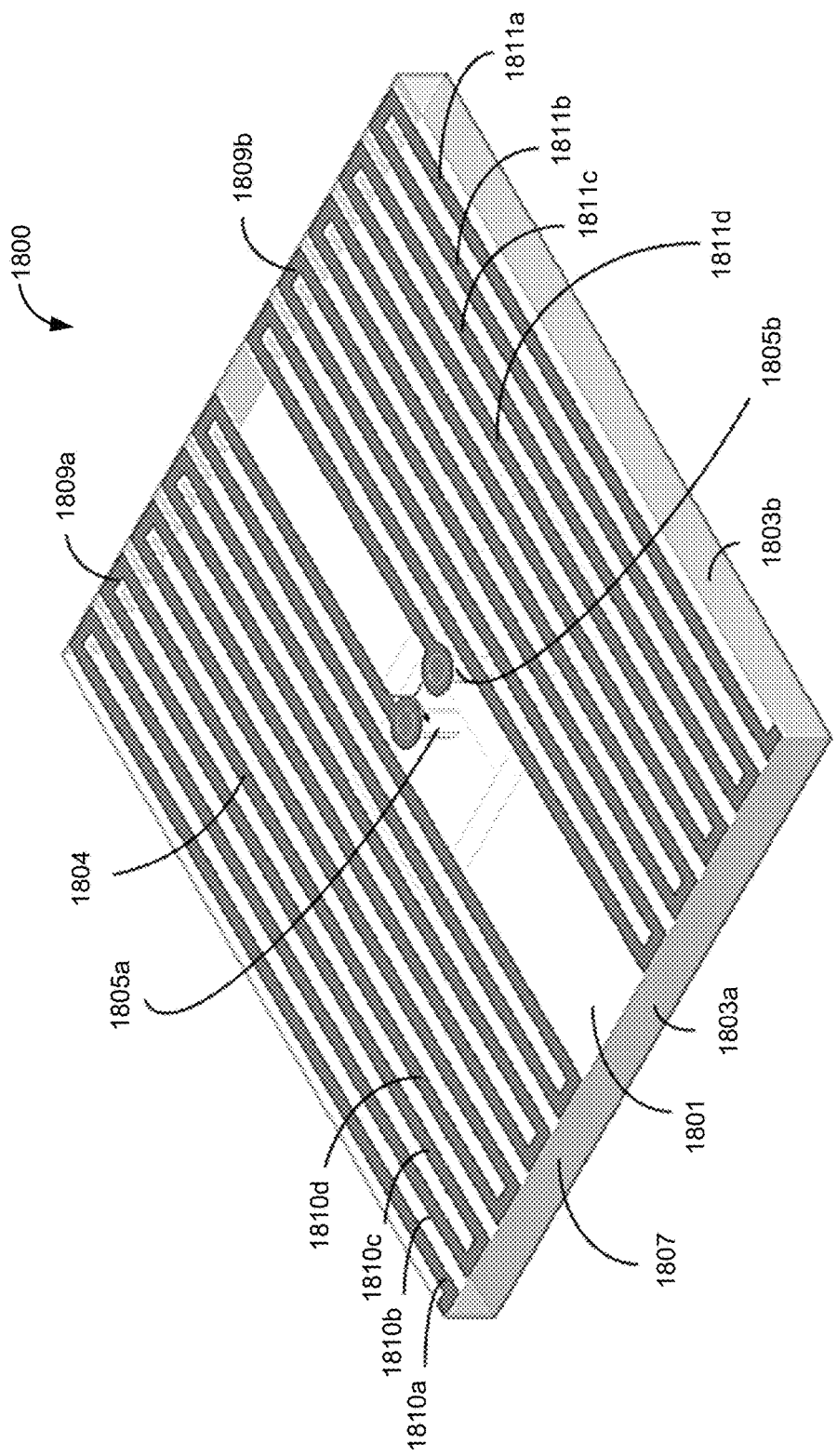
FIG. 18 is a schematic illustration of an exemplary system, according to an embodiment.

FIG. 18 schematically illustrates a top perspective view of an exemplary near-field power transfer system 1800, according to an embodiment of the disclosure. In some embodiments, the power transfer system 1800 may be a part of or associated with a power transmitter. In other embodiments, the power transfer system 1800 may be a part of or associated with a power receiver. The power transfer system 1800 may comprise a housing defined by a top surface 1801, a bottom surface (not shown), and sidewalls 1803. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 1801 may allow electromagnetic waves to pass through with minimal obstruction while the sidewalls 1803 may obstruct electromagnetic waves by attenuation, absorption, reflection, or other techniques known in the art.

A substrate 1807 may be disposed within a space defined between the top surface 1801, sidewalls 1803, and the bottom surface 1802. In some embodiments, the power transfer system 1800 may not include a housing and the substrate 1807 may include the top surface 1801, sidewalls 1803, and the bottom surface 1802. The substrate 1807 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may transmit radiation, and may act as thinreflectors.

An antenna 1804 may be constructed on or below the top surface. When the power transfer system 1800 is a part of or associated with a power transmitter, the antenna 1804 may be used for transmitting electromagnetic waves. Alternatively, when the power transfer system 1800 is a part of or associated with a power receiver, the antenna 1804 may be used for receiving electromagnetic waves. In some embodiments, the power transfer system 1800 may operate as a transceiver and the antenna 1804 may both transmit and receive electromagnetic waves. The antenna 1804 may be constructed from materials such as metals, alloys, metamaterials and composites. For example, the antenna 1804 may be made of copper or copper alloys. The antenna 1804 may be constructed to have different shapes based on the power transfer requirements. In the exemplary system 1800 shown in FIG. 18, the antenna 1804 is constructed in a shape of a dipole including a first meandered pole 1809a and a second meandered pole 1809b. A first power feed line (not shown) to the first meandered pole 1809a may be carried by a first via 1805a and a second power feed line (not shown) to the second meandered pole 1809b may be carried by a second via 1805b. The first power feed line may supply current to the first meandered pole 1809a and the second power feed line may supply current to the second meandered pole 1809b. The first meandered pole 1809a includes antenna segments 1810 which are disposed close to each other and the second meandered pole 1809b includes antenna segments 1811 also disposed close to each other. The currents flowing through the neighboring antenna segments 1810, 1811 may be in opposite directions. For example, if the current in an antenna segment 1810b is flowing from left to right of FIG. 18, the current in each of the antenna segments 1810a, 1810c may be flowing from right to left. The opposite flow of the current across any number of antenna segments 1810 of the power transfer system 1800 results in mutual cancellation of the far field electromagnetic radiation generated by the power transfer system 1800. Additionally or alternatively, the far field electromagnetic radiation generated by the antenna segments 1810 of the first pole 1809a may be cancelled by the electromagnetic radiation generated by antenna segments 1811 of the second pole 1809b. It should be appreciated that the far field cancellation may occur across any number of segments 1810, 1811 and/or across any number of poles 1809. Therefore, there may be no leakage of power in the far field of the power transfer system 1800. Such cancellation, however, may not occur in a near-field active zone of the power transfer system 1800, where the transfer of power may occur.

The power transfer system 1800 may include a ground plane (not shown) at or above the bottom surface. The ground plane may be formed by materials such as metal, alloys, and composites. In an embodiment, the ground plane may be formed by copper or a copper alloy. In some embodiments, the ground plane may be constructed of a solid sheet of material. In other embodiments, the ground plane may be constructed using material strips arranged in shapes such as loops, spirals, and meshes. The vias 1805 carrying the power feed lines to the antenna may pass through the ground plane. In some embodiments, the ground plane may be electrically connected to the antenna. In some embodiments, the ground plane may not be electrically connected to the antenna 1804. For such implementations, an insulation area to insulate the vias 1805 from the ground plane may be constructed between the vias 1805 and the ground plane. In some embodiments, the ground plane may act as a reflector of the electromagnetic waves generated by the antenna 1804. In other words, the ground plane may not allow electromagnetic transmission beyond the bottom surface of the power transfer system 1800 by cancelling and/or reflecting the transmission image formed beyond the bottom surface. Reflecting the electromagnetic waves by the ground plane may reinforce the electromagnetic waves transmitted by the antenna 1804 from or towards the top surface 1801. Therefore, there may be no leakage of electromagnetic power from the bottom surface.

Figure 19:
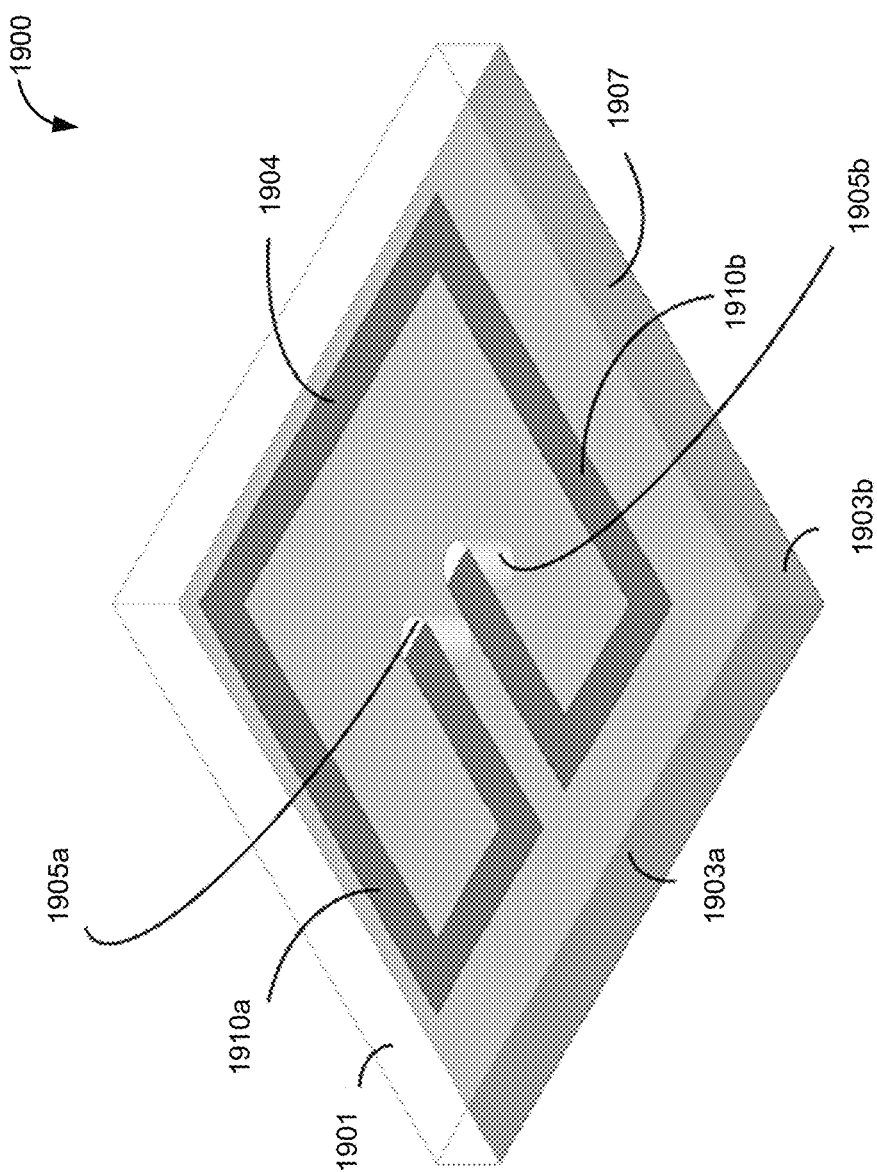
FIG. 19 is a schematic illustration of an exemplary system, according to an embodiment.

FIG. 19 schematically illustrates a top perspective view of an exemplary near-field power transfer system 1900, according to an embodiment of the disclosure. In some embodiments, the power transfer system 1900 may be a part of or associated with a power transmitter. In other embodiments, the power transfer system 1900 may be a part of or associated with a power receiver. The power transfer system 1900 may comprise a housing defined by a top surface 1901, a bottom surface (not shown), and sidewalls 1903. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 1901 may allow electromagnetic waves to pass through with minimal obstruction while the sidewalls 1903 may obstruct electromagnetic waves by attenuation, absorption, reflection, or other techniques known in the art.

A substrate 1907 may be disposed within a space defined between the top surface 1901, sidewalls 1903, and the bottom surface 1902. In some embodiments, the power transfer system 1900 may not include a housing and the substrate 1907 may include the top surface 1901, sidewalls 1903, and the bottom surface 1902. The substrate 1907 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may generate radiation, and may act as thin reflectors.

An antenna 1904 may be constructed on or below the top surface 1901. When the power transfer system 1900 is a part of or associated with a power transmitter, the antenna 1904 may be used for transmitting electromagnetic waves. Alternatively, when the power transfer system 1900 is a part of or associated with a power receiver, the antenna 1904 may be used for receiving electromagnetic waves. In some embodiments, the power transfer system 1900 may operate as a transceiver and the antenna 1904 may both transmit and receive electromagnetic waves. The antenna 1904 may be constructed from materials such as metals, alloys, and composites. For example, the antenna 1904 may be made of copper or copper alloys. The antenna 1904 may be constructed to have different shapes based on the power transfer requirements. In the exemplary system 1900 shown in FIG. 19, the antenna 1904 is constructed in a shape of a loop including loop segments 1910 which are disposed close to each other. The currents flowing through the neighboring loop segments 1910 may be in opposite directions. For example, if the current in a first loop segment 1910a is flowing from left to right of FIG. 19, the current in a second loop segment 1910b may be flowing from right to left. The opposite flow of the current results in mutual cancellation of the electromagnetic radiation the far field of the power transfer system 1900. Therefore, there may be no leakage of power in the far field of the power transfer system 1900. Such cancellation, however, may not occur in a near-field active zone of the power transfer system 1900, where the transfer of power may occur.

The power transfer system 1900 may include a ground plane (not shown) at or above the bottom surface. The ground plane may be formed by materials such as metal, alloys, metamaterials, and composites. In an embodiment, the ground plane may be formed by copper or a copper alloy. In some embodiments, the ground plane may be constructed of a solid sheet of material. In other embodiments, the ground plane may be constructed using material strips arranged in shapes such as loops, spirals, and meshes. The vias 1905 carrying the power feed lines (not shown) to the antenna may pass through the ground plane. The power feed lines may provide current to the antenna 1904. In some embodiments, the ground plane 106 may be electrically connected to the antenna. In some embodiments, the ground plane may not be electrically connected to the antenna 1904. For such implementations, an insulation area to insulate the vias 1905 from the ground plane may be constructed between the vias 305 and the ground plane. In some embodiments, the ground plane may act as a reflector of the electromagnetic waves generated by the antenna 1904. In other words, the ground plane may not allow electromagnetic transmission beyond the bottom surface of the power transfer system 300 by cancelling and/or reflecting the transmission image formed beyond the bottom surface. Reflecting the electromagnetic waves by the ground plane may reinforce the electromagnetic waves transmitted by the antenna 1904 from or towards the top surface 1901. Therefore, there may be no leakage of electromagnetic power from the bottom surface.

Figure 20:
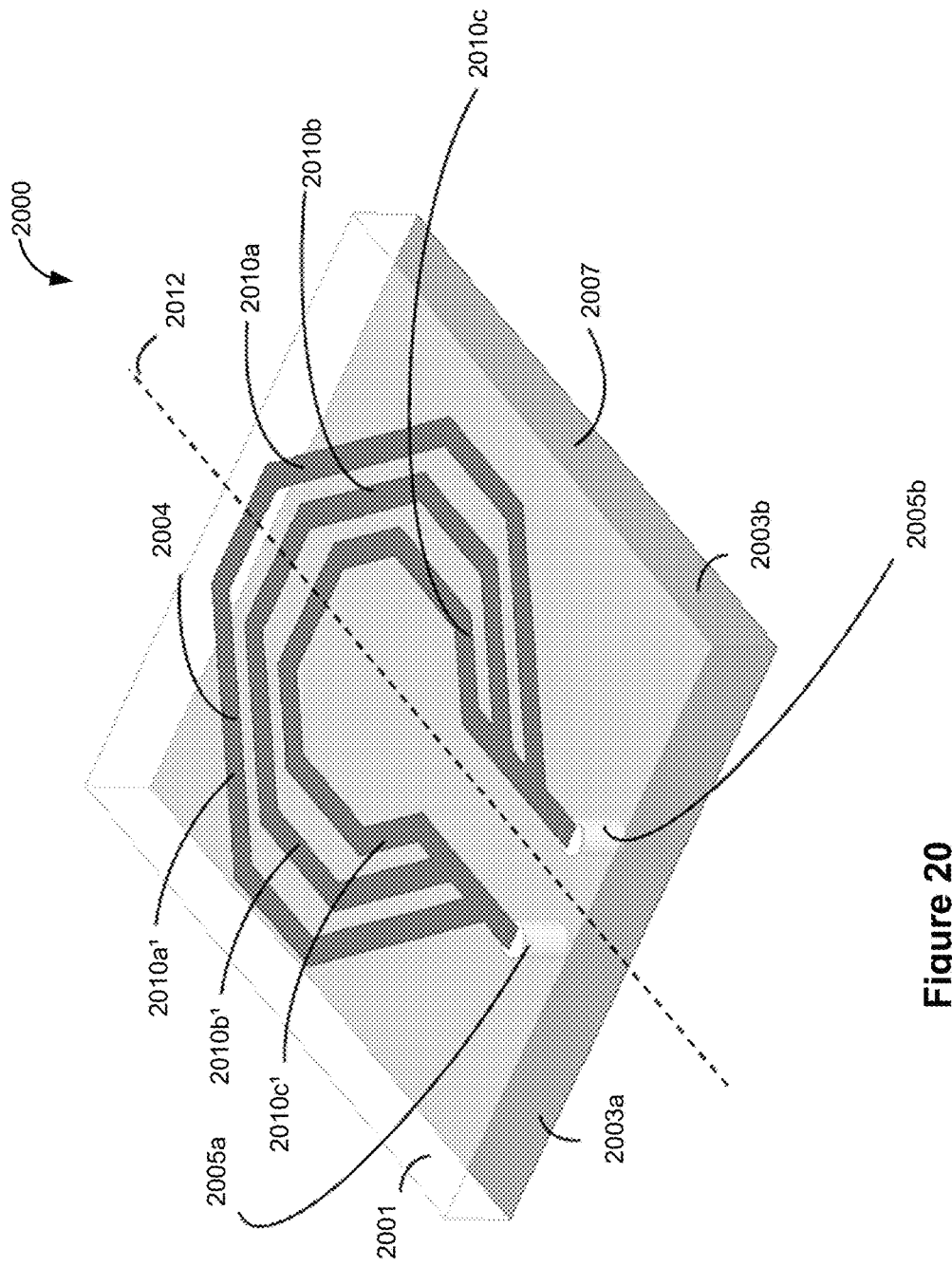
FIG. 20 is a schematic illustration of an exemplary system, according to an embodiment.

FIG. 20 schematically illustrates a top perspective view of an exemplary near-field power transfer system 2000, according to an embodiment of the disclosure. In some embodiments, the power transfer system 2000 may be a part of or associated with a power transmitter. In other embodiments, the power transfer system 2000 may be a part of or associated with a power receiver. In other embodiments, the power transfer system 2000 may be a part of or associated with a transceiver. The power transfer system 2000 may comprise a housing defined by a top surface 2001, a bottom surface (not shown), and sidewalls 2003. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 2001 may allow electromagnetic waves to pass through with minimal obstruction while the sidewalls 2003 may obstruct electromagnetic waves by attenuation, absorption, reflection, or other techniques known in the art.

A substrate 2007 may be disposed within a space defined between the top surface 2001, sidewalls 2003, and the bottom surface 2002. In some embodiments, the power transfer system 2000 may not include a housing and the substrate 2007 may include the top surface 2001, sidewalls 2003, and the bottom surface 2002. The substrate 2007 may comprise any material capable of insulating, reflecting, absorbing, or otherwise housing electrical lines conducting cmTent, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may transmit radiation, and may act as thin reflectors.

An antenna 2004 may be constructed on or below the top surface 2001. When the power transfer system 2000 is a part of or associated with a power transmitter, the antenna 2004 may be used for transmitting electromagnetic waves. Alternatively, when the power transfer system 2000 is a part of or associated with a power receiver, the antenna 2004 may be used for receiving electromagnetic waves. In some embodiments, the power transfer system 2000 may operate as a transceiver and the antenna 2004 may both transmit and receive electromagnetic waves. The power feed lines (not shown) to the antenna 2004 may be carried by the vias 2005. The power feed lines may provide current to the antenna 2004. The antenna 2004 may be constructed from materials such as metals, alloys, metamaterials, and composites. For example, the antenna 2004 may be made of copper or copper alloys. The antenna 2004 may be constructed to have different shapes based on the power transfer requirements. In the exemplary system 2000 shown in FIG. 20, the antenna 2004 is constructed in a shape of concentric loops including antenna segments 2010 which are disposed close to each other. As shown in FIG. 20, a single concentric loop may include two of the antenna segments 2010. For example, the innermost loop may include a first antenna segment 2010c to the right of an imaginary line 2012 roughly dividing the loops into two halves, and a corresponding second antenna segment 2010c' to the left of the imaginary line 2012. The currents flowing through the neighboring antenna segments 2010 may be in opposite directions. For example, if the current in the antenna segments 2010a', 2010b', 2010c' is flowing from left to right of FIG. 20, the current in each of the antenna segments 2010a, 2010b, 2010c may be flowing from right to left. The opposite flow of the current results in mutual cancellation of the electromagnetic radiation at the far field of the power transfer system 2000. Therefore, there may be no transfer of power to the far field of the power transfer system 2000. Such cancellation, however, may not occur in a near-field active zone of the power transfer system 2000, where the transfer of power may occur. One ordinarily skilled in the art will appreciate the cancellation of electromagnetic radiation in the far field and absence of such cancellation in the near-field is dictated by one or more solutions of Maxwell's equations for time-varying electric and magnetic fields generated by the currents flowing in opposite directions. One ordinarily skilled in the art should further appreciate the near field active zone is defined by the presence of electromagnetic power in the immediate vicinity of the power transfer system 2000.

The power transfer system 2000 may include a ground plane (not shown) at or above the bottom surface. The ground plane may be formed by materials such as metal, alloys, and composites. In an embodiment, the ground plane may be formed by copper or a copper alloy. In some embodiments, the ground plane may be constructed of a solid sheet of material. In other embodiments, the ground plane may be constructed using material strips arranged in shapes such as loops, spirals, and meshes. The vias 2005 carrying the power feed lines to the antenna may pass through the ground plane. In some embodiments, the ground plane may be electrically connected to the antenna. In some embodiments, the ground plane may not be electrically connected to the antenna 2004. For such implementations, an insulation area to insulate the vias 2005 from the ground plane may be constructed between the vias 2005 and the ground plane. In some embodiments, the ground plane may act as a reflector of the electromagnetic waves generated by the antenna 2004. In other words, the ground plane may not allow electromagnetic transmission beyond the bottom surface of the power transfer system 2000 by cancelling and/or reflecting the transmission image formed beyond the bottom surface. Reflecting the electromagnetic waves by the ground plane may reinforce the electromagnetic waves transmitted by the antenna 2004 from or towards the top surface 2001. Therefore, there may be no leakage of electromagnetic power from the bottom surface.

Figure 21:
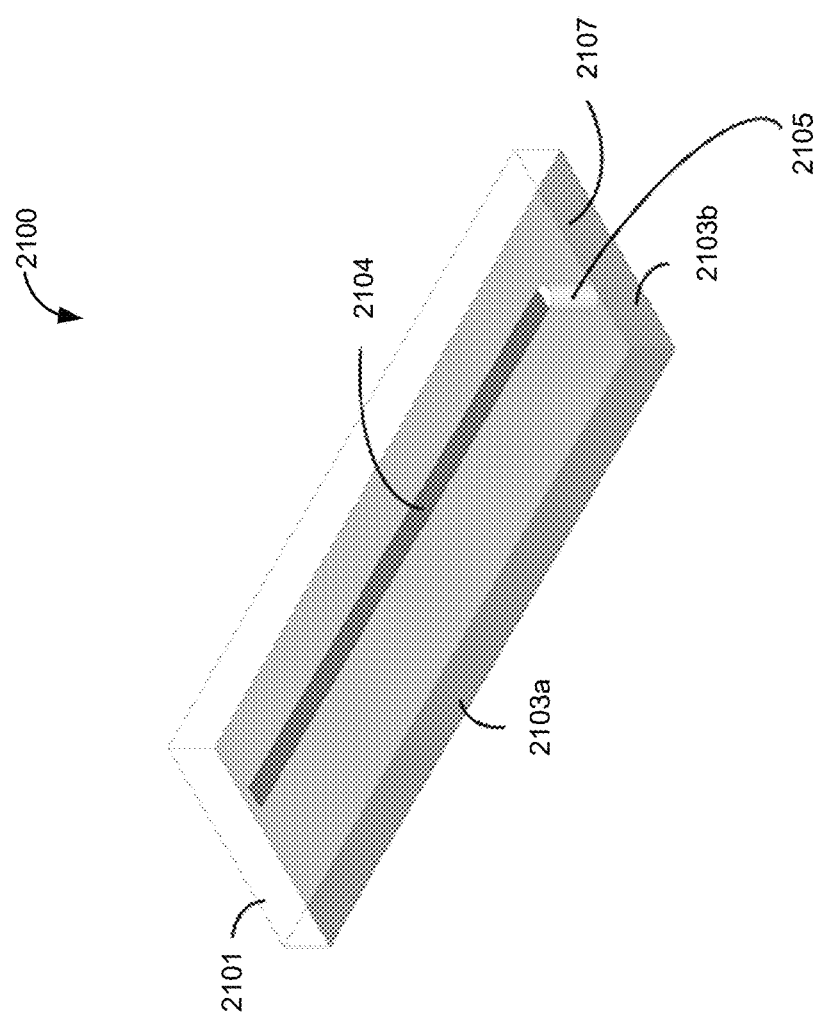
FIG. 21 is a schematic illustration of an exemplary system, according to an embodiment.

FIG. 21 schematically illustrates a top perspective view of an exemplary near-field power transfer system 2100, according to an embodiment of the disclosure. In some embodiments, the power transfer system 2100 may be a part of or associated with a power transmitter. In other embodiments, the power transfer system 2100 may be a part of or associated with a power receiver. The power transfer system 2100 may comprise a housing defined by a top surface 2101, a bottom surface (not shown), and sidewalls 2103. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 2101 may allow electromagnetic waves to pass through with minimal obstruction while the sidewalls 2103 may obstruct electromagnetic waves by attenuation, absorption, reflection, or other techniques known in the art.

A substrate 2107 may be disposed within a space defined between the top surface 2101, sidewalls 2103, and the bottom surface 2102. In some embodiments, the power transfer system 2100 may not include a housing and the substrate 2107 may include the top surface 2101, sidewalls 2103, and the bottom surface 2102. The substrate 2107 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may transmit radiation, and may act as thin reflectors.

An antenna 2104 may be constructed on or below the top surface 2101. When the power transfer system 2100 is a part of or associated with a power transmitter, the antenna 2104 may be used for transmitting electromagnetic waves. Alternatively, when the power transfer system 2100 is a part of or associated with a power receiver, the antenna 2104 may be used for receiving electromagnetic waves. In some embodiments, the power transfer system 2100 may operate as a transceiver and the antenna 2104 may both transmit and receive electromagnetic waves. The antenna 2104 may be constructed from materials such as metals, alloys, and composites. For example, the antenna 2104 may be made of copper or copper alloys. The antenna 2104 may be constructed to have different shapes based on the power transfer requirements. In the exemplary system 2100 shown in FIG. 21, the antenna 2104 is constructed in a shape of a monopole. A via 2105 may carry a power feed line (not shown) to the antenna 2104. The power feed line may provide current to the antenna 2104.

The power transfer system 2100 may include a ground plane (not shown) at or above the bottom surface. The ground plane may be formed by materials such as metal, alloys, and composites. In an embodiment, the ground plane may be formed by copper or a copper alloy. In some embodiments, the ground plane may be constructed of a solid sheet of material. In other embodiments, the ground plane may be constructed using material strips arranged in shapes such as loops, spirals, and meshes. The via 2105 carrying the power feed line to the antenna 2104 may pass through the ground plane. In some embodiments, the ground plane may be electrically connected to the antenna. In some embodiments, the ground plane may not be electrically connected to the antenna 2104. For such implementations, an insulation area to insulate the via 2105 from the ground plane may be constructed between the via 2105 and the ground plane. In some embodiments, the ground plane may act as a reflector of the electromagnetic waves generated by the antenna 2104. In other words, the ground plane may not allow electromagnetic transmission beyond the bottom surface of the power transfer system 2100 by cancelling and/or reflecting the transmission image formed beyond the bottom surface. Reflecting the electromagnetic waves by the ground plane may reinforce the electromagnetic waves transmitted by the antenna 2104 from or towards the top surface 2101. Therefore, there may be no leakage of electromagnetic power from the bottom surface.

Figure 22:
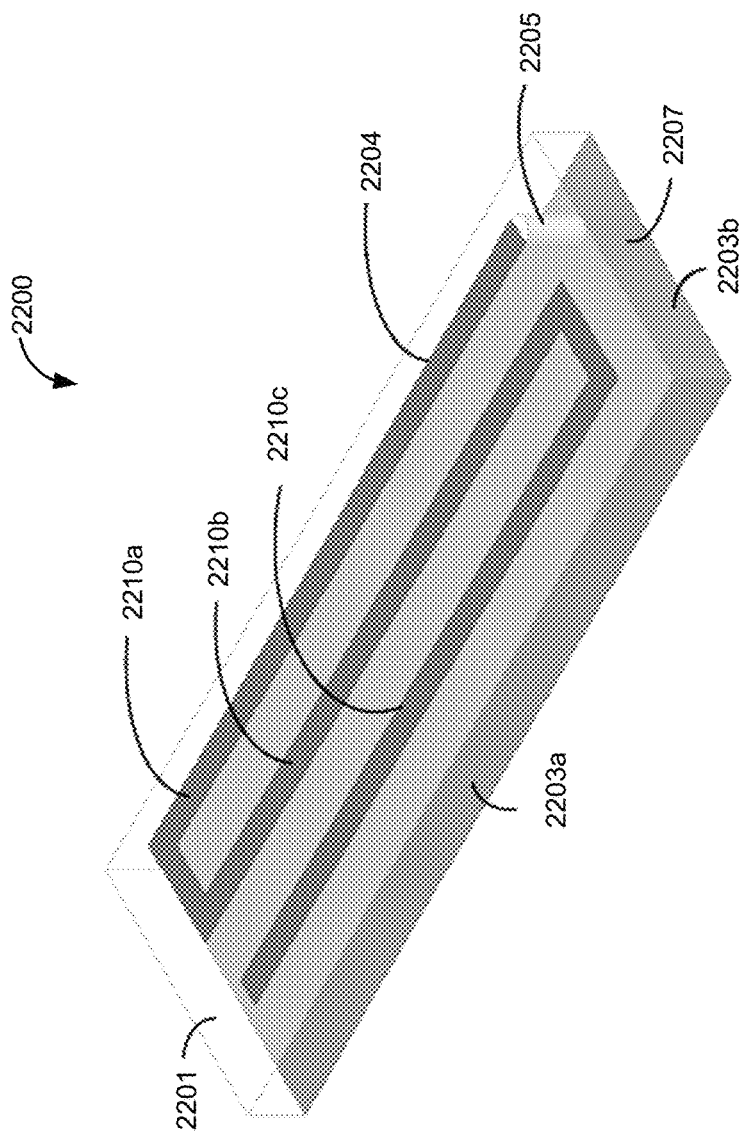
FIG. 22 is a schematic illustration of an exemplary system, according to an embodiment.

FIG. 22 schematically illustrates a top perspective view of an exemplary near-field power transfer system 2200, according to an embodiment of the disclosure. In some embodiments, the power transfer system 2200 may be a part of or associated with a power transmitter. In other embodiments, the power transfer system 2200 may be a part of or associated with a power receiver. The power transfer system 2200 may comprise a housing defined by a top surface 2201, a bottom surface (not shown), and sidewalls 2203. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 2201 may allow electromagnetic waves to pass through with minimal obstruction while the sidewalls 2203 may obstruct electromagnetic waves by attenuation, absorption, reflection, or other techniques known in the art.

A substrate 2207 may be disposed within a space defined between the top surface 2201, sidewalls 2203, and the bottom surface 2202. In some embodiments, the power transfer system 2200 may not include a housing and the substrate 2207 may include the top surface 2201, sidewalls 2203, and the bottom surface 2202. The substrate 2207 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may transmit radiation, and may act as thin reflectors.

An antenna 2204 may be constructed on or below the top surface 2201. When the power transfer system 2200 is a part of or associated with a power transmitter, the antenna 2204 may be used for transmitting electromagnetic waves. Alternatively, when the power transfer system 2200 is a part of or associated with a power receiver, the antenna 2204 may be used for receiving electromagnetic waves. In some embodiments, the power transfer system 2200 may operate as a transceiver and the antenna 2204 may both transmit and receive electromagnetic waves. The antenna 2204 may be constructed from materials such as metals, alloys, and composites. For example, the antenna 2204 may be made of copper or copper alloys. A via 2205 may carry a power feed line (not shown) to the antenna. The power feed line may provide current to the antenna 2204. The antenna 2204 may be constructed to have different shapes based on the power transfer requirements. In the exemplary system 2200 shown in FIG. 22, the antenna 2204 is constructed in a shape of a monopole including antenna segments 2210 placed close to each other. The currents flowing through the neighboring antenna segments 2210 may be in opposite directions. For example, if the current in the antenna segment 2210b is flowing from left to right of FIG. 22, the current each of the antenna segments 2210a, 2210c may be flowing from right to left. The opposite flow of the current results in mutual cancellation of the electromagnetic radiation in the far field of the power transfer system 2200. Therefore, there may be no transfer of power in the far field of the power transfer system 2200. Such cancellation, however, may not occur in a near-field active zone of the power transfer system 2200, where the transfer of power may occur. One ordinarily skilled in the art will appreciate the cancellation of electromagnetic radiation in the far field and absence of such cancellation in the near-field is dictated by one or more solutions of Maxwell's equations for time-varying electric and magnetic fields generated by the currents flowing in opposite directions. One ordinarily skilled in the art should further appreciate the near field active zone is defined by the presence of electromagnetic power in the immediate vicinity of the power transfer system 2200. The power transfer system 2200 may include a ground plane (not shown) at or above the bottom surface. The ground plane may be formed by materials such as metal, alloys, and composites. In an embodiment, the ground plane may be formed by copper or a copper alloy. In some embodiments, the ground plane may be constructed of a solid sheet of material. In other embodiments, the ground plane may be constructed using material strips arranged in shapes such as loops, spirals, and meshes. The via 2205 carrying the power feed line to the antenna 2204 may pass through the ground plane. In some embodiments, the ground plane may be electrically connected to the antenna. In some embodiments, the ground plane may not be electrically connected to the antenna 2204. For such implementations, an insulation area to insulate the via 2205 from the ground plane may be constructed between the via 2205 and the ground plane. In some embodiments, the ground plane may act as a reflector of the electromagnetic waves generated by the antenna 2204. In other words, the ground plane may not allow electromagnetic transmission beyond the bottom surface of the power transfer system 2200 by cancelling and/or reflecting the transmission image formed beyond the bottom surface. Reflecting the electromagnetic waves by the ground plane may reinforce the electromagnetic waves transmitted by the antenna 2204 from or towards the top surface 2201. Therefore, there may be no leakage of electromagnetic power from the bottom surface.

Figure 23:
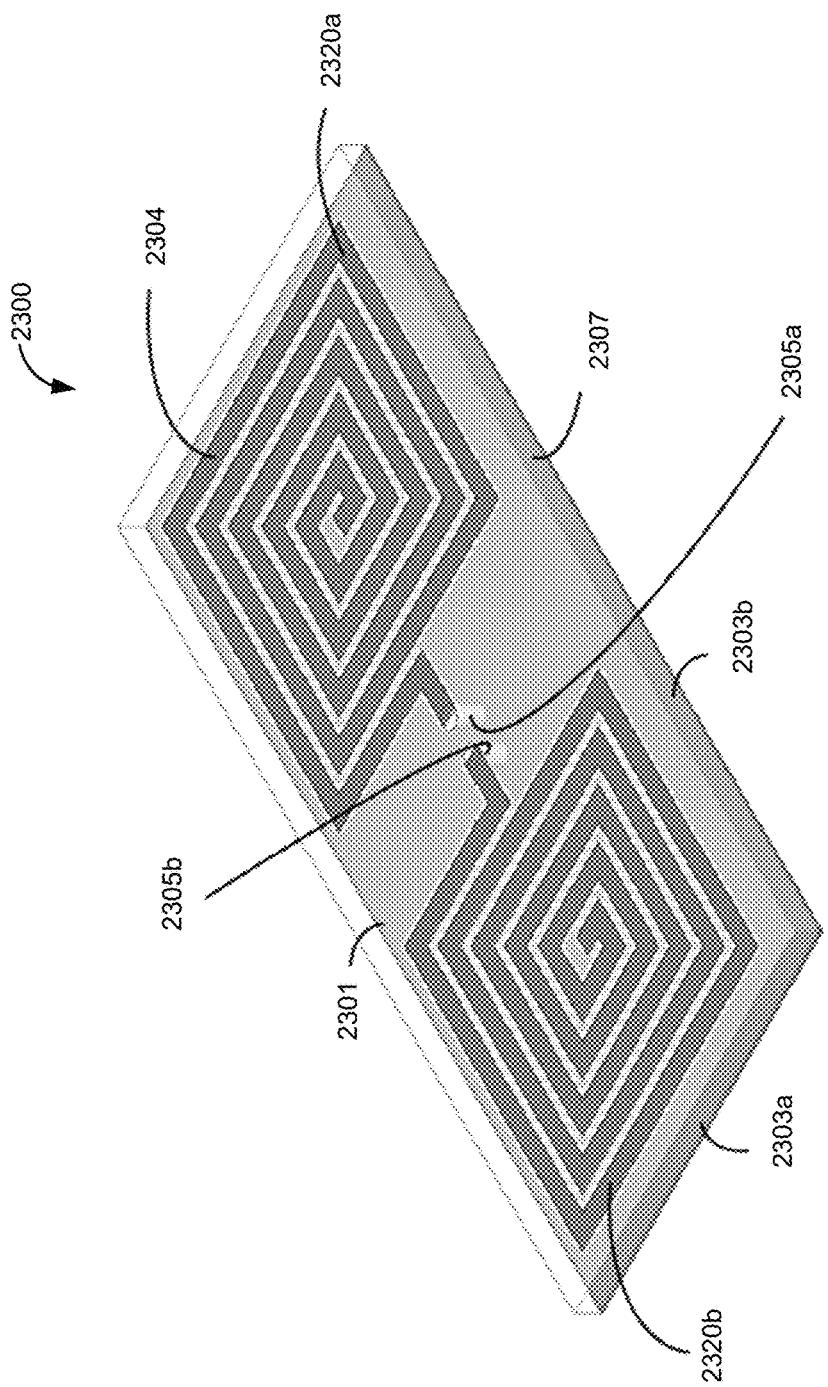
FIG. 23 is a schematic illustration of an exemplary system, according to an embodiment.

FIG. 23 schematically illustrates a top perspective view of an exemplary near-field power transfer system 2300, according to an embodiment of the disclosure. In some embodiments, the power transfer system 2300 may be a part of or associated with a power transmitter. In other embodiments, the power transfer system 2300 may be a part of or associated with a power receiver. The power transfer system 2300 may comprise a housing defined by a top surface 2301, a bottom surface (not shown), and sidewalls 2303. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 2301 may allow electromagnetic waves to pass through with minimal obstruction while the sidewalls 2303 may obstruct electromagnetic waves by attenuation, absorption, reflection, or other techniques known in the art.

A substrate 2307 may be disposed within a space defined between the top surface 2301, sidewalls 2303, and the bottom surface 2302. In some embodiments, the power transfer system 2300 may not include a housing and the substrate 2307 may include the top surface 2301, sidewalls 2303, and the bottom surface 2302. The substrate 2307 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may transmit radiation, and may act as thin reflectors.

An antenna 2304 may be constructed on or below the top surface 2301. When the power transfer system 2300 is a part of or associated with a power transmitter, the antenna 2304 may be used for transmitting electromagnetic waves. Alternatively, when the power transfer system 2300 is a part of or associated with a power receiver, the antenna 2304 may be used for receiving electromagnetic waves. In some embodiments, the power transfer system 2300 may operate as a transceiver and the antenna 2304 may both transmit and receive electromagnetic waves. The antenna 2304 may be constructed from materials such as metals, alloys, and composites. For example, the antenna 2304 may be made of copper or copper alloys. The antenna 2304 may be constructed to have different shapes based on the power transfer requirements. In the exemplary system 2300 shown in FIG. 23, the antenna 2304 is constructed as a hybrid dipoles comprising a first spiral pole 2320a and a second spiral pole 2320b. A first power feed line supplying current to the first spiral pole 2320a may be provided through a first via 2305a and a second power feed supplying current the second spiral pole 2320b may be provided through a second via 2305b. The antenna segments in each of the spiral poles 2320 may mutually cancel the electromagnetic radiation in the far field generated by the spiral dipoles 2320 thereby reducing the transfer of power to the far field. For example, the antenna segments in the first spiral pole 2320a may cancel the far field electromagnetic radiation generated by each other. Additionally, or in the alternative, the far field radiation generated by one or more antenna segments of the first spiral pole 2320a may be cancelled by the far field radiation generated by one or more antenna segments of the second spiral pole 2320b. One ordinarily skilled in the art will appreciate the cancellation of electromagnetic radiation in the far field and absence of such cancellation in the near-field is dictated by one or more solutions of Maxwell's equations for time-varying electric and magnetic fields generated by the currents flowing in opposite directions.

The power transfer system 2300 may include a ground plane (not shown) at or above the bottom surface. The ground plane may be formed by materials such as metal, alloys, and composites. In an embodiment, the ground plane may be formed by copper or a copper alloy. In some embodiments, the ground plane may be constructed of a solid sheet of material. In other embodiments, the ground plane may be constructed using material strips arranged in shapes such as loops, spirals, and meshes. The vias 2305 carrying the power feed lines to the antenna may pass through the ground plane. In some embodiments, the ground plane may be electrically connected to the antenna. In some embodiments, the ground plane may not be electrically connected to the antenna 2304. For such implementations, an insulation area to insulate the vias 2305 from the ground plane may be constructed between the vias 2305 and the ground plane. In some embodiments, the ground plane may act as a reflector of the electromagnetic waves generated by the antenna 2304. In other words, the ground plane may not allow electromagnetic transmission beyond the bottom surface of the power transfer system 2300 by cancelling and/or reflecting the transmission image formed beyond the bottom surface. Reflecting the electromagnetic waves by the ground plane may reinforce the electromagnetic waves transmitted by the antenna 2304 from or towards the top surface 2301. Therefore, there may be no leakage of electromagnetic power from the bottom surface.

The hybrid antenna 2304 may be required for wideband and/or multiband designs. For example, a non-hybrid structure may be highly efficient at a first frequency and at a first distance between the transmitter and the receiver, but may be at inefficient other frequencies and distances. Incorporating more complex structure such as a hybrid antenna 2304 may allow for higher efficiencies along a range of frequencies and distances.

Figure 24A:
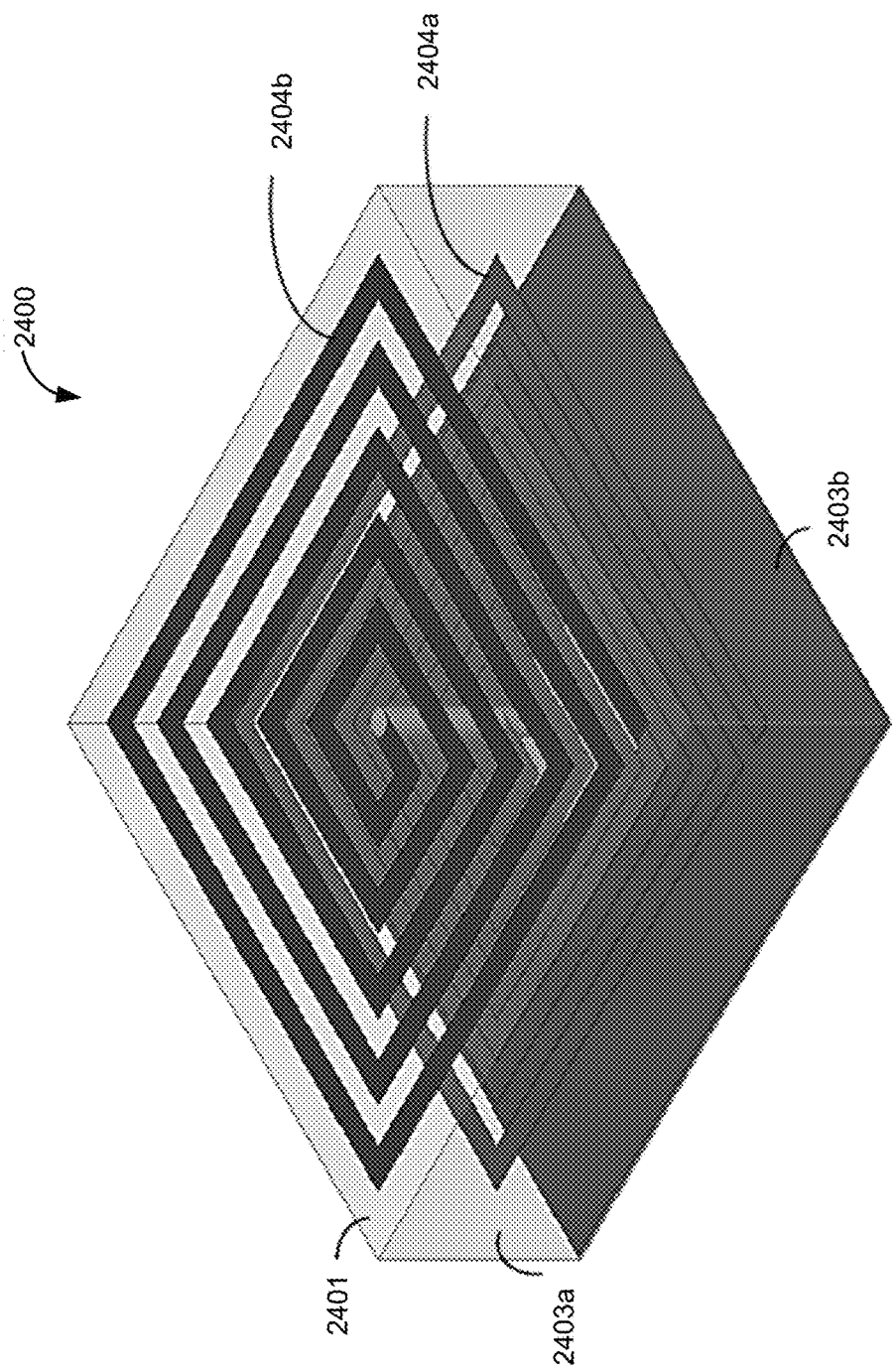
FIGS. 24A and 24B are schematic illustrations of an exemplary system, according to an embodiment.
Figure 24B:
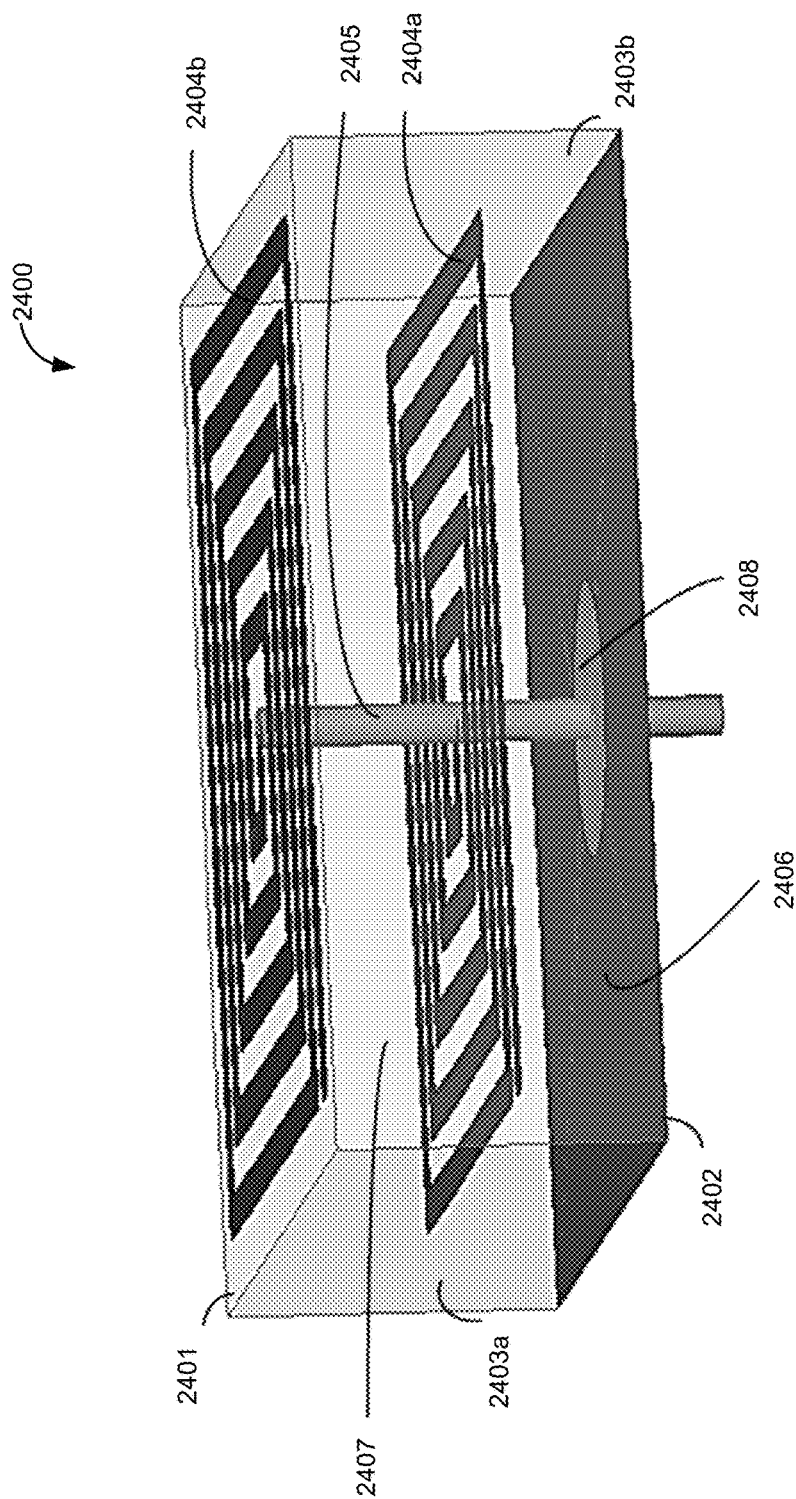

FIG. 24A and FIG. 24B schematically illustrate a top perspective view and a side perspective view respectively of an exemplary near-field power transfer system 2400, according to an embodiment of the disclosure. In some embodiments, the power transfer system 2400 may be a part of or associated with a power transmitter. In other embodiments, the power transfer system 100 may be a part of or associated with a power receiver. The power transfer system 2400 may comprise a housing defined by a top surface 2401, a bottom surface 2402, and sidewalls 2403. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 2401 may allow electromagnetic waves to pass through with minimal obstruction while the sidewalls 2403 may obstruct electromagnetic waves by attenuation, absorption, reflection, or other techniques known in the art.

A substrate 2407 may be disposed within a space defined between the top surface 2401, sidewalls 2403, and the bottom surface 2402. In some embodiments, the power transfer system 2400 may not include a housing and the substrate 2407 may include the top surface 2401, sidewalls 2403, and the bottom surface 2402. The substrate 2407 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may transmit radiation, and may act as thin reflectors.

The power transfer system may include hierarchical antennas 2404 that may be constructed on or below the top surface 2401. When the power transfer system 2400 is a part of or associated with a power transmitter, the antennas 2404 may be used for transmitting electromagnetic waves. Alternatively, when the power transfer system 2400 is a part of or associated with a power receiver, the antennas 2404 may be used for receiving electromagnetic waves. In some embodiments, the power transfer system 2400 may operate as a transceiver and the antennas 2404 may both transmit and receive electromagnetic waves. The antennas 2404 may be constructed from materials such as metals, alloys, and composites. For example, the antennas 2404 may be made of copper or copper alloys. The antennas 2404 may be constructed to have different shapes based on the power transfer requirements. In the exemplary system 2400 shown in FIG. 24A and FIG. 24B, the antennas 2404 are constructed in a hierarchical spiral structure with a level zero hierarchical antenna 2404a and a level one hierarchical antenna 2404b. Each of the hierarchical antennas 2404 may include antenna segments, wherein antenna segments have currents flowing in the opposite directions to cancel out the far field radiations. For example, the antenna segments in the level_zero hierarchical antenna 2404a may cancel the far field electromagnetic radiation generated by each other. Additionally, or in the alternative, the far field radiation generated by one or more antenna segments of the level_zero hierarchical antenna 2404a may be cancelled by the far field radiation generated by one or more antenna segments of the level_one hierarchical antenna 2404b. A power feed line (not shown) to the antennas is carried through a via 2405. The power feed line may supply current to the antenna 2404.

The power transfer system 2400 may include a ground plane 2406 at or above the bottom surface 2402. The ground plane 2406 may be formed by materials such as metal, alloys, and composites. In an embodiment, the ground plane 2406 may be formed by copper or a copper alloy. In some embodiments, the ground plane 2406 may be constructed of a solid sheet of material. In other embodiments, the ground plane 2406 may be constructed using material strips arranged in shapes such as loops, spirals, and meshes. The via 2405 carrying a power feed line to the antenna may pass through the ground plane 2406. In some embodiments, the ground plane 2406 may be electrically connected to one or more of the antennas 2404. In some embodiments, the ground plane 2406 may not be electrically connected to the antennas 2404. For such implementations, an insulation area 2408 to insulate the via 2405 from the ground plane 2406 may be constructed between the via 2405 and the ground plane 2406. In some embodiments, the ground plane 2406 may act as a reflector of the electromagnetic waves generated by the antennas 2404. In other words, the ground plane may not allow electromagnetic transmission beyond the bottom surface of the power transfer system 2400 by cancelling and/or reflecting the transmission image formed beyond the bottom surface. Reflecting the electromagnetic waves by the ground plane may reinforce the electromagnetic waves transmitted by the antennas 2404 from or towards the top surface 2401. Therefore, there may be no leakage of electromagnetic power from the bottom surface 2402. In some embodiments, there may be multiple ground planes, with a ground plane for each of the hierarchical antennas 2404. In some embodiments, the hierarchical antennas have different power feed lines carried through multiple vias.

The hierarchical antennas 2404 may be required for wideband and/or multiband designs. For example, a non-hierarchical structure may be highly efficient at a first frequency and at a first distance between the transmitter and the receiver, but may be inefficient at other frequencies and distances. Incorporating more complex structures, such as hierarchical antennas 2404, may allow for higher efficiencies along a range of frequencies and distances.

FIGS. 25A-25H illustrate various views of a representative near-field antenna 2500 in accordance with some embodiments. It is noted that the representative near-field antenna 2500, and its various components, may not be drawn to scale. Moreover, while some example features are illustrated, various other features have not been illustrated for the sake of brevity and so as not to obscure pertinent aspects of the example implementations disclosed herein. In some instances, the near-field antenna 2500 is referred to as a "quad-pol antenna element." In some embodiments, the near-field antenna 2500 is part of the charging pad 100, e.g., one or more of the near-field antennas 2500 are included in each of the antenna zones 290 (FIG. 1B). In some embodiments, the near-field antennas 2500 are the only antennas included in each of the antenna zones while, in other embodiments, the near-field antennas 2500 can be included in respective antenna zones along with other antennas described herein. In still other embodiments, the near-field antennas 2500 can be included as the only antennas in certain of the antenna zones, while other antenna zones may include only other types of antennas that are described herein.

FIG. 25A shows an isometric view of the near-field antenna 2500 in accordance with some embodiments. As shown, the near-field antenna 2500 includes a substrate 2506 offset from a reflector 2504 (e.g., offset along the z-axis), and thus a gap is formed between the reflector 2504 and substrate 2506. In such an arrangement, the reflector 2504 defines a first plane (e.g., a first horizontal plane: the bottom surface) and the substrate 2506 defines a second plane (e.g., a second horizontal plane: the top surface) that is offset from the first plane. In some embodiments, the substrate 2506 is made from a dielectric, while in other embodiments the substrate 2506 is made from other materials capable of insulating, reflecting, absorbing, or otherwise housing electrical lines conducting current, such as metamaterials. Metamaterials are a broad class of synthetic materials that are engineered to yield desirable magnetic permeability and electrical permittivity. At least one of the magnetic permeability and electrical permittivity may be based upon power-transfer requirements, and/or compliance constraints for government regulations. In various embodiments, the metamaterials disclosed herein can be used to receive radiation, transmit radiation, and/or as reflectors.

In some embodiments, the reflector 2504 is a metal sheet (e.g., copper, copper alloy, or the like) while in other embodiments the reflector 2504 is a metamaterial. The reflector 2504 is configured to reflect some electromagnetic signals radiated by the near-field antenna 2500. In other words, the reflector 2504 may not allow electromagnetic transmission beyond the bottom surface of the near-field antenna 2500 by reflecting the electromagnetic signals radiated by the near-field antenna 2500. Additionally, reflecting the electromagnetic signals by the reflector 2504 can redirect some of the electromagnetic signals transmitted by antenna elements of the near-field antenna 2500 from or towards the substrate 2506. In some instances, the reflector 2504 reduces far-field gain of the near-field antenna 2500. In some embodiments, the reflector 2504 also cancels some electromagnetic signals radiated by the near-field antenna 2500.

The substrate 2506 further includes four distinct coplanar antenna elements (also referred to herein as "radiating elements"), where each of the four distinct antenna elements follows a respective meandering pattern. The four distinct coplanar antenna elements may each occupy a distinct quadrant of the substrate. The coplanar antenna elements may be embedded in the substrate 2506, such that respective first surfaces of the coplanar antenna elements are coplanar with a top surface of the substrate 2506, and respective second surfaces, opposite the respective first surfaces, of the coplanar antenna elements are coplanar with a bottom surface of the substrate 2506. The respective meandering patterns are used to increase an effective length of each of the four distinct coplanar antenna elements, thus resulting in a lower resonant frequency of the antenna 2500 while reducing an overall size of the antenna 2500.

In some embodiments, the respective meandering patterns are all the same while, in other embodiments, one or more of the respective meandering patterns differ. Each of the four distinct coplanar antenna elements includes a plurality of continuous (and/or contiguous) segments, which are discussed below with reference to FIG. 25F. In some embodiments (not shown), a shape of each segment in the plurality of segments is substantially the same (e.g., each is rectangular or some other shape). Alternatively, in some other embodiments, a shape of at least one segment in the plurality of segments differs from shapes of other segments in the plurality of segments. It is noted that various combinations of shapes can be used to form the segments of a respective antenna element, and the shapes shown in FIG. 25A are merely illustrative examples. Further, in some embodiments, the substrate 2506 is not included and the four distinct coplanar antenna elements are made from stamped metal (i.e., the radiating elements are sitting in open space above the reflector 2504).

The four distinct coplanar antenna elements are shown in FIG. 25A as a first radiating element 2502-A, a second radiating element 2502-B, a third radiating element 2502-C, and a fourth radiating element 2502-D. The first radiating element 2502-A and the second radiating element 2502-B together compose (i.e., form) a first dipole antenna 2501-A positioned along (e.g., center on) a first axis (e.g., the X-axis). In other words, the first radiating element 2502-A is a first pole of the first dipole antenna 2501-A and the second radiating element 2502-B is a second pole of the first dipole antenna 2501-A. The first dipole antenna 2501-A is indicated by the dashed line.

In addition, the third radiating element 2502-C and the fourth radiating element 2502-D together compose (i.e., form) a second dipole antenna 2501-B positioned along a second axis (e.g., the Y-axis) perpendicular to the first axis. In other words, the third radiating element 2502-C is a first pole of the second dipole antenna 2501-B and the fourth radiating element 2502-D is a second pole of the second dipole antenna 2501-B. The second dipole antenna 2501-B is indicated by the dashed-dotted line.

Figure 25B:
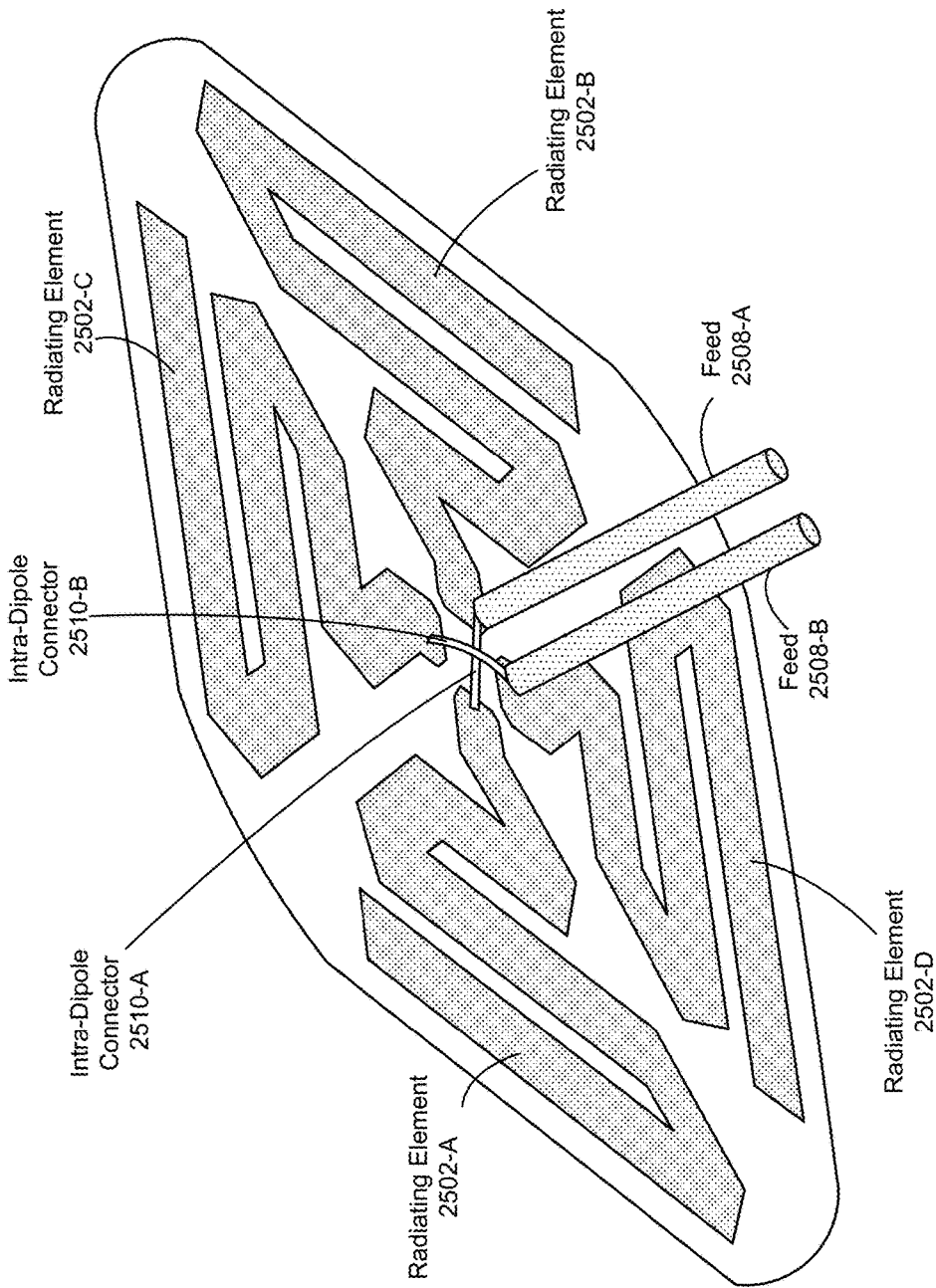
FIG. 25B shows another isometric view of a near-field antenna in accordance with some embodiments.

FIG. 25B shows another isometric view (e.g., isometric underneath view) of the near-field antenna 2500 in accordance with some embodiments. For ease of illustration, the reflector 2504 is not shown in FIG. 25B.

As shown, the near-field antenna 2500 further includes a first feed 2508-A and a second feed 2508-B attached to a central region of the substrate 2504. The first feed 2508-A is connected to the first and second radiating elements 2502-A, 2502-B forming the first dipole antenna 2501-A. More specifically, the first feed 2508-A is connected to the second radiating element 2502-B via a connector 2512-A (FIG. 25C) and to the first radiating element 2502-A via an intra-dipole connector 2510-A. The first feed 2508-A is configured to supply electromagnetic signals that originate from a power amplifier (e.g., power amplifier 108, FIG. 26) to the first and second radiating elements 2502-A, 2502-B.

The second feed 2508-B is connected to the third and fourth radiating elements 2502-C, 2502-D forming the second dipole antenna 2501-B. More specifically, the second feed 2508-B is connected to the fourth radiating element 2502-D via a connector 2512-B (FIG. 25C) and to the third radiating element 2502-C via an intra-dipole connector 2510-B. The second feed 2508-B is configured to supply electromagnetic signals that originate from the power amplifier to the third and fourth radiating elements 2502-C, 2502-D. The four radiating elements are configured to radiate the provided electromagnetic signals (e.g., radio frequency power waves), which are used to power or charge a wireless-power-receiving device.

In some embodiments, as explained below in detail, the four radiating elements do not radiate at the same time. Instead, based on information about a wireless-power receiving device, either the first dipole antenna 2501-A is supplied the electromagnetic signals or the second dipole antenna 2501-B is supplied electromagnetic signals.

The electromagnetic signals radiated by the first dipole antenna 2501-A have a first polarization and the electromagnetic signals radiated by the second dipole antenna 2501-B have a second polarization perpendicular to the first polarization. The differences in polarization are attributable, at least in part, to the orientations of the first and second dipole antennas 2501-A, 2501-B. For example, the first dipole antenna 2501-A is positioned along the first axis (e.g., the X-axis) and the second dipole antenna 2501-B is positioned along the second axis (e.g., the Y-axis), which is perpendicular to the first axis. Thus, in some instances, the electromagnetic signals are fed to the dipole antenna whose polarization matches a polarization of a power-receiving-antenna of a wireless-power-receiving device. A process for selectively coupling one of the dipole antennas to an electromagnetic signals feeding source (i.e., a power amplifier 108) is described below in method 3000 (FIG. 30).

For ease of discussion below, the substrate 2506 and the radiating elements 2502-A-2502-D are referred to collectively as the "radiator 2507" when appropriate.

Figure 25C:
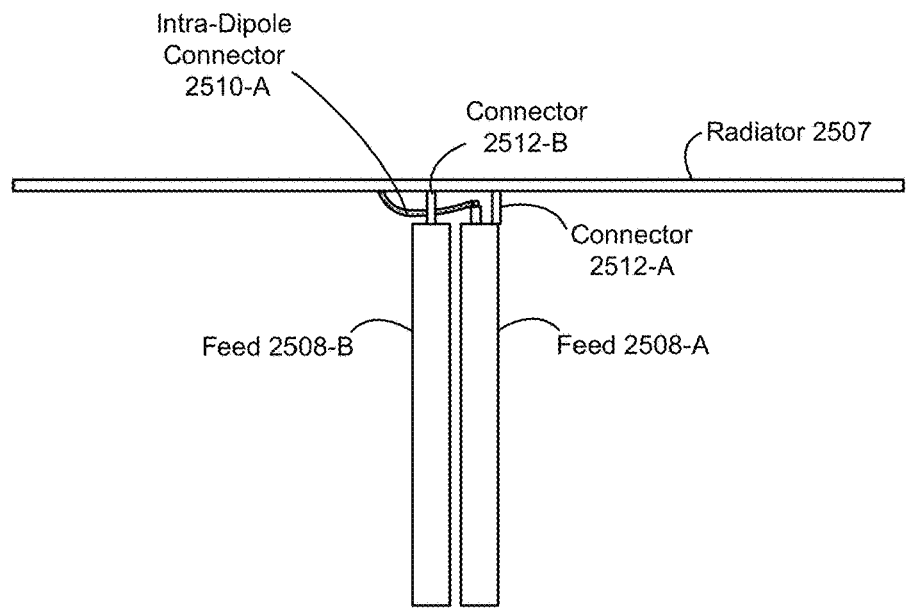
FIGS. 25C-25D show different side views of a near-field antenna in accordance with some embodiments.
Figure 25D:
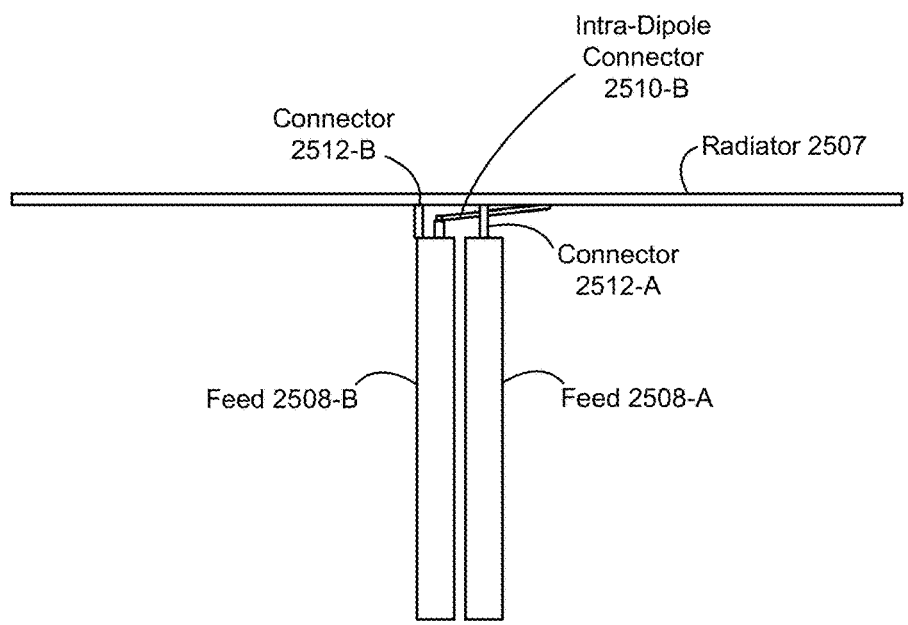

FIGS. 25C-25D show different side views of the near-field antenna 2500, where the side view in FIG. 25D is rotated 90 degrees relative to the side view in FIG. 25C. In certain embodiments or circumstances, the first feed 2508-A is connected to the second radiating element 2502-B by the connector 2512-A and to the first radiating element 2502-A by the intra-dipole connector 2510-A (FIG. 25B also shows the intra-dipole connector 2510-A). In certain embodiments or circumstances, the second feed 2508-B is connected to the fourth radiating element 2502-B by the connector 2512-B and to the third radiating element 2502-C by the intra-dipole connector 2510-B (FIG. 25B also shows the intra-dipole connector 2510-B).

Figure 25E:
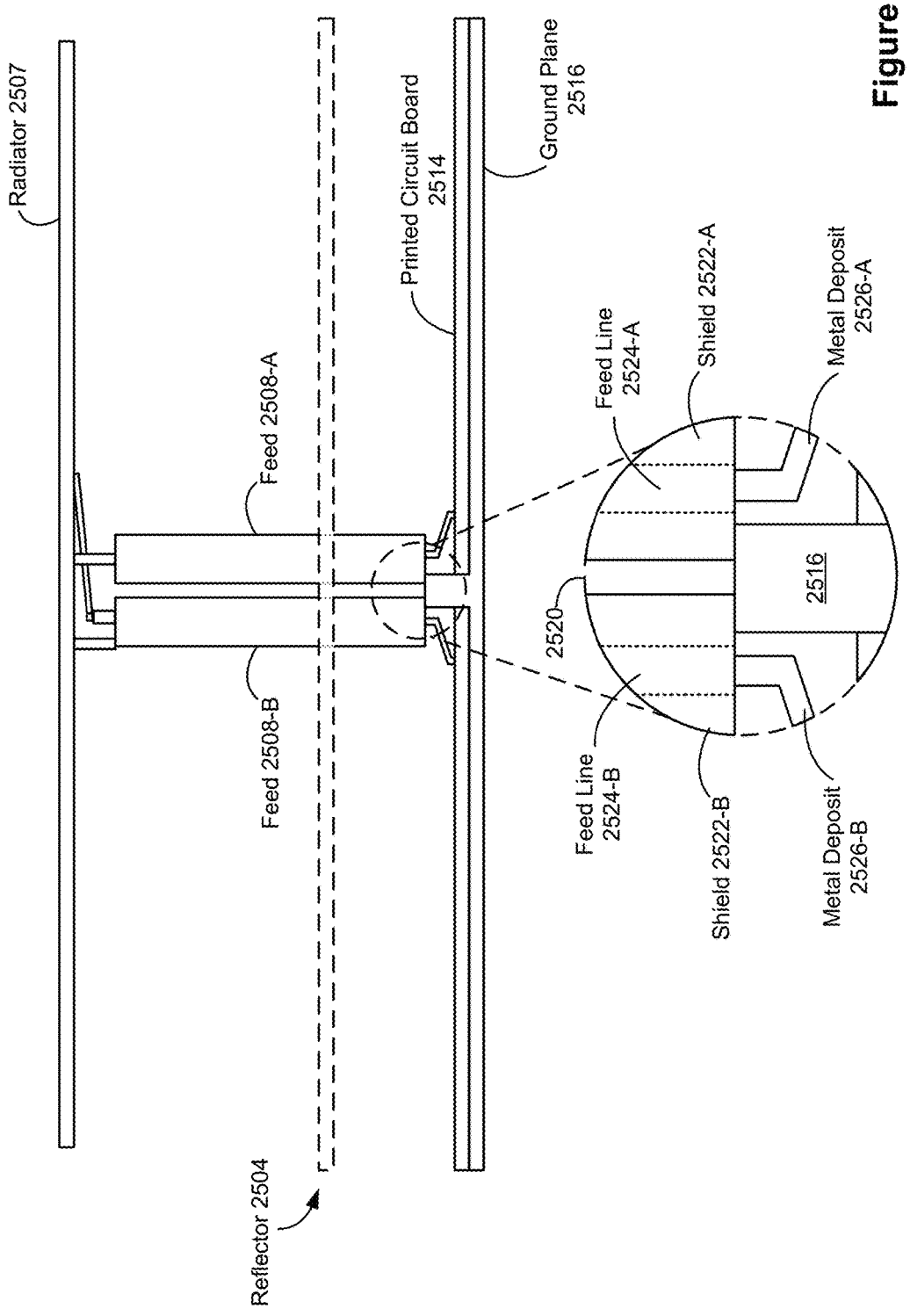
FIG. 25E shows another side view of a near-field antenna in accordance with some embodiments.

FIG. 25E shows another side view of the near-field antenna 2500 in accordance with some embodiments. As shown, the first and second feeds 2508-A, 2508-B are substantially perpendicular to the radiator 2507. For example, each of the feeds 2508-A, 2508-B is disposed along a respective vertical axis while the antenna 2507 is disposed along a horizontal axis/plane. Further, the first and second feeds 2508-A, 2508-B are connected at a first end to the antenna 2507, and are connected at a second end, opposite the first end, to a printed circuit board 2514 and a ground plane 2516. In some embodiments, the printed circuit board 2514 and the ground plate 2516 compose the reflector 2504. Alternatively, in some embodiments, the reflector 2504 is a distinct component, which is offset from the printed circuit board 2514 and the ground plane 2516 (e.g., positioned between the antenna 2507 and the printed circuit board 2514). In this arrangement, the reflector 2504 may define openings (not shown), and the first and second feeds 2508-A, 2508-B may pass through said openings.

As shown in the magnified view 2520, the first feed 2508-A includes a feedline 2524-A (e.g., a conductive metal line) housed (i.e., surrounded) by a shield 2522-A. The feedline 2524-A is connected to metal traces (e.g., communication buses 208, FIG. 26) of the printed circuit board 2514 by a metal deposit 2526-A. Further, the shield 2522-A contacts the ground plane 2516, thereby grounding the first dipole 2501-A.

Similarly, the second feed 2508-B includes a feedline 2524-B housed by a shield 2522-B. The feedline 2524-B is connected to metal traces (not shown) of the printed circuit board 2514 by a metal deposit 2526-B. Further, the shield 2522-B contacts the ground plane 2516, thereby grounding the second dipole 2501-B. As explained below with reference to FIG. 26, the metal traces of the printed circuit board 2514 may be connected to one or more additional components (not shown in FIGS. 25A-25H) of the near-field antenna 2500, including one or more power amplifiers 108, an impedance-adjusting component 2620, and a switch 2630 (also referred to herein as "switch circuitry").

Although not shown in FIG. 25E, a dielectric may separate the feedline from the shield in each feed (e.g., electrically isolate the two components). Additionally, another dielectric can surround the shield in each feed to protect the shield (i.e., the first and second feeds 2508-A, 2508-B may be coaxial cables). It is also noted that the particular shapes of the metal deposits 2526-A, 2526-B can vary in certain embodiments, and the shapes shown in FIG. 25E are examples used for ease of illustration.

Figure 25F:
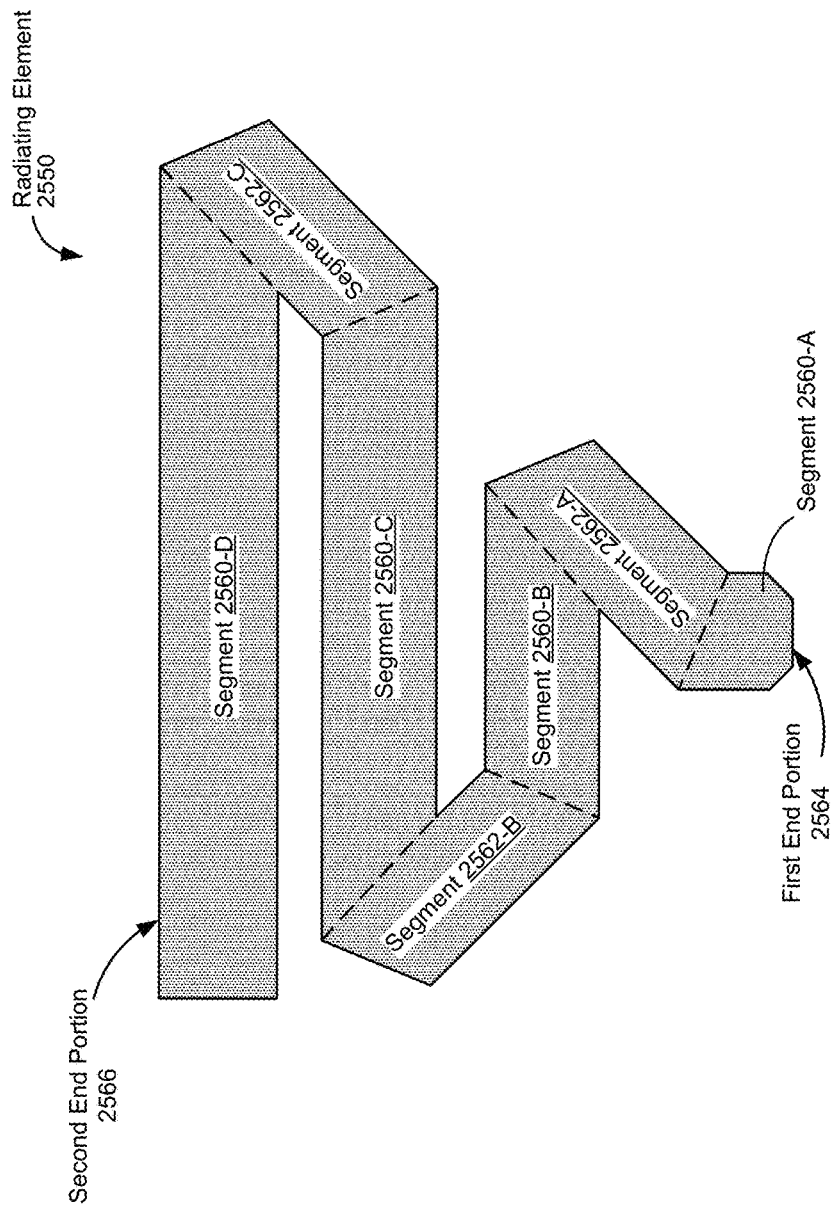
FIG. 25F shows a representative radiating element following a meandering pattern in accordance with some embodiments.

FIG. 25F shows a representative radiating element 2550 following a meandering pattern in accordance with some embodiments. As shown, the representative radiating element 2550 includes: (i) a first plurality of segments 2560-A-2560-D, and (ii) a second plurality of segments 2562-A-2562-C interspersed between the first plurality of segments 2560-A-2560-D (separated by dashed lines). In some embodiments, the first plurality of segments 2560-A-2560-D and the second plurality of segments 2562-A-2562-C are continuous segments. Alternatively, in some other embodiments, the first plurality of segments 2560-A-2560-D and the second plurality of segments 2562-A-2562-C are contiguous segments (e.g., ends of neighboring segments abut one another). The illustrated boundaries (e.g., the dashed lines) separating the segments in FIG. 25F are merely one example set of boundaries that is used for illustrative purposes only, and one of skill in the art will appreciate (upon reading this disclosure) that other boundaries (and segment delineations) are within the scope of this disclosure.

As shown, lengths of segments in the first plurality of segments 2560-A-2560-D increase from a first end portion 2564 of the radiating element 2550 to a second end portion 2566 of the radiating element 2550. In some embodiments, while not shown, lengths of segments in the second plurality of segments 2562-A-2562-C increase from the first end portion 2564 of the radiating element 2550 to the second end portion 2566 of the radiating element 2550. Alternatively, in some other embodiments, lengths of segments in the second plurality of segments 2562-A-2562-C remain substantially the same from the first end portion 2564 of the radiating element 2550 to the second end portion 2566 of the radiating element 2550. In the illustrated embodiment, the lengths of the first plurality of segments 2560-A-2560-D are different from the lengths of the second plurality of segments 2562-A-2562-C. Further, the lengths of the first plurality of segments 2560-A-2560-D toward the second end portion 2566 of the radiating element 2550 are greater than the lengths of the second plurality of segments 2562-A-2562-C toward the second end portion 2566 of the radiating element 2550.

In some embodiments, the shape of the radiating element provides certain important advantages. For example, the specific shape of the representative radiating element 2550 shown in FIG. 25F provides the following advantages: (i) the shape allows two perpendicularly-positioned dipoles to fit in a small area and occupy four quadrants of the substrate 2506 where each pair of quadrants is perpendicular to each other, and (ii) the width and gaps between segments of neighboring radiating elements (i.e., spacing between quadrants) can be varied to tune the near-field antenna 2500 to a desired frequency, while still maintaining the radiating elements' miniaturized form-factor. To illustrate numeral (i), with reference to FIG. 25A, the first and second radiating elements 2502-A, 2502-B occupy a first pair of quadrants that include sides of the near-field antenna that are along the Y-axis. Further, the third and fourth radiating elements 2502-C, 2502-D occupy a second pair of quadrants that include sides of the near-field antenna that are along the X-axis. Accordingly, the first and second pairs of quadrants of the substrate 2506 include sides of the NF antenna that are perpendicular to each other (e.g., this feature is facilitated, in part, by a width of each radiating element increasing from a central portion of the near-field antenna 2500 to a respective side of the near-field antenna 2500).

Figure 25G:
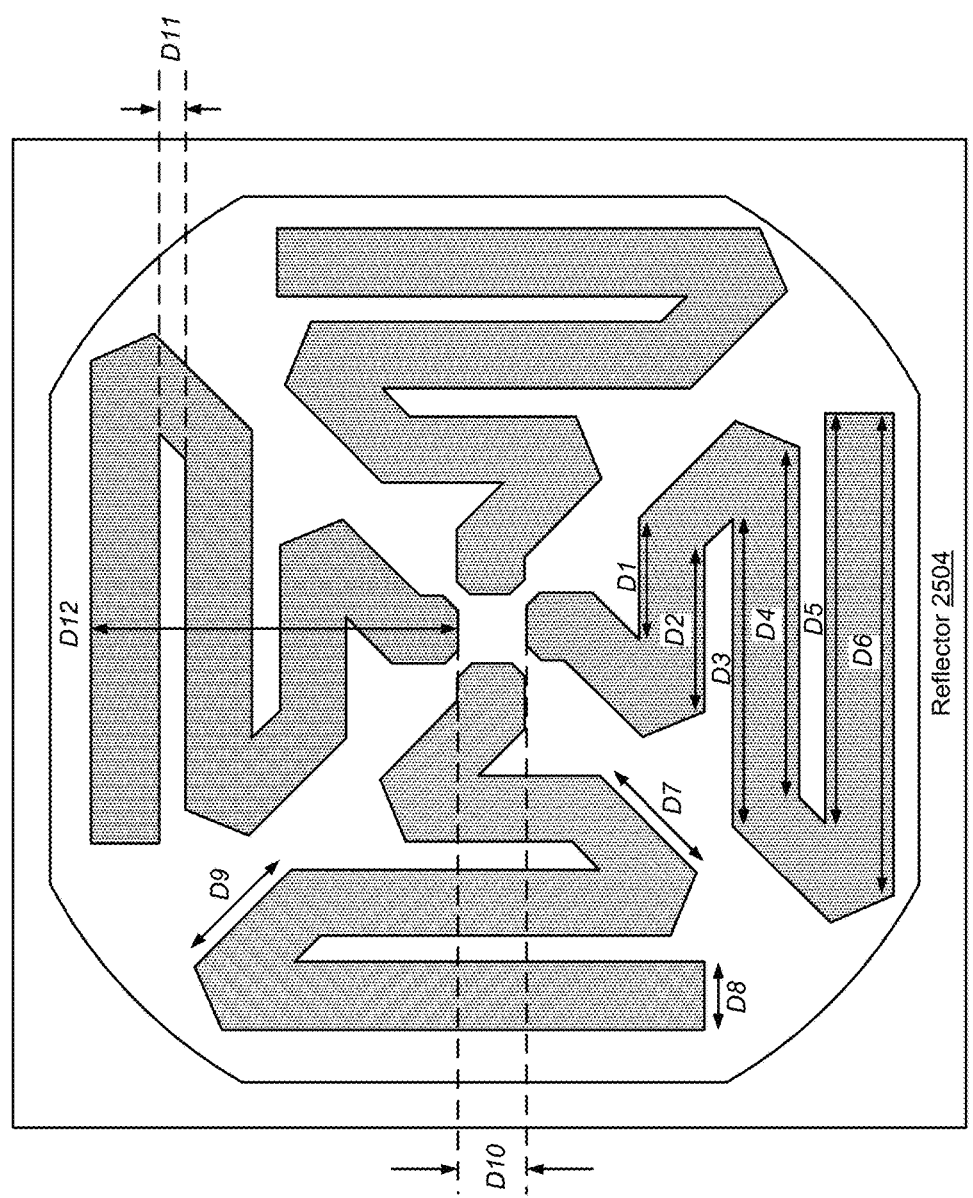
FIG. 25G shows a top view of a near-field antenna in accordance with some embodiments.

FIG. 25G shows a top view of the representative near-field antenna 2500 in accordance with some embodiments. Dimensions of the near-field antenna 2500 can effect an operating frequency of the near-field antenna 2500, radiation efficiency of the near-field antenna 2500, and a resulting radiation pattern (e.g., radiation pattern 2800, FIG. 28A) produced by the near-field antenna 2500, among other characteristics of the NF antenna 2500. As one example, the near-field antenna 2500, when operating at approximately 918 MHz has the following dimensions (approximately): D1=9.3 mm, D2=12.7 mm, D3=23.7 mm, D4=27 mm, D5=32 mm, D6=37.5 mm, D7=10.6 mm, D8=5.1 mm, D9=10.6 mm, D10=5.5 mm, D11=2.1 mm, and D12=28 mm. Further, the reflector 2504 may have a width of 65 mm, a height of 65 mm, and a thickness of 0.25 mm.

Figure 25H:
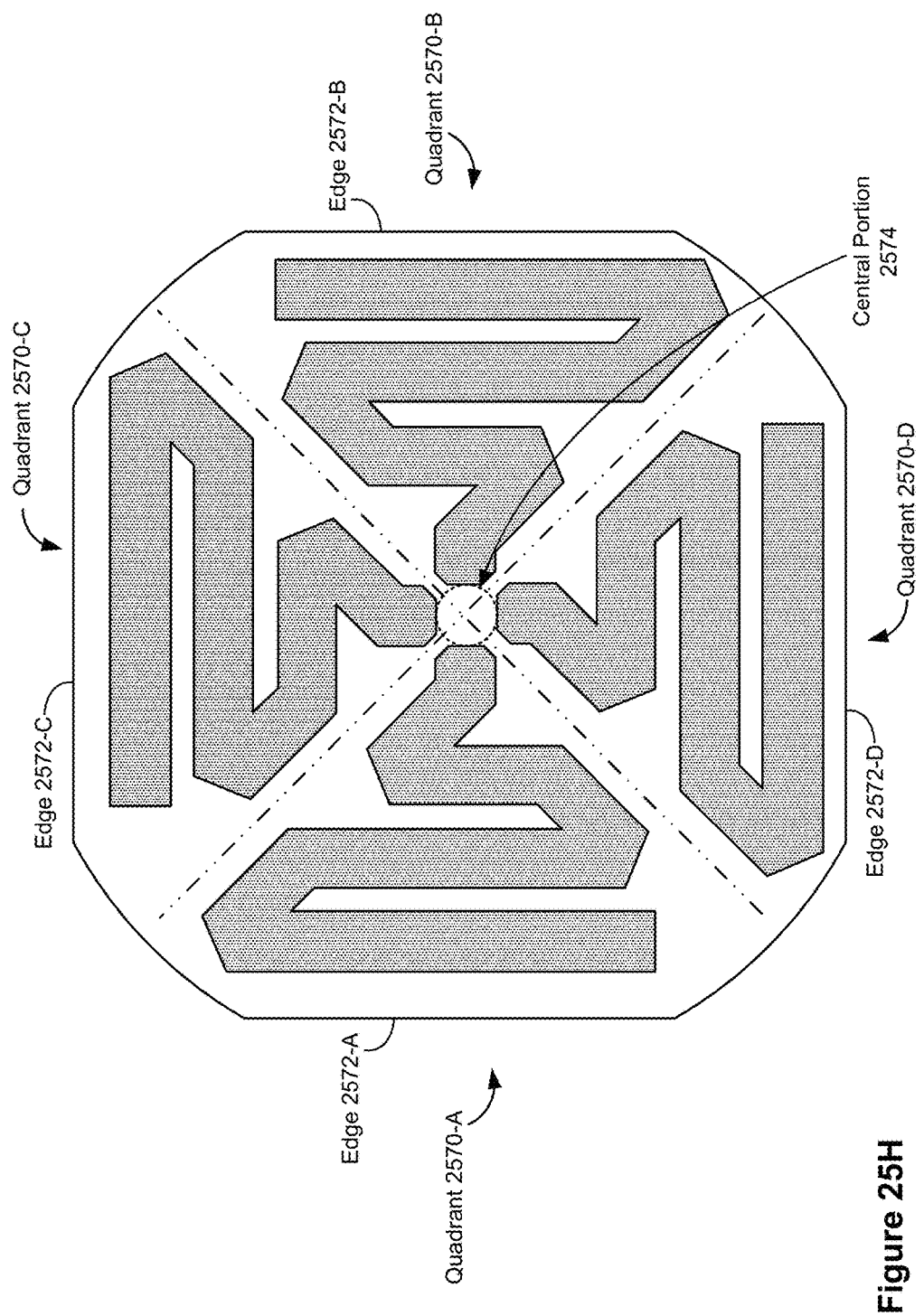
FIG. 25H shows another top view of a near-field antenna in accordance with some embodiments.

FIG. 25H shows another top view of the representative near-field antenna 2500 in accordance with some embodiments. As shown, the four distinct coplanar antenna elements each occupy a distinct quadrant of the substrate 2506 (e.g., occupy one of the quadrants 2570-A through 2570-D, demarcated by the dash-dotted lines). Further, (i) a first end portion 2564 of the respective meandering pattern followed by each of the four distinct antenna elements borders a central portion 2574 (dotted line) of the near-field antenna 2500, and (ii) a second end portion 2566 of the respective meandering pattern followed by each of the four distinct antenna elements borders one of the edges 2572-A-2572-D of the near-field antenna 2500. In such an arrangement, a longest dimension of the respective meandering pattern followed by each of the four distinct antenna elements (e.g., segment 2560-D) is closer to a distinct edge 2572 of the near-field antenna than to the central portion 2574 of the near-field antenna 2500. Moreover, a shortest dimension of the respective meandering pattern followed by each of the four distinct antenna elements is closer to the central portion 2574 of the near-field antenna 2500 than a distinct edge 2572 of the near-field antenna 2500. Thus, a width of each of the four distinct antenna elements increases, in a meandering fashion, from the central portion 2574 of the near-field antenna 2500 to a respective edge 2572 of the near-field antenna 2500. Furthermore, in some embodiments, the longest dimension of the respective meandering pattern parallels the distinct edge 2572.

Figure 27:
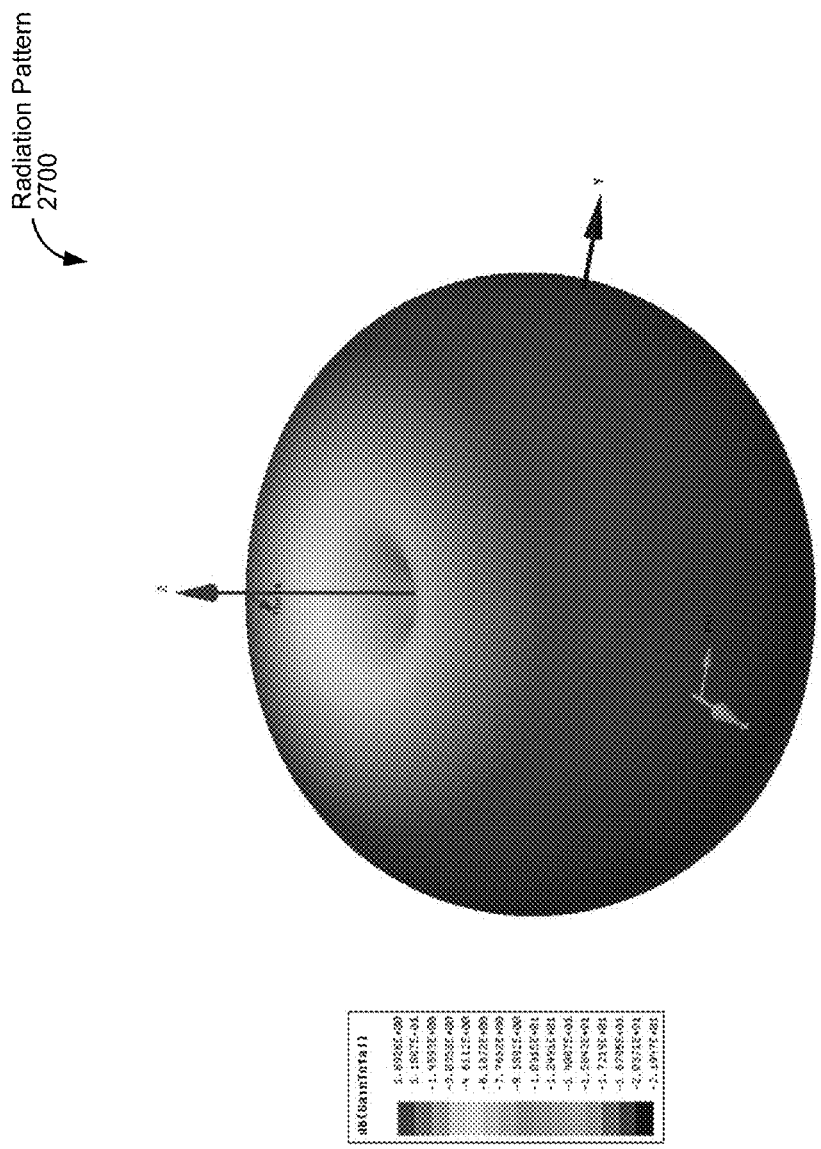
FIG. 27 shows a radiation pattern generated by the near-field antenna with a reflector of FIG. 25A.

As shown in FIG. 27, the near-field antenna 2500 (when it includes a reflector) creates substantially uniform radiation pattern 2700 that has minimal far-field gain. The dimensions provided above are merely used for illustrative purposes, and a person of skill in the art (upon reading this disclosure) will appreciate that various other dimensions could be used to obtain acceptable radiation properties, depending on the circumstances.

Figure 26:
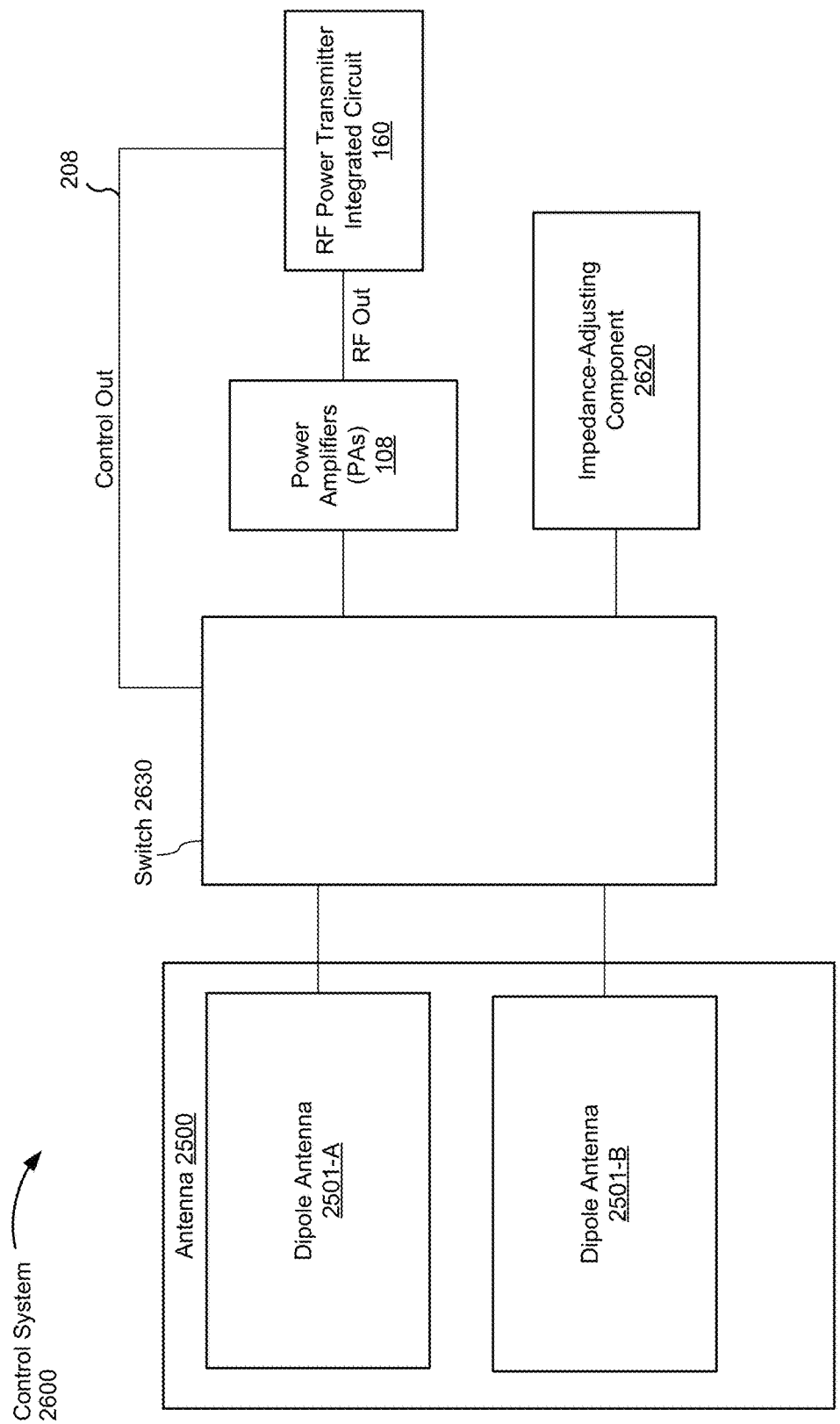
FIG. 26 is a block diagram of a control system used for controlling operation of a near-field antenna in accordance with some embodiments/.

FIG. 26 is a block diagram of a control system 2600 used for controlling operation of certain components of the near-field antenna 2500 in accordance with some embodiments. The control system 2600 may be an example of the charging pad 100 (FIG. 1A), however, one or more components included in the charging pad 100 are not included in the control system 2600 for ease of discussion and illustration.

The control system 2600 includes an RF power transmitter integrated circuit 160, one or more power amplifiers 108, an impedance-adjusting component 2620, and the near-field antenna 2500, which includes the first and second dipole antennas 2501-A, 2501-B. Each of these components is described in detail above, and the impedance-adjusting component 2620 is described in more detail below.

The impedance-adjusting component 2620 may be an RF termination or load, and is configured to adjust an impedance of at least one of the first and second dipole antennas 2501-A, 2501-B. Put another way, the impedance-adjusting component 2620 is configured to change an impedance one of the dipole antennas, thereby creating an impedance mismatch between the two dipole antennas. By creating an impedance mismatch between the two dipole antenna, mutual coupling between the two dipole antennas is substantially reduced. It is noted that the impedance-adjusting component 2620 is one example of an antenna-adjusting component. Various other antenna-adjusting components might be used (e.g., to change an effective length of any of the radiating elements) to adjust various other characteristics of the antenna (e.g., such as length of the respective antenna elements of each dipole), in order to ensure that one of the two dipoles is not tuned to a transmission frequency of the other dipole.

The control system 2600 also includes a switch 2630 (also referred to herein as "switch circuitry") having one or more switches therein (not shown). The switch 2630 is configured to switchably couple the first and second dipole antennas 2501-A, 2501-B to the impedance-adjusting component 2620 and at least one power amplifier 108, respectively (or vice versa), in response to receiving one or more instructions in the form of electrical signals (e.g., the "Control Out" signal) from the RF power transmitter integrated circuit 160. For example, the switch 2630 may couple, via one or more switches, the first dipole antenna 2501-A with the impedance-adjusting component 2620 and the second dipole antenna 2501-B with at least one power amplifier 108, or vice versa.

To accomplish the switching discussed above, the switch 2630 provides distinct signal pathways (e.g., via the one or more switches therein) to the first and second dipole antennas 2501-A, 2501-B. Each of the switches, once closed, creates a unique pathway between either: (i) a respective power amplifier 108 (or multiple power amplifiers 108) and a respective dipole antenna, or (ii) the impedance-adjusting component 2620 and a respective dipole antenna. Put another way, some of the unique pathways through the switch 2630 are used to selectively provide RF signals to one of the dipole antennas 2501-A, 2501-B while some of the unique pathways through the switch 2630 are used to adjust an impedance of one of the dipole antennas 2501-A, 2501-B (i.e., detune the dipole antennas 2501-A, 2501-B). It is noted that two or more switches of the switch circuitry may be closed at the same time, thereby creating multiple unique pathways to the near-field antenna 2500 that may be used simultaneously.

As shown, the RF power transmitter integrated circuit 160 is coupled to the switch 2630 via busing 208. The integrated circuit 160 is configured to control operation of the one or more switches therein (illustrated as the "Control Out" signal in FIGS. 1A, 1C, and 26). For example, the RF power transmitter integrated circuit 160 may close a first switch in the switch 2630, which connects a respective power amplifier 108 with the first dipole antenna 2501-A, and may close a second switch in the switch 2630 that connects the impedance-adjusting component 2620 with the second dipole antenna 2501-B, or vice versa. Moreover, the RF power transmitter integrated circuit 160 is coupled to the one or more power amplifiers 108 and is configured to cause generation of a suitable RF signal (e.g., the "RF Out" signal) and cause provision of the RF signal to the one or more power amplifiers 108. The one or more power amplifiers 108, in turn, are configured to provide the RF signal (e.g., based on an instruction received from the RF power transmitter integrated circuit 160) to one of the dipole antennas via the switch 2630, depending on which switch (or switches) in the switch circuitry 2630 is (are) closed.

In some embodiments, the RF power transmitter integrated circuit 160 controller is configured to control operation of the switch 2630 and the one or more power amplifiers 108 based on one or more of: (i) a location of a wireless-power-receiving device near (or on) the near-field antenna 2500, (ii) a polarization of a power-receiving-antenna of the wireless-power-receiving device, and (iii) a spatial orientation of the wireless-power-receiving device. In some embodiments, the RF power transmitter integrated circuit 160 receives information that allows the circuit 160 to determine (i) the location of the wireless-power-receiving device, (ii) the polarization of the power-receiving-antenna of the wireless-power-receiving device, and (iii) the spatial orientation of the wireless-power-receiving device from the wireless-power-receiving device. For example, the wireless-power-receiving device can send one or more communications signals to a communication radio of the near-field antenna 2500 indicating each of the above (e.g., data in the one or more communications signals indicates the location, polarization, and/or orientation of the wireless-power-receiving device). Further, as shown in FIG. 1A, the wireless communication component 204 (i.e., the communication radio of the near-field antenna 2500) is connected to the RF power transmitter integrated circuit 160. Thus, the data received by the wireless communication component 204 can be conveyed to the RF power transmitter integrated circuit 160.

In some embodiments, the first dipole antenna 2501-A may be configured to radiate electromagnetic signals having a first polarization (e.g., horizontally polarized electromagnetic signals) and the second dipole antenna 2501-B may be configured to radiate electromagnetic signals having a second polarization (e.g., vertically polarized electromagnetic signals) (or vice versa). Further, if the power-receiving-antenna of the wireless-power-receiving device is configured to receive electromagnetic signals having the first polarization, then the RF power transmitter integrated circuit 160 will connect the first dipole antenna 2501-A to the one or more power amplifiers 108 and will connect the impedance-adjusting component 2620 with the second dipole antenna 2501-B, via the switch 2630. In this way, the electromagnetic signals radiated by the near-field antenna 2500 will have a polarization that matches the polarization of the target device, thereby increasing an efficiency of energy transferred to the wireless-power-receiving device.

In some embodiments, the switch 2630 may be part of (e.g., internal to) the near-field antenna 2500. Alternatively, in some embodiments, the switch 2630 is separate from the near-field antenna 2500 (e.g., the switch 2630 may be a distinct component, or may be part of another component, such as the power amplifier(s) 108). It is noted that any switch design capable of accomplishing the above may be used.

FIG. 27 shows a radiation pattern 2700 generated by the near-field antenna 2500 when it does include the back reflector 2504 (i.e., the radiating antenna elements are "backed" by the metallic reflector). The illustrated radiation pattern 2700 is generated by the near-field antenna 2500 when (i) the first dipole antenna 2501-A is fed electromagnetic signals by the one or more power amplifiers 108, and (ii) the near-field antenna 2500 includes the reflector 2504. As shown, the radiation pattern 2700 has a higher concentration of EM energy produced along the X-axis and Y-axis (and has a radiation null along the Z-axis) and forms an overall torus shape. As such, the electromagnetic field concentration stays closer to the NF antenna 2500 and far-field gain is minimized (e.g., the EM field concentration stays closer to the radiator 2507 and the reflector 2504, FIG. 25E). Although not shown, the radiation pattern 2700 is polarized in a direction that is aligned with the X-axis.

Figure 28A:
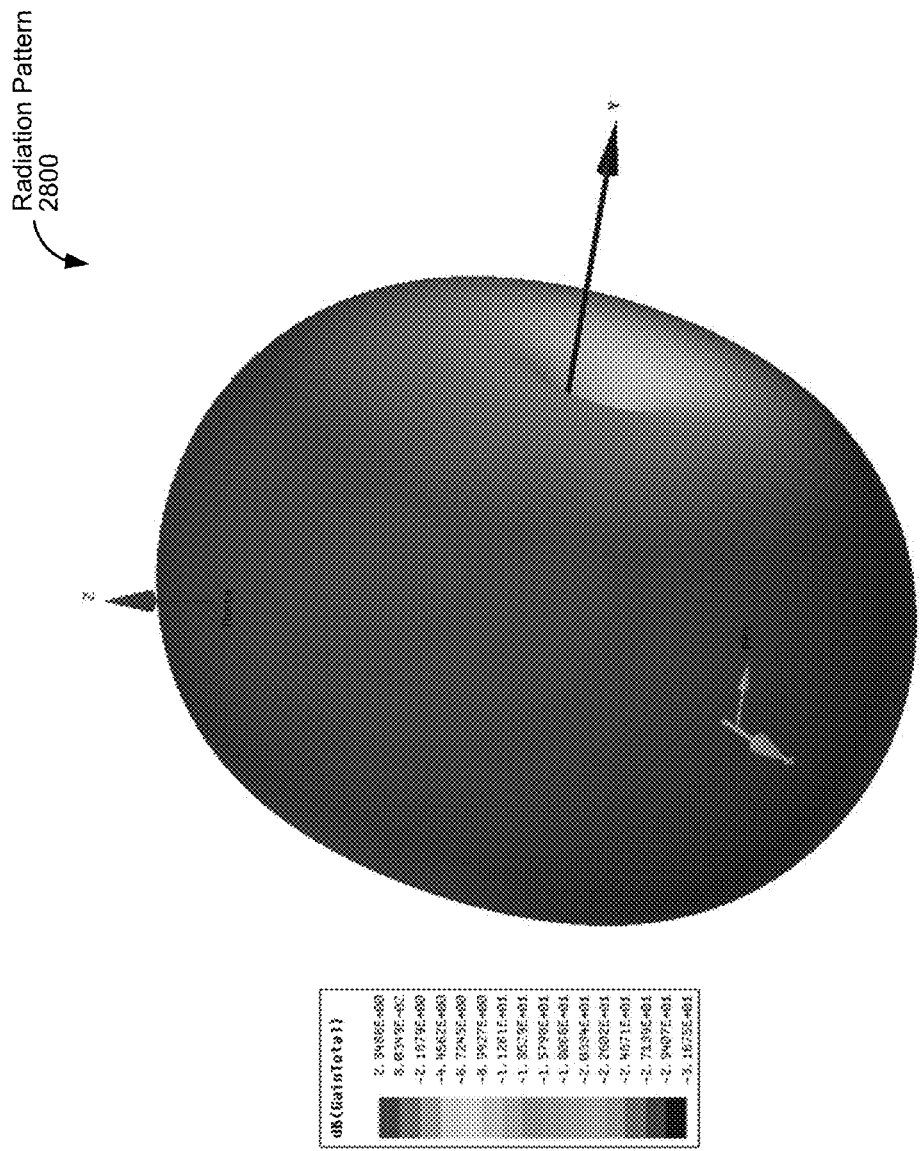
FIGS. 28A to 28C show additional radiation patterns generated by the near-field antenna of FIG. 25A.

Thus, by incorporating the reflector 2504, the radiation pattern 2700 is rotated 90 degrees about the X-axis relative to the radiation pattern 2800 (FIG. 28A, discussed below). Additionally, by incorporating the reflector 2504, a radiation null is formed along the Z-axis, which substantially reduces far-field gain, and energy radiated by the near-field antenna 2500 is concentrated within a near-field distance from the near-field antenna 2500. Again, the second dipole antenna 2501-B may be connected to the impedance-adjusting component 2620 when the first dipole antenna 2501-A is fed the electromagnetic signals.

Figure 28B:
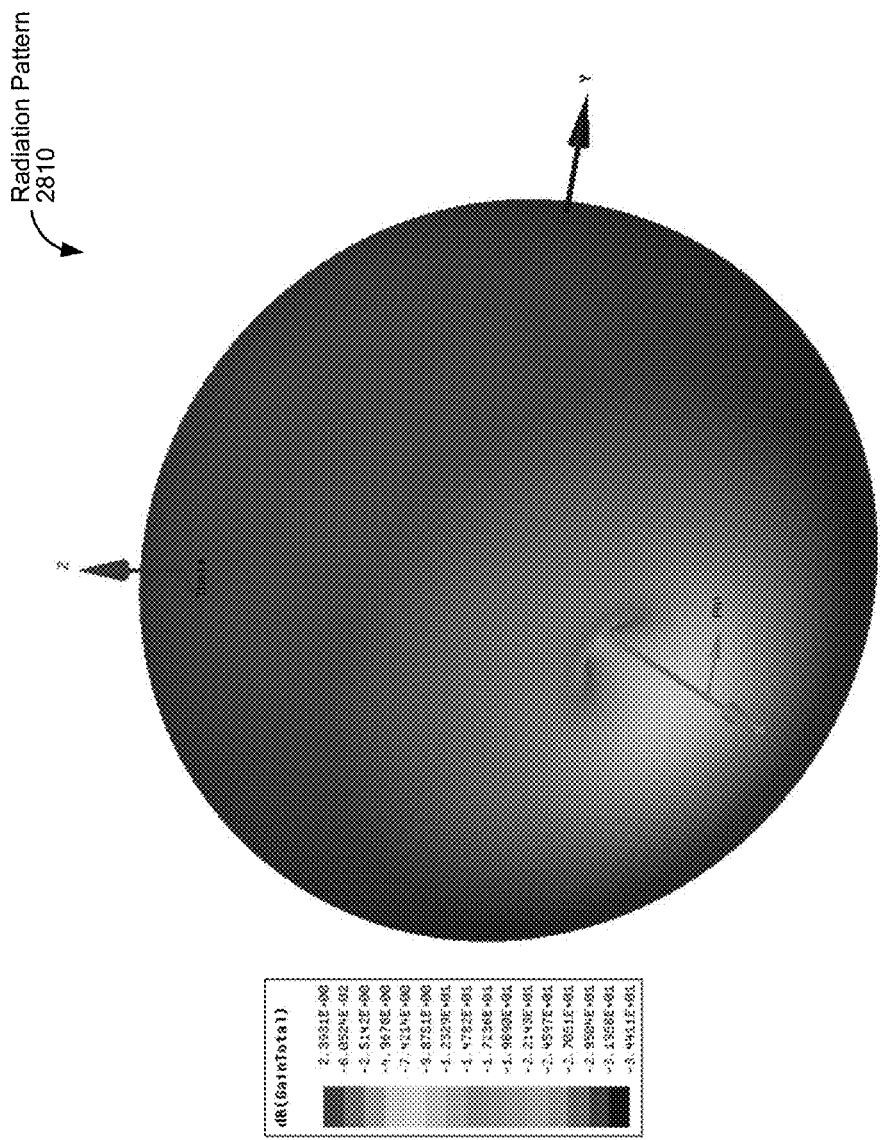
Figure 28C:
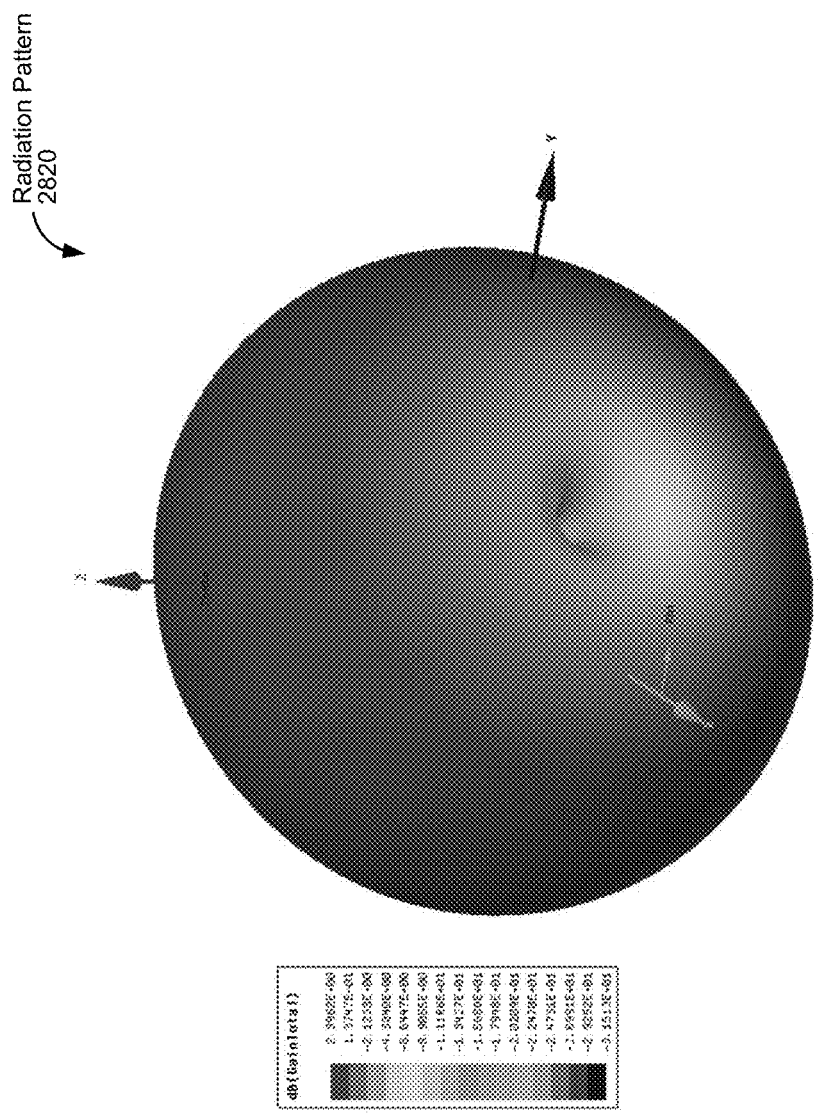

FIG. 28A to FIG. 28C show various radiation patterns generated by an embodiment of the near-field antenna 2500 that does not include the reflector 2504. The radiation pattern 2800 illustrated in FIG. 28A is generated by the near-field antenna 2500 when the first dipole antenna 2501-A is fed electromagnetic signals by the one or more power amplifiers 108. As shown, the radiation pattern 2800 has a higher concentration of EM energy produced along the Z-axis and the X-axis (and has a radiation null along the Y-axis) and forms an overall torus shape. This pattern 2800 shows that an antenna element, without the reflector, radiates outward/perpendicular to the near-field antenna 2500. Although not shown, the radiation pattern 2800 is polarized in a first direction (e.g., aligned with the X-axis). Furthermore, the second dipole antenna 2501-B may be connected to the impedance-adjusting component 2620 when the first dipole antenna 2501-A is fed the electromagnetic signals by the one or more power amplifiers 108.

The radiation pattern 2810 illustrated in FIG. 28B is generated by the near-field antenna 2500 when the second dipole antenna 2501-B is fed electromagnetic signals by the one or more power amplifiers 108 (i.e., the first dipole antenna 2501-A is not fed electromagnetic signals and instead may be connected to the impedance-adjusting component 2620). FIG. 28B shows that the radiation pattern 2810 that has a higher concentration of EM energy produced along the Z-axis and the Y-axis (and has a radiation null along the X-axis), which also forms an overall torus shape. Although not shown, the radiation pattern 2810 is polarized in a second direction (e.g., aligned with the Y-axis). Accordingly, the first dipole antenna 2501-A is configured to generate a radiation pattern 2800 polarized in the first direction while the second dipole antenna 2501-B is configured to generate a radiation pattern 2810 polarized in the second direction perpendicular to the first direction. In this way, the first dipole antenna 2501-A is fed when the polarization of the electromagnetic signals generated by the first dipole antenna 2501-A match a polarization of a power-receiving antenna of a wireless-power-receiving device. Alternatively, the second dipole antenna 2501-D is fed when the polarization of the electromagnetic signals generated by the second dipole antenna 2501-B match a polarization of a power-receiving antenna of a wireless-power-receiving device.

FIG. 28C shows a radiation pattern 2820 generated when both the first and second dipole antennas are fed electromagnetic signals by the one or more power amplifiers 108, and neither dipole antenna is connected to the impedance-adjusting component 2620. As shown, the radiation pattern 2820 has higher concentrations of EM energy produced along the Z-axis, X-axis and the Y-axis (and a radiation null is formed between the X-axis and the Y-axis) and forms an overall torus shape.

Figure 29A:
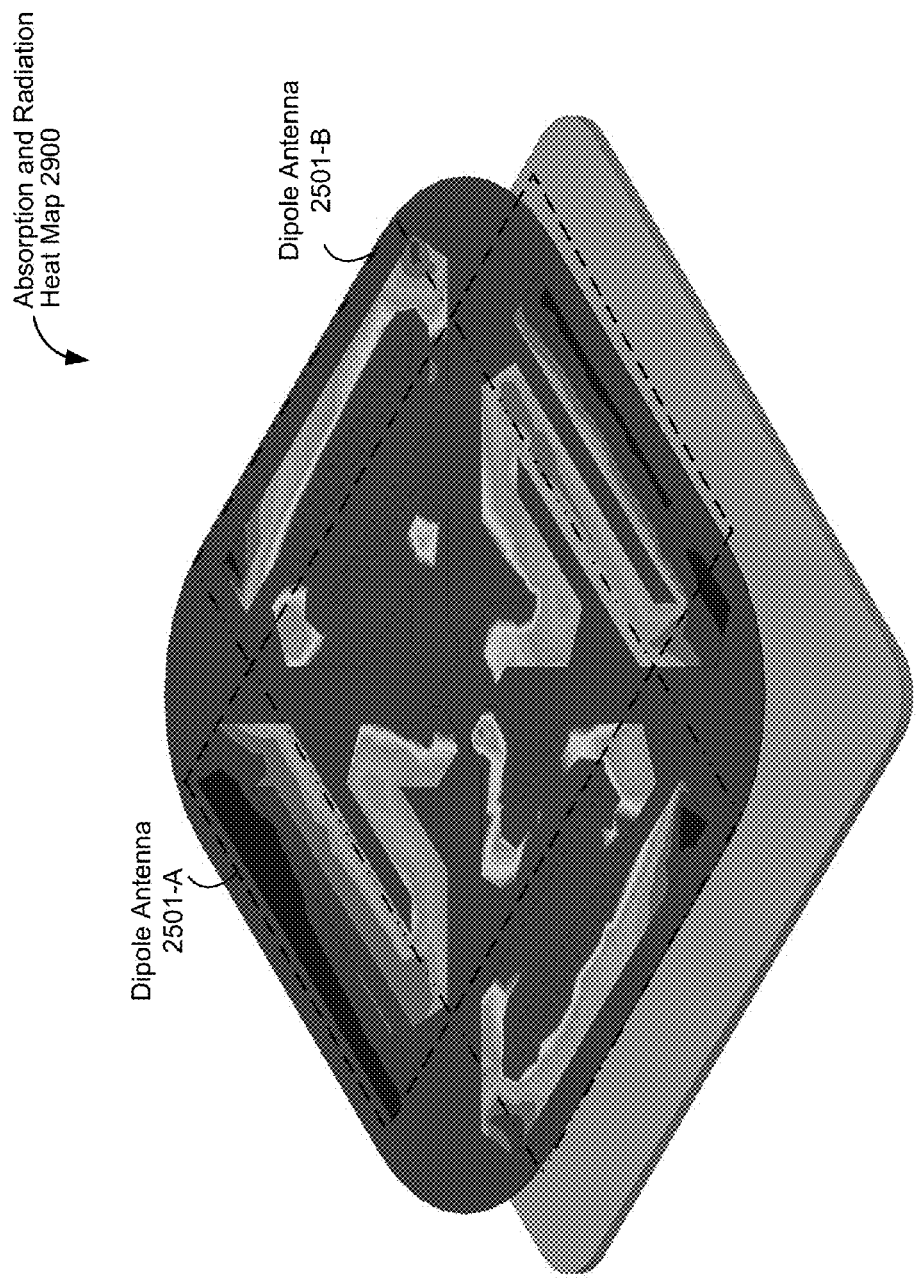
FIGS. 29A and 29B show concentrations of energy radiated and absorbed by dipole antennas of a near-field antenna in accordance with some embodiments.
Figure 29B:
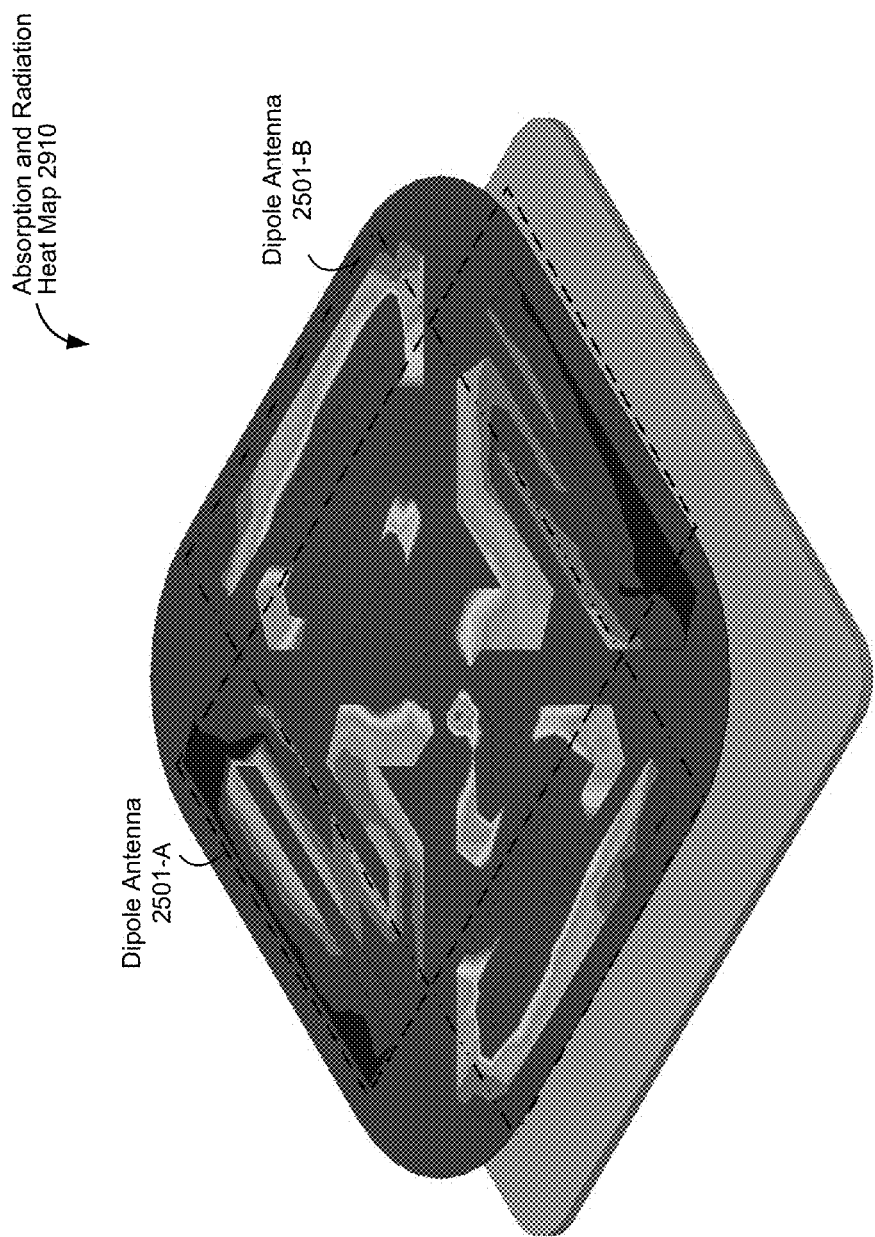

FIGS. 29A and 29B show concentrations of energy radiated and absorbed by dipole antennas of the near-field antenna 2500 in accordance with some embodiments.

In particular, FIG. 29A shows the resulting concentrations of energy radiated and absorbed by the dipole antennas 2501-A, 2501-B when an impedance of the first dipole antenna 2501-A substantially matches an impedance of the second dipole antenna 2501-B. FIG. 29B shows the resulting concentrations of energy radiated and absorbed by the dipole antennas 2501-A, 2501-B of the near-field antenna 2500 when an impedance of the first dipole antenna 2501-A differs from an impedance of the second dipole antenna 2501-B, which is achieved by connecting one of the dipole antennas to the impedance-adjusting component 2620. Put another way, the first and second dipole antennas 2501-A, 2501-B are intentionally detuned as a result of one of the dipole antennas being connected to the impedance-adjusting component 2620.

An absence of impedance mismatch between neighboring antenna elements leads to substantial mutual coupling between neighboring antenna elements. "Mutual coupling" refers to energy being absorbed by one antenna element (or one antenna dipole) when another nearby antenna element (or antenna dipole) is radiating. Antennas (or antenna arrays) with closely spaced antenna elements typically suffer from undesired mutual coupling between neighboring antenna elements, which limits the antenna's ability to radiated efficiency (this problem is particularly acute when the antenna elements are placed close together and when the antenna elements are miniaturized).

For example, with reference to FIG. 29A, the second dipole antenna 2501-B is fed electromagnetic signals by the one or more power amplifiers 108, and the coloring along the second dipole antenna 2501-B represents different concentrations of energy radiated by the second dipole antenna 2501-B, with reds corresponding to high concentrations, greens corresponding to medium concentrations, and blues corresponding to low concentrations. The first dipole antenna 2501-A in FIG. 29A is not independently radiating, however, certain amounts of the energy radiated by the second dipole antenna 2501-B is absorbed at the first dipole antenna 2501-A as a result of the mutual coupling between the two dipole antennas. Because of this mutual coupling, a radiation efficiency of the near-field antenna 2500 is not optimized (e.g., the NF antenna 2500 may only be able to transfer 50% or less of the energy it attempts to transmit).

In contrast, with reference to FIG. 29B, the second dipole antenna 2501-B is fed electromagnetic signals by the one or more power amplifiers 108. Additionally, the first dipole antenna 2501-A is coupled to the impedance-adjusting component 2620, thereby creating an intentional impedance mismatch between the two dipole antennas. In such a configuration, the first dipole antenna 2501-A in FIG. 29B is absorbing far less energy radiated by the second dipole antenna 2501-B compared to an amount of the energy that the first dipole antenna 2501-A was absorbing in FIG. 29A. Accordingly, a radiation efficiency of the near-field antenna 2500 in FIG. 29B is higher (e.g., the NF antenna 2500 may now be able to radiate 90% or greater of the energy it attempts to transmit) than the radiation efficiency of the near-field antenna 2500 in FIG. 29A.

Method of Operation

FIG. 30 is a flow diagram showing a method 3000 of wireless power transmission in accordance with some embodiments. Operations (e.g., steps) of the method 3000 may be performed by a controller (e.g., RF power transmitter integrated circuit 160, FIGS. 1A and 26) associated with a near-field antenna (e.g., near-field antenna 2500, FIG. 25A). At least some of the operations shown in FIG. 30 correspond to instructions stored in a computer memory or computer-readable storage medium (e.g., memory 206 of the charging pad 100, FIG. 2A).

The method 3000 includes providing (3002) a near-field antenna that includes a reflector (e.g., reflector 2504, FIG. 25A) and four distinct coplanar antenna elements (e.g., radiating elements 2502-A to 2502-D, FIG. 25A) offset from the reflector. The four distinct antenna elements follow respective meandering patterns, such as the meandering pattern shown in FIG. 25F. Furthermore, (i) two antenna elements of the four coplanar antenna elements form a first dipole antenna (e.g., dipole antenna 2501-A, FIG. 25A) aligned with a first axis (e.g., X-axis, FIG. 25A), and (ii) another two antenna elements (e.g., dipole antenna 2501-B, FIG. 25A) of the four coplanar antenna elements form a second dipole antenna aligned with a second axis (e.g., Y-axis, FIG. 25A) perpendicular to the first axis. In some embodiments, the respective meandering patterns are all the same.

In some embodiments, a first antenna element (e.g., first radiating element 2502-A) of the four distinct coplanar antenna elements is a first pole of the first dipole antenna and a second antenna element (e.g., second radiating element 2502-B) of the four distinct coplanar antenna elements is a second pole of the first dipole antenna. Furthermore, a third antenna element (e.g., third radiating element 2502-C) of the four distinct coplanar antenna elements may be a first pole of the second dipole antenna and a fourth antenna element (e.g., fourth radiating element 2502-D) of the four distinct coplanar antenna elements may be a second pole of the second dipole antenna. The two antenna elements that form the first dipole antenna can each include two segments that are perpendicular to the first axis, and the other two antenna elements that form the second dipole antenna can each include two segments that parallel the first axis. For example, with reference to FIG. 25A, the first and second radiating elements 2502-A, 2502-B each includes two segments (e.g., segments 2560-C and 2560-D, FIG. 25F) that are perpendicular to the X-axis, and the third and fourth radiating elements 2502-C, 2502-D each includes two segments (e.g., segments 2560-C and 2560-D, FIG. 25F) that are parallel to the X-axis. In such an arrangement, the two antenna elements that form the first dipole antenna are configured to radiate electromagnetic signals having a first polarization, and the two antenna elements that form the second dipole antenna are configured to radiate electromagnetic signals having a second polarization perpendicular to the first polarization.

In some embodiments, each of the four distinct antenna elements includes: (i) a first plurality of segments, and (ii) a second plurality of segments interspersed between each of the first plurality of segments. For example, with reference to FIG. 25G, the second plurality of segments 2562-A-2562-C are interspersed between the first plurality of segments 2560-A-2560-D. In such embodiments, first lengths of segments in the first plurality of segments increase from a first end portion of the antenna element to a second end portion of the antenna element, as shown in FIGS. 25F and 25G. It is noted that the "first end portion" of each antenna element corresponds to the first end portion 2564 illustrated in FIG. 25F, and the first end portion of each antenna element is near a central portion 2574 (FIG. 25H) of the near-field antenna 2500. Furthermore, the "second end portion" of each antenna element corresponds to the second end portion 2566 illustrated in FIG. 25F, and the second end portion 2566 of each antenna element extends towards an edge 2572 (FIG. 25H) of the near-field antenna 2500. Thus, put simply, a width of each of the four distinct antenna elements increases, in a meandering fashion, from a central portion of the near-field antenna 2500 to a respective edge of the near-field antenna 2500.

In some embodiments, second lengths of segments in the second plurality of segments also increase from the first end portion of the antenna element to the second end portion of the antenna element, while in other embodiments the second lengths of the segments in the second plurality of segments remain substantially the same, as shown in FIG. 25F. Additionally, the first lengths of one or more segments in the first plurality of segments are different from the second lengths of the segments in the second plurality of segments. In some embodiments, the first lengths of the first plurality of segments toward the second end portion of the antenna element are greater than the second lengths of the second plurality of segments toward the second end portion of the antenna element. For example, the lengths of segments 2560-C and 2560-D are substantially longer than the lengths of segments 2562-B and 2562-C. Segments of the radiating elements are discussed in further detail above with reference to FIGS. 25F and 25G.

In some embodiments, a first end portion of the respective meandering pattern followed by each of the four distinct antenna elements borders a same central portion (e.g., central portion 2574, FIG. 25H) of the near-field antenna, and a second end portion of the respective meandering pattern followed by each of the four distinct antenna elements borders a distinct edge (e.g., one of the edges 2572, FIG. 25H) of the near-field antenna. Further, a longest dimension of the respective meandering pattern followed by each of the four distinct antenna elements may be closer to the distinct edge of the near-field antenna than to the same central portion of the near-field antenna. In addition, a shortest dimension of the respective meandering pattern followed by each of the four distinct antenna elements may be closer to the same central portion of the near-field antenna than the distinct edge of the near-field antenna.

In some embodiments, the four distinct coplanar antenna elements are formed on or within a substrate. For example, as shown in FIGS. 25A and 25B, opposing first and second surfaces of the four distinct coplanar antenna elements are exposed and coplanar with opposing first and second surfaces of the substrate 2506. It is noted that a dielectric (e.g., thermoplastic or thermosetting polymer) can be deposited over the four distinct coplanar antenna elements so that the antenna elements are protected (may or may not be visible depending on the properties of the dielectric). In some embodiments, the substrate may include a metamaterial of a predetermined magnetic permeability or electrical permittivity. The metamaterial substrate can increase the performance of the near-field antenna as a whole (e.g., increase radiation efficient when compared to a substrate made from a common dielectric).

The near-field antenna further includes switch circuitry (e.g., switch 2630, FIG. 26) coupled to at least two of the four coplanar antenna elements. For example, the near-field antenna may include a first feed (e.g., feed 2508-A) with opposing first and second ends, where the first end of the first feed is connected to a first of the two antenna elements composing the first dipole antenna and the second end of the first feed is connected to the switch circuitry, e.g., via metal traces deposited on a printed circuit board 2514 (FIG. 25E).

In addition, the near-field antenna may include a second feed (e.g., feed 2508-B) with opposing first and second ends, where the first end of the second feed is connected to a first of the two antenna elements composing the second dipole antenna and the second end of the second feed is connected to the switch circuitry, e.g., via metal traces (e.g., busing 208) deposited on the printed circuit board 2514. The feeds and the printed circuit board are discussed in further detail above with reference to FIG. 25E.

The near-field antenna also includes a power amplifier (e.g., power amplifier(s) 108, FIG. 26) coupled to the switch circuitry (e.g., via the metal traces), and an impedance-adjusting component (e.g., component 2520, FIG. 26) coupled to the switch circuitry (e.g., via the metal traces). The near-field antenna may also include a controller (e.g., RF power transmitter integrated circuit 160, FIGS. 1A and 26) configured to control operation of the switch circuitry and the power amplifier. The controller may be connected to the switch circuitry and the power amplifier via the metal traces. The power amplifier, the impedance-adjusting component, and the controller are discussed in further detail above with reference to FIG. 26.

The method 3000 further includes instructing (3004) the switch circuitry to couple: (i) the first dipole antenna to the power amplifier, and (ii) the second dipole antenna to the impedance-adjusting component (or vice versa). For example, with reference to FIG. 26, the integrated circuit 160 may send the "Control Out" signal to the switch circuitry 2630, which causes one or more first switches in the switch circuitry 2630 to close and connect a respective power amplifier 108 with the first dipole antenna 2501-A. The "Control Out" signal also causes one or more second switches in the switch circuitry 2630 to close and connect the impedance-adjusting component 2620 with the second dipole antenna 2501-B. It is noted that, in some embodiments, the switch circuitry 2630 includes first and second switch circuits. In such embodiments, the first switch circuit is closed to connect the first dipole antenna to the power amplifier and the second dipole antenna to the impedance-adjusting component. Further, the second switch circuit is closed to connect the first dipole antenna to the impedance-adjusting component and the second dipole antenna to the power amplifier. Controlling operation of the switch circuitry 2630 is discussed in further detail above with reference to FIG. 26.

The one or more signals generated and provided by the controller may be based on information received from a wireless-power-receiving device (e.g., receiver 104, FIG. 2B). For example, the controller may receive location information for the wireless-power-receiving device, (ii) polarization information for a power-receiving-antenna of the wireless-power-receiving device, and/or (iii) orientation information for the wireless-power-receiving device, each of which may be received from the wireless-power-receiving device. Further, the one or more electrical signals may be based on this received information. Put another way, the controller may be configured to control operation of the switch circuitry and the power amplifier based on one or more of: (i) a location of a wireless-power-receiving device (as indicated by the location information), (ii) a polarization of a power-receiving-antenna of the wireless-power-receiving device (as indicated by the polarization information), and (iii) an orientation of the wireless-power-receiving device (as indicated by the orientation information).

As explained above with reference to FIG. 26, the switch circuitry is configured to switchably couple the first and second dipole antennas 2501-A, 2501-B to the impedance-adjusting component 2620 and the power amplifier 108, respectively (or vice versa), in response to receiving one or more electrical signals from the RF power transmitter integrated circuit 160 (e.g., the "Control Out" signal). Further, in some embodiments, the switch circuitry may be configured to switchably couple the first dipole antenna to the power amplifier and the second dipole antenna to the impedance-adjusting component when the near-field antenna is in a first operation mode. Moreover, the switch circuitry may be configured to switchably couple the second dipole antenna to the power amplifier and the first dipole antenna to the impedance-adjusting component when the near-field antenna is in a second operation mode distinct from the first operation mode.

The method 3000 further includes instructing (3006) the power amplifier to feed electromagnetic signals to the first dipole antenna via the switch circuitry. For example, with reference to FIG. 26, the integrated circuit 160 sends the "RF Out" signal to the power amplifier. The power amplifier may, in turn, amplify (if needed) the received "RF Out" signal, and then provide the amplified RF signal to the first dipole antenna via the switch circuitry. The electromagnetic signals, when fed to the first dipole antenna, cause the first dipole antenna to radiate electromagnetic signals to be received by the wireless-power-receiving device, which is located within a threshold distance from the near-field antenna. The wireless-power-receiving device can use energy from the radiated electromagnetic signals, once received, to power or charge an electronic device coupled with the wireless-power-receiving device. Additionally, because the second dipole antenna is connected to the impedance-adjusting component and the first dipole antenna is not, an impedance of the second dipole antenna is adjusted (by the impedance-adjusting component) so that the impedance of the second dipole antenna differs from an impedance of the first dipole antenna. In such an arrangement, the first dipole antenna and the second dipole antenna are detuned (e.g., an operating frequency of the first dipole antenna differs from an operating frequency of the second dipole antenna).

In some embodiments, the method 3000 further includes reflecting, by the reflector, at least a portion of the electromagnetic signals radiated by the first dipole antenna. In addition, in some embodiments, the method 3000 further includes cancelling, by the reflector, at least a portion of the electromagnetic signals radiated by the first dipole antenna.

All of these examples are non-limiting and any number of combinations and multi-layered structures are possible using the example structures described above.

Further embodiments also include various subsets of the above embodiments including embodiments in FIGS. 1-30 combined or otherwise re-arranged in various embodiments, as one of skill in the art will readily appreciate while reading this disclosure.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A near-field antenna comprising:
   a reflector;
   four distinct coplanar antenna elements, offset from the reflector, each of the four distinct antenna elements following respective meandering patterns, wherein:
      two antenna elements of the four coplanar antenna elements form a first dipole antenna along a first axis; and
      another two antenna elements of the four coplanar antenna elements form a second dipole antenna along a second axis perpendicular to the first axis;
   a power amplifier configured to feed electromagnetic signals to at least one of the first and second dipole antennas;
   an impedance-adjusting component configured to adjust an impedance of at least one of the first and second dipole antennas; and
   switch circuitry coupled to the power amplifier, the impedance-adjusting component, and the first and second dipole antennas, the switch circuitry being configured to:
      (i) switchably couple the first dipole antenna to the power amplifier and the second dipole antenna to the impedance-adjusting component, or
      (ii) switchably couple the second dipole antenna to the power amplifier and the first dipole antenna to the impedance-adjusting component.

2. The near-field antenna of claim 1, wherein:
   in a first mode of operation for the near-field antenna, the switch circuitry couples (i) the first dipole antenna to the power amplifier and (ii) the second dipole antenna to the impedance-adjusting component; and
   in a second mode of operation for the near-field antenna, the switch circuitry couples (i) the second dipole antenna to the power amplifier and (ii) the first dipole antenna to the impedance-adjusting component.

3. The near-field antenna of claim 2, wherein:
   in the first mode of operation for the near-field antenna, the first dipole antenna is to receive electromagnetic waves from the power amplifier and radiate the received electromagnetic waves having a first polarization; and
   in the second mode of operation for the near-field antenna, the second dipole antenna is to receive electromagnetic waves from the power amplifier and radiate the received electromagnetic waves having a second polarization different from the first polarization.

4. The near-field antenna of claim 3, wherein a wireless-power-receiving device, located within a threshold distance from the near-field antenna, is configured to harvest the radiated electromagnetic waves and use the harvested electromagnetic waves to power or charge an electronic device coupled with the wireless-power-receiving device.

5. The near-field antenna of claim 1, further comprising a controller configured to control operation of the switch circuitry and the power amplifier.

6. The near-field antenna of claim 5, wherein the controller is configured to control operation of the switch circuitry and the power amplifier based on one or more of: (i) a location of a wireless-power-receiving device, (ii) a polarization of a power-receiving-antenna of the wireless-power-receiving device, and (iii) a spatial orientation of the wireless-power-receiving device.

7. The near-field antenna of claim 1, further comprising:
   a first feed connected to a first of the two antenna elements of the first dipole antenna and the switch circuitry, wherein the first feed is configured to supply electromagnetic signals to the first antenna element of the first dipole antenna that originate from the power amplifier when the power amplifier is switchably coupled to the first dipole antenna by the switch circuitry; and
   a second feed connected to a first of the other two antenna elements of the second dipole antenna and the switch circuitry, wherein the second feed is configured to supply electromagnetic signals to the first antenna element of the second dipole antenna that originate from the power amplifier when the power amplifier is switchably coupled to the second dipole antenna by the switch circuitry.

8. The near-field antenna of claim 1, wherein:
   a first antenna element of the four distinct coplanar antenna elements is a first pole of the first dipole antenna;
   a second antenna element of the four distinct coplanar antenna elements is a second pole of the first dipole antenna;
   a third antenna element of the four distinct coplanar antenna elements is a first pole of the second dipole antenna; and
   a fourth antenna element of the four distinct coplanar antenna elements is a second pole of the second dipole antenna.

9. The near-field antenna of claim 1, wherein:
   the two antenna elements that form the first dipole antenna each include two segments that are perpendicular to the first axis; and
   the other two antenna elements that form the second dipole antenna each include two segments that are parallel to the first axis.

10. The near-field antenna of claim 1, wherein:
    a first end portion of the respective meandering pattern followed by each of the four distinct antenna elements borders a same central portion of the near-field antenna;
    a second end portion of the respective meandering pattern followed by each of the four distinct antenna elements borders a distinct edge of the near-field antenna; and a longest dimension of the respective meandering pattern followed by each of the four distinct antenna elements is closer to the distinct edge of the near-field antenna than to the same central portion of the near-field antenna.

11. The near-field antenna of claim 10, wherein a shortest dimension of the respective meandering pattern followed by each of the four distinct antenna elements is closer to the same central portion of the near-field antenna than the distinct edge of the near-field antenna.

12. The near-field antenna of claim 1, wherein the reflector is a solid metal sheet of copper or a copper alloy.

13. The near-field antenna of claim 1, wherein the reflector is configured to reflect at least a portion of the electromagnetic signals radiated by the first or second dipole antennas.

14. The near-field antenna of claim 1, wherein the four distinct coplanar antenna elements are formed on or within a substrate.

15. The near-field antenna of claim 14, wherein the substrate comprises a metamaterial of a predetermined magnetic permeability or electrical permittivity.

16. The near-field antenna of claim 1, wherein the respective meandering patterns are all the same.

17. The near-field antenna of claim 16, wherein the two antenna elements that form the first dipole antenna are aligned along the first axis such that the respective meandering patterns followed by each of the two antenna elements are mirror images of one another.

18. The near-field antenna of claim 17, wherein the other two antenna elements that form the second dipole antenna are aligned along the second axis such that the respective meandering patterns followed by each of the other two antenna elements are mirror images of one another.

19. A method of wirelessly charging a receiver device, the method comprising:
   providing a near-field antenna that comprises:
      a reflector;
      four distinct coplanar antenna elements, offset from the reflector, each of the four distinct antenna elements following respective meandering patterns, wherein: (i) two antenna elements of the four coplanar antenna elements form a first dipole antenna aligned with a first axis; and (ii) another two antenna elements of the four coplanar antenna elements form a second dipole antenna aligned with a second axis perpendicular to the first axis;
      switch circuitry coupled to at least two of the four coplanar antenna elements;
      a power amplifier coupled to the switch circuitry; and
      an impedance-adjusting component coupled to the switch circuitry;
   instructing the switch circuitry to couple: (i) the first dipole antenna to the power amplifier, and (ii) the second dipole antenna to the impedance-adjusting component;
   instructing the power amplifier to feed electromagnetic signals to the first dipole antenna via the switch circuitry, wherein:
      the electromagnetic signals, when fed to the first dipole antenna, cause the first dipole antenna to radiate electromagnetic signals to be received by a wireless-power-receiving device located within a threshold distance from the near-field antenna, and
      an impedance of the second dipole antenna is adjusted by the impedance-adjusting component so that the impedance of the second dipole antenna differs from an impedance of the first dipole antenna.

20. A non-transitory computer-readable storage medium storing executable instructions that, when executed by one or more processors of a near-field antenna with a reflector, four distinct coplanar antenna elements, switch circuitry coupled to at least two of the four coplanar antenna elements, a power amplifier coupled to the switch circuitry, and an impedance-adjusting component coupled to the switch circuitry, cause the near-field antenna to:
   instruct the switch circuitry to couple: (i) the first dipole antenna to the power amplifier, and (ii) the second dipole antenna to the impedance-adjusting component;
   instruct the power amplifier to feed electromagnetic signals to the first dipole antenna via the switch circuitry, wherein:
      the electromagnetic signals, when fed to the first dipole antenna, cause the first dipole antenna to radiate electromagnetic signals to be received by a wireless-power-receiving device located within a threshold distance from the near-field antenna, and
      an impedance of the second dipole antenna is adjusted by the impedance-adjusting component so that the impedance of the second dipole antenna differs from an impedance of the first dipole antenna.

* * * * *